US011895357B2

(12) United States Patent
Yoo et al.

(10) Patent No.: US 11,895,357 B2
(45) Date of Patent: Feb. 6, 2024

(54) BROADCASTING SIGNAL TRANSMISSION DEVICE, BROADCASTING SIGNAL RECEPTION DEVICE, BROADCASTING SIGNAL TRANSMISSION METHOD, AND BROADCASTING SIGNAL RECEPTION METHOD

(71) Applicant: LG Electronics Inc., Seoul (KR)

(72) Inventors: Huisang Yoo, Seoul (KR); Younghun Song, Seoul (KR); Kyoungsoo Moon, Seoul (KR); Seungjoo An, Seoul (KR); Jinwon Lee, Seoul (KR); Hyekyeong Yeom, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 70 days.

(21) Appl. No.: 17/750,204

(22) Filed: May 20, 2022

(65) Prior Publication Data
US 2022/0286729 A1 Sep. 8, 2022

Related U.S. Application Data

(63) Continuation of application No. 16/843,192, filed on Apr. 8, 2020, now Pat. No. 11,425,449, which is a (Continued)

(51) Int. Cl.
H04N 21/434 (2011.01)
H04N 21/262 (2011.01)
(Continued)

(52) U.S. Cl.
CPC ..... *H04N 21/4345* (2013.01); *H04N 21/2362* (2013.01); *H04N 21/23439* (2013.01);
(Continued)

(58) Field of Classification Search
CPC ......... H04N 21/4345; H04N 21/23439; H04N 21/2362; H04N 21/26258; H04N 21/435;
(Continued)

(56) References Cited

U.S. PATENT DOCUMENTS 9,900,166 B2  2/2018  Luby .................. H04L 12/1868
2010/0185746 A1  7/2010  Suh .................... H04N 21/4345
                                                                          709/217
(Continued)

FOREIGN PATENT DOCUMENTS

KR  10-2014-0134676 A  11/2014
WO  WO-2014171718 A1  10/2014  ......... H04N 21/8456

*Primary Examiner* — Mulugeta Mengesha
*Assistant Examiner* — Alexander Boyd
(74) *Attorney, Agent, or Firm* — Bryan Cave Leighton Paisner LLP

(57) ABSTRACT

A broadcasting signal reception device may include a reception unit for receiving, through the broadcasting network, a broadcasting signal including a first component of a DASH content which can be received through a broadcasting network and a broadband network; a delivery module for de-capsulating the received broadcasting signal, outputting LCT packets transmitted through one or more LCT channels, and parsing signaling information used for acquiring segments corresponding to the first component of the DASH content included in the LCT packets; and a decoder for decoding the acquired segments.

18 Claims, 65 Drawing Sheets

Related U.S. Application Data continuation of application No. 15/538,159, filed as application No. PCT/KR2015/014126 on Dec. 22, 2015, now Pat. No. 10,667,004.

(60) Provisional application No. 62/096,496, filed on Dec. 23, 2014, provisional application No. 62/095,760, filed on Dec. 22, 2014.

(51) Int. Cl.

| | | |
|---|---|---|
| *H04N 21/643* | (2011.01) | |
| *H04N 21/462* | (2011.01) | |
| *H04N 21/2362* | (2011.01) | |
| *H04N 21/2343* | (2011.01) | |
| *H04N 21/435* | (2011.01) | |
| *H04N 21/61* | (2011.01) | |
| *H04N 21/845* | (2011.01) | |
| *H04N 7/54* | (2006.01) | |
| *H04N 7/24* | (2011.01) | |

(52) U.S. Cl.
CPC ..... *H04N 21/26258* (2013.01); *H04N 21/435* (2013.01); *H04N 21/4622* (2013.01); *H04N 21/6125* (2013.01); *H04N 21/643* (2013.01); *H04N 21/64322* (2013.01); *H04N 21/8456* (2013.01); *H04N 7/54* (2013.01); *H04N 2007/246* (2013.01)

(58) Field of Classification Search
CPC ........... H04N 21/4622; H04N 21/6125; H04N 21/643; H04N 21/64322; H04N 21/8456; H04N 7/54; H04N 2007/246
See application file for complete search history.

(56) References Cited

U.S. PATENT DOCUMENTS

| | | | |
|---|---|---|---|
| 2011/0072075 A1 | 3/2011 | Gautier | H04L 12/1881 709/203 |
| 2012/0259994 A1 | 10/2012 | Gillies et al. | |
| 2012/0331508 A1 | 12/2012 | Vare et al. | |
| 2013/0036234 A1 | 2/2013 | Pazos et al. | |
| 2013/0279879 A1 | 10/2013 | Watanabe | H04N 21/8543 386/239 |
| 2014/0019635 A1 | 1/2014 | Reznik et al. | |
| 2015/0278022 A1 | 10/2015 | Chen | H04L 65/4076 714/15 |
| 2016/0072637 A1 | 3/2016 | Gholmieh | H04L 65/4076 709/219 |
| 2016/0164943 A1 | 6/2016 | Walker | H04N 21/23439 709/219 |
| 2016/0261665 A1 | 9/2016 | Stockhammer | H04N 21/23439 |
| 2016/0330490 A1 | 11/2016 | Kitahara | H04N 21/4345 |
| 2017/0019431 A1 | 1/2017 | Kitahara | H04N 21/4385 |
| 2017/0064044 A1* | 3/2017 | Yang | H04L 69/324 |
| 2017/0134542 A1* | 5/2017 | Hwang | G09G 5/06 |
| 2017/0347134 A1 | 11/2017 | Bae | H04N 21/6125 |
| 2017/0353253 A1 | 12/2017 | Yamagishi | H04H 60/17 |
| 2018/0098111 A1* | 4/2018 | Yang | H04N 21/4345 |
| 2018/0295407 A1* | 10/2018 | Michael | H04N 21/64707 |

\* cited by examiner

FIG. 2

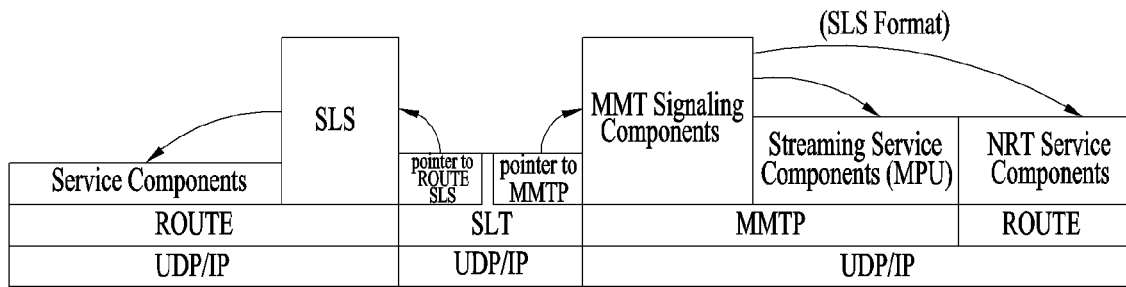

FIG. 3

| Element or Attribute Name | Use |
|---|---|
| SLT | |
| @bsid | 1 |
| @sltSectionVersion | 1 |
| @sltSectionNumber | 0..1 |
| @totalSltSectionNumbers | 0..1 |
| @language | 0..1 |
| @capabilities | 0..1 |
| InetSigLoc | 0..1 |
| Service | 1..N |
| @serviceId | 1 |
| @SLT serviceSeqNumber | 1 |
| @protected | 0..1 |
| @majorChannelNo | 1 |
| @minorChannelNo | 1 |
| @serviceCategory | 1 |
| @shortServiceName | 1 |
| @hidden | 0..1 |
| @sls ProtocolType | 1 |
| BroadcastSignaling | 0..1 |
| @slsPlpId | 0..1 |
| @slsDestinationIpAddress | 0..1 |
| @slsDestinationUdpPort | 0..1 |
| @slsSourceIpAddress | 0..1 |
| @slsMajorProtocolVersion | 0..1 |
| @SlsMinorProtocolVersion | 0..1 |
| @serviceLanguage | 0..1 |
| @broadbandAccessRequired | 0..1 |
| @capabilities | 0..1 |
| InetSigLoc | 0..1 |

FIG. 5

| Element or Attribute Name | | | | Use |
|---|---|---|---|---|
| bundleDescription | | | | |
| | userServiceDescription | | | |
| | | @serviceId | | M |
| | | @atsc: serviceId | | M |
| | | @atsc: serviceStatus | | OD |
| | | @atsc: fullMPDUri | | M |
| | | @atsc: sTSIDUri | | M |
| | | name | | 0..N |
| | | | lang | CM |
| | | serviceLanguage | | 0...N |
| | | atsc: capabilityCode | | 0...1 |
| | | deliveryMethod | | 1..N |
| | | | r12: broadcastAppService | 1..N |
| | | | | basePattern | 1..N |
| | | | r12: unicastAppService | 0..N |
| | | | | basePattern | 1..N |

FIG. 6

| Element and Attribute Names | | | Use |
|---|---|---|---|
| S - TSID | | | |
| | @serviceId | | O |
| | RS | | 1..N |
| | | @bsid | OD |
| | | @sIpAddr | OD |
| | | @dIpAddr | OD |
| | | @dport | OD |
| | | @PLPID | OD |
| | | LS | 1..N |
| | | @tsi | M |
| | | @PLPID | OD |
| | | @bw | O |
| | | @startTime | O |
| | | @endTime | O |
| | | SrcFlow | 0..1 |
| | | RprFlow | 0..1 |

FIG. 7

| Element or Attribute Name | | | | | | Use |
|---|---|---|---|---|---|---|
| bundleDescription | | | | | | |
| | userServiceDescription | | | | | |
| | | @serviceId | | | | M |
| | | @atsc: serviceId | | | | M |
| | | Name | | | | 0..N |
| | | | Lang | | | CM |
| | | serviceLanguage | | | | 0..N |
| | | atsc: capabilityCode | | | | 0..1 |
| | | atsc: Channel | | | | 1 |
| | | | @atsc: majorChannelNo | | | M |
| | | | @atsc: minorChannelNo | | | M |
| | | | @atsc: serviceLang | | | O |
| | | | @atsc: serviceGenre | | | O |
| | | | @atsc: serviceIcon | | | M |
| | | | atsc: ServiceDescription | | | 0..N |
| | | | | @atsc: serviceDescrText | | M |
| | | | | @atsc: serviceDescrLang | | O |
| | | atsc:mpuComponent | | | | 0..1 |
| | | | @atsc: mmtPackageId | | | M |
| | | | @atsc: next MmtPackageId | | | O |
| | | atsc: routeComponent | | | | 0..1 |
| | | | @atsc: sTSIDUri | | | M |
| | | | @slsPlpId | | | OD |
| | | | @slsDestinationIpAddress | | | OD |
| | | | @slsDestinationUdpPort | | | M |
| | | | @slsSourceIpAddress | | | M |
| | | | @slsMajorProtocolVersion | | | OD |
| | | | @SlsMinorProtocolVersion | | | OD |
| | | atsc: broadbandComponent | | | | 0..1 |
| | | | @atsc: fullfMPDUri | | | M |
| | | atsc: ComponentInfo | | | | 1..N |
| | | | @atsc: component Type | | | M |
| | | | @atsc: component Role | | | M |
| | | | @atsc: component ProtectedFlag | | | OD |
| | | | @atsc: component Id | | | M |
| | | | @atsc: component Name | | | O |

FIG. 13
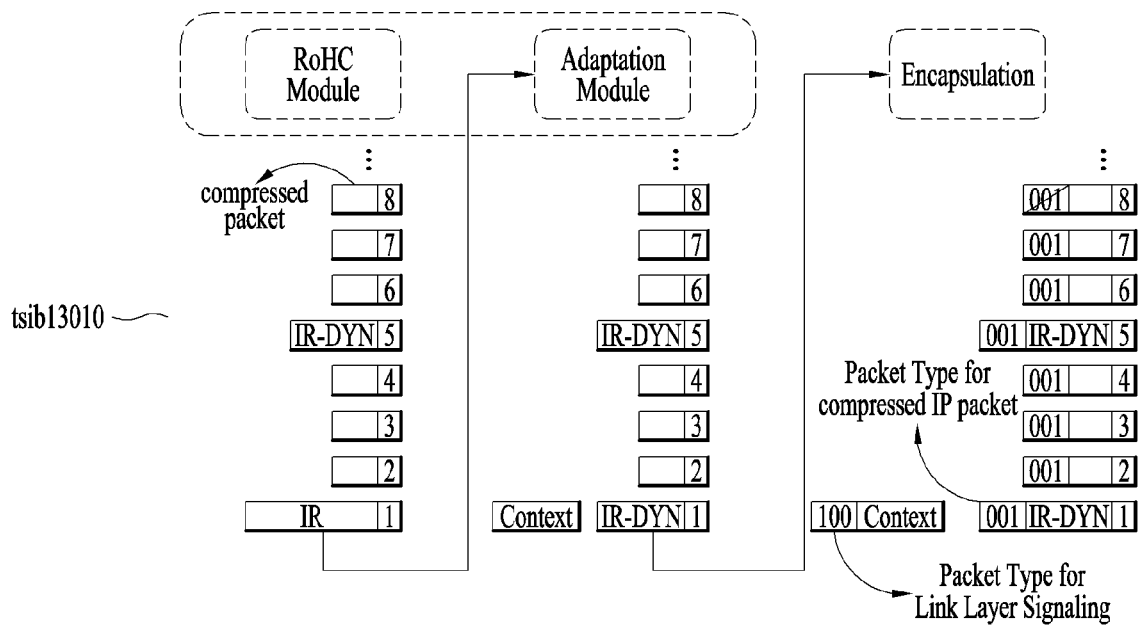
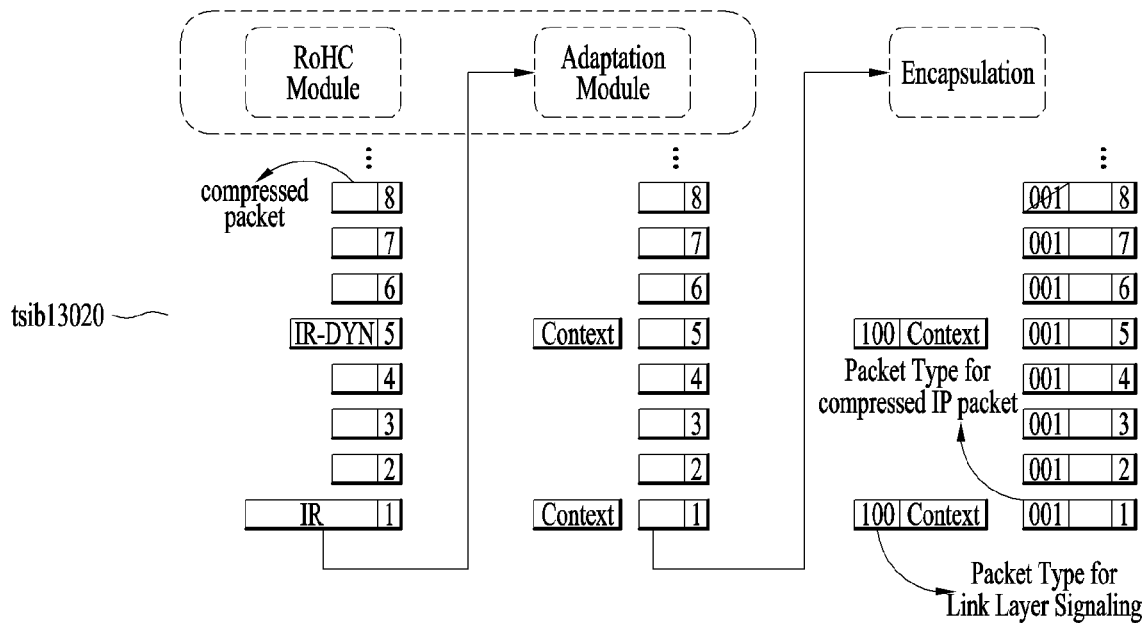

FIG. 14

Link_Mapping_Table (tsib14010):

| Syntax | Number of bits | Mnemonic |
|---|---|---|
| Link_Mapping_Table() { | | |
| signaling_type | 8 | "0x01" |
| PLP_ID | 6 | uimsbf |
| Reserved | 2 | |
| num_session | 8 | uimsbf |
| for(i = 0; i < num_session; i++) { | | |
| src_IP_add | 32 | uimsbf |
| dst_IP_add | 32 | uimsbf |
| src_UDP_port | 16 | uimsbf |
| dst_UDP_port | 16 | uimsbf |
| SID_flag | 1 | bslbf |
| compressed_flag | 1 | bslbf |
| reserved | 6 | '000000' |
| if (SID_flag == "1") { | | |
| SID | 8 | uimsbf |
| } | | |
| if (compressed_flag == "1") { | | |
| context_id | 8 | uimsbf |
| } | | |
| } | | |
| } | | |

ROHC-U_description_table (tsib14020):

| Syntax | Number of bits | Mnemonic |
|---|---|---|
| ROHC-U_description_table { | | |
| signaling_type | 8 | "0x02" |
| PLP_ID | 6 | uimsbf |
| adaptation_mode | 2 | uimsbf |
| context_config | 2 | bslbf |
| reserved | 6 | bslbf |
| context_id | 8 | uimsbf |
| context_profile | 8 | uimsbf |
| if (context_config = 0x01) { | | |
| context_length | 8 | uimsbf |
| static_chain_byte () | var | uimsbf |
| } | | |
| else if (context_config = 0X02) { | | |
| context_length | 8 | uimsbf |
| dynamic_chain_byte () | var | uimsbf |
| } | | |
| else if (context_config = 0x03) { | | |
| context_length | 8 | uimsbf |
| static_chain_byte () | var | uimsbf |
| dynamic_chain_byte () | var | uimsbf |
| } | | |
| } | | |

(a)

$S_{demux\_in}(i) = \{b_i(0), b_i(1), b_i(2), ..., b_i(\eta_{MOD}-1)\}$, $S_{demux\_out}(i) = \{c_i(0), c_i(1), c_i(2), ..., c_i(\eta_{MOD}-1)\}$, $c_i(1) = b_i(i\%\eta_{MOD}), c_i(2) = b_i((i+1)\%\eta_{MOD}), ..., c_i(\eta_{MOD}-1) = b_i((i+1)\%\eta_{MOD})$ (b)

a) Bit-Interleaving Output b) Bit-Demultiplexer Output

FIG. 24

| Content | Bits |
|---|---|
| PREAMBLE_DATA<br>NUM_FRAME_FRU<br>PAYLOAD_TYPE<br>NUM_FSS<br>SYSTEM_VERSION | 20<br>2<br>3<br>2<br>8 |
| CELL_ID<br>NETWORK_ID<br>SYSTEM_ID | 16<br>16<br>16 |
| for i = 0:3<br>    FRU_PHY_PROFILE<br>    FRU_FRAME_LENGTH<br>    FRU_GI_FRACTION<br>    RESERVED<br>end | <br>3<br>2<br>3<br>4<br> |
| PLS2_FEC_TYPE<br>PLS2_MOD<br>PLS2_SIZE_CELL<br>PLS2_STAT_SIZE_BIT<br>PLS2_DYN_SIZE_BIT<br>PLS2_REP_FLAG<br>PLS2_REP_SIZE_CELL<br>PLS2_NEXT_FEC_TYPE<br>PLS2_NEXT_MODE<br>PLS2_NEXT_REP_FLAG<br>PLS2_NEXT_REP_SIZE_CELL<br>PLS2_NEXT_REP_STAT_SIZE_BIT<br>PLS2_NEXT_REP_DYN_SIZE_BIT<br>PLS2_AP_MODE<br>PLS2_AP_SIZE_CELL<br>PLS2_NEXT_AP_MODE<br>PLS2_NEXT_AP_SIZE_CELL | 2<br>3<br>15<br>14<br>14<br>1<br>15<br>2<br>3<br>1<br>15<br>14<br>14<br>2<br>15<br>2<br>15 |
| RESERVED<br>CRC 32 | 32<br>32 |

FIG. 25

| Content | Bits |
|---|---|
| FIC_FLAG | 1 |
| AUX_FLAG | 1 |
| NUM_DP | 6 |
| for i = 1 : NUM_DP | |
|     DP_ID | 6 |
|     DP_TYPE | 3 |
|     DP_GROUP_ID | 8 |
|     BASE_DP_ID | 6 |
|     DP_FEC_TYPE | 2 |
|     DP_COD | 4 |
|     DP_MOD | 4 |
|     DP_SSD_FLAG | 1 |
|     if PHY_PROFILE = '010' | |
|         DP_MIMO | 3 |
|     end | |
|     DP_TI_TYPE | 1 |
|     DP_TI_LENGTH | 2 |
|     DP_TI_BYPASS | 1 |
|     DP_FRAME_INTERVAL | 2 |
|     DP_FIRST_FRAME_IDX | 5 |
|     DP_NUM_BLOCK_MAX | 10 |
|     DP_PAYLOAD_TYPE | 2 |
|     DP_INBAND_MODE | 2 |
|     DP_PROTOCOL_TYPE | 2 |
|     DP_CRC_MODE | 2 |
|     if DP_PAYLOAD_TYPE == TS('00') | |
|         DNP_MODE | 2 |
|         ISSY_MODE | 2 |
|         HC_MODE_TS | 2 |
|         if HC_MODE_TS == '01' or '10' | |
|             PID | 13 |
|         end | |
|     if DP_PAYLOAD_TYPE = IP('01') | |
|         HC_MODE_IP | 2 |
|     end | |
|     RESERVED | 8 |
| end | |
| if FIC_FLAG == 1 | |
|     FIC_VERSION | 8 |
|     FIC_LENGTH_BYTE | 13 |
|     RESERVED | 8 |
| end | |
| if AUX_FLAG == 1 | |
|     NUM_AUX | 4 |
|     AUX_CONFIG_RFU | 8 |
|     for -1 : NUM_AUX | |
|         AUX_STREAM_TYPE | 4 |
|         AUX_PRIVATE_CONF | 28 |
|     end | |
| end | |

| Content | Bit |
|---|---|
| FRAME_INDEX | 5 |
| PLS_CHANGE_COUNTER | 4 |
| FIC_CHANGE_COUNTER | 4 |
| RESERVED | 16 |
| for i = 1: NUM_DP | |
| DP_ID | 6 |
| DP_START | 15 (or13) |
| DP_NUM_BLOCK | 10 |
| end RESERVED | 8 |
| EAC_FLAG | 1 |
| EAS_WAKE_UP_VERSION_NUM | 8 |
| if EAC_FLAG = 1 | |
| EAC_LENGTH_BYTE | 12 |
| else | |
| EAC_COUNTER | 12 |
| end | |
| for i=1:NUM_AUX | |
| AUX_PRIVATE_DYN | 48 |
| end | |
| CRC 32 | 32 |

FIG. 29
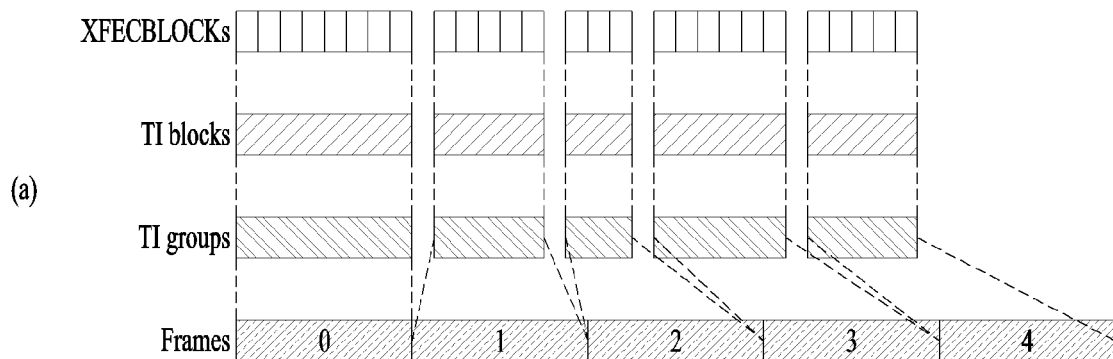
(a)
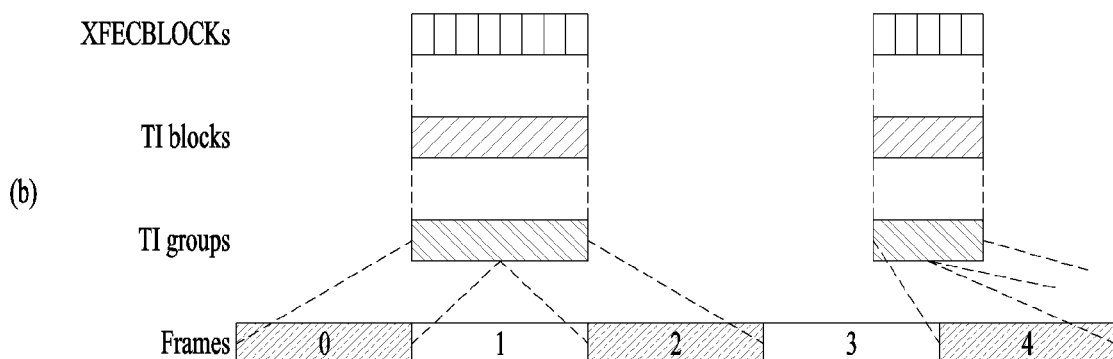
(b)
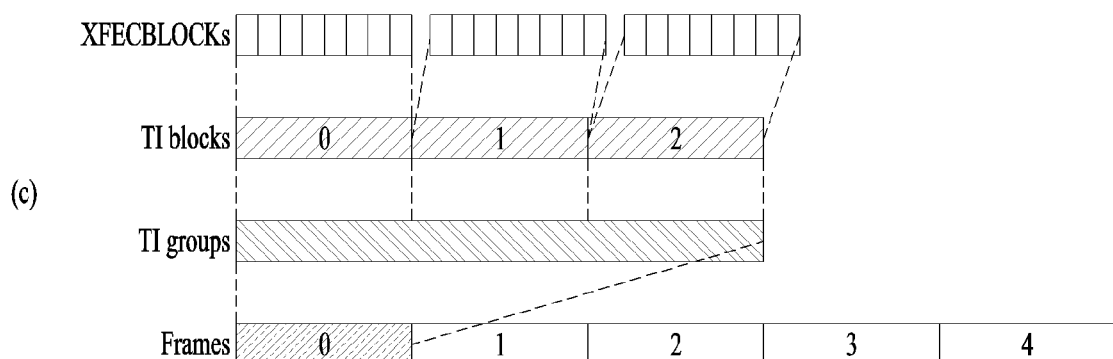
(c)

FIG. 31
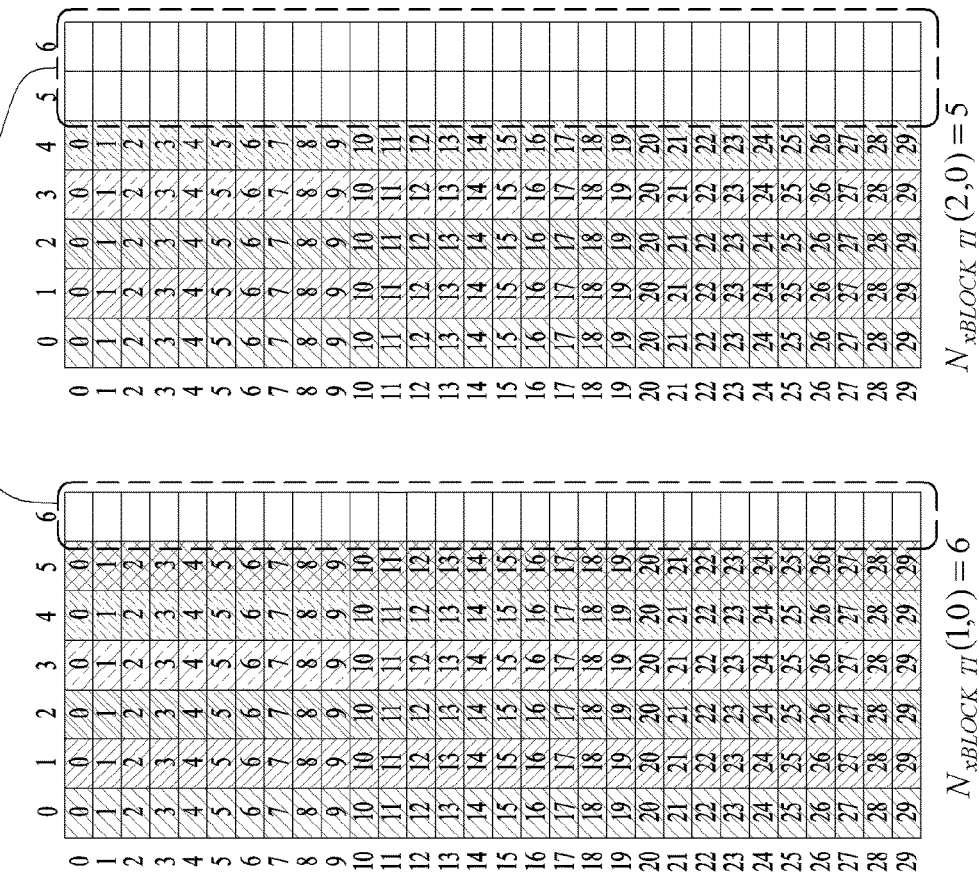
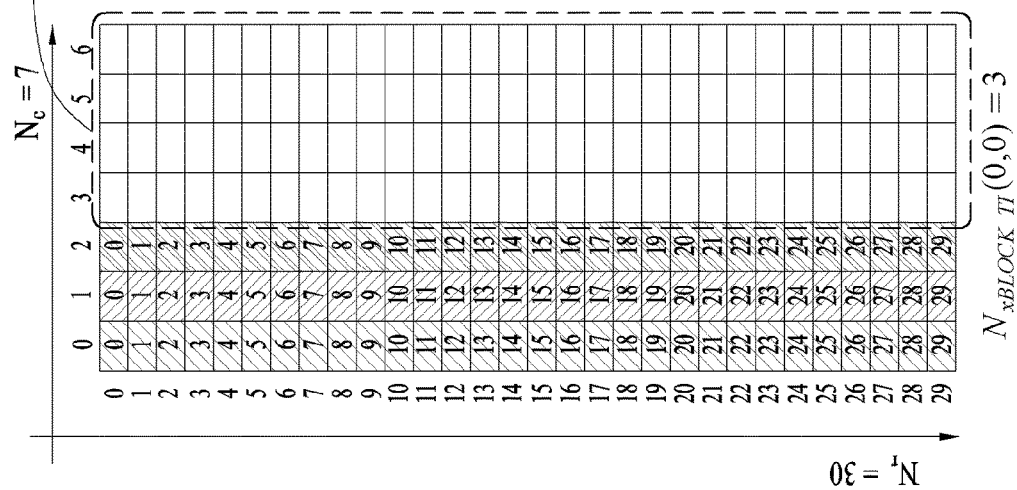

FIG. 33

The main-PRBS generator is defined based on the $(N_a-1)$-bit binary word sequence $R_n$ with $N_a = \log_2 N_{max}$ $0 \leq n < 2$
$\quad R_n[N_a-2, N_a-3, \ldots, 1, 0] = 0, 0, \ldots, 0, 0$
$n = 2$
$\quad R_n[N_a-2, N_a-3, \ldots, 1, 0] = 0, 0, \ldots, 0, 1$
$2 < n < N_{max}$
$\quad R_n[N_a-3, N_a-4, \ldots, 1, 0] = R_n[N_a-2, N_a-3, \ldots, 2, 1]$
where
$R_n[N_a-2]$ is defined as:

in 8K FFT mode: $R_n[11] = R_{n-1}[0] \oplus R_{n-1}[1] \oplus R_{n-1}[4] \oplus R_{n-1}[6]$
in 16K FFT mode: $R_n[12] = R_{n-1}[0] \oplus R_{n-1}[1] \oplus R_{n-1}[4] \oplus R_{n-1}[5] \oplus R_{n-1}[9] \oplus R_{n-1}[11]$
in 32K FFT mode: $R_n[13] = R_{n-1}[0] \oplus R_{n-1}[1] \oplus R_{n-1}[2] \oplus R_{n-1}[12]$ (a)

| FFT mode | Nmax |
|---|---|
| 8K | 8192 |
| 16K | 16384 |
| 32K | 32768 |

The sub-PRBS generator is defined based on the $(N_b-1)$-bit binary word sequence $G_k$ with $N_b = \log_2(0.5 N_{max})$ $0 \leq k < 4$
$\quad G_k[N_b-2, N_b-3, \ldots, 1, 0] = 0, 0, , \ldots, 0, 0$
$k = 4$
$\quad G_k[N_b-2, N_b-3, \ldots, 1, 0] = 1, 1, , \ldots, 1, 1$
$4 < k < N_{max}$
$\quad G_k[N_b-3, N_b-4, \ldots, 1, 0] = G_k[N_b-2, N_b-3, \ldots, 2, 1]$ where
$\quad G_k[N_b-2]$ is defined as:

in 8K FFT mode: $G_k[10] = G_{k-1}[0] \oplus G_{k-1}[2]$
in 16K FFT mode: $G_k[11] = G_{k-1}[0] \oplus G_{k-1}[1] \oplus G_{k-1}[4] \oplus G_{k-1}[6]$
in 32K FFT mode: $G_k[12] = G_{k-1}[0] \oplus G_{k-1}[1] \oplus G_{k-1}[4] \oplus G_{k-1}[5] \oplus G_{k-1}[9] \oplus G_{k-1}[11]$ (a)

$p = 0;$
for $(n = 0; n < N_{max}; n = n+1)$
$\quad \{T(n) = (n \bmod 2) \cdot 2^{N_a-1} + \sum_{i=0}^{N_a-2}(2^i \, ?R_n[i]);$
$\quad S_l(n) = (T(n) + A_{\lfloor l/2 \rfloor}) \bmod N_{max};$
$\quad$ if $S_l(n) < N_{data}$
$\quad\quad \{H_l(p) = S_l(n);$
$\quad\quad p = p + 1; \}$
$\}$ $(n \bmod 2) \cdot 2^{N_a-1}$ denotes 1-bit toggling, i.e., $R_n[N_a-1] = 0, 1, 0, 1, \ldots$ and
the cyclic-shifting value $A_{\lfloor l/2 \rfloor}$ is calculated for every OFDM symbol pair (b)

FIG. 35

FIG. 36
| PLP_NUM | 1 | >1 |
|---|---|---|
| Interleaving type | CI | CI+BI |
FIG. 37
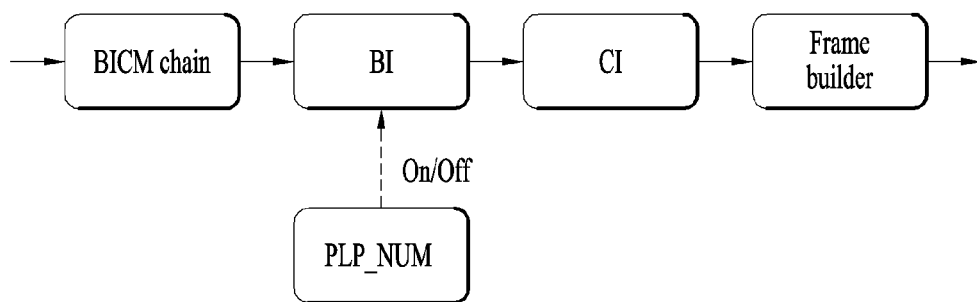
<Hybrid TI structure: example-1>
FIG. 38
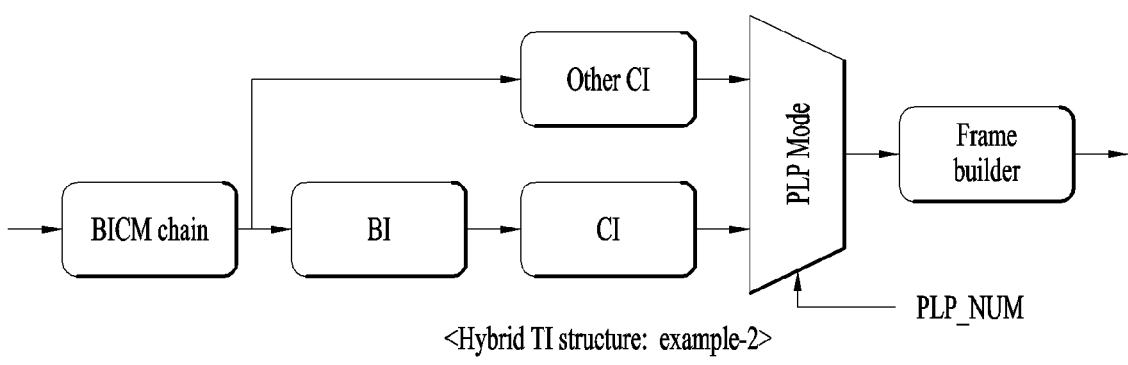
<Hybrid TI structure: example-2>

<Hybrid TI structure: example-1>

<Hybrid TI structure: example-2>

FIG. 44

| 0 | | | | | 7 | | | | | 15 | 23 | 31 |
|---|---|---|---|---|---|---|---|---|---|---|---|---|
| V | C | R | S | O | H | T | R | A | B | HDR_LEN | Codepoint (CP) | |
| Congestion Control Information (CCI) ||||||||||||
| Transport Session Identifier (TSI) ||||||||||||
| Transport Object Identifier (TOI) ||||||||||||
| HET | | | | | SI | FH | FC | | | Padding Bytes (PB) | | reserved |
| Header Extensions (EXT_FTI, EXT_TIME etc.) ||||||||||||
| FEC Payload ID ||||||||||||
| Encoding symbol (s) ||||||||||||

FIG. 45

| 0 | | | | | 7 | | | | | 15 | 23 | 31 |
|---|---|---|---|---|---|---|---|---|---|---|---|---|
| V | C | R | S | O | H | T | R | A | B | HDR_LEN | Codepoint (CP) ||
| Congestion Control Information (CCI) |||||||||||||
| Transport Session Identifier (TSI) |||||||||||||
| Transport Object Identifier (TOI) |||||||||||||
| HET |||| | SI | FH || FHL ||| Padding Bytes (PB) ||
| Header Extensions (EXT_FTI, EXT_TIME etc.) |||||||||||||
| FEC Payload ID |||||||||||||
| Encoding symbol (s) |||||||||||||

| 0 | | 7 | | | | | 15 | | | 23 | 31 |
|---|---|---|---|---|---|---|---|---|---|---|---|
| V | C | PSI | S | O | H | Res | A | B | HDR_LEN | | Codepoint (CP) |

| Congestion Control Information (CCI) |
| Transport Session Identifier (TSI) |
| Transport Object Identifier (TOI) |

| HET | Type | Reserved |

| Header Extensions (EXT_FTI, EXT_TIME etc.) |
| FEC Payload ID |
| Encoding symbol (s) |

FIG. 48

| 0 | | | | 7 | | | | 15 | | 23 | 31 |
|---|---|---|---|---|---|---|---|---|---|---|---|
| V | C | PSI | S | O | H | Res | A | B | HDR_LEN | | Codepoint (CP) |
| Congestion Control Information (CCI) ||||||||||||
| Transport Session Identifier (TSI) ||||||||||||
| Transport Object Identifier (TOI) ||||||||||||
| HET ||| Internal Structure Type |||| Reserved |||||
| Header Extensions (EXT_FTI, EXT_TIME etc.) ||||||||||||
| FEC Payload ID ||||||||||||
| Encoding symbol (s) ||||||||||||

FIG. 49

| 0 | | | | 7 | | | | 15 | | 23 | 31 |
|---|---|---|---|---|---|---|---|---|---|---|---|
| V | C | PSI | S | O | H | Res | A | B | HDR_LEN | | Codepoint (CP) |
| Congestion Control Information (CCI) ||||||||||||
| Transport Session Identifier (TSI) ||||||||||||
| Transport Object Identifier (TOI) ||||||||||||
| HET ||| SF | Reserved ||||| Offset |||
| Header Extensions (EXT_FTI, EXT_TIME etc.) ||||||||||||
| FEC Payload ID ||||||||||||
| Encoding symbol (s) ||||||||||||

FIG. 50

| 0 | | 7 | | | | | | | 15 | | 23 | 31 |
|---|---|---|---|---|---|---|---|---|---|---|---|---|
| V | C | PSI | S | O | H | Res | A | B | HDR_LEN | | Codepoint (CP) | |
| Congestion Control Information (CCI) ||||||||||||
| Transport Session Identifier (TSI) ||||||||||||
| Transport Object Identifier (TOI) ||||||||||||
| | HET | | | HEL | | | | URL | | | | |
| Header Extensions (EXT_FTI, EXT_TIME etc.) ||||||||||||
| FEC Payload ID ||||||||||||
| Encoding symbol (s) ||||||||||||

FIG. 51

| 0 | | 7 | | | | | | | 15 | | 23 | 31 |
|---|---|---|---|---|---|---|---|---|---|---|---|---|
| V | C | PSI | S | O | H | Res | A | B | HDR_LEN | | Codepoint (CP) | |
| Congestion Control Information (CCI) ||||||||||||
| Session Group Identifier (SGI) |||||| Divided Transport Session Identifier (DTSI) ||||||
| Object Group Identifier (OGI) |||||| Divided Transport Object Identifier (DTOI) ||||||
| Header Extensions (EXT_FTI, EXT_TIME etc.) ||||||||||||
| FEC Payload ID ||||||||||||
| Encoding symbol (s) ||||||||||||

FIG. 56

| 0 | | 7 | | | | | | | 15 | | 23 | 31 |
|---|---|---|---|---|---|---|---|---|---|---|---|---|
| V | C | PSI | S | O | H | Priority | A | B | HDR_LEN | | Codepoint (CP) | |
| Congestion Control Information (CCI) ||||||||||||| 
| Transport Session Identifier (TSI) |||||||||||||
| Transport Object Identifier (TOI) |||||||||||||
| Header Extensions (EXT_FTI, EXT_TIME etc.) |||||||||||||
| FEC Payload ID |||||||||||||
| Encoding Symbol (s) |||||||||||||

FIG. 57

| 0 | | 7 | | | | | | | 15 | | 23 | 31 |
|---|---|---|---|---|---|---|---|---|---|---|---|---|
| V | C | PSI | S | O | H | Res | A | B | HDR_LEN | | Codepoint (CP) | |
| Congestion Control Information (CCI) |||||||||||||
| Transport Session Identifier (TSI) |||||||||||||
| Transport Object Identifier (TOI) |||||||||||||
| HET | | | Priority | | | | Reserved | | | | | |
| Header Extensions (EXT_FTI, EXT_TIME etc.) |||||||||||||
| FEC Payload ID |||||||||||||
| Encoding Symbol (s) |||||||||||||

FIG. 60

| 0 | | | | | | | | | 7 | | 15 | 23 | 31 |
|---|---|---|---|---|---|---|---|---|---|---|---|---|---|
| V | | C | X | P | S | O | H | R | A | B | HDR_LEN | Codepoint (CP) |
| Congestion Control Information (CCI) ||||||||||||||
| Transport Session Identifier (TSI) ||||||||||||||
| Transport Object Identifier (TOI) ||||||||||||||
| Header Extensions (EXT_FTI, EXT_TIME etc.) ||||||||||||||
| FEC Payload ID ||||||||||||||
| Encoding Symbol (s) ||||||||||||||

FIG. 61

| 0 | | | | | | | | 7 | | 15 | 23 | 31 |
|---|---|---|---|---|---|---|---|---|---|---|---|---|
| V | | C | PSI | S | O | H | Type | A | B | HDR_LEN | Codepoint (CP) |
| Congestion Control Information (CCI) |||||||||||||
| Transport Session Identifier (TSI) |||||||||||||
| T | Transport Object Identifier (TOI) ||||||||||||
| Header Extensions (EXT_FTI, EXT_TIME etc.) |||||||||||||
| FEC Payload ID |||||||||||||
| Encoding Symbol (s) |||||||||||||

| From | To |
|---|---|
| OGI/DTOI in LCT packet header, Transfer-Length in EXT_FTI | Content-Length |
| URL in EXT_URL | Content-Location |
| Offset in EXT_OFS, Transfer-Length in EXT_FTI, OGI/DTOI in LCT packet header | Content-Range |
| MPD, URL in EXT_URL, | Expires |
| Timestamp in EXT_MEDIA_TIME or etc. | |

FIG. 66

| From | To |
|---|---|
| Content-Location | URL in EXT_URL |
| Content-Range | Offset in EXT_OFS, OGI/DTOI in LCT packet header |
| MPD | Timestamp in EXT_MEDIA_TIME or etc. |

FIG. 71

| Element/Attribute | Cardinality | Description |
|---|---|---|
| Component Map Description | | |
| @service_id | 1 | |
| @mpdID | 0..1 | |
| @perID | 0..1 | |
| BroadcastComp | 0..N | |
| @reptnID | 0..1 | If it is a real time component, this cardinality is set as 1 |
| @tsi | 0..1 | |
| @datapipeID | 1 | |
| BBComp | 0..N | |
| @reptnID | 0..1 | If it is a real time component, this cardinality is set as 1 |
| ForeignComp | 0..N | |
| @reptnID | 0..1 | If it is a real time component, this cardinality is set as 1 |
| @transportStreamID | 1 | |
| @partitionID | 0..1 | |
| @sourceIPAddr | 0..1 | |
| @destIPAddr | 0..1 | |
| @destUDPPort | 0..1 | |
| @datapipeID | 0..1 | |

(a)

```
<MPD xmlns:xsi="http://www.w3.org/2001/XMLSchema-instance"
xmlns="urn:mpeg:dash:schema:mpd:2011"
xsi:schemaLocation="urn:mpeg:dash:schema:mpd:2011 DASH-MPD.xsd"
type="static"
mediaPresentationDuration="PT3256S" minBufferTime="PT1.2S"
profiles="urn:mpeg:dash:profile:isoff-on-demand:2011">
  <BaseURL>http://cdn1.example.com/</BaseURL>
  <BaseURL>http://cdn2.example.com/</BaseURL>
  <Period>
    <broadcast_flag="1" broadband_flag="0">
  </Period>
</MPD>
```

(b)

FIG. 72
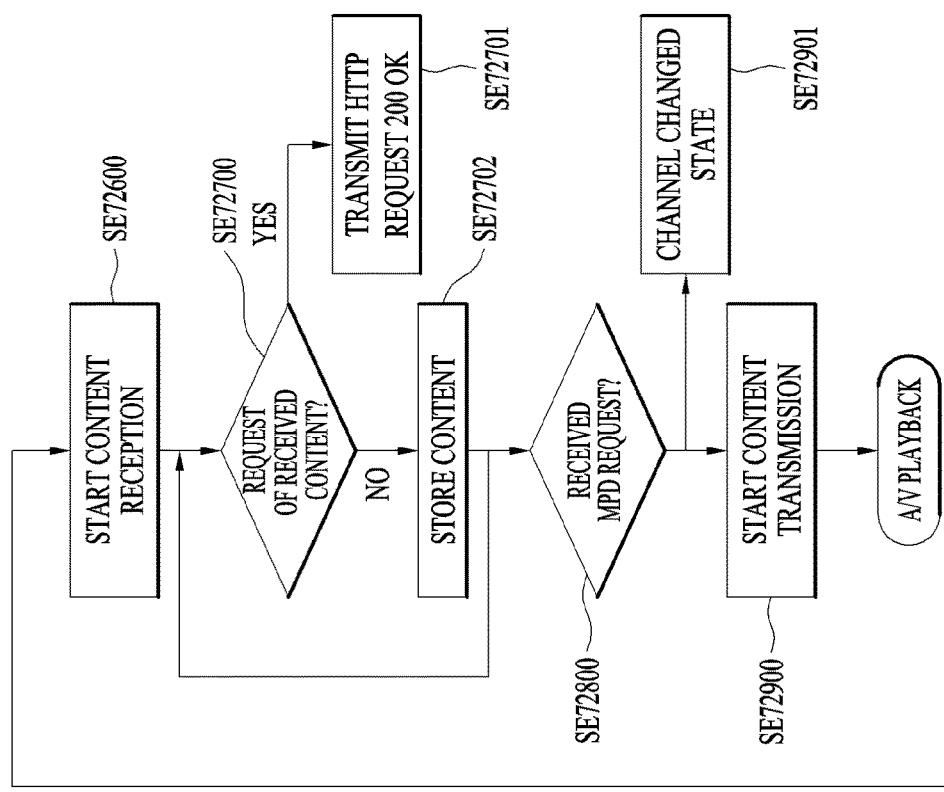
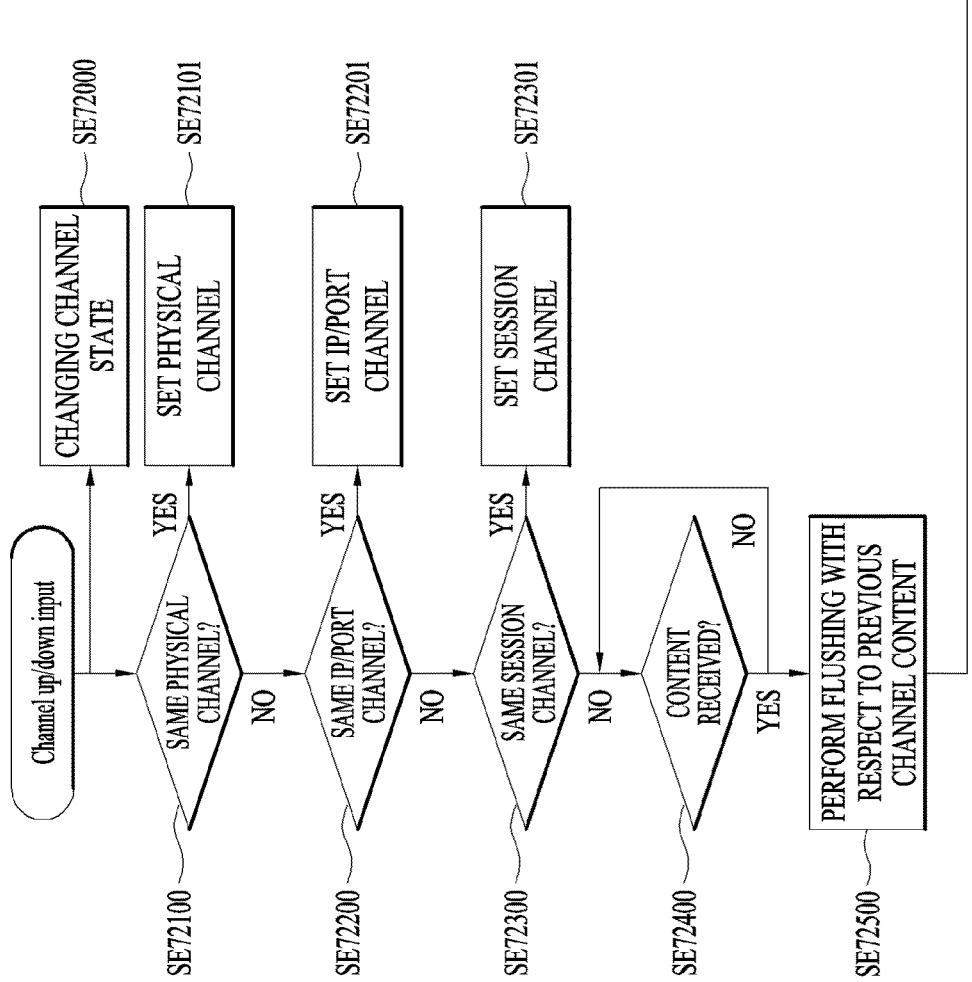

FIG. 76

| Element or Attribute Name | | | Use | Description |
|---|---|---|---|---|
| LSID | | | | LCT Session Instance Description |
| @version | | | O | Version of this LCT Session Instance Description. The version is increased by one when the descriptor is updated. The received LSID with highest version number is the currently valid version. |
| | @validFrom | | O | The date and time from which the LSID is valid. The validFrom attribute may or may not be present. If not present, the receiver can assume the LSID version is valid immediately. |
| | @expiration | | O | The date and time when the LSID expires. The expiration attribute may or may not be present. If not present the receiver can assume the LSID is valid for all time, or until it receives a newer LSID with an associated expiration value. |
| | TransportSession | | 1 ... N | Provides information about LCT transport sessions |
| | | @tsi | M | Specifies the transport session identifier. The session identifiers must not be 0. |
| | | SourceFlow | 0 ... 1 | Provides information of a source flow carried on this tsi |
| | | RepairFlow | 0 ... 1 | Provides information of a repair flow carried on the tsi. |
| | | @tsi | 0 ... N | provides additional property information about this transport session |

Legend:
    For attributes: M=Mandatory, O=Optional, OD=Optional with Default Value, CM=Conditionally Mandatory.
    For elements: <minOccurs>...<maxOccurs> (N=unbounded)
    Note that the conditions only holds without using xlink:href. If linking is used, then all attributes are
    "optional" and <minOccurs=0>
Elements are bold; attributes are non-bold and preceded with an @.

FIG. 77

| Element or Attribute Name | | | Use | Description |
|---|---|---|---|---|
| SourceFlow | | | | defines a source flow in session |
| | EFDT | | 0 ... 1 | If provided, it specifies the details of the file delivery data. This is the extended File Delivery Table(FDT) instance. The EFDT may either be embedded or may be provided as a reference. If provided as a reference the EFDT may be updated independently of the LSID |
| | | @idRef | 0 ... 1 | Identification of the EFDT, it can be represented as a URI by the corresponding Transport Session. |
| | | @realtime | OD default: false | If not present it is false. If present and set to true, LCT packets contain extension headers including timestamps that express the presentation time of the included delivery object. |
| | | @minBufferSize | O | Defines the maximum amount of data that needs to be stored in the receiver. This value may be present if @ realtime is set to true. |
| | ApplicationIdentifier | | 0 ... 1 | May provide additional information that can be mapped to the application that is carried in this transport session, e.g. Representation ID of a DASH content or the Adaptation Set parameters of a DASH Representation in order to select the LCT transport session for rendering. |
| | PayloadFormat | | 1 ... N | Defines payload formats of ROUTE packets carrying the objects of the source flow |
| | | @codePoint | OD default=0 | Defines what CodePoint value is used for this payload. This is the value of the CP field in the LCT header. When signalling this this value, the delivery of the object can follow the rules below. |
| | | @deliveryObjectFormat | M | Specifies the payload format of the delivery object |
| | | @fragmentation | OD default=0 | Specifies the type of fragmentation<br>0 : arbitrary<br>1 : application specific (sample based)<br>2 : application specific (e.g., a collection of boxes) |
| | | @deliveryOrder | OD default=0 | Specifies the ordering of delivery of objects<br>0: arbitrary<br>1: in-order delivery<br>2: in-order delivery of media samples and prior to movie fragment box |
| | | @sourceFecPayloadID | OD default=1 | Defines the format of the Source FEC Payload ID. The following valuesn be defined :<br>• 0: the source FEC payload ID is absent and the entire delivery object is contained in this packet.<br>• 1: the source FEC payload ID is 32 bit and expresses the start offset in the object.<br>• 2: FECParameters defines the Format of the Source FEC Payload ID. |
| | | FECParameters | 0 ... 1 | Defines the FEC parameters. This includes the FEC-encoding-id, the instance-id, etc. It is specifically used to signal the applied Source FEC Payload ID. |
| | SourceFlowProperty | | 0 ... N | provides property information about this source flow, e.g., broadcast location (e.g., data pipe within the broadcast stream) carrying this source flow data. |

Legend:
For attributes: M=Mandatory, O=Optional, OD=Optional with Default Value, CM=Conditionally Mandatory.
For elements: <minOccurs>...<maxOccurs> (N=unbounded)
Note that the conditions only holds without using xlink:href. If linking is used, then all attributes are "optional" and <minOccurs=0>
Elements are bold; attributes are non-bold and preceded with an @.

FIG. 78

| Element or Attribute Name | | | Use | Description |
|---|---|---|---|---|
| SourceFlow | | | | defines a source flow in session |
| | EFDT | | 0 ... 1 | If provided, it specifies the details of the file delivery data. This is the extended File Delivery Table(FDT) instance. The EFDT may either be embedded or may be provided as a reference. If provided as a reference the EFDT may be updated independently of the LSID |
| | | @idRef | 0 ... 1 | Identification of the EFDT, it can be represented as a URI by the corresponding Transport Session. |
| | | @realtime | OD default: false | If not present it is false. If present and set to true, LCT packets contain extension headers including timestamps that express the presentation time of the included delivery object. |
| | | @minBufferSize | O | Defines the maximum amount of data that needs to be stored in the receiver. This value may be present if @ realtime is set to true. |
| | ApplicationIdentifier | | 0 ... 1 | May provide additional information that can be mapped to the application that is carried in this transport session, e.g. Representation ID of a DASH content or the Adaptation Set parameters of a DASH Representation in order to select the LCT transport session for rendering. |
| | @location | | O | location (e.g., data pipe within the broadcast stream) carrying this source flow data. |
| | PayloadFormat | | 1 ... N | Defines payload formats of ROUTE packets carrying the objects of the source flow |
| | | @codePoint | OD default=0 | Defines what CodePoint value is used for this payload. This is the value of the CP field in the LCT header. When signalling this this value, the delivery of the object can follow the rules below. |
| | | @deliveryObjectFormat | M | Specifies the payload format of the delivery object |
| | | @fragmentation | OD default=0 | Specifies the type of fragmentation<br>0 : arbitrary<br>1 : application specific (sample based)<br>2 : application specific (e.g., a collection of boxes) |
| | | @deliveryOrder | OD default=0 | Specifies the ordering of delivery of objects<br>0: arbitrary<br>1: in-order delivery<br>2: in-order delivery of media samples and prior to movie fragment box |
| | | @sourceFecPayloadID | OD default=1 | Defines the format of the Source FEC Payload ID. The following valuesn be defined :<br>• 0: the source FEC payload ID is absent and the entire delivery object is contained in this packet.<br>• 1: the source FEC payload ID is 32 bit and expresses the start offset in the object.<br>• 2: FECParameters defines the Format of the Source FEC Payload ID. |
| | | FECParameters | 0 ... 1 | Defines the FEC parameters. This includes the FEC-encoding-id, the instance-id, etc. It is specifically used to signal the applied Source FEC Payload ID. |
| | SourceFlowProperty | | 0 ... N | provides property information about this source flow, e.g., broadcast location (e.g., data pipe within the broadcast stream) carrying this source flow data. |

Legend:
For attributes: M=Mandatory, O=Optional, OD=Optional with Default Value, CM=Conditionally Mandatory.
For elements: <minOccurs>...<maxOccurs> (N=unbounded)
Note that the conditions only holds without using xlink:href. If linking is used, then all attributes are "optional" and <minOccurs=0>
Elements are bold; attributes are non-bold and preceded with an @.

FIG. 79

| Element or Attribute Name | | Use | Description |
|---|---|---|---|
| LSID | | | extended FDT instance descriptor |
| | @idRef | 0...1 | Identification of the EFDT, |
| | @idRef | O | Version of this extended FDT instance descriptor. The version if increased by one when the descriptor is updated. The received EFDT with highest version number is the currently valid version. |
| | @maxExpiresDelta | O | The maximum expiry time for an object in the Transport Session after sending the first packet associated to this object. |
| | @maxTransportSize | O | The maximum transport size of any object described by this EFDT. |
| | FileTemplate | 0...1 | Specifies the file URL or file template in the body |
| Legend: For attributes: M=Mandatory, O=Optional, OD=Optional with Default Value, CM=Conditionally Mandatory. For elements: <minOccurs>...<maxOccurs> (N=unbounded) Note that the conditions only holds without using xlink:href. If linking is used, then all attributes are "optional" and <minOccurs=0> Elements are bold; attributes are non-bold and preceded with an @. | | | |

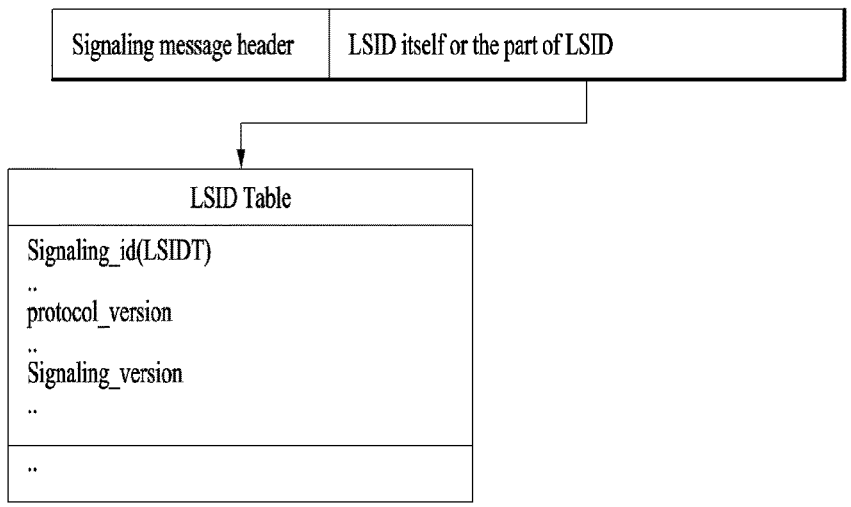

FIG. 82

| Element or Attribute Name | Use | Description |
|---|---|---|
| MPD | | The root element that carries the Media Presentation Description for a Media Presentation. |
| @id | O | specifies anidentifier for the Media Presentation. It is recommended to use anidntifier that is unique within the scope in which the Media Presentation is published. |
| @profiles | O | specifies a the list of Media Presentation profiles as described in 8.<br><br>The contents of this attribute shall conform to either the pro-simp or pro-fancy productions of RFC6381, Section 4.5, without the enclosing DQUOTE characters. As profile identifier the URI defined for the conforming Media Presentation profiles as described in 8 shall be used. |
| @type | OD<br><br>default : static | specifies whether the Media Presentation Description may be updated (@type="dynamic") or not (@type="static")<br><br>NOTE Static MPDs are typically used for ON-Demand services. whereas dynamic MPDs are used for live services. |
| @availabilityStartTime | CM<br><br>Must be present for @type= 'dynamic' | Fir @type='dynamic' this attribute shall be present. In this case it specifies the anchor for the computation of the earliest availability time (in UTC)for any Segment in the Media Presentation.<br><br>For @type="static" if present, it specifies the Segment acailability start time for all Segments referred to in this MPD. If not present, all Segments described in the MPD shall become available atthe time the MPD becomes available. |
| @availabilityEndTime | O | specifies the latest Segment availability end time for any Segment in the Media Presentation. When not present, the value is unknown. |
| @mediaPresentationDuration | CM<br><br>Must be present for @type= 'static' | specifies the duration of the entire Media Presentation. If the attribute is not present, the duration of the Media Presentation is unknown. In this case the attribute MPD @minimumUpdatePeriod shall be present.<br><br>This attribute shall be present when the attribute MPD @minimumUpdatePeriod is not present. |
| @minimumUpdatePeriod | O | If this attribute is present, it specifies the smallest period between potential changes to the MPD. This can be useful to control the frequency at which a client checks for updates.<br><br>If this attribute is not present it indicates that the MPD does not change.<br><br>If MPD @type is 'static', @minimumUpdatePeriod |

BROADCASTING SIGNAL TRANSMISSION DEVICE, BROADCASTING SIGNAL RECEPTION DEVICE, BROADCASTING SIGNAL TRANSMISSION METHOD, AND BROADCASTING SIGNAL RECEPTION METHOD

This application is a continuation of application Ser. No. 16/843,192 filed on Apr. 8, 2020, which is a continuation of application Ser. No. 15/538,159 filed on Jun. 20, 2017, now U.S. Pat. No. 10,667,004, which is a National Stage Application of International Application No. PCT/KR2015/014126 filed on Dec. 22, 2015, and claims priority to U.S. Provisional Application No. 62/095,760 filed on Dec. 22, 2014 and U.S. Provisional Application No. 62/096,496 filed on Dec. 23, 2014, all of which are hereby incorporated by reference in their entireties as if fully set forth herein.

TECHNICAL FIELD

The present invention relates to an apparatus for transmitting a broadcast signal, an apparatus for receiving a broadcast signal and methods for transmitting and receiving a broadcast signal.

BACKGROUND ART

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

DISCLOSURE

Technical Problem

That is, a digital broadcast system can provide HD (high definition) images, multichannel audio and various additional services. However, data transmission efficiency for transmission of large amounts of data, robustness of transmission/reception networks and network flexibility in consideration of mobile reception equipment need to be improved for digital broadcast.

Technical Solution

The object of the present invention can be achieved by providing a broadcast signal reception method including receiving, through a broadcast network, a broadcast signal including a first component of DASH content capable of being received through the broadcast network and a broadband network, decapsulating the received broadcast signal to output LCT packets transmitted through at least one LCT channel, acquiring signaling information included in the output LCT packets, acquiring segments corresponding to the first component of the DASH content included in the LCT packets using the acquired signaling information, and decoding the acquired segments.

Advantageous Effects

The present invention can control quality of service (QoS) with respect to services or service components by processing data on the basis of service characteristics, thereby providing various broadcast services.

The present invention can achieve transmission flexibility by transmitting various broadcast services through the same radio frequency (RF) signal bandwidth.

The present invention can provide methods and apparatuses for transmitting and receiving broadcast signals, which enable digital broadcast signals to be received without error even when a mobile reception device is used or even in an indoor environment.

The present invention can effectively support future broadcast services in an environment supporting future hybrid broadcasting using terrestrial broadcast networks and the Internet.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 illustrates a relation between an SLT and service layer signaling (SLS) according to an embodiment of the present invention;

FIG. 3 illustrates an SLT according to an embodiment of the present invention;

FIG. 5 illustrates a USBD fragment for ROUTE/DASH according to an embodiment of the present invention;

FIG. 6 illustrates an S-TSID fragment for ROUTE/DASH according to an embodiment of the present invention;

FIG. 7 illustrates a USBD/USD fragment for MMT according to an embodiment of the present invention;

FIG. 13 illustrates an example of adaptation modes in IP header compression according to an embodiment of the present invention (transmitting side);

FIG. 14 illustrates a link mapping table (LMT) and an RoHC-U description table according to an embodiment of the present invention;

FIG. 24 is a table illustrating PLS1 data according to an embodiment of the present invention;

FIG. 25 is a table illustrating PLS2 data according to an embodiment of the present invention;

FIG. 29 illustrates time interleaving according to an embodiment of the present invention;

FIG. 31 illustrates an operation of a twisted row-column block interleaver according to another embodiment of the present invention;

FIG. 33 illustrates a main PRBS used for all FFT modes according to an embodiment of the present invention;

FIG. 34 illustrates a sub-PRBS used for FFT modes and an interleaving address for frequency interleaving according to an embodiment of the present invention;

FIG. 35 illustrates a write operation of a time interleaver according to an embodiment of the present invention;

FIG. 36 is a table illustrating an interleaving type applied according to the number of PLPs;

FIG. 37 is a block diagram including a first example of a structure of a hybrid time interleaver;

FIG. 38 is a block diagram including a second example of the structure of the hybrid time interleaver;

FIG. 44 illustrates a Layered Coding Transport (LCT) packet structure for file transmission according to an embodiment of the present invention;

FIG. 45 illustrates a structure of an LCT packet according to an embodiment of the present invention;

FIG. 48 is a diagram illustrating a structure of a packet including type information according to another embodiment of the present invention;

FIG. 49 is a diagram illustrating a structure of a packet including boundary information according to another embodiment of the present invention;

FIG. 50 is a diagram illustrating a structure of a packet including mapping information according to another embodiment of the present invention;

FIG. 51 is a diagram illustrating a structure of an LCT packet including grouping information according to another embodiment of the present invention;

FIG. 56 is a diagram showing the structure of a packet including priority information according to another embodiment of the present invention;

FIG. 57 is a diagram showing the structure of a packet including priority information according to another embodiment of the present invention;

FIG. 60 is a diagram showing the structure of a packet including random access point (RAP) information according to another embodiment of the present invention;

FIG. 61 is a diagram showing the structure of a packet including real time information according to another embodiment of the present invention;

FIG. 66 is a diagram illustrating a method of formatting an HTTP Entity header according to another embodiment of the present invention;

FIG. 71 is a diagram illustrating a CMT and an MPD defining a flag according to an embodiment of the present invention;

FIG. 72 is a flowchart illustrating operation of a receiver in a pull mode according to an embodiment of the present invention;

FIG. 76 is a diagram illustrating semantics of an LSID element according to an embodiment of the present invention;

FIG. 77 is a diagram illustrating semantics of a source flow element according to an embodiment of the present invention;

FIG. 78 is a diagram illustrating semantics of a source flow element according to another embodiment of the present invention;

FIG. 79 is a diagram illustrating the structure of a signaling packet including EFDT semantics and an LSID according to an embodiment of the present invention;

FIG. 82 is a diagram illustrating semantics of an MPD element according to an embodiment of the present invention.

BEST MODE

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The present invention provides apparatuses and methods for transmitting and receiving broadcast signals for future broadcast services. Future broadcast services according to an embodiment of the present invention include a terrestrial broadcast service, a mobile broadcast service, an ultra high definition television (UHDTV) service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

Figure 1:
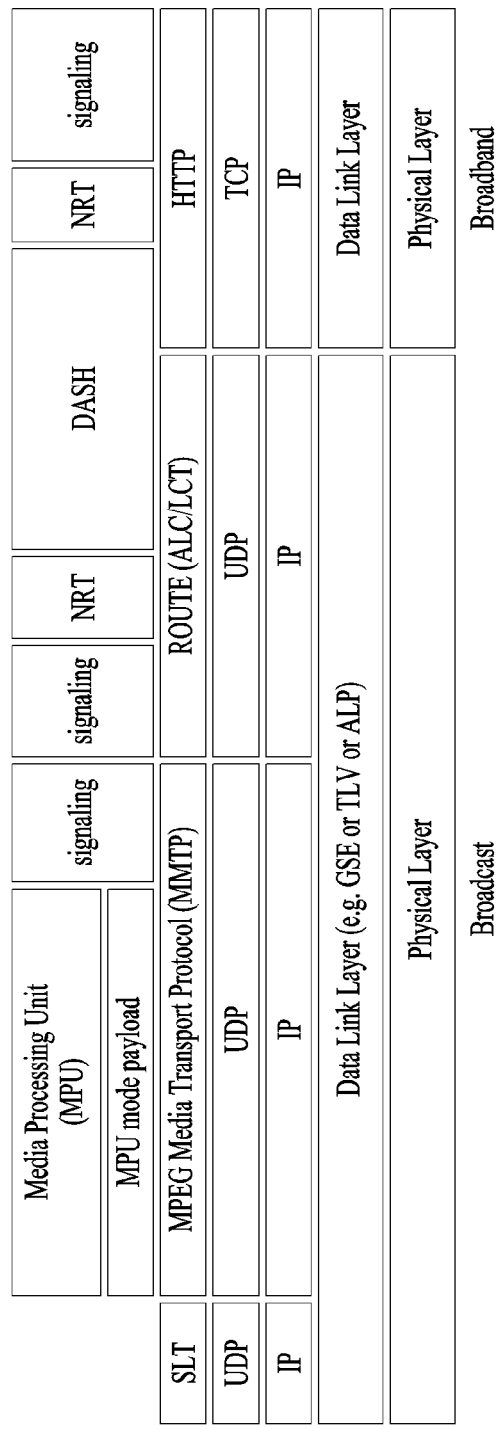
FIG. 1 illustrates a receiver protocol stack according to an embodiment of the present invention.

FIG. 1 illustrates a receiver protocol stack according to an embodiment of the present invention.

Two schemes may be used in broadcast service delivery through a broadcast network.

In a first scheme, media processing units (MPUs) are transmitted using an MMT protocol (MMTP) based on MPEG media transport (MMT). In a second scheme, dynamic adaptive streaming over HTTP (DASH) segments may be transmitted using real time object delivery over unidirectional transport (ROUTE) based on MPEG DASH.

Non-timed content including NRT media, EPG data, and other files is delivered with ROUTE. Signaling may be delivered over MMTP and/or ROUTE, while bootstrap signaling information is provided by the means of the Service List Table (SLT).

In hybrid service delivery, MPEG DASH over HTTP/TCP/IP is used on the broadband side. Media files in ISO Base Media File Format (BMFF) are used as the delivery, media encapsulation and synchronization format for both broadcast and broadband delivery. Here, hybrid service delivery may refer to a case in which one or more program elements are delivered through a broadband path.

Services are delivered using three functional layers. These are the physical layer, the delivery layer and the service management layer. The physical layer provides the mechanism by which signaling, service announcement and IP packet streams are transported over the broadcast physical layer and/or broadband physical layer. The delivery layer provides object and object flow transport functionality. It is enabled by the MMTP or the ROUTE protocol, operating on a UDP/IP multicast over the broadcast physical layer, and enabled by the HTTP protocol on a TCP/IP unicast over the broadband physical layer. The service management layer enables any type of service, such as linear TV or HTML5 application service, to be carried by the underlying delivery and physical layers.

In this figure, a protocol stack part on a broadcast side may be divided into a part transmitted through the SLT and the MMTP, and a part transmitted through ROUTE.

The SLT may be encapsulated through UDP and IP layers. Here, the SLT will be described below. The MMTP may transmit data formatted in an MPU format defined in MMT, and signaling information according to the MMTP. The data may be encapsulated through the UDP and IP layers. ROUTE may transmit data formatted in a DASH segment form, signaling information, and non-timed data such as NRT data, etc. The data may be encapsulated through the UDP and IP layers. According to a given embodiment, some or all processing according to the UDP and IP layers may be omitted. Here, the illustrated signaling information may be signaling information related to a service.

The part transmitted through the SLT and the MMTP and the part transmitted through ROUTE may be processed in the UDP and IP layers, and then encapsulated again in a data link layer. The link layer will be described below. Broadcast data processed in the link layer may be multicast as a broadcast signal through processes such as encoding/interleaving, etc. in the physical layer.

In this figure, a protocol stack part on a broadband side may be transmitted through HTTP as described above. Data formatted in a DASH segment form, signaling information, NRT information, etc. may be transmitted through HTTP. Here, the illustrated signaling information may be signaling information related to a service. The data may be processed through the TCP layer and the IP layer, and then encapsulated into the link layer. According to a given embodiment, some or all of the TCP, the IP, and the link layer may be omitted. Broadband data processed thereafter may be transmitted by unicast in the broadband through a process for transmission in the physical layer.

Service can be a collection of media components presented to the user in aggregate; components can be of multiple media types; a Service can be either continuous or intermittent; a Service can be Real Time or Non-Real Time; Real Time Service can consist of a sequence of TV programs.

FIG. 2 illustrates a relation between the SLT and SLS according to an embodiment of the present invention.

Service signaling provides service discovery and description information, and comprises two functional components: Bootstrap signaling via the Service List Table (SLT) and the Service Layer Signaling (SLS). These represent the information which is necessary to discover and acquire user services. The SLT enables the receiver to build a basic service list, and bootstrap the discovery of the SLS for each service.

The SLT can enable very rapid acquisition of basic service information. The SLS enables the receiver to discover and access services and their content components. Details of the SLT and SLS will be described below.

As described in the foregoing, the SLT may be transmitted through UDP/IP. In this instance, according to a given embodiment, data corresponding to the SLT may be delivered through the most robust scheme in this transmission.

The SLT may have access information for accessing SLS delivered by the ROUTE protocol. In other words, the SLT may be bootstrapped into SLS according to the ROUTE protocol. The SLS is signaling information positioned in an upper layer of ROUTE in the above-described protocol stack, and may be delivered through ROUTE/UDP/IP. The SLS may be transmitted through one of LCT sessions included in a ROUTE session. It is possible to access a service component corresponding to a desired service using the SLS.

In addition, the SLT may have access information for accessing an MMT signaling component delivered by MMTP. In other words, the SLT may be bootstrapped into SLS according to the MMTP. The SLS may be delivered by an MMTP signaling message defined in MMT. It is possible to access a streaming service component (MPU) corresponding to a desired service using the SLS. As described in the foregoing, in the present invention, an NRT service component is delivered through the ROUTE protocol, and the SLS according to the MMTP may include information for accessing the ROUTE protocol. In broadband delivery, the SLS is carried over HTTP(S)/TCP/IP.

FIG. 3 illustrates an SLT according to an embodiment of the present invention.

First, a description will be given of a relation among respective logical entities of service management, delivery, and a physical layer.

Services may be signaled as being one of two basic types. First type is a linear audio/video or audio-only service that may have an app-based enhancement. Second type is a service whose presentation and composition is controlled by a downloaded application that is executed upon acquisition of the service. The latter can be called an "app-based" service.

The rules regarding presence of ROUTE/LCT sessions and/or MMTP sessions for carrying the content components of a service may be as follows.

For broadcast delivery of a linear service without app-based enhancement, the service's content components can be carried by either (but not both): (1) one or more ROUTE/LCT sessions, or (2) one or more MMTP sessions.

For broadcast delivery of a linear service with app-based enhancement, the service's content components can be carried by: (1) one or more ROUTE/LCT sessions, and (2) zero or more MMTP sessions.

In certain embodiments, use of both MMTP and ROUTE for streaming media components in the same service may not be allowed.

For broadcast delivery of an app-based service, the service's content components can be carried by one or more ROUTE/LCT sessions.

Each ROUTE session comprises one or more LCT sessions which carry as a whole, or in part, the content components that make up the service. In streaming services delivery, an LCT session may carry an individual component of a user service such as an audio, video or closed caption stream. Streaming media is formatted as DASH Segments.

Each MMTP session comprises one or more MMTP packet flows which carry MMT signaling messages or as a whole, or in part, the content component. An MMTP packet flow may carry MMT signaling messages or components formatted as MPUs.

For the delivery of NRT User Services or system metadata, an LCT session carries file-based content items. These content files may consist of continuous (time-based) or discrete (non-time-based) media components of an NRT service, or metadata such as Service Signaling or ESG fragments. Delivery of system metadata such as service signaling or ESG fragments may also be achieved through the signaling message mode of MMTP.

A broadcast stream is the abstraction for an RF channel, which is defined in terms of a carrier frequency centered within a specified bandwidth. It is identified by the pair [geographic area, frequency]. A physical layer pipe (PLP) corresponds to a portion of the RF channel Each PLP has certain modulation and coding parameters. It is identified by a PLP identifier (PLPID), which is unique within the broadcast stream it belongs to. Here, PLP can be referred to as DP (data pipe).

Each service is identified by two forms of service identifier: a compact form that is used in the SLT and is unique only within the broadcast area; and a globally unique form that is used in the SLS and the ESG. A ROUTE session is identified by a source IP address, destination IP address and destination port number. An LCT session (associated with the service component(s) it carries) is identified by a transport session identifier (TSI) which is unique within the scope of the parent ROUTE session. Properties common to the LCT sessions, and certain properties unique to individual LCT sessions, are given in a ROUTE signaling structure called a service-based transport session instance description (S-TSID), which is part of the service layer signaling. Each LCT session is carried over a single physical layer pipe. According to a given embodiment, one LCT session may be transmitted through a plurality of PLPs. Different LCT sessions of a ROUTE session may or may not be contained in different physical layer pipes. Here, the ROUTE session may be delivered through a plurality of PLPs. The properties described in the S-TSID include the TSI value and PLPID for each LCT session, descriptors for the delivery objects/files, and application layer FEC parameters.

A MMTP session is identified by destination IP address and destination port number. An MMTP packet flow (associated with the service component(s) it carries) is identified by a packet_id which is unique within the scope of the parent MMTP session. Properties common to each MMTP packet flow, and certain properties of MMTP packet flows, are given in the SLT. Properties for each MMTP session are given by MMT signaling messages, which may be carried within the MMTP session. Different MMTP packet flows of a MMTP session may or may not be contained in different physical layer pipes. Here, the MMTP session may be delivered through a plurality of PLPs. The properties described in the MMT signaling messages include the packet_id value and PLPID for each MMTP packet flow. Here, the MMT signaling messages may have a form defined in MMT, or have a deformed form according to embodiments to be described below.

Hereinafter, a description will be given of low level signaling (LLS).

Signaling information which is carried in the payload of IP packets with a well-known address/port dedicated to this function is referred to as low level signaling (LLS). The IP address and the port number may be differently configured depending on embodiments. In one embodiment, LLS can be transported in IP packets with address 224.0.23.60 and destination port 4937/udp. LLS may be positioned in a portion expressed by "SLT" on the above-described protocol stack. However, according to a given embodiment, the LLS may be transmitted through a separate physical channel (dedicated channel) in a signal frame without being subjected to processing of the UDP/IP layer.

UDP/IP packets that deliver LLS data may be formatted in a form referred to as an LLS table. A first byte of each UDP/IP packet that delivers the LLS data may correspond to a start of the LLS table. The maximum length of any LLS table is limited by the largest IP packet that can be delivered from the PHY layer, 65,507 bytes.

The LLS table may include an LLS table ID field that identifies a type of the LLS table, and an LLS table version field that identifies a version of the LLS table. According to a value indicated by the LLS table ID field, the LLS table may include the above-described SLT or a rating region table (RRT). The RRT may have information about content advisory rating.

Hereinafter, the SLT will be described. LLS can be signaling information which supports rapid channel scans and bootstrapping of service acquisition by the receiver, and SLT can be a table of signaling information which is used to build a basic service listing and provide bootstrap discovery of SLS.

The function of the SLT is similar to that of the program association table (PAT) in MPEG-2 Systems, and the fast information channel (FIC) found in ATSC Systems. For a receiver first encountering the broadcast emission, this is the place to start. SLT supports a rapid channel scan which allows a receiver to build a list of all the services it can receive, with their channel name, channel number, etc., and SLT provides bootstrap information that allows a receiver to discover the SLS for each service. For ROUTE/DASH-delivered services, the bootstrap information includes the destination IP address and destination port of the LCT session that carries the SLS. For MMT/MPU-delivered services, the bootstrap information includes the destination IP address and destination port of the MMTP session carrying the SLS.

The SLT supports rapid channel scans and service acquisition by including the following information about each service in the broadcast stream. First, the SLT can include information necessary to allow the presentation of a service list that is meaningful to viewers and that can support initial service selection via channel number or up/down selection. Second, the SLT can include information necessary to locate the service layer signaling for each service listed. That is, the SLT may include access information related to a location at which the SLS is delivered.

The illustrated SLT according to the present embodiment is expressed as an XML document having an SLT root element. According to a given embodiment, the SLT may be expressed in a binary format or an XML document.

The SLT root element of the SLT illustrated in the figure may include @bsid, @sltSectionVersion, @sltSectionNumber, @ totalSltSectionNumbers, @ language, @capabilities, InetSigLoc and/or Service. According to a given embodiment, the SLT root element may further include @providerId. According to a given embodiment, the SLT root element may not include @language.

The service element may include @serviceId, @SLTserviceSeqNumber, @protected, @ majorChannelNo, @minorChannelNo, @serviceCategory, @shortServiceName, @hidden, @slsProtocolType, BroadcastSignaling, @slsPlpId, @slsDestinationIpAddress, @slsDestinationUdpPort, @slsSourceIpAddress, @slsMajorProtocolVersion, @SlsMinorProtocolVersion, @serviceLanguage, @broadbandAccessRequired, @capabilities and/or InetSigLoc.

According to a given embodiment, an attribute or an element of the SLT may be added/changed/deleted. Each element included in the SLT may additionally have a separate attribute or element, and some attribute or elements according to the present embodiment may be omitted. Here, a field which is marked with @ may correspond to an attribute, and a field which is not marked with @ may correspond to an element.

@bsid is an identifier of the whole broadcast stream. The value of BSID may be unique on a regional level.

@providerId can be an index of broadcaster that is using part or all of this broadcast stream. This is an optional attribute. When it's not present, it means that this broadcast stream is being used by one broadcaster. @providerId is not illustrated in the figure.

@sltSectionVersion can be a version number of the SLT section. The sltSectionVersion can be incremented by 1 when a change in the information carried within the slt occurs. When it reaches maximum value, it wraps around to 0.

@sltSectionNumber can be the number, counting from 1, of this section of the SLT. In other words, @sltSectionNumber may correspond to a section number of the SLT section. When this field is not used, @sltSectionNumber may be set to a default value of 1.

@totalSltSectionNumbers can be the total number of sections (that is, the section with the highest sltSectionNumber) of the SLT of which this section is part. sltSectionNumber and totalSltSectionNumbers together can be considered to indicate "Part M of N" of one portion of the SLT when it is sent in fragments. In other words, when the SLT is transmitted, transmission through fragmentation may be supported. When this field is not used, @totalSltSectionNumbers may be set to a default value of 1. A case in which this field is not used may correspond to a case in which the SLT is not transmitted by being fragmented.

@language can indicate primary language of the services included in this slt instance. According to a given embodiment, a value of this field may have be a three-character language code defined in the ISO. This field may be omitted.

@capabilities can indicate required capabilities for decoding and meaningfully presenting the content for all the services in this slt instance.

InetSigLoc can provide a URL telling the receiver where it can acquire any requested type of data from external server(s) via broadband. This element may include @urlType as a lower field. According to a value of the @urlType field, a type of a URL provided by InetSigLoc may be indicated. According to a given embodiment, when the @urlType field has a value of 0, InetSigLoc may provide a URL of a signaling server. When the @urlType field has a value of 1, InetSigLoc may provide a URL of an ESG server. When the @urlType field has other values, the field may be reserved for future use.

The service field is an element having information about each service, and may correspond to a service entry. Service element fields corresponding to the number of services indicated by the SLT may be present. Hereinafter, a description will be given of a lower attribute/element of the service field.

@serviceId can be an integer number that uniquely identify this service within the scope of this broadcast area. According to a given embodiment, a scope of @serviceId may be changed. @ SLTserviceSeqNumber can be an integer number that indicates the sequence number of the SLT service information with service ID equal to the serviceId attribute above. SLTserviceSeqNumber value can start at 0 for each service and can be incremented by 1 every time any attribute in this service element is changed. If no attribute values are changed compared to the previous Service element with a particular value of ServiceID then SLTserviceSeqNumber would not be incremented. The SLTserviceSeqNumber field wraps back to 0 after reaching the maximum value.

@protected is flag information which may indicate whether one or more components for significant reproduction of the service are in a protected state. When set to "1" (true), that one or more components necessary for meaningful presentation is protected. When set to "0" (false), this flag indicates that no components necessary for meaningful presentation of the service are protected. Default value is false.

@majorChannelNo is an integer number representing the "major" channel number of the service. An example of the field may have a range of 1 to 999.

@minorChannelNo is an integer number representing the "minor" channel number of the service. An example of the field may have a range of 1 to 999.

@serviceCategory can indicate the category of this service. This field may indicate a type that varies depending on embodiments. According to a given embodiment, when this field has values of 1, 2, and 3, the values may correspond to a linear A/V service, a linear audio only service, and an app-based service, respectively. When this field has a value of 0, the value may correspond to a service of an undefined category. When this field has other values except for 1, 2, and 3, the field may be reserved for future use. @shortServiceName can be a short string name of the Service.

@hidden can be boolean value that when present and set to "true" indicates that the service is intended for testing or proprietary use, and is not to be selected by ordinary TV receivers. The default value is "false" when not present.

@slsProtocolType can be an attribute indicating the type of protocol of Service Layer Signaling used by this service. This field may indicate a type that varies depending on embodiments. According to a given embodiment, when this field has values of 1 and 2, protocols of SLS used by respective corresponding services may be ROUTE and MMTP, respectively. When this field has other values except for 0, the field may be reserved for future use. This field may be referred to as @slsProtocol.

BroadcastSignaling and lower attributes/elements thereof may provide information related to broadcast signaling. When the BroadcastSignaling element is not present, the child element InetSigLoc of the parent service element can be present and its attribute urlType includes URL_type 0x00 (URL to signaling server). In this case attribute url supports the query parameter svc=<service_id> where service_id corresponds to the serviceId attribute for the parent service element.

Alternatively when the BroadcastSignaling element is not present, the element InetSigLoc can be present as a child element of the slt root element and the attribute urlType of that InetSigLoc element includes URL_type 0x00 (URL to signaling server). In this case, attribute url for URL_type 0x00 supports the query parameter svc=<service_id> where service_id corresponds to the serviceId attribute for the parent Service element.

@slsPlpId can be a string representing an integer number indicating the PLP ID of the physical layer pipe carrying the SLS for this service.

@slsDestinationIpAddress can be a string containing the dotted-IPv4 destination address of the packets carrying SLS data for this service.

@slsDestinationUdpPort can be a string containing the port number of the packets carrying SLS data for this service. As described in the foregoing, SLS bootstrapping may be performed by destination IP/UDP information.

@slsSourceIpAddress can be a string containing the dotted-IPv4 source address of the packets carrying SLS data for this service.

@slsMajorProtocolVersion can be major version number of the protocol used to deliver the service layer signaling for this service. Default value is 1.

@ SlsMinorProtocolVersion can be minor version number of the protocol used to deliver the service layer signaling for this service. Default value is 0.

@serviceLanguage can be a three-character language code indicating the primary language of the service. A value of this field may have a form that varies depending on embodiments.

@broadbandAccessRequired can be a Boolean indicating that broadband access is required for a receiver to make a meaningful presentation of the service. Default value is false. When this field has a value of True, the receiver needs to access a broadband for significant service reproduction, which may correspond to a case of hybrid service delivery.

@capabilities can represent required capabilities for decoding and meaningfully presenting the content for the service with service ID equal to the service Id attribute above.

InetSigLoc can provide a URL for access to signaling or announcement information via broadband, if available. Its data type can be an extension of the any URL data type, adding an @urlType attribute that indicates what the URL gives access to. An @urlType field of this field may indicate the same meaning as that of the @urlType field of InetSigLoc described above. When an InetSigLoc element of attribute URL_type 0x00 is present as an element of the SLT, it can be used to make HTTP requests for signaling metadata. The HTTP POST message body may include a service term. When the InetSigLoc element appears at the section level, the service term is used to indicate the service to which the requested signaling metadata objects apply. If the service term is not present, then the signaling metadata objects for all services in the section are requested. When the InetSigLoc appears at the service level, then no service term is needed to designate the desired service. When an InetSigLoc element of attribute URL_type 0x01 is provided, it can be used to retrieve ESG data via broadband. If the element appears as a child element of the service element, then the URL can be used to retrieve ESG data for that service. If the element appears as a child element of the SLT element, then the URL can be used to retrieve ESG data for all services in that section.

In another example of the SLT, @sltSectionVersion, @sltSectionNumber, @totalSltSectionNumbers and/or @language fields of the SLT may be omitted In addition, the above-described InetSigLoc field may be replaced by @sltInetSigUri and/or @sltInetEsgUri field. The two fields may include the URI of the signaling server and URI information of the ESG server, respectively. The InetSigLoc field corresponding to a lower field of the SLT and the InetSigLoc field corresponding to a lower field of the service field may be replaced in a similar manner.

The suggested default values may vary depending on embodiments. An illustrated "use" column relates to the respective fields. Here, "1" may indicate that a corresponding field is an essential field, and "0 . . . 1" may indicate that a corresponding field is an optional field.

Figure 4:
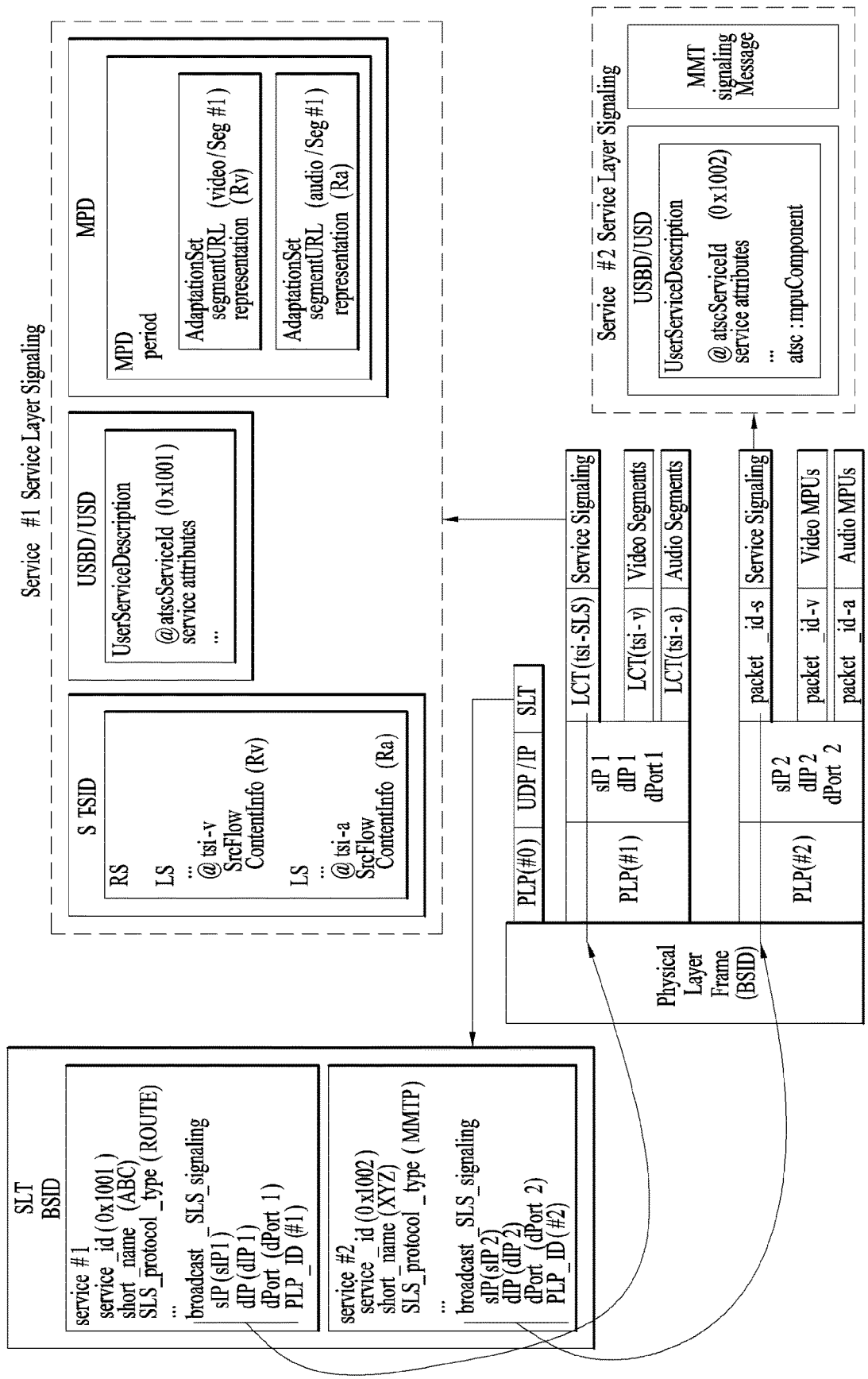
FIG. 4 illustrates SLS bootstrapping and a service discovery process according to an embodiment of the present invention.

FIG. 4 illustrates SLS bootstrapping and a service discovery process according to an embodiment of the present invention.

Hereinafter, SLS will be described.

SLS can be signaling which provides information for discovery and acquisition of services and their content components.

For ROUTE/DASH, the SLS for each service describes characteristics of the service, such as a list of its components and where to acquire them, and the receiver capabilities required to make a meaningful presentation of the service. In the ROUTE/DASH system, the SLS includes the user service bundle description (USBD), the S-TSID and the DASH media presentation description (MPD). Here, USBD or user service description (USD) is one of SLS XML fragments, and may function as a signaling herb that describes specific descriptive information. USBD/USD may be extended beyond 3GPP MBMS. Details of USBD/USD will be described below.

The service signaling focuses on basic attributes of the service itself, especially those attributes needed to acquire the service. Properties of the service and programming that are intended for viewers appear as service announcement, or ESG data.

Having separate Service Signaling for each service permits a receiver to acquire the appropriate SLS for a service of interest without the need to parse the entire SLS carried within a broadcast stream.

For optional broadband delivery of Service Signaling, the SLT can include HTTP URLs where the Service Signaling files can be obtained, as described above.

LLS is used for bootstrapping SLS acquisition, and subsequently, the SLS is used to acquire service components delivered on either ROUTE sessions or MMTP sessions. The described figure illustrates the following signaling sequences. Receiver starts acquiring the SLT described above. Each service identified by service_id delivered over ROUTE sessions provides SLS bootstrapping information: PLPID(#1), source IP address (sIP1), destination IP address (dIP1), and destination port number (dPort1). Each service identified by service_id delivered over MMTP sessions provides SLS bootstrapping information: PLPID(#2), destination IP address (dIP2), and destination port number (dPort2).

For streaming services delivery using ROUTE, the receiver can acquire SLS fragments carried over the IP/UDP/LCT session and PLP; whereas for streaming services delivery using MMTP, the receiver can acquire SLS fragments carried over an MMTP session and PLP. For service delivery using ROUTE, these SLS fragments include USBD/USD fragments, S-TSID fragments, and MPD fragments. They are relevant to one service. USBD/USD fragments describe service layer properties and provide URI references to S-TSID fragments and URI references to MPD fragments. In other words, the USBD/USD may refer to S-TSID and MPD. For service delivery using MMTP, the USBD references the MMT signaling's MPT message, the MP Table of which provides identification of package ID and location information for assets belonging to the service. Here, an asset is a multimedia data entity, and may refer to a data entity which is combined into one unique ID and is used to generate one multimedia presentation. The asset may correspond to a service component included in one service. The MPT message is a message having the MP table of MMT. Here, the MP table may be an MMT package table having information about content and an MMT asset. Details may be similar to a definition in MMT. Here, media presentation may correspond to a collection of data that establishes bounded/unbounded presentation of media content.

The S-TSID fragment provides component acquisition information associated with one service and mapping between DASH Representations found in the MPD and in the TSI corresponding to the component of the service. The S-TSID can provide component acquisition information in the form of a TSI and the associated DASH representation identifier, and PLPID carrying DASH segments associated with the DASH representation. By the PLPID and TSI values, the receiver collects the audio/video components from the service and begins buffering DASH media segments then applies the appropriate decoding processes.

For USBD listing service components delivered on MMTP sessions, as illustrated by "Service #2" in the described figure, the receiver also acquires an MPT message with matching MMT_package_id to complete the SLS. An MPT message provides the full list of service components comprising a service and the acquisition information for each component. Component acquisition information includes MMTP session information, the PLPID carrying the session and the packet_id within that session.

According to a given embodiment, for example, in ROUTE, two or more S-TSID fragments may be used. Each fragment may provide access information related to LCT sessions delivering content of each service.

In ROUTE, S-TSID, USBD/USD, MPD, or an LCT session delivering S-TSID, USBD/USD or MPD may be referred to as a service signaling channel. In MMTP, USBD/UD, an MMT signaling message, or a packet flow delivering the MMTP or USBD/UD may be referred to as a service signaling channel.

Unlike the illustrated example, one ROUTE or MMTP session may be delivered through a plurality of PLPs. In other words, one service may be delivered through one or more PLPs. As described in the foregoing, one LCT session may be delivered through one PLP. Unlike the figure, according to a given embodiment, components included in one service may be delivered through different ROUTE sessions. In addition, according to a given embodiment, components included in one service may be delivered through different MMTP sessions. According to a given embodiment, components included in one service may be delivered separately through a ROUTE session and an MMTP session. Although not illustrated, components included in one service may be delivered via broadband (hybrid delivery).

FIG. 5 illustrates a USBD fragment for ROUTE/DASH according to an embodiment of the present invention.

Hereinafter, a description will be given of SLS in delivery based on ROUTE.

SLS provides detailed technical information to the receiver to enable the discovery and access of services and their content components. It can include a set of XML-encoded metadata fragments carried over a dedicated LCT session. That LCT session can be acquired using the bootstrap information contained in the SLT as described above. The SLS is defined on a per-service level, and it describes the characteristics and access information of the service, such as a list of its content components and how to acquire them, and the receiver capabilities required to make a meaningful presentation of the service. In the ROUTE/DASH system, for linear services delivery, the SLS consists of the following metadata fragments: USBD, S-TSID and the DASH MPD. The SLS fragments can be delivered on a dedicated LCT transport session with TSI=0. According to a given embodiment, a TSI of a particular LCT session (dedicated LCT session) in which an SLS fragment is delivered may have a different value. According to a given embodiment, an LCT session in which an SLS fragment is delivered may be signaled using the SLT or another scheme.

ROUTE/DASH SLS can include the user service bundle description (USBD) and service-based transport session instance description (S-TSID) metadata fragments. These service signaling fragments are applicable to both linear and application-based services. The USBD fragment contains service identification, device capabilities information, references to other SLS fragments required to access the service and constituent media components, and metadata to enable the receiver to determine the transport mode (broadcast and/or broadband) of service components. The S-TSID fragment, referenced by the USBD, provides transport session descriptions for the one or more ROUTE/LCT sessions in which the media content components of a service are delivered, and descriptions of the delivery objects carried in those LCT sessions. The USBD and S-TSID will be described below.

In streaming content signaling in ROUTE-based delivery, a streaming content signaling component of SLS corresponds to an MPD fragment. The MPD is typically associated with linear services for the delivery of DASH Segments as streaming content. The MPD provides the resource identifiers for individual media components of the linear/streaming service in the form of Segment URLs, and the context of the identified resources within the Media Presentation. Details of the MPD will be described below.

In app-based enhancement signaling in ROUTE-based delivery, app-based enhancement signaling pertains to the delivery of app-based enhancement components, such as an application logic file, locally-cached media files, network content items, or a notification stream. An application can also retrieve locally-cached data over a broadband connection when available.

Hereinafter, a description will be given of details of USBD/USD illustrated in the figure.

The top level or entry point SLS fragment is the USBD fragment. An illustrated USBD fragment is an example of the present invention, basic fields of the USBD fragment not illustrated in the figure may be additionally provided according to a given embodiment. As described in the foregoing, the illustrated USBD fragment has an extended form, and may have fields added to a basic configuration.

The illustrated USBD may have a bundleDescription root element. The bundleDescription root element may have a userServiceDescription element. The userServiceDescription element may correspond to an instance for one service.

The userServiceDescription element may include @serviceId, @atsc:serviceId, @ atsc:serviceStatus, @atsc:fullMPDUri, @atsc:sTSIDUri, name, serviceLanguage, atsc:capabilityCode and/or deliveryMethod.

@serviceId can be a globally unique URI that identifies a service, unique within the scope of the BSID. This parameter can be used to link to ESG data (Service@globalServiceID).

@atsc:serviceId is a reference to corresponding service entry in LLS(SLT). The value of this attribute is the same value of serviceId assigned to the entry.

@atsc:serviceStatus can specify the status of this service. The value indicates whether this service is active or inactive. When set to "1" (true), that indicates service is active. When this field is not used, @atsc:serviceStatus may be set to a default value of 1.

@atsc:fullMPDUri can reference an MPD fragment which contains descriptions for contents components of the service delivered over broadcast and optionally, also over broadband.

@atsc:sTSIDUri can reference the S-TSID fragment which provides access related parameters to the Transport sessions carrying contents of this service.

name can indicate name of the service as given by the lang attribute. name element can include lang attribute, which indicating language of the service name. The language can be specified according to XML data types.

serviceLanguage can represent available languages of the service. The language can be specified according to XML data types.

atsc:capabilityCode can specify the capabilities required in the receiver to be able to create a meaningful presentation of the content of this service. According to a given embodiment, this field may specify a predefined capability group. Here, the capability group may be a group of capability attribute values for significant presentation. This field may be omitted according to a given embodiment.

deliveryMethod can be a container of transport related information pertaining to the contents of the service over broadcast and (optionally) broadband modes of access. Referring to data included in the service, when the number of the data is N, delivery schemes for respective data may be described by this element. The deliveryMethod may include an r12:broadcastAppService element and an r12:unicastAppService element. Each lower element may include a basePattern element as a lower element.

r12:broadcastAppService can be a DASH Representation delivered over broadcast, in multiplexed or non-multiplexed form, containing the corresponding media component(s) belonging to the service, across all Periods of the affiliated media presentation. In other words, each of the fields may indicate DASH representation delivered through the broadcast network.

r12:unicastAppService can be a DASH Representation delivered over broadband, in multiplexed or non-multiplexed form, containing the constituent media content component(s) belonging to the service, across all periods of the affiliated media presentation. In other words, each of the fields may indicate DASH representation delivered via broadband.

basePattern can be a character pattern for use by the receiver to match against any portion of the segment URL used by the DASH client to request media segments of a parent representation under its containing period. A match implies that the corresponding requested media segment is carried over broadcast transport. In a URL address for receiving DASH representation expressed by each of the r12:broadcastAppService element and the r12:unicastAppService element, a part of the URL, etc. may have a particular pattern. The pattern may be described by this field. Some data may be distinguished using this information. The proposed default values may vary depending on embodiments. The "use" column illustrated in the figure relates to each field. Here, M may denote an essential field, 0 may denote an optional field, OD may denote an optional field having a default value, and CM may denote a conditional essential field. 0 . . . 1 to 0 . . . N may indicate the number of available fields.

FIG. 6 illustrates an S-TSID fragment for ROUTE/DASH according to an embodiment of the present invention.

Hereinafter, a description will be given of the S-TSID illustrated in the figure in detail.

S-TSID can be an SLS XML fragment which provides the overall session description information for transport session(s) which carry the content components of a service. The S-TSID is the SLS metadata fragment that contains the overall transport session description information for the zero or more ROUTE sessions and constituent LCT sessions in which the media content components of a service are delivered. The S-TSID also includes file metadata for the delivery object or object flow carried in the LCT sessions of the service, as well as additional information on the payload formats and content components carried in those LCT sessions.

Each instance of the S-TSID fragment is referenced in the USBD fragment by the @atsc:sTSIDUri attribute of the userServiceDescription element. The illustrated S-TSID according to the present embodiment is expressed as an XML document. According to a given embodiment, the S-TSID may be expressed in a binary format or as an XML document.

The illustrated S-TSID may have an S-TSID root element. The S-TSID root element may include @serviceId and/or RS.

@serviceID can be a reference corresponding service element in the USD. The value of this attribute can reference a service with a corresponding value of service_id.

The RS element may have information about a ROUTE session for delivering the service data. Service data or service components may be delivered through a plurality of ROUTE sessions, and thus the number of RS elements may be 1 to N.

The RS element may include @bsid, @sIpAddr, @dIpAddr, @dport, @PLPID and/or LS.

@bsid can be an identifier of the broadcast stream within which the content component(s) of the broadcastAppService are carried. When this attribute is absent, the default broadcast stream is the one whose PLPs carry SLS fragments for this service. Its value can be identical to that of the broadcast_stream_id in the SLT.

@sIpAddr can indicate source IP address. Here, the source IP address may be a source IP address of a ROUTE session for delivering a service component included in the service. As described in the foregoing, service components of one service may be delivered through a plurality of ROUTE sessions. Thus, the service components may be transmitted using another ROUTE session other than the ROUTE session for delivering the S-TSID. Therefore, this field may be used to indicate the source IP address of the ROUTE session. A default value of this field may be a source IP address of a current ROUTE session. When a service component is delivered through another ROUTE session, and thus the ROUTE session needs to be indicated, a value of this field may be a value of a source IP address of the ROUTE session. In this case, this field may correspond to M, that is, an essential field.

@dIpAddr can indicate destination IP address. Here, a destination IP address may be a destination IP address of a ROUTE session that delivers a service component included in a service. For a similar case to the above description of @sIpAddr, this field may indicate a destination IP address of a ROUTE session that delivers a service component. A default value of this field may be a destination IP address of a current ROUTE session. When a service component is delivered through another ROUTE session, and thus the ROUTE session needs to be indicated, a value of this field may be a value of a destination IP address of the ROUTE session. In this case, this field may correspond to M, that is, an essential field.

@dport can indicate destination port. Here, a destination port may be a destination port of a ROUTE session that delivers a service component included in a service. For a similar case to the above description of @sIpAddr, this field may indicate a destination port of a ROUTE session that delivers a service component. A default value of this field may be a destination port number of a current ROUTE session. When a service component is delivered through another ROUTE session, and thus the ROUTE session needs to be indicated, a value of this field may be a destination port number value of the ROUTE session. In this case, this field may correspond to M, that is, an essential field.

@PLPID may be an ID of a PLP for a ROUTE session expressed by an RS. A default value may be an ID of a PLP of an LCT session including a current S-TSID. According to a given embodiment, this field may have an ID value of a PLP for an LCT session for delivering an S-TSID in the ROUTE session, and may have ID values of all PLPs for the ROUTE session.

An LS element may have information about an LCT session for delivering a service data. Service data or service components may be delivered through a plurality of LCT sessions, and thus the number of LS elements may be 1 to N.

The LS element may include @tsi, @PLPID, @bw, @startTime, @endTime, SrcFlow and/or RprFlow.

@tsi may indicate a TSI value of an LCT session for delivering a service component of a service.

@PLPID may have ID information of a PLP for the LCT session. This value may be overwritten on a basic ROUTE session value.

@bw may indicate a maximum bandwidth value. @startTime may indicate a start time of the LCT session. @endTime may indicate an end time of the LCT session. A SrcFlow element may describe a source flow of ROUTE. A RprFlow element may describe a repair flow of ROUTE.

The proposed default values may be varied according to an embodiment. The "use" column illustrated in the figure relates to each field. Here, M may denote an essential field, O may denote an optional field, OD may denote an optional field having a default value, and CM may denote a conditional essential field. 0 . . . 1 to 0 . . . N may indicate the number of available fields.

Hereinafter, a description will be given of MPD for ROUTE/DASH.

The MPD is an SLS metadata fragment which contains a formalized description of a DASH Media Presentation, corresponding to a linear service of a given duration defined by the broadcaster (for example a single TV program, or the set of contiguous linear TV programs over a period of time). The contents of the MPD provide the resource identifiers for Segments and the context for the identified resources within the Media Presentation. The data structure and semantics of the MPD fragment can be according to the MPD defined by MPEG DASH.

One or more of the DASH Representations conveyed in the MPD can be carried over broadcast. The MPD may describe additional Representations delivered over broadband, e.g. in the case of a hybrid service, or to support service continuity in handoff from broadcast to broadcast due to broadcast signal degradation (e.g. driving through a tunnel).

FIG. 7 illustrates a USBD/USD fragment for MMT according to an embodiment of the present invention.

MMT SLS for linear services comprises the USBD fragment and the MMT Package (MP) table. The MP table is as described above. The USBD fragment contains service identification, device capabilities information, references to other SLS information required to access the service and constituent media components, and the metadata to enable the receiver to determine the transport mode (broadcast and/or broadband) of the service components. The MP table for MPU components, referenced by the USBD, provides transport session descriptions for the MMTP sessions in which the media content components of a service are delivered and the descriptions of the Assets carried in those MMTP sessions.

The streaming content signaling component of the SLS for MPU components corresponds to the MP table defined in MMT. The MP table provides a list of MMT assets where each asset corresponds to a single service component and the description of the location information for this component.

USBD fragments may also contain references to the S-TSID and the MPD as described above, for service components delivered by the ROUTE protocol and the broadband, respectively. According to a given embodiment, in delivery through MMT, a service component delivered through the ROUTE protocol is NRT data, etc. Thus, in this case, MPD may be unnecessary. In addition, in delivery through MMT, information about an LCT session for delivering a service component, which is delivered via broadband, is unnecessary, and thus an S-TSID may be unnecessary. Here, an MMT package may be a logical collection of media data delivered using MMT. Here, an MMTP packet may refer to a formatted unit of media data delivered using MMT. An MPU may refer to a generic container of independently decodable timed/non-timed data. Here, data in the MPU is media codec agnostic.

Hereinafter, a description will be given of details of the USBD/USD illustrated in the figure.

The illustrated USBD fragment is an example of the present invention, and basic fields of the USBD fragment may be additionally provided according to an embodiment. As described in the foregoing, the illustrated USBD fragment has an extended form, and may have fields added to a basic structure.

The illustrated USBD according to an embodiment of the present invention is expressed as an XML document. According to a given embodiment, the USBD may be expressed in a binary format or as an XML document.

The illustrated USBD may have a bundleDescription root element. The bundleDescription root element may have a userServiceDescription element. The userServiceDescription element may be an instance for one service.

The userServiceDescription element may include @serviceId, @atsc:serviceId, name, serviceLanguage, atsc:capabilityCode, atsc:Channel, atsc:mpuComponent, atsc:routeComponent, atsc:broadbandComponent and/or atsc:ComponentInfo.

Here, @serviceId, @atsc:serviceId, name, serviceLanguage, and atsc:capabilityCode may be as described above. The lang field below the name field may be as described above. atsc:capabilityCode may be omitted according to a given embodiment.

The userServiceDescription element may further include an atsc:contentAdvisoryRating element according to an embodiment. This element may be an optional element. atsc:contentAdvisoryRating can specify the content advisory rating. This field is not illustrated in the figure.

atsc:Channel may have information about a channel of a service. The atsc:Channel element may include @atsc:majorChannelNo, @atsc:minorChannelNo, @atsc:serviceLang, @atsc:serviceGenre, @atsc:serviceIcon and/or atsc:ServiceDescription. @atsc:majorChannelNo, @atsc:minorChannelNo, and @atsc:serviceLang may be omitted according to a given embodiment.

@atsc:majorChannelNo is an attribute that indicates the major channel number of the service.

@atsc:minorChannelNo is an attribute that indicates the minor channel number of the service.

@atsc:serviceLang is an attribute that indicates the primary language used in the service.

@atsc:serviceGenre is an attribute that indicates primary genre of the service.

@atsc:serviceIcon is an attribute that indicates the Uniform Resource Locator (URL) for the icon used to represent this service.

atsc:ServiceDescription includes service description, possibly in multiple languages. atsc:ServiceDescription includes can include @atsc:serviceDescrText and/or @atsc:serviceDescrLang.

@atsc:serviceDescrText is an attribute that indicates description of the service.

@atsc:serviceDescrLang is an attribute that indicates the language of the serviceDescrText attribute above.

atsc:mpuComponent may have information about a content component of a service delivered in a form of an MPU. atsc:mpuComponent may include @atsc:mmtPackageId and/or @atsc: nextMmtPackageId.

@atsc:mmtPackageId can reference a MMT Package for content components of the service delivered as MPUs.

@atsc:nextMmtPackageId can reference a MMT Package to be used after the one referenced by @atsc:mmtPackageId in time for content components of the service delivered as MPUs.

atsc:routeComponent may have information about a content component of a service delivered through ROUTE. atsc:routeComponent may include @atsc:sTSIDUri, @sTSIDPlpId, @sTSIDDestinationIpAddress, @sTSIDDestinationUdpPort, @sTSIDSourceIpAddress, @sTSIDMajorProtocolVersion and/or @sTSIDMinorProtocolVersion.

@atsc:sTSIDUri can be a reference to the S-TSID fragment which provides access related parameters to the Transport sessions carrying contents of this service. This field may be the same as a URI for referring to an S-TSID in USBD for ROUTE described above. As described in the foregoing, in service delivery by the MMTP, service components, which are delivered through NRT, etc., may be delivered by ROUTE. This field may be used to refer to the S-TSID therefor.

@sTSIDPlpId can be a string representing an integer number indicating the PLP ID of the physical layer pipe carrying the S-TSID for this service. (default: current physical layer pipe).

@sTSIDDestinationIpAddress can be a string containing the dotted-IPv4 destination address of the packets carrying S-TSID for this service. (default: current MMTP session's source IP address)

@sTSIDDestinationUdpPort can be a string containing the port number of the packets carrying S-TSID for this service.

@sTSIDSourceIpAddress can be a string containing the dotted-IPv4 source address of the packets carrying S-TSID for this service.

@sTSIDMajorProtocolVersion can indicate major version number of the protocol used to deliver the S-TSID for this service. Default value is 1.

@sTSIDMinorProtocolVersion can indicate minor version number of the protocol used to deliver the S-TSID for this service. Default value is 0.

atsc:broadbandComponent may have information about a content component of a service delivered via broadband. In other words, atsc:broadbandComponent may be a field on the assumption of hybrid delivery. atsc:broadbandComponent may further include @atsc:fullfMPDUri.

@atsc:fullfMPDUri can be a reference to an MPD fragment which contains descriptions for contents components of the service delivered over broadband.

An atsc:ComponentInfo field may have information about an available component of a service. The atsc:ComponentInfo field may have information about a type, a role, a name, etc. of each component. The number of atsc:ComponentInfo fields may correspond to the number (N) of respective components. The atsc:ComponentInfo field may include @atsc:componentType, @atsc:componentRole, @atsc:componentProtectedFlag, @atsc:componentId and/or @atsc:componentName.

@atsc:componentType is an attribute that indicates the type of this component. Value of 0 indicates an audio component. Value of 1 indicates a video component. Value of 2 indicated a closed caption component. Value of 3 indicates an application component. Values 4 to 7 are reserved. A meaning of a value of this field may be differently set depending on embodiments.

@atsc:componentRole is an attribute that indicates the role or kind of this component.

For audio (when componentType attribute above is equal to 0): values of componentRole attribute are as follows: 0=Complete main, 1=Music and Effects, 2=Dialog, 3=Commentary, 4=Visually Impaired, 5=Hearing Impaired, 6=Voice-Over, 7-254=reserved, 255=unknown.

For video (when componentType attribute above is equal to 1) values of componentRole attribute are as follows: 0=Primary video, 1=Alternative camera view, 2=Other alternative video component, 3=Sign language inset, 4=Follow subject video, 5=3D video left view, 6=3D video right view, 7=3D video depth information, 8=Part of video array <x,y> of <n,m>, 9=Follow-Subject metadata, 10-254=reserved, 255=unknown.

For Closed Caption component (when componentType attribute above is equal to 2) values of componentRole attribute are as follows: 0=Normal, 1=Easy reader, 2-254=reserved, 255=unknown.

When componentType attribute above is between 3 to 7, inclusive, the componentRole can be equal to 255. A meaning of a value of this field may be differently set depending on embodiments.

@atsc:componentProtectedFlag is an attribute that indicates if this component is protected (e.g. encrypted). When this flag is set to a value of 1 this component is protected (e.g. encrypted). When this flag is set to a value of 0 this component is not protected (e.g. encrypted). When not present the value of componentProtectedFlag attribute is inferred to be equal to 0. A meaning of a value of this field may be differently set depending on embodiments.

@atsc:componentId is an attribute that indicates the identifier of this component. The value of this attribute can be the same as the asset_id in the MP table corresponding to this component.

@atsc:componentName is an attribute that indicates the human readable name of this component.

The proposed default values may vary depending on embodiments. The "use" column illustrated in the figure relates to each field. Here, M may denote an essential field, O may denote an optional field, OD may denote an optional field having a default value, and CM may denote a conditional essential field. 0 . . . 1 to 0 . . . N may indicate the number of available fields.

Hereinafter, a description will be given of MPD for MMT.

The Media Presentation Description is an SLS metadata fragment corresponding to a linear service of a given duration defined by the broadcaster (for example a single TV program, or the set of contiguous linear TV programs over a period of time). The contents of the MPD provide the resource identifiers for segments and the context for the identified resources within the media presentation. The data structure and semantics of the MPD can be according to the MPD defined by MPEG DASH.

In the present embodiment, an MPD delivered by an MMTP session describes Representations delivered over broadband, e.g. in the case of a hybrid service, or to support service continuity in handoff from broadcast to broadband due to broadcast signal degradation (e.g. driving under a mountain or through a tunnel).

Hereinafter, a description will be given of an MMT signaling message for MMT.

When MMTP sessions are used to carry a streaming service, MMT signaling messages defined by MMT are delivered by MMTP packets according to signaling message mode defined by MMT. The value of the packet_id field of MMTP packets carrying service layer signaling is set to '00' except for MMTP packets carrying MMT signaling messages specific to an asset, which can be set to the same packet_id value as the MMTP packets carrying the asset. Identifiers referencing the appropriate package for each service are signaled by the USBD fragment as described above. MMT Package Table (MPT) messages with matching MMT_package_id can be delivered on the MMTP session signaled in the SLT. Each MMTP session carries MMT signaling messages specific to its session or each asset delivered by the MMTP session.

In other words, it is possible to access USBD of the MMTP session by specifying an IP destination address/port number, etc. of a packet having the SLS for a particular service in the SLT. As described in the foregoing, a packet ID of an MMTP packet carrying the SLS may be designated as a particular value such as 00, etc. It is possible to access an MPT message having a matched packet ID using the above-described package IP information of USBD. As described below, the MPT message may be used to access each service component/asset.

The following MMTP messages can be delivered by the MMTP session signaled in the SLT.

MMT Package Table (MPT) message: This message carries an MP (MMT Package) table which contains the list of all Assets and their location information as defined by MMT. If an Asset is delivered by a PLP different from the current PLP delivering the MP table, the identifier of the PLP carrying the asset can be provided in the MP table using physical layer pipe identifier descriptor. The physical layer pipe identifier descriptor will be described below.

MMT ATSC3 (MA3) message mmt_atsc3_message( ): This message carries system metadata specific for services including service layer signaling as described above. mmt_atsc3_message( ) will be described below.

The following MMTP messages can be delivered by the MMTP session signaled in the SLT, if required.

Media Presentation Information (MPI) message: This message carries an MPI table which contains the whole document or a subset of a document of presentation information. An MP table associated with the MPI table also can be delivered by this message.

Clock Relation Information (CRI) message: This message carries a CRI table which contains clock related information for the mapping between the NTP timestamp and the MPEG-2 STC. According to a given embodiment, the CRI message may not be delivered through the MMTP session.

The following MMTP messages can be delivered by each MMTP session carrying streaming content.

Hypothetical Receiver Buffer Model message: This message carries information required by the receiver to manage its buffer.

Hypothetical Receiver Buffer Model Removal message: This message carries information required by the receiver to manage its MMT de-capsulation buffer.

Hereinafter, a description will be given of mmt_atsc3_message( ) corresponding to one of MMT signaling messages. An MMT Signaling message mmt_atsc3_message( ) is defined to deliver information specific to services according to the present invention described above. The signaling message may include message ID, version, and/or length fields corresponding to basic fields of the MMT signaling message. A payload of the signaling message may include service ID information, content type information, content version information, content compression information and/or URI information. The content type information may indicate a type of data included in the payload of the signaling message. The content version information may indicate a version of data included in the payload, and the content compression information may indicate a type of compression applied to the data. The URI information may have URI information related to content delivered by the message.

Hereinafter, a description will be given of the physical layer pipe identifier descriptor.

The physical layer pipe identifier descriptor is a descriptor that can be used as one of descriptors of the MP table described above. The physical layer pipe identifier descriptor provides information about the PLP carrying an asset. If an asset is delivered by a PLP different from the current PLP delivering the MP table, the physical layer pipe identifier descriptor can be used as an asset descriptor in the associated MP table to identify the PLP carrying the asset. The physical layer pipe identifier descriptor may further include BSID information in addition to PLP ID information. The BSID may be an ID of a broadcast stream that delivers an MMTP packet for an asset described by the descriptor.

Figure 8:
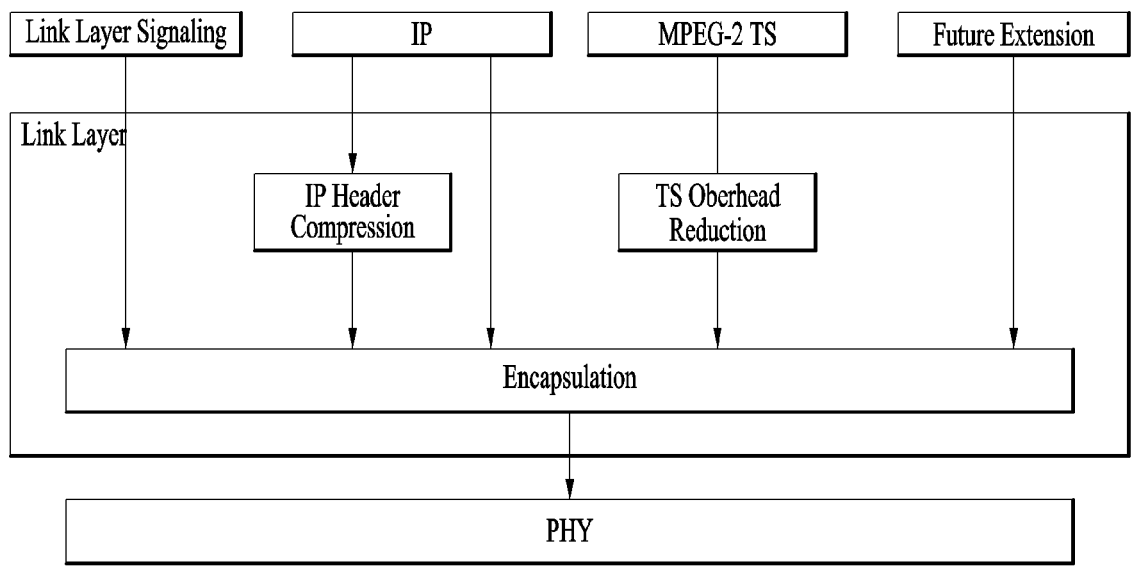
FIG. 8 illustrates a link layer protocol architecture according to an embodiment of the present invention.

FIG. 8 illustrates a link layer protocol architecture according to an embodiment of the present invention.

Hereinafter, a link layer will be described.

The link layer is the layer between the physical layer and the network layer, and transports the data from the network layer to the physical layer at the sending side and transports the data from the physical layer to the network layer at the receiving side. The purpose of the link layer includes abstracting all input packet types into a single format for processing by the physical layer, ensuring flexibility and future extensibility for as yet undefined input types. In addition, processing within the link layer ensures that the input data can be transmitted in an efficient manner, for example by providing options to compress redundant information in the headers of input packets. The operations of encapsulation, compression and so on are referred to as the link layer protocol and packets created using this protocol are called link layer packets. The link layer may perform functions such as packet encapsulation, overhead reduction and/or signaling transmission, etc.

Hereinafter, packet encapsulation will be described. Link layer protocol allows encapsulation of any type of packet, including ones such as IP packets and MPEG-2 TS. Using link layer protocol, the physical layer need only process one single packet format, independent of the network layer protocol type (here we consider MPEG-2 TS packet as a kind of network layer packet.) Each network layer packet or input packet is transformed into the payload of a generic link layer packet. Additionally, concatenation and segmentation can be performed in order to use the physical layer resources efficiently when the input packet sizes are particularly small or large.

As described in the foregoing, segmentation may be used in packet encapsulation. When the network layer packet is too large to process easily in the physical layer, the network layer packet is divided into two or more segments. The link layer packet header includes protocol fields to perform segmentation on the sending side and reassembly on the receiving side. When the network layer packet is segmented, each segment can be encapsulated to link layer packet in the same order as original position in the network layer packet. Also each link layer packet which includes a segment of network layer packet can be transported to PHY layer consequently.

As described in the foregoing, concatenation may be used in packet encapsulation. When the network layer packet is small enough for the payload of a link layer packet to include several network layer packets, the link layer packet header includes protocol fields to perform concatenation. The concatenation is combining of multiple small sized network layer packets into one payload. When the network layer packets are concatenated, each network layer packet can be concatenated to payload of link layer packet in the same order as original input order. Also each packet which constructs a payload of link layer packet can be whole packet, not a segment of packet.

Hereinafter, overhead reduction will be described. Use of the link layer protocol can result in significant reduction in overhead for transport of data on the physical layer. The link layer protocol according to the present invention may provide IP overhead reduction and/or MPEG-2 TS overhead reduction. In IP overhead reduction, IP packets have a fixed header format, however some of the information which is needed in a communication environment may be redundant in a broadcast environment. Link layer protocol provides mechanisms to reduce the broadcast overhead by compressing headers of IP packets. In MPEG-2 TS overhead reduction, link layer protocol provides sync byte removal, null packet deletion and/or common header removal (compression). First, sync byte removal provides an overhead reduction of one byte per TS packet, secondly a null packet deletion mechanism removes the 188 byte null TS packets in a manner that they can be re-inserted at the receiver and finally a common header removal mechanism.

For signaling transmission, in the link layer protocol, a particular format for the signaling packet may be provided for link layer signaling, which will be described below.

In the illustrated link layer protocol architecture according to an embodiment of the present invention, link layer protocol takes as input network layer packets such as IPv4, MPEG-2 TS and so on as input packets. Future extension indicates other packet types and protocol which is also possible to be input in link layer. Link layer protocol also specifies the format and signaling for any link layer signaling, including information about mapping to specific channel to the physical layer. Figure also shows how ALP incorporates mechanisms to improve the efficiency of transmission, via various header compression and deletion algorithms. In addition, the link layer protocol may basically encapsulate input packets.

Figure 9:
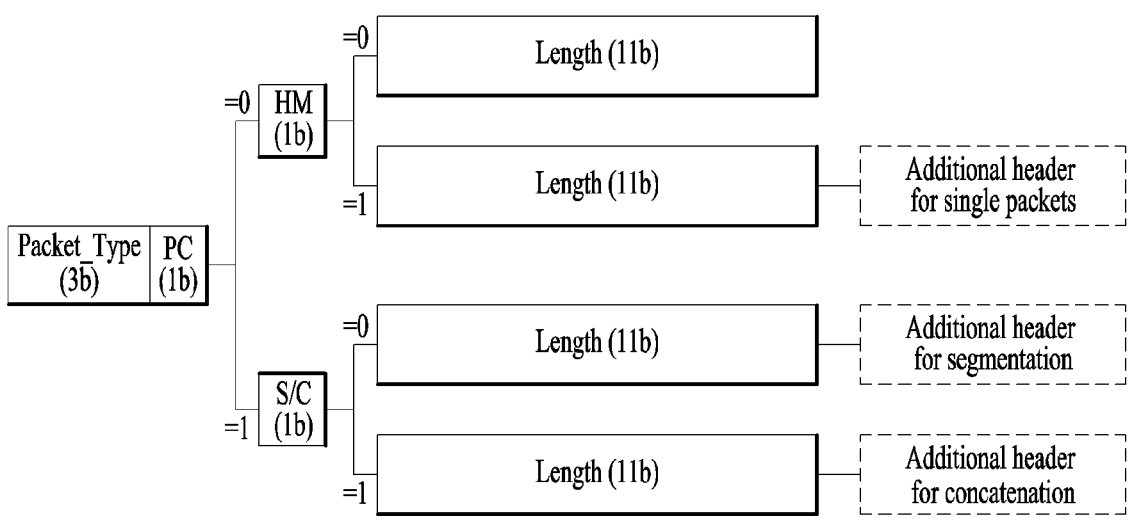
FIG. 9 illustrates a structure of a base header of a link layer packet according to an embodiment of the present invention.

FIG. 9 illustrates a structure of a base header of a link layer packet according to an embodiment of the present invention. Hereinafter, the structure of the header will be described.

A link layer packet can include a header followed by the data payload. The header of a link layer packet can include a base header, and may include an additional header depending on the control fields of the base header. The presence of an optional header is indicated from flag fields of the additional header. According to a given embodiment, a field indicating the presence of an additional header and an optional header may be positioned in the base header.

Hereinafter, the structure of the base header will be described. The base header for link layer packet encapsulation has a hierarchical structure. The base header can be two bytes in length and is the minimum length of the link layer packet header.

The illustrated base header according to the present embodiment may include a Packet_Type field, a PC field and/or a length field. According to a given embodiment, the base header may further include an HM field or an S/C field.

Packet_Type field can be a 3-bit field that indicates the original protocol or packet type of the input data before encapsulation into a link layer packet. An IPv4 packet, a compressed IP packet, a link layer signaling packet, and other types of packets may have the base header structure and may be encapsulated. However, according to a given embodiment, the MPEG-2 TS packet may have a different particular structure, and may be encapsulated. When the value of Packet_Type is "000", "001" "100" or "111", that is the original data type of an ALP packet is one of an IPv4 packet, a compressed IP packet, link layer signaling or extension packet. When the MPEG-2 TS packet is encapsulated, the value of Packet_Type can be "010". Other values of the Packet_Type field may be reserved for future use.

Payload_Configuration (PC) field can be a 1-bit field that indicates the configuration of the payload. A value of 0 can indicate that the link layer packet carries a single, whole input packet and the following field is the Header_Mode field. A value of 1 can indicate that the link layer packet carries more than one input packet (concatenation) or a part of a large input packet (segmentation) and the following field is the Segmentation_Concatenation field.

Header_Mode (HM) field can be a 1-bit field, when set to 0, that can indicate there is no additional header, and that the length of the payload of the link layer packet is less than 2048 bytes. This value may be varied depending on embodiments. A value of 1 can indicate that an additional header for single packet defined below is present following the Length field. In this case, the length of the payload is larger than 2047 bytes and/or optional features can be used (sub stream identification, header extension, etc.). This value may be varied depending on embodiments. This field can be present only when Payload_Configuration field of the link layer packet has a value of 0.

Segmentation_Concatenation (S/C) field can be a 1-bit field, when set to 0, that can indicate that the payload carries a segment of an input packet and an additional header for segmentation defined below is present following the Length field. A value of 1 can indicate that the payload carries more than one complete input packet and an additional header for concatenation defined below is present following the Length field. This field can be present only when the value of Payload_Configuration field of the ALP packet is 1.

Length field can be a 11-bit field that indicates the 11 least significant bits (LSBs) of the length in bytes of payload carried by the link layer packet. When there is a Length_MSB field in the following additional header, the length field is concatenated with the Length_MSB field, and is the LSB to provide the actual total length of the payload. The number of bits of the length field may be changed to another value rather than 11 bits.

Following types of packet configuration are thus possible: a single packet without any additional header, a single packet with an additional header, a segmented packet and a concatenated packet. According to a given embodiment, more packet configurations may be made through a combination of each additional header, an optional header, an additional header for signaling information to be described below, and an additional header for time extension.

Figure 10:
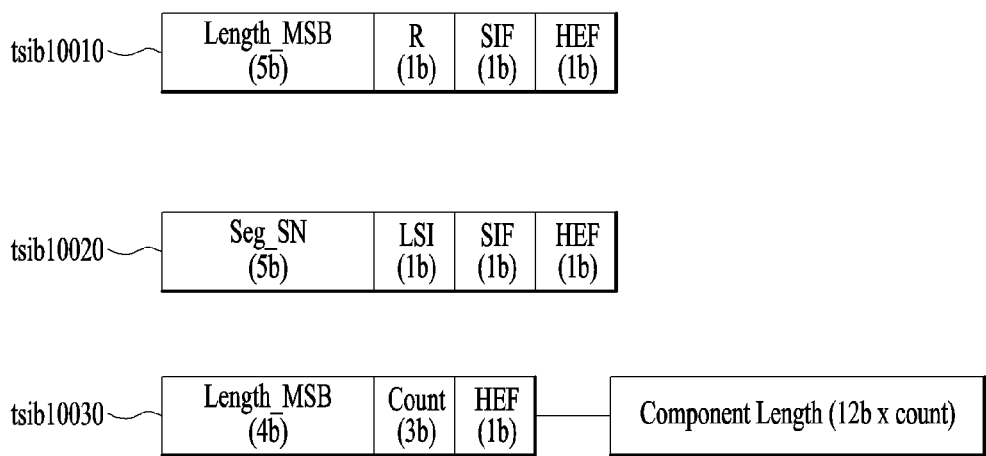
FIG. 10 illustrates a structure of an additional header of a link layer packet according to an embodiment of the present invention.

FIG. 10 illustrates a structure of an additional header of a link layer packet according to an embodiment of the present invention.

Various types of additional headers may be present. Hereinafter, a description will be given of an additional header for a single packet.

This additional header for single packet can be present when Header_Mode (HM)="1". The Header_Mode (HM) can be set to 1 when the length of the payload of the link layer packet is larger than 2047 bytes or when the optional fields are used. The additional header for single packet is shown in Figure (tsib10010).

Length_MSB field can be a 5-bit field that can indicate the most significant bits (MSBs) of the total payload length in bytes in the current link layer packet, and is concatenated with the Length field containing the 11 least significant bits (LSBs) to obtain the total payload length. The maximum length of the payload that can be signaled is therefore 65535 bytes. The number of bits of the length field may be changed to another value rather than 11 bits. In addition, the number of bits of the Length_MSB field may be changed, and thus a maximum expressible payload length may be changed. According to a given embodiment, each length field may indicate a length of a whole link layer packet rather than a payload.

SIF (Sub stream Identifier Flag) field can be a 1-bit field that can indicate whether the sub stream ID (SID) is present after the HEF field or not. When there is no SID in this link layer packet, SIF field can be set to 0. When there is a SID after HEF field in the link layer packet, SIF can be set to 1. The detail of SID is described below.

HEF (Header Extension Flag) field can be a 1-bit field that can indicate, when set to 1 additional header is present for future extension. A value of 0 can indicate that this extension header is not present.

Hereinafter, a description will be given of an additional header when segmentation is used.

This additional header (tsib10020) can be present when Segmentation_Concatenation (S/C)="0". Segment_Sequence_Number can be a 5-bit unsigned integer that can indicate the order of the corresponding segment carried by the link layer packet. For the link layer packet which carries the first segment of an input packet, the value of this field can be set to 0x0. This field can be incremented by one with each additional segment belonging to the segmented input packet.

Last_Segment_Indicator (LSI) can be a 1-bit field that can indicate, when set to 1, that the segment in this payload is the last one of input packet. A value of 0, can indicate that it is not last segment.

SIF (Sub stream Identifier Flag) can be a 1-bit field that can indicate whether the SID is present after the HEF field or not. When there is no SID in the link layer packet, SIF field can be set to 0. When there is a SID after the HEF field in the link layer packet, SIF can be set to 1.

HEF (Header Extension Flag) can be a This 1-bit field that can indicate, when set to 1, that the optional header extension is present after the additional header for future extensions of the link layer header. A value of 0 can indicate that optional header extension is not present.

According to a given embodiment, a packet ID field may be additionally provided to indicate that each segment is generated from the same input packet. This field may be unnecessary and thus be omitted when segments are transmitted in order.

Hereinafter, a description will be given of an additional header when concatenation is used.

This additional header (tsib10030) can be present when Segmentation_Concatenation (S/C)="1".

Length_MSB can be a 4-bit field that can indicate MSB bits of the payload length in bytes in this link layer packet. The maximum length of the payload is 32767 bytes for concatenation. As described in the foregoing, a specific numeric value may be changed.

Count can be a field that can indicate the number of the packets included in the link layer packet. The number of the packets included in the link layer packet, 2 can be set to this field. So, its maximum value of concatenated packets in a link layer packet is 9. A scheme in which the count field indicates the number may be varied depending on embodiments. That is, the numbers from 1 to 8 may be indicated.

HEF (Header Extension Flag) can be a 1-bit field that can indicate, when set to 1 the optional header extension is present after the additional header for future extensions of the link layer header. A value of 0, can indicate extension header is not present.

Component_Length can be a 12-bit length field that can indicate the length in byte of each packet. Component_Length fields are included in the same order as the packets present in the payload except last component packet. The number of length field can be indicated by (Count+1). According to a given embodiment, length fields, the number of which is the same as a value of the count field, may be present. When a link layer header consists of an odd number of Component_Length, four stuffing bits can follow after the last Component_Length field. These bits can be set to 0. According to a given embodiment, a Component_length field indicating a length of a last concatenated input packet may not be present. In this case, the length of the last concatenated input packet may correspond to a length obtained by subtracting a sum of values indicated by respective Component_length fields from a whole payload length.

Hereinafter, the optional header will be described.

As described in the foregoing, the optional header may be added to a rear of the additional header. The optional header field can contain SID and/or header extension. The SID is used to filter out specific packet stream in the link layer level. One example of SID is the role of service identifier in a link layer stream carrying multiple services. The mapping information between a service and the SID value corresponding to the service can be provided in the SLT, if applicable. The header extension contains extended field for future use. Receivers can ignore any header extensions which they do not understand.

SID (Sub stream Identifier) can be a 8-bit field that can indicate the sub stream identifier for the link layer packet. If there is optional header extension, SID present between additional header and optional header extension.

Header_Extension( ) can include the fields defined below.

Extension_Type can be an 8-bit field that can indicate the type of the Header_Extension ( ).

Extension_Length can be a 8-bit field that can indicate the length of the Header Extension ( ) in bytes counting from the next byte to the last byte of the Header_Extension 0.

Extension_Byte can be a byte representing the value of the Header_Extension ( ).

Figure 11:
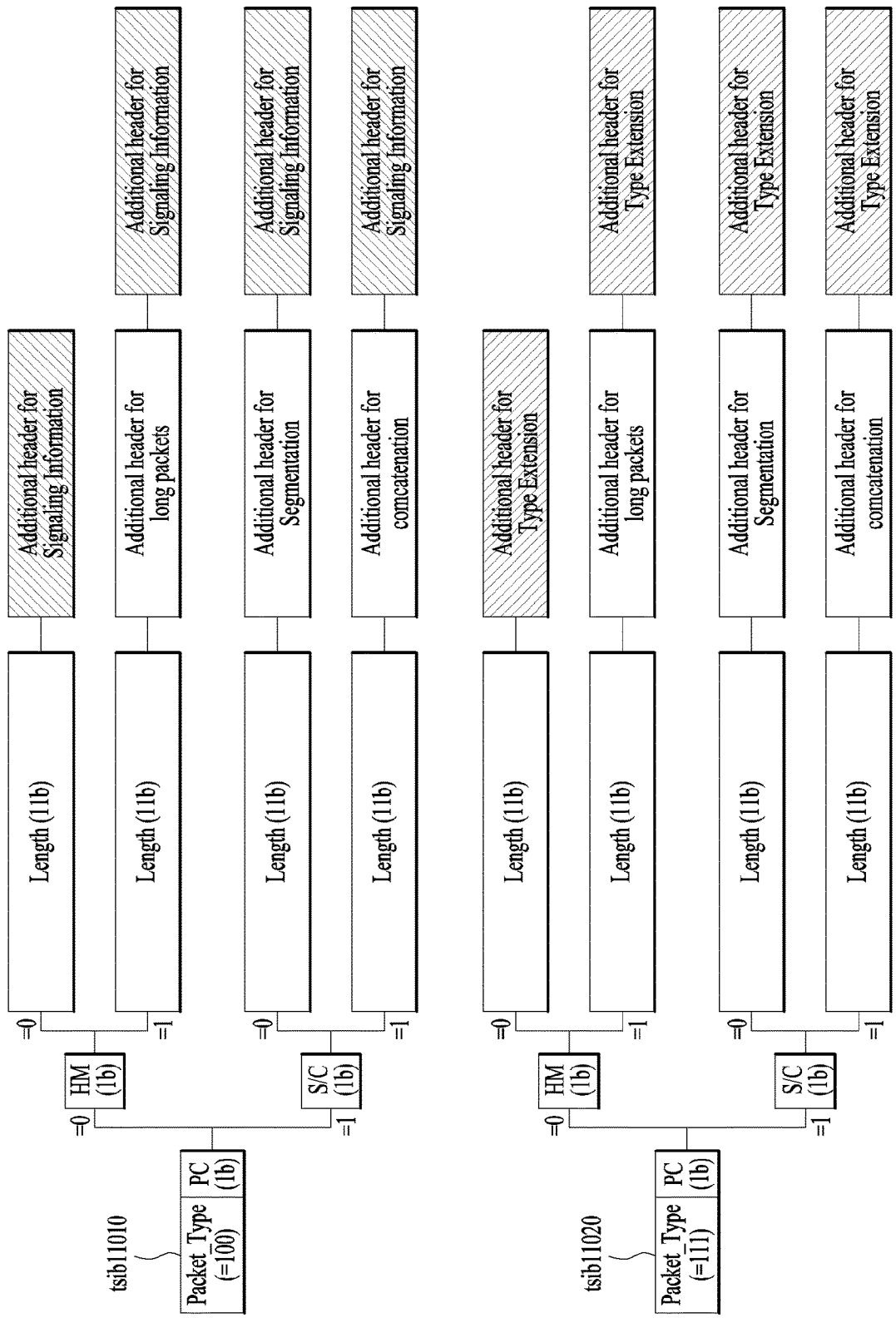
FIG. 11 illustrates a structure of an additional header of a link layer packet according to another embodiment of the present invention.

FIG. 11 illustrates a structure of an additional header of a link layer packet according to another embodiment of the present invention.

Hereinafter, a description will be given of an additional header for signaling information.

How link layer signaling is incorporated into link layer packets are as follows. Signaling packets are identified by when the Packet_Type field of the base header is equal to 100.

Figure (tsib11010) shows the structure of the link layer packets containing additional header for signaling information. In addition to the link layer header, the link layer packet can consist of two additional parts, additional header for signaling information and the actual signaling data itself.

The total length of the link layer signaling packet is shown in the link layer packet header.

The additional header for signaling information can include following fields. According to a given embodiment, some fields may be omitted.

Signaling_Type can be an 8-bit field that can indicate the type of signaling.

Signaling_Type_Extension can be a 16-bit filed that can indicate the attribute of the signaling. Detail of this field can be defined in signaling specification.

Signaling_Version can be an 8-bit field that can indicate the version of signaling.

Signaling_Format can be a 2-bit field that can indicate the data format of the signaling data. Here, a signaling format may refer to a data format such as a binary format, an XML format, etc.

Signaling_Encoding can be a 2-bit field that can specify the encoding/compression format. This field may indicate whether compression is not performed and which type of compression is performed.

Hereinafter, a description will be given of an additional header for packet type extension.

In order to provide a mechanism to allow an almost unlimited number of additional protocol and packet types to be carried by link layer in the future, the additional header is defined. Packet type extension can be used when Packet_type is 111 in the base header as described above. Figure (tsib11020) shows the structure of the link layer packets containing additional header for type extension.

The additional header for type extension can include following fields.

According to a given embodiment, some fields may be omitted.

extended_type can be a 16-bit field that can indicate the protocol or packet type of the input encapsulated in the link layer packet as payload. This field cannot be used for any protocol or packet type already defined by Packet_Type field.

Figure 12:
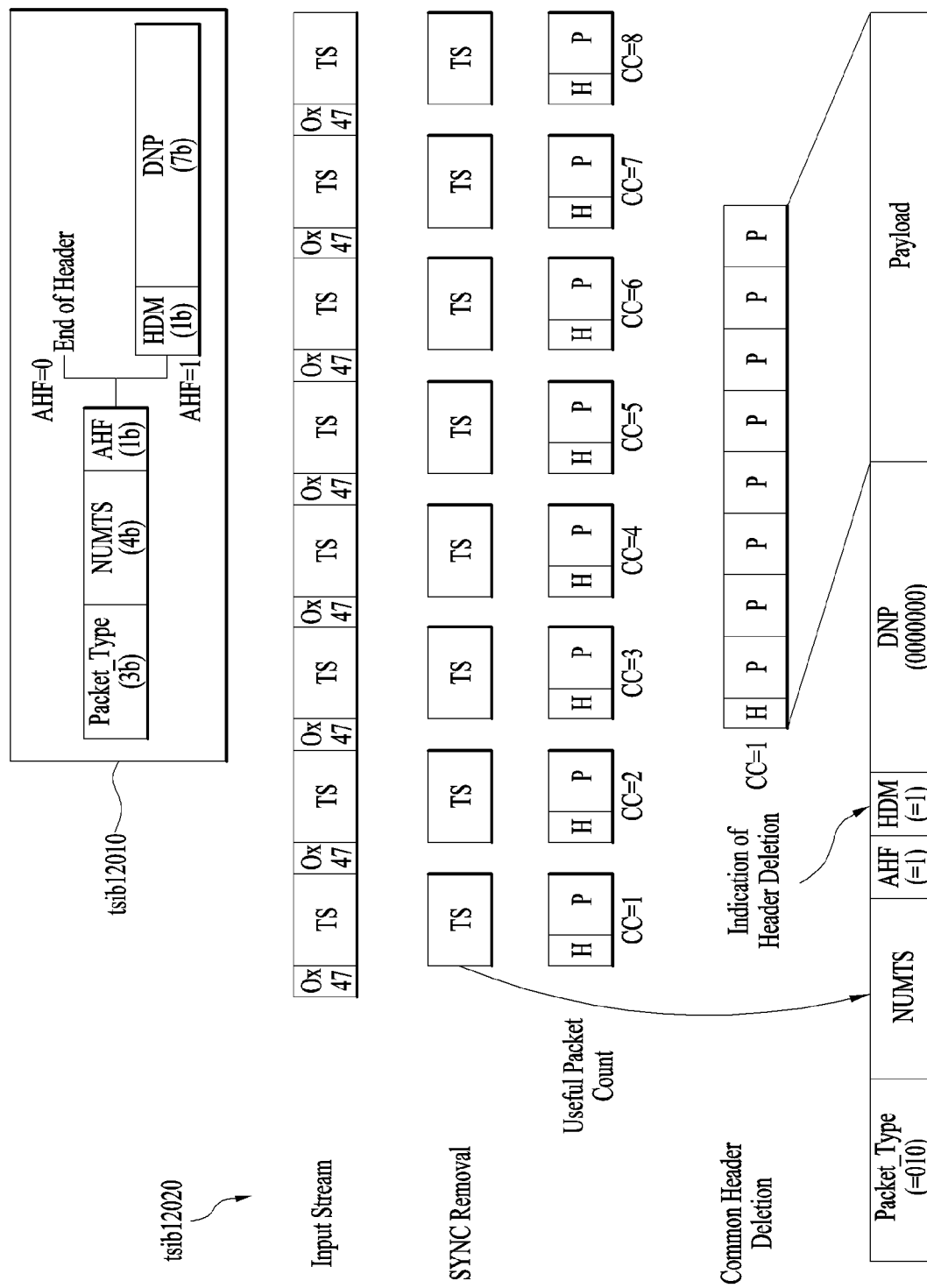
FIG. 12 illustrates a header structure of a link layer packet for an MPEG-2 TS packet and an encapsulation process thereof according to an embodiment of the present invention.

FIG. 12 illustrates a header structure of a link layer packet for an MPEG-2 TS packet and an encapsulation process thereof according to an embodiment of the present invention.

Hereinafter, a description will be given of a format of the link layer packet when the MPEG-2 TS packet is input as an input packet.

In this case, the Packet_Type field of the base header is equal to 010. Multiple TS packets can be encapsulated within each link layer packet. The number of TS packets is signaled via the NUMTS field. In this case, as described in the foregoing, a particular link layer packet header format may be used.

Link layer provides overhead reduction mechanisms for MPEG-2 TS to enhance the transmission efficiency. The sync byte (0x47) of each TS packet can be deleted. The option to delete NULL packets and similar TS headers is also provided.

In order to avoid unnecessary transmission overhead, TS null packets (PID=0x1FFF) may be removed. Deleted null packets can be recovered in receiver side using DNP field. The DNP field indicates the count of deleted null packets. Null packet deletion mechanism using DNP field is described below.

In order to achieve more transmission efficiency, similar header of MPEG-2 TS packets can be removed. When two or more successive TS packets have sequentially increased continuity counter fields and other header fields are the same, the header is sent once at the first packet and the other headers are deleted. HDM field can indicate whether the header deletion is performed or not. Detailed procedure of common TS header deletion is described below.

When all three overhead reduction mechanisms are performed, overhead reduction can be performed in sequence of sync removal, null packet deletion, and common header deletion. According to a given embodiment, a performance order of respective mechanisms may be changed. In addition, some mechanisms may be omitted according to a given embodiment.

The overall structure of the link layer packet header when using MPEG-2 TS packet encapsulation is depicted in Figure (tsib12010).

Hereinafter, a description will be given of each illustrated field. Packet_Type can be a 3-bit field that can indicate the protocol type of input packet as describe above. For MPEG-2 TS packet encapsulation, this field can always be set to 010.

NUMTS (Number of TS packets) can be a 4-bit field that can indicate the number of TS packets in the payload of this link layer packet. A maximum of 16 TS packets can be supported in one link layer packet. The value of NUMTS=0 can indicate that 16 TS packets are carried by the payload of the link layer packet. For all other values of NUMTS, the same number of TS packets are recognized, e.g. NUMTS=0001 means one TS packet is carried.

AHF (Additional Header Flag) can be a field that can indicate whether the additional header is present of not. A value of 0 indicates that there is no additional header. A value of 1 indicates that an additional header of length 1-byte is present following the base header. If null TS packets are deleted or TS header compression is applied this field can be set to 1. The additional header for TS packet encapsulation consists of the following two fields and is present only when the value of AHF in this link layer packet is set to 1.

HDM (Header Deletion Mode) can be a 1-bit field that indicates whether TS header deletion can be applied to this link layer packet. A value of 1 indicates that TS header deletion can be applied. A value of "0" indicates that the TS header deletion method is not applied to this link layer packet.

DNP (Deleted Null Packets) can be a 7-bit field that indicates the number of deleted null TS packets prior to this link layer packet. A maximum of 128 null TS packets can be deleted. When HDM=0 the value of DNP=0 can indicate that 128 null packets are deleted. When HDM=1 the value of DNP=0 can indicate that no null packets are deleted. For all other values of DNP, the same number of null packets are recognized, e.g. DNP=5 means 5 null packets are deleted.

The number of bits of each field described above may be changed. According to the changed number of bits, a minimum/maximum value of a value indicated by the field may be changed. These numbers may be changed by a designer.

Hereinafter, SYNC byte removal will be described.

When encapsulating TS packets into the payload of a link layer packet, the SYNC byte (0x47) from the start of each TS packet can be deleted. Hence the length of the MPEG2-TS packet encapsulated in the payload of the link layer packet is always of length 187 bytes (instead of 188 bytes originally).

Hereinafter, null packet deletion will be described.

Transport Stream rules require that bit rates at the output of a transmitter's multiplexer and at the input of the receiver's de-multiplexer are constant in time and the end-to-end delay is also constant. For some Transport Stream input signals, null packets may be present in order to accommodate variable bitrate services in a constant bitrate stream. In this case, in order to avoid unnecessary transmission overhead, TS null packets (that is TS packets with PID=0x1FFF) may be removed. The process is carried-out in a way that the removed null packets can be re-inserted in the receiver in the exact place where they were originally, thus guaranteeing constant bitrate and avoiding the need for PCR time stamp updating.

Before generation of a link layer packet, a counter called DNP (Deleted Null-Packets) can first be reset to zero and then incremented for each deleted null packet preceding the first non-null TS packet to be encapsulated into the payload of the current link layer packet. Then a group of consecutive useful TS packets is encapsulated into the payload of the current link layer packet and the value of each field in its header can be determined. After the generated link layer packet is injected to the physical layer, the DNP is reset to zero. When DNP reaches its maximum allowed value, if the next packet is also a null packet, this null packet is kept as a useful packet and encapsulated into the payload of the next link layer packet. Each link layer packet can contain at least one useful TS packet in its payload.

Hereinafter, TS packet header deletion will be described. TS packet header deletion may be referred to as TS packet header compression.

When two or more successive TS packets have sequentially increased continuity counter fields and other header fields are the same, the header is sent once at the first packet and the other headers are deleted. When the duplicated MPEG-2 TS packets are included in two or more successive TS packets, header deletion cannot be applied in transmitter side. HDM field can indicate whether the header deletion is performed or not. When TS header deletion is performed, HDM can be set to 1. In the receiver side, using the first packet header, the deleted packet headers are recovered, and the continuity counter is restored by increasing it in order from that of the first header.

An example tsib12020 illustrated in the figure is an example of a process in which an input stream of a TS packet is encapsulated into a link layer packet. First, a TS stream including TS packets having SYNC byte (0x47) may be input. First, sync bytes may be deleted through a sync byte deletion process. In this example, it is presumed that null packet deletion is not performed.

Here, it is presumed that packet headers of eight TS packets have the same field values except for CC, that is, a continuity counter field value. In this case, TS packet deletion/compression may be performed. Seven remaining TS packet headers are deleted except for a first TS packet header corresponding to CC=1. The processed TS packets may be encapsulated into a payload of the link layer packet.

In a completed link layer packet, a Packet_Type field corresponds to a case in which TS packets are input, and thus may have a value of 010. A NUMTS field may indicate the number of encapsulated TS packets. An AHF field may be set to 1 to indicate the presence of an additional header since packet header deletion is performed. An HDM field may be set to 1 since header deletion is performed. DNP may be set to 0 since null packet deletion is not performed.

FIG. 13 illustrates an example of adaptation modes in IP header compression according to an embodiment of the present invention (transmitting side).

Hereinafter, IP header compression will be described.

In the link layer, IP header compression/decompression scheme can be provided. IP header compression can include two parts: header compressor/decompressor and adaptation module. The header compression scheme can be based on the Robust Header Compression (RoHC). In addition, for broadcasting usage, adaptation function is added.

In the transmitter side, ROHC compressor reduces the size of header for each packet. Then, adaptation module extracts context information and builds signaling information from each packet stream. In the receiver side, adaptation module parses the signaling information associated with the received packet stream and attaches context information to the received packet stream. ROHC decompressor reconstructs the original IP packet by recovering the packet header.

The header compression scheme can be based on the RoHC as described above. In particular, in the present system, an RoHC framework can operate in a unidirectional mode (U mode) of the RoHC. In addition, in the present system, it is possible to use an RoHC UDP header compression profile which is identified by a profile identifier of 0x0002.

Hereinafter, adaptation will be described.

In case of transmission through the unidirectional link, if a receiver has no information of context, decompressor cannot recover the received packet header until receiving full context. This may cause channel change delay and turn on delay. For this reason, context information and configuration parameters between compressor and decompressor can be always sent with packet flow.

The Adaptation function provides out-of-band transmission of the configuration parameters and context information. Out-of-band transmission can be done through the link layer signaling. Therefore, the adaptation function is used to reduce the channel change delay and decompression error due to loss of context information.

Hereinafter, extraction of context information will be described.

Context information may be extracted using various schemes according to adaptation mode. In the present invention, three examples will be described below. The scope of the present invention is not restricted to the examples of the adaptation mode to be described below. Here, the adaptation mode may be referred to as a context extraction mode.

Adaptation Mode 1 (not illustrated) may be a mode in which no additional operation is applied to a basic RoHC packet stream. In other words, the adaptation module may operate as a buffer in this mode. Therefore, in this mode, context information may not be included in link layer signaling In Adaptation Mode 2 (tsib13010), the adaptation module can detect the IR packet from ROHC packet flow and extract the context information (static chain). After extracting the context information, each IR packet can be converted to an IR-DYN packet. The converted IR-DYN packet can be included and transmitted inside the ROHC packet flow in the same order as IR packet, replacing the original packet.

In Adaptation Mode 3 (tsib13020), the adaptation module can detect the IR and IR-DYN packet from ROHC packet flow and extract the context information. The static chain and dynamic chain can be extracted from IR packet and dynamic chain can be extracted from IR-DYN packet. After extracting the context information, each IR and IR-DYN packet can be converted to a compressed packet. The compressed packet format can be the same with the next packet of IR or IR-DYN packet. The converted compressed packet can be included and transmitted inside the ROHC packet flow in the same order as IR or IR-DYN packet, replacing the original packet.

Signaling (context) information can be encapsulated based on transmission structure. For example, context information can be encapsulated to the link layer signaling. In this case, the packet type value can be set to "100".

In the above-described Adaptation Modes 2 and 3, a link layer packet for context information may have a packet type field value of 100. In addition, a link layer packet for compressed IP packets may have a packet type field value of 001. The values indicate that each of the signaling information and the compressed IP packets are included in the link layer packet as described above.

Hereinafter, a description will be given of a method of transmitting the extracted context information.

The extracted context information can be transmitted separately from ROHC packet flow, with signaling data through specific physical data path. The transmission of context depends on the configuration of the physical layer path. The context information can be sent with other link layer signaling through the signaling data pipe.

In other words, the link layer packet having the context information may be transmitted through a signaling PLP together with link layer packets having other link layer signaling information (Packet_Type=100). Compressed IP packets from which context information is extracted may be transmitted through a general PLP (Packet_Type=001). Here, depending on embodiments, the signaling PLP may refer to an L1 signaling path. In addition, depending on embodiments, the signaling PLP may not be separated from the general PLP, and may refer to a particular and general PLP through which the signaling information is transmitted.

At a receiving side, prior to reception of a packet stream, a receiver may need to acquire signaling information. When receiver decodes initial PLP to acquire the signaling information, the context signaling can be also received. After the signaling acquisition is done, the PLP to receive packet stream can be selected. In other words, the receiver may acquire the signaling information including the context information by selecting the initial PLP. Here, the initial PLP may be the above-described signaling PLP. Thereafter, the receiver may select a PLP for acquiring a packet stream. In this way, the context information may be acquired prior to reception of the packet stream.

After the PLP for acquiring the packet stream is selected, the adaptation module can detect IR-DYN packet form received packet flow. Then, the adaptation module parses the static chain from the context information in the signaling data. This is similar to receiving the IR packet. For the same context identifier, IR-DYN packet can be recovered to IR packet. Recovered ROHC packet flow can be sent to ROHC decompressor. Thereafter, decompression may be started.

FIG. 14 illustrates a link mapping table (LMT) and an RoHC-U description table according to an embodiment of the present invention.

Hereinafter, link layer signaling will be described.

Generally, link layer signaling is operates under IP level. At the receiver side, link layer signaling can be obtained earlier than IP level signaling such as Service List Table (SLT) and Service Layer Signaling (SLS). Therefore, link layer signaling can be obtained before session establishment.

For link layer signaling, there can be two kinds of signaling according input path: internal link layer signaling and external link layer signaling. The internal link layer signaling is generated in link layer at transmitter side. And the link layer takes the signaling from external module or protocol. This kind of signaling information is considered as external link layer signaling. If some signaling need to be obtained prior to IP level signaling, external signaling is transmitted in format of link layer packet.

The link layer signaling can be encapsulated into link layer packet as described above. The link layer packets can carry any format of link layer signaling, including binary and XML. The same signaling information may not be transmitted in different formats for the link layer signaling.

Internal link layer signaling may include signaling information for link mapping. The Link Mapping Table (LMT) provides a list of upper layer sessions carried in a PLP. The LMT also provides addition information for processing the link layer packets carrying the upper layer sessions in the link layer.

An example of the LMT (tsib14010) according to the present invention is illustrated.

signaling_type can be an 8-bit unsigned integer field that indicates the type of signaling carried by this table. The value of signaling_type field for Link Mapping Table (LMT) can be set to 0x01.

PLP_ID can be an 8-bit field that indicates the PLP corresponding to this table.

num_session can be an 8-bit unsigned integer field that provides the number of upper layer sessions carried in the PLP identified by the above PLP_ID field. When the value of signaling_type field is 0x01, this field can indicate the number of UDP/IP sessions in the PLP.

src_IP_add can be a 32-bit unsigned integer field that contains the source IP address of an upper layer session carried in the PLP identified by the PLP_ID field.

dst_IP_add can be a 32-bit unsigned integer field that contains the destination IP address of an upper layer session carried in the PLP identified by the PLP_ID field.

src_UDP_port can be a 16-bit unsigned integer field that represents the source UDP port number of an upper layer session carried in the PLP identified by the PLP_ID field.

dst_UDP_port can be a 16-bit unsigned integer field that represents the destination UDP port number of an upper layer session carried in the PLP identified by the PLP_ID field.

SID_flag can be a 1-bit Boolean field that indicates whether the link layer packet carrying the upper layer session identified by above 4 fields, Src_IP_add, Dst_IP_add, Src_UDP_Port and Dst_UDP_Port, has an SID field in its optional header. When the value of this field is set to 0, the link layer packet carrying the upper layer session may not have an SID field in its optional header. When the value of this field is set to 1, the link layer packet carrying the upper layer session can have an SID field in its optional header and the value the SID field can be same as the following SID field in this table.

compressed_flag can be a 1-bit Boolean field that indicates whether the header compression is applied the link layer packets carrying the upper layer session identified by above 4 fields, Src_IP_add, Dst_IP_add, Src_UDP_Port and Dst_UDP_Port. When the value of this field is set to 0, the link layer packet carrying the upper layer session may have a value of 0x00 of Packet_Type field in its base header. When the value of this field is set to 1, the link layer packet carrying the upper layer session may have a value of 0x01 of Packet_Type field in its base header and the Context_ID field can be present.

SID can be an 8-bit unsigned integer field that indicates sub stream identifier for the link layer packets carrying the upper layer session identified by above 4 fields, Src_IP_add, Dst_IP_add, Src_UDP_Port and Dst_UDP_Port. This field can be present when the value of SID_flag is equal to 1.

context_id can be an 8-bit field that provides a reference for the context id (CID) provided in the ROHC-U description table. This field can be present when the value of compressed_flag is equal to 1.

An example of the RoHC-U description table (tsib14020) according to the present invention is illustrated. As described in the foregoing, the RoHC-U adaptation module may generate information related to header compression.

signaling_type can be an 8-bit field that indicates the type of signaling carried by this table. The value of signaling_type field for ROHC-U description table (RDT) can be set to "0x02".

PLP_ID can be an 8-bit field that indicates the PLP corresponding to this table.

context_id can be an 8-bit field that indicates the context id (CID) of the compressed IP stream. In this system, 8-bit CID can be used for large CID.

context_profile can be an 8-bit field that indicates the range of protocols used to compress the stream. This field can be omitted.

adaptation_mode can be a 2-bit field that indicates the mode of adaptation module in this PLP. Adaptation modes have been described above.

context_config can be a 2-bit field that indicates the combination of the context information. If there is no context information in this table, this field may be set to "0x0". If the static_chain( ) or dynamic_chain( ) byte is included in this table, this field may be set to "0x01" or "0x02" respectively. If both of the static_chain( ) and dynamic_chain( ) byte are included in this table, this field may be set to "0x03".

context_length can be an 8-bit field that indicates the length of the static chain byte sequence. This field can be omitted.

static_chain_byte ( ) can be a field that conveys the static information used to initialize the ROHC-U decompressor. The size and structure of this field depend on the context profile.

dynamic_chain_byte ( ) can be a field that conveys the dynamic information used to initialize the ROHC-U decompressor. The size and structure of this field depend on the context profile.

The static_chain_byte can be defined as sub-header information of IR packet. The dynamic_chain_byte can be defined as sub-header information of IR packet and IR-DYN packet.

Figure 15:
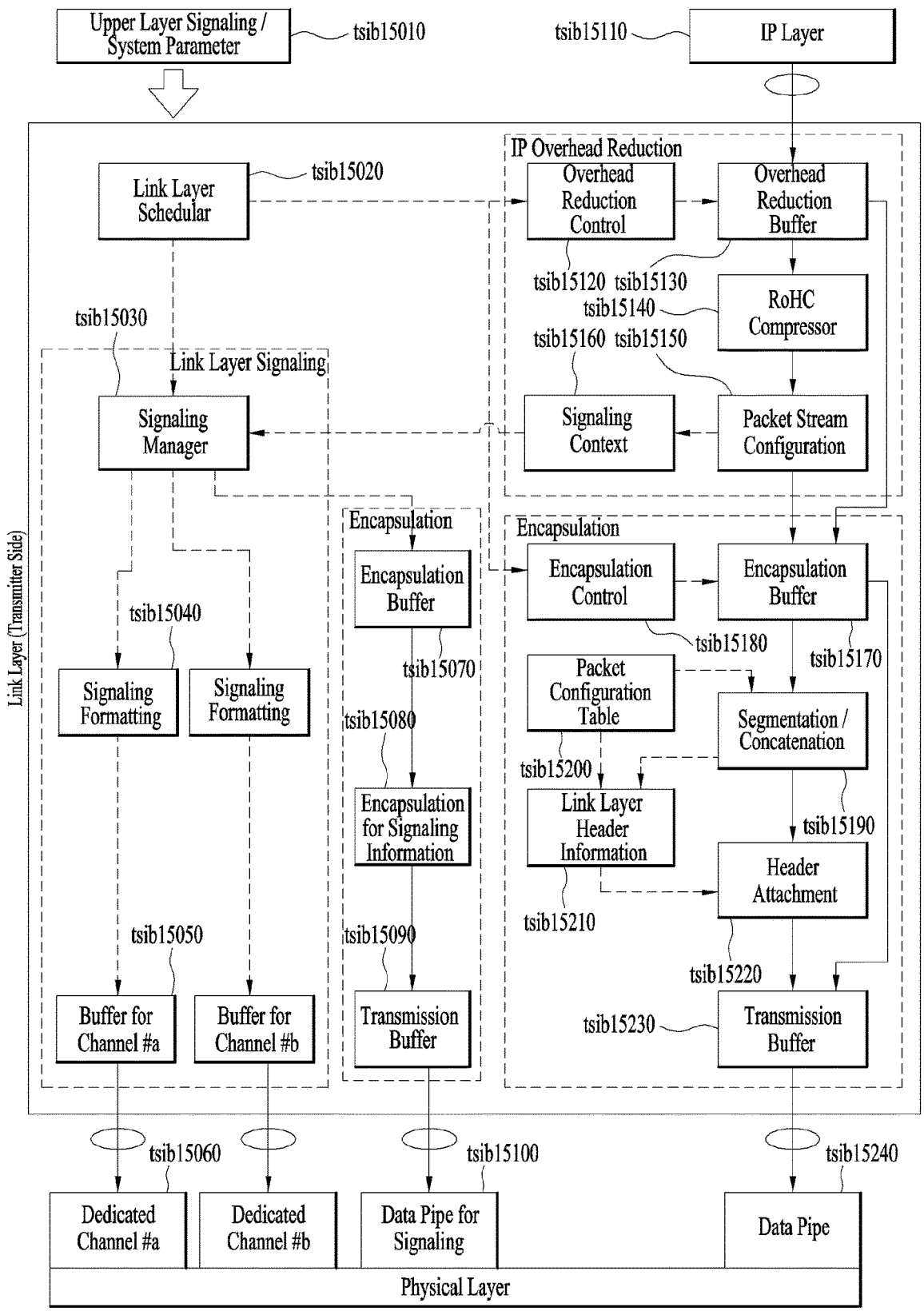
FIG. 15 illustrates a structure of a link layer on a transmitter side according to an embodiment of the present invention.

FIG. 15 illustrates a structure of a link layer on a transmitter side according to an embodiment of the present invention.

The present embodiment presumes that an IP packet is processed. From a functional point of view, the link layer on the transmitter side may broadly include a link layer signaling part in which signaling information is processed, an overhead reduction part, and/or an encapsulation part. In addition, the link layer on the transmitter side may include a scheduler for controlling and scheduling an overall operation of the link layer and/or input and output parts of the link layer.

First, signaling information of an upper layer and/or a system parameter tsib15010 may be delivered to the link layer. In addition, an IP stream including IP packets may be delivered to the link layer from an IP layer tsib15110.

As described above, the scheduler tsib15020 may determine and control operations of several modules included in the link layer. The delivered signaling information and/or system parameter tsib15010 may be filterer or used by the scheduler tsib15020. Information, which corresponds to a part of the delivered signaling information and/or system parameter tsib15010, necessary for a receiver may be delivered to the link layer signaling part. In addition, information, which corresponds to a part of the signaling information, necessary for an operation of the link layer may be delivered to an overhead reduction controller tsib15120 or an encapsulation controller tsib15180.

The link layer signaling part may collect information to be transmitted as a signal in a physical layer, and convert/configure the information in a form suitable for transmission. The link layer signaling part may include a signaling manager tsib15030, a signaling formatter tsib15040, and/or a buffer for channels tsib15050.

The signaling manager tsib15030 may receive signaling information delivered from the scheduler tsib15020 and/or signaling (and/or context) information delivered from the overhead reduction part. The signaling manager tsib15030 may determine a path for transmission of the signaling information for delivered data. The signaling information may be delivered through the path determined by the signaling manager tsib15030. As described in the foregoing, signaling information to be transmitted through a divided channel such as the FIC, the EAS, etc. may be delivered to the signaling formatter tsib15040, and other signaling information may be delivered to an encapsulation buffer tsib15070.

The signaling formatter tsib15040 may format related signaling information in a form suitable for each divided channel such that signaling information may be transmitted through a separately divided channel. As described in the foregoing, the physical layer may include separate physically/logically divided channels. The divided channels may be used to transmit FIC signaling information or EAS-related information. The FIC or EAS-related information may be sorted by the signaling manager tsib15030, and input to the signaling formatter tsib15040. The signaling formatter tsib15040 may format the information based on each separate channel. When the physical layer is designed to transmit particular signaling information through a separately divided channel other than the FIC and the EAS, a signaling formatter for the particular signaling information may be additionally provided. Through this scheme, the link layer may be compatible with various physical layers.

The buffer for channels tsib15050 may deliver the signaling information received from the signaling formatter tsib15040 to separate dedicated channels tsib15060. The number and content of the separate channels may vary depending on embodiments.

As described in the foregoing, the signaling manager tsib15030 may deliver signaling information, which is not delivered to a particular channel, to the encapsulation buffer tsib15070. The encapsulation buffer tsib15070 may function as a buffer that receives the signaling information which is not delivered to the particular channel.

An encapsulation block for signaling information tsib15080 may encapsulate the signaling information which is not delivered to the particular channel A transmission buffer tsib15090 may function as a buffer that delivers the encapsulated signaling information to a DP for signaling information tsib15100. Here, the DP for signaling information tsib15100 may refer to the above-described PLS region.

The overhead reduction part may allow efficient transmission by removing overhead of packets delivered to the link layer. It is possible to configure overhead reduction parts corresponding to the number of IP streams input to the link layer.

An overhead reduction buffer tsib15130 may receive an IP packet delivered from an upper layer. The received IP packet may be input to the overhead reduction part through the overhead reduction buffer tsib15130.

An overhead reduction controller tsib15120 may determine whether to perform overhead reduction on a packet stream input to the overhead reduction buffer tsib15130. The overhead reduction controller tsib15120 may determine whether to perform overhead reduction for each packet stream. When overhead reduction is performed on a packet stream, packets may be delivered to a robust header compression (RoHC) compressor tsib15140 to perform overhead reduction. When overhead reduction is not performed on a packet stream, packets may be delivered to the encapsulation part to perform encapsulation without overhead reduction. Whether to perform overhead reduction of packets may be determined based on the signaling information tsib15010 delivered to the link layer. The signaling information may be delivered to the encapsulation controller tsib15180 by the scheduler tsib15020.

The RoHC compressor tsib15140 may perform overhead reduction on a packet stream. The RoHC compressor tsib15140 may perform an operation of compressing a header of a packet. Various schemes may be used for overhead reduction. Overhead reduction may be performed using a scheme proposed by the present invention. The present invention presumes an IP stream, and thus an expression "RoHC compressor" is used. However, the name may be changed depending on embodiments. The operation is not restricted to compression of the IP stream, and overhead reduction of all types of packets may be performed by the RoHC compressor tsib15140.

A packet stream configuration block tsib15150 may separate information to be transmitted to a signaling region and information to be transmitted to a packet stream from IP packets having compressed headers. The information to be transmitted to the packet stream may refer to information to be transmitted to a DP region. The information to be transmitted to the signaling region may be delivered to a signaling and/or context controller tsib15160. The information to be transmitted to the packet stream may be transmitted to the encapsulation part.

The signaling and/or context controller tsib15160 may collect signaling and/or context information and deliver the signaling and/or context information to the signaling manager in order to transmit the signaling and/or context information to the signaling region.

The encapsulation part may perform an operation of encapsulating packets in a form suitable for a delivery to the physical layer. It is possible to configure encapsulation parts corresponding to the number of IP streams.

An encapsulation buffer tsib15170 may receive a packet stream for encapsulation. Packets subjected to overhead reduction may be received when overhead reduction is performed, and an input IP packet may be received without change when overhead reduction is not performed.

An encapsulation controller tsib15180 may determine whether to encapsulate an input packet stream. When encapsulation is performed, the packet stream may be delivered to a segmentation/concatenation block tsib15190. When encapsulation is not performed, the packet stream may be delivered to a transmission buffer tsib15230. Whether to encapsulate packets may be determined based on the signaling information tsib15010 delivered to the link layer. The signaling information may be delivered to the encapsulation controller tsib15180 by the scheduler tsib15020.

In the segmentation/concatenation block tsib15190, the above-described segmentation or concatenation operation may be performed on packets. In other words, when an input IP packet is longer than a link layer packet corresponding to an output of the link layer, one IP packet may be segmented into several segments to configure a plurality of link layer packet payloads. On the other hand, when an input IP packet is shorter than a link layer packet corresponding to an output of the link layer, several IP packets may be concatenated to configure one link layer packet payload.

A packet configuration table tsib15200 may have configuration information of a segmented and/or concatenated link layer packet. A transmitter and a receiver may have the same information in the packet configuration table tsib15200. The transmitter and the receiver may refer to the information of the packet configuration table tsib15200. An index value of the information of the packet configuration table tsib15200 may be included in a header of the link layer packet.

A link layer header information block tsib15210 may collect header information generated in an encapsulation process. In addition, the link layer header information block tsib15210 may collect header information included in the packet configuration table tsib15200. The link layer header information block tsib15210 may configure header information according to a header structure of the link layer packet.

A header attachment block tsib15220 may add a header to a payload of a segmented and/or concatenated link layer packet. The transmission buffer tsib15230 may function as a buffer to deliver the link layer packet to a DP tsib15240 of the physical layer.

The respective blocks, modules, or parts may be configured as one module/protocol or a plurality of modules/protocols in the link layer.

Figure 16:
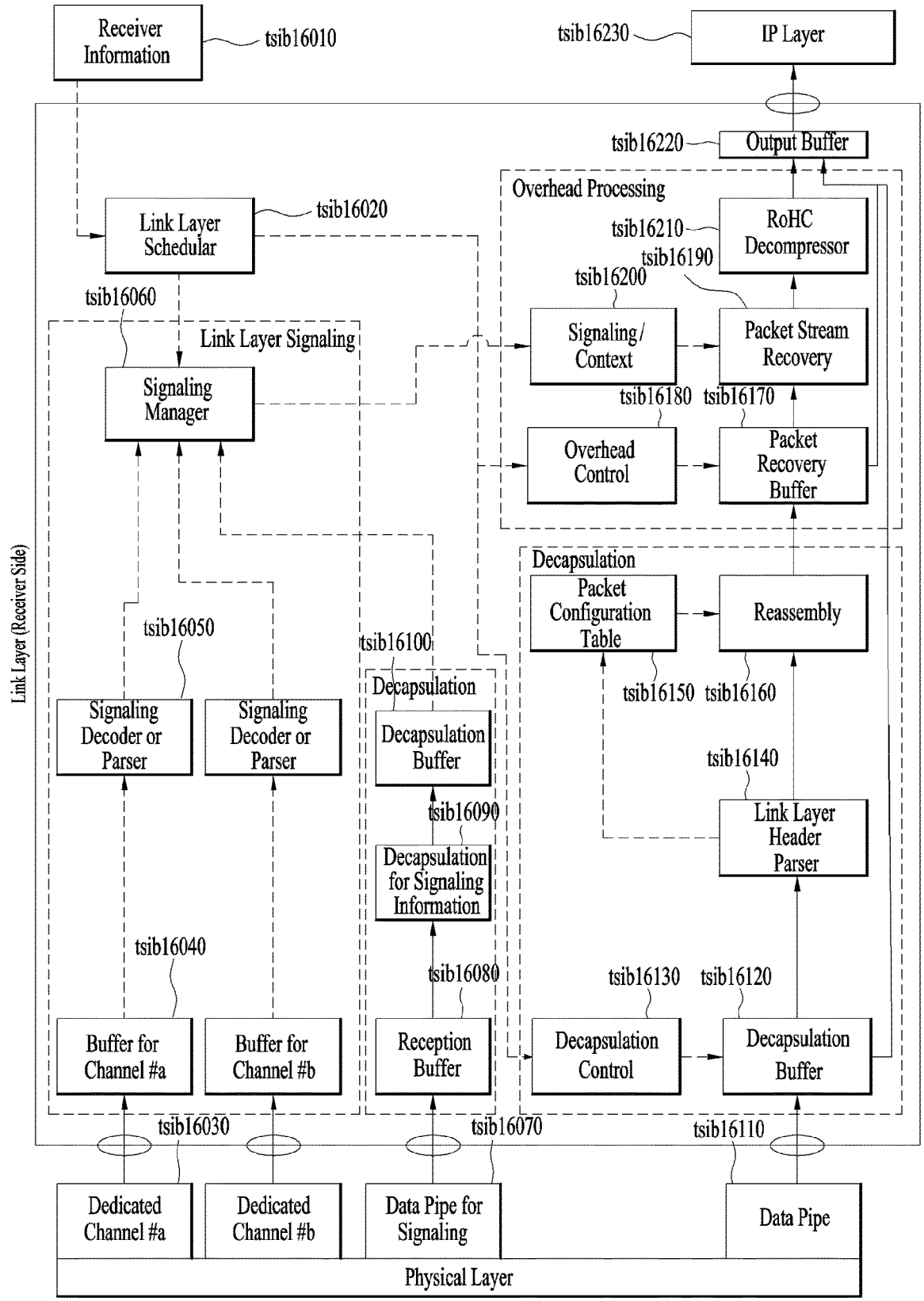
FIG. 16 illustrates a structure of a link layer on a receiver side according to an embodiment of the present invention.

FIG. 16 illustrates a structure of a link layer on a receiver side according to an embodiment of the present invention.

The present embodiment presumes that an IP packet is processed. From a functional point of view, the link layer on the receiver side may broadly include a link layer signaling part in which signaling information is processed, an overhead processing part, and/or a decapsulation part. In addition, the link layer on the receiver side may include a scheduler for controlling and scheduling overall operation of the link layer and/or input and output parts of the link layer.

First, information received through a physical layer may be delivered to the link layer. The link layer may process the information, restore an original state before being processed at a transmitter side, and then deliver the information to an upper layer. In the present embodiment, the upper layer may be an IP layer.

Information, which is separated in the physical layer and delivered through a particular channel tsib16030, may be delivered to a link layer signaling part. The link layer signaling part may determine signaling information received from the physical layer, and deliver the determined signaling information to each part of the link layer.

A buffer for channels tsib16040 may function as a buffer that receives signaling information transmitted through particular channels. As described in the foregoing, when physically/logically divided separate channels are present in the physical layer, it is possible to receive signaling information transmitted through the channels. When the information received from the separate channels is segmented, the segmented information may be stored until complete information is configured.

A signaling decoder/parser tsib16050 may verify a format of the signaling information received through the particular channel, and extract information to be used in the link layer. When the signaling information received through the particular channel is encoded, decoding may be performed. In addition, according to a given embodiment, it is possible to verify integrity, etc. of the signaling information.

A signaling manager tsib16060 may integrate signaling information received through several paths. Signaling information received through a DP for signaling tsib16070 to be described below may be integrated in the signaling manager tsib16060. The signaling manager tsib16060 may deliver signaling information necessary for each part in the link layer. For example, the signaling manager tsib16060 may deliver context information, etc. for recovery of a packet to the overhead processing part. In addition, the signaling manager tsib16060 may deliver signaling information for control to a scheduler tsib16020.

General signaling information, which is not received through a separate particular channel, may be received through the DP for signaling tsib16070. Here, the DP for signaling may refer to PLS, L1, etc. Here, the DP may be referred to as a PLP. A reception buffer tsib16080 may function as a buffer that receives signaling information delivered from the DP for signaling. In a decapsulation block for signaling information tsib16090, the received signaling information may be decapsulated. The decapsulated signaling information may be delivered to the signaling manager tsib16060 through a decapsulation buffer tsib16100. As described in the foregoing, the signaling manager tsib16060 may collate signaling information, and deliver the collated signaling information to a necessary part in the link layer.

The scheduler tsib16020 may determine and control operations of several modules included in the link layer. The scheduler tsib16020 may control each part of the link layer using receiver information tsib16010 and/or information delivered from the signaling manager tsib16060. In addition, the scheduler tsib16020 may determine an operation mode, etc. of each part. Here, the receiver information tsib16010 may refer to information previously stored in the receiver. The scheduler tsib16020 may use information changed by a user such as channel switching, etc. to perform a control operation.

The decapsulation part may filter a packet received from a DP tsib16110 of the physical layer, and separate a packet according to a type of the packet. It is possible to configure decapsulation parts corresponding to the number of DPs that can be simultaneously decoded in the physical layer.

The decapsulation buffer tsib16100 may function as a buffer that receives a packet stream from the physical layer to perform decapsulation. A decapsulation controller tsib16130 may determine whether to decapsulate an input packet stream. When decapsulation is performed, the packet stream may be delivered to a link layer header parser tsib16140. When decapsulation is not performed, the packet stream may be delivered to an output buffer tsib16220. The signaling information received from the scheduler tsib16020 may be used to determine whether to perform decapsulation.

The link layer header parser tsib16140 may identify a header of the delivered link layer packet. It is possible to identify a configuration of an IP packet included in a payload of the link layer packet by identifying the header. For example, the IP packet may be segmented or concatenated.

A packet configuration table tsib16150 may include payload information of segmented and/or concatenated link layer packets. The transmitter and the receiver may have the same information in the packet configuration table tsib16150. The transmitter and the receiver may refer to the information of the packet configuration table tsib16150. It is possible to find a value necessary for reassembly based on index information included in the link layer packet.

A reassembly block tsib16160 may configure payloads of the segmented and/or concatenated link layer packets as packets of an original IP stream. Segments may be collected and reconfigured as one IP packet, or concatenated packets may be separated and reconfigured as a plurality of IP packet streams. Recombined IP packets may be delivered to the overhead processing part.

The overhead processing part may perform an operation of restoring a packet subjected to overhead reduction to an original packet as a reverse operation of overhead reduction performed in the transmitter. This operation may be referred to as overhead processing. It is possible to configure overhead processing parts corresponding to the number of DPs that can be simultaneously decoded in the physical layer.

A packet recovery buffer tsib16170 may function as a buffer that receives a decapsulated RoHC packet or IP packet to perform overhead processing.

An overhead controller tsib16180 may determine whether to recover and/or decompress the decapsulated packet. When recovery and/or decompression are performed, the packet may be delivered to a packet stream recovery block tsib16190. When recovery and/or decompression are not performed, the packet may be delivered to the output buffer tsib16220. Whether to perform recovery and/or decompression may be determined based on the signaling information delivered by the scheduler tsib16020.

The packet stream recovery block tsib16190 may perform an operation of integrating a packet stream separated from the transmitter with context information of the packet stream. This operation may be a process of restoring a packet stream such that an RoHC decompressor tsib16210 can perform processing. In this process, it is possible to receive signaling information and/or context information from a signaling and/or context controller tsib16200. The signaling and/or context controller tsib16200 may determine signaling information delivered from the transmitter, and deliver the signaling information to the packet stream recovery block tsib16190 such that the signaling information may be mapped to a stream corresponding to a context ID.

The RoHC decompressor tsib16210 may restore headers of packets of the packet stream. The packets of the packet stream may be restored to forms of original IP packets through restoration of the headers. In other words, the RoHC decompressor tsib16210 may perform overhead processing.

The output buffer tsib16220 may function as a buffer before an output stream is delivered to an IP layer tsib16230.

The link layers of the transmitter and the receiver proposed in the present invention may include the blocks or modules described above. In this way, the link layer may independently operate irrespective of an upper layer and a lower layer, overhead reduction may be efficiently performed, and a supportable function according to an upper/lower layer may be easily defined/added/deleted.

Figure 17:
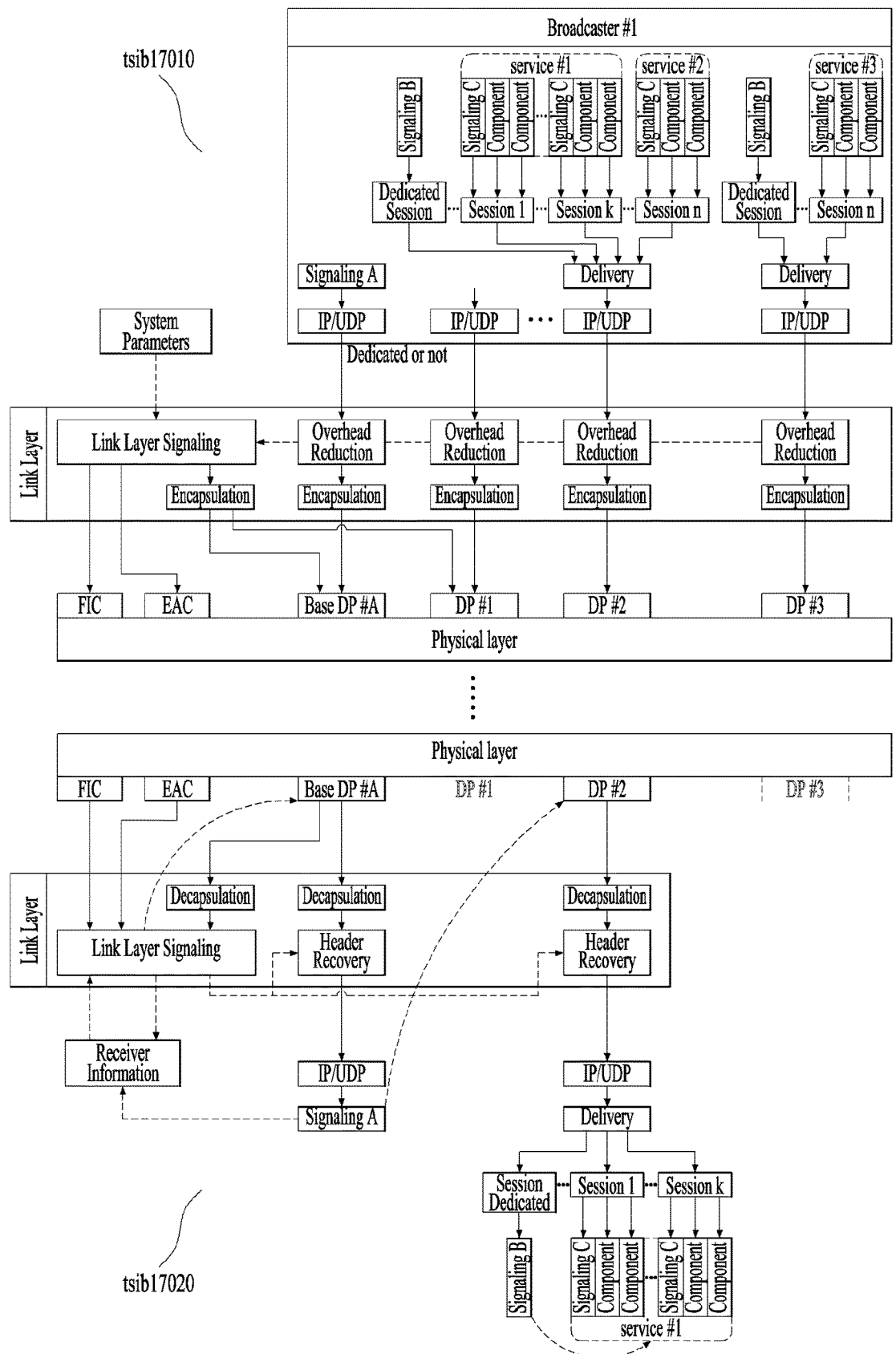
FIG. 17 illustrates a configuration of signaling transmission through a link layer according to an embodiment of the present invention (transmitting/receiving sides)

FIG. 17 illustrates a configuration of signaling transmission through a link layer according to an embodiment of the present invention (transmitting/receiving sides).

In the present invention, a plurality of service providers (broadcasters) may provide services within one frequency band. In addition, a service provider may provide a plurality of services, and one service may include one or more components. It can be considered that the user receives content using a service as a unit.

The present invention presumes that a transmission protocol based on a plurality of sessions is used to support an IP hybrid broadcast. Signaling information delivered through a signaling path may be determined based on a transmission configuration of each protocol. Various names may be applied to respective protocols according to a given embodiment.

In the illustrated data configuration tsib17010 on the transmitting side, service providers (broadcasters) may provide a plurality of services (Service #1, #2, . . . ). In general, a signal for a service may be transmitted through a general transmission session (signaling C). However, the signal may be transmitted through a particular session (dedicated session) according to a given embodiment (signaling B).

Service data and service signaling information may be encapsulated according to a transmission protocol. According to a given embodiment, an IP/UDP layer may be used. According to a given embodiment, a signal in the IP/UDP layer (signaling A) may be additionally provided. This signaling may be omitted.

Data processed using the IP/UDP may be input to the link layer. As described in the foregoing, overhead reduction and/or encapsulation may be performed in the link layer. Here, link layer signaling may be additionally provided. Link layer signaling may include a system parameter, etc. Link layer signaling has been described above.

The service data and the signaling information subjected to the above process may be processed through PLPs in a physical layer. Here, a PLP may be referred to as a DP. The example illustrated in the figure presumes a case in which a base DP/PLP is used. However, depending on embodiments, transmission may be performed using only a general DP/PLP without the base DP/PLP.

In the example illustrated in the figure, a particular channel (dedicated channel) such as an FIC, an EAC, etc. is used. A signal delivered through the FIC may be referred to as a fast information table (FIT), and a signal delivered through the EAC may be referred to as an emergency alert table (EAT). The FIT may be identical to the above-described SLT. The particular channels may not be used depending on embodiments. When the particular channel (dedicated channel) is not configured, the FIT and the EAT may be transmitted using a general link layer signaling transmission scheme, or transmitted using a PLP via the IP/UDP as other service data.

According to a given embodiment, system parameters may include a transmitter-related parameter, a service provider-related parameter, etc. Link layer signaling may include IP header compression-related context information and/or identification information of data to which the context is applied. Signaling of an upper layer may include an IP address, a UDP number, service/component information, emergency alert-related information, an IP/UDP address for service signaling, a session ID, etc. Detailed examples thereof have been described above.

In the illustrated data configuration tsib17020 on the receiving side, the receiver may decode only a PLP for a corresponding service using signaling information without having to decode all PLPs.

First, when the user selects or changes a service desired to be received, the receiver may be tuned to a corresponding frequency and may read receiver information related to a corresponding channel stored in a DB, etc. The information stored in the DB, etc. of the receiver may be configured by reading an SLT at the time of initial channel scan.

After receiving the SLT and the information about the corresponding channel, information previously stored in the DB is updated, and information about a transmission path of the service selected by the user and information about a path, through which component information is acquired or a signal necessary to acquire the information is transmitted, are acquired. When the information is not determined to be changed using version information of the SLT, decoding or parsing may be omitted.

The receiver may verify whether SLT information is included in a PLP by parsing physical signaling of the PLP in a corresponding broadcast stream (not illustrated), which may be indicated through a particular field of physical signaling. It is possible to access a position at which a service layer signal of a particular service is transmitted by accessing the SLT information. The service layer signal may be encapsulated into the IP/UDP and delivered through a transmission session. It is possible to acquire information about a component included in the service using this service layer signaling. A specific SLT-SLS configuration is as described above.

In other words, it is possible to acquire transmission path information, for receiving upper layer signaling information (service signaling information) necessary to receive the service, corresponding to one of several packet streams and PLPs currently transmitted on a channel using the SLT. The transmission path information may include an IP address, a UDP port number, a session ID, a PLP ID, etc. Here, depending on embodiments, a value previously designated by the IANA or a system may be used as an IP/UDP address. The information may be acquired using a scheme of accessing a DB or a shared memory, etc.

When the link layer signal and service data are transmitted through the same PLP, or only one PLP is operated, service data delivered through the PLP may be temporarily stored in a device such as a buffer, etc. while the link layer signal is decoded.

It is possible to acquire information about a path through which the service is actually transmitted using service signaling information of a service to be received. In addition, a received packet stream may be subjected to decapsulation and header recovery using information such as overhead reduction for a PLP to be received, etc.

In the illustrated example (tsib17020), the FIC and the EAC are used, and a concept of the base DP/PLP is presumed. As described in the foregoing, concepts of the FIC, the EAC, and the base DP/PLP may not be used.

While MISO or MIMO uses two antennas in the following for convenience of description, the present invention is applicable to systems using two or more antennas. The present invention proposes a physical profile (or system) optimized to minimize receiver complexity while attaining the performance required for a particular use case. Physical (PHY) profiles (base, handheld and advanced profiles) according to an embodiment of the present invention are subsets of all configurations that a corresponding receiver should implement. The PHY profiles share most of the functional blocks but differ slightly in specific blocks and/or parameters. For the system evolution, future profiles may also be multiplexed with existing profiles in a single radio frequency (RF) channel through a future extension frame (FEF). The base profile and the handheld profile according to the embodiment of the present invention refer to profiles to which MIMO is not applied, and the advanced profile refers to a profile to which MIMO is applied. The base profile may be used as a profile for both the terrestrial broadcast service and the mobile broadcast service. That is, the base profile may be used to define a concept of a profile which includes the mobile profile. In addition, the advanced profile may be divided into an advanced profile for a base profile with MIMO and an advanced profile for a handheld profile with MIMO. Moreover, the profiles may be changed according to intention of the designer.

The following terms and definitions may be applied to the present invention. The following terms and definitions may be changed according to design.

Auxiliary stream: sequence of cells carrying data of as yet undefined modulation and coding, which may be used for future extensions or as required by broadcasters or network operators Base data pipe: data pipe that carries service signaling data Baseband frame (or BBFRAME): set of Kbch bits which form the input to one FEC encoding process (BCH and LDPC encoding)

Cell: modulation value that is carried by one carrier of orthogonal frequency division multiplexing (OFDM) transmission Coded block: LDPC-encoded block of PLS1 data or one of the LDPC-encoded blocks of PLS2 data Data pipe: logical channel in the physical layer that carries service data or related metadata, which may carry one or a plurality of service(s) or service component(s).

Data pipe unit (DPU): a basic unit for allocating data cells to a DP in a frame.

Data symbol: OFDM symbol in a frame which is not a preamble symbol (the data symbol encompasses the frame signaling symbol and frame edge symbol)

DP_ID: this 8-bit field identifies uniquely a DP within the system identified by the SYSTEM_ID Dummy cell: cell carrying a pseudo-random value used to fill the remaining capacity not used for PLS signaling, DPs or auxiliary streams Emergency alert channel (EAC): part of a frame that carries EAS information data Frame: physical layer time slot that starts with a preamble and ends with a frame edge symbol Frame repetition unit: a set of frames belonging to the same or different physical layer profiles including an FEF, which is repeated eight times in a superframe Fast information channel (FIC): a logical channel in a frame that carries mapping information between a service and the corresponding base DP FECBLOCK: set of LDPC-encoded bits of DP data FFT size: nominal FFT size used for a particular mode, equal to the active symbol period Ts expressed in cycles of an elementary period T Frame signaling symbol: OFDM symbol with higher pilot density used at the start of a frame in certain combinations of FFT size, guard interval and scattered pilot pattern, which carries a part of the PLS data Frame edge symbol: OFDM symbol with higher pilot density used at the end of a frame in certain combinations of FFT size, guard interval and scattered pilot pattern Frame group: the set of all frames having the same PHY profile type in a superframe Future extension frame: physical layer time slot within the superframe that may be used for future extension, which starts with a preamble Futurecast UTB system: proposed physical layer broadcast system, the input of which is one or more MPEG2-TS, IP or general stream(s) and the output of which is an RF signal Input stream: a stream of data for an ensemble of services delivered to the end users by the system Normal data symbol: data symbol excluding the frame signaling symbol and the frame edge symbol PHY profile: subset of all configurations that a corresponding receiver should implement PLS: physical layer signaling data including PLS1 and PLS2

PLS1: a first set of PLS data carried in a frame signaling symbol (FSS) having a fixed size, coding and modulation, which carries basic information about a system as well as parameters needed to decode PLS2

NOTE: PLS1 data remains constant for the duration of a frame group

PLS2: a second set of PLS data transmitted in the FSS, which carries more detailed PLS data about the system and the DPs PLS2 dynamic data: PLS2 data that dynamically changes frame-by-frame PLS2 static data: PLS2 data that remains static for the duration of a frame group Preamble signaling data: signaling data carried by the preamble symbol and used to identify the basic mode of the system Preamble symbol: fixed-length pilot symbol that carries basic PLS data and is located at the beginning of a frame The preamble symbol is mainly used for fast initial band scan to detect the system signal, timing thereof, frequency offset, and FFT size.

Reserved for future use: not defined by the present document but may be defined in future Superframe: set of eight frame repetition units Time interleaving block (TI block): set of cells within which time interleaving is carried out, corresponding to one use of a time interleaver memory TI group: unit over which dynamic capacity allocation for a particular DP is carried out, made up of an integer, dynamically varying number of XFECBLOCKs NOTE: The TI group may be mapped directly to one frame or may be mapped to a plurality of frames. The TI group may contain one or more TI blocks.

Figure 18:
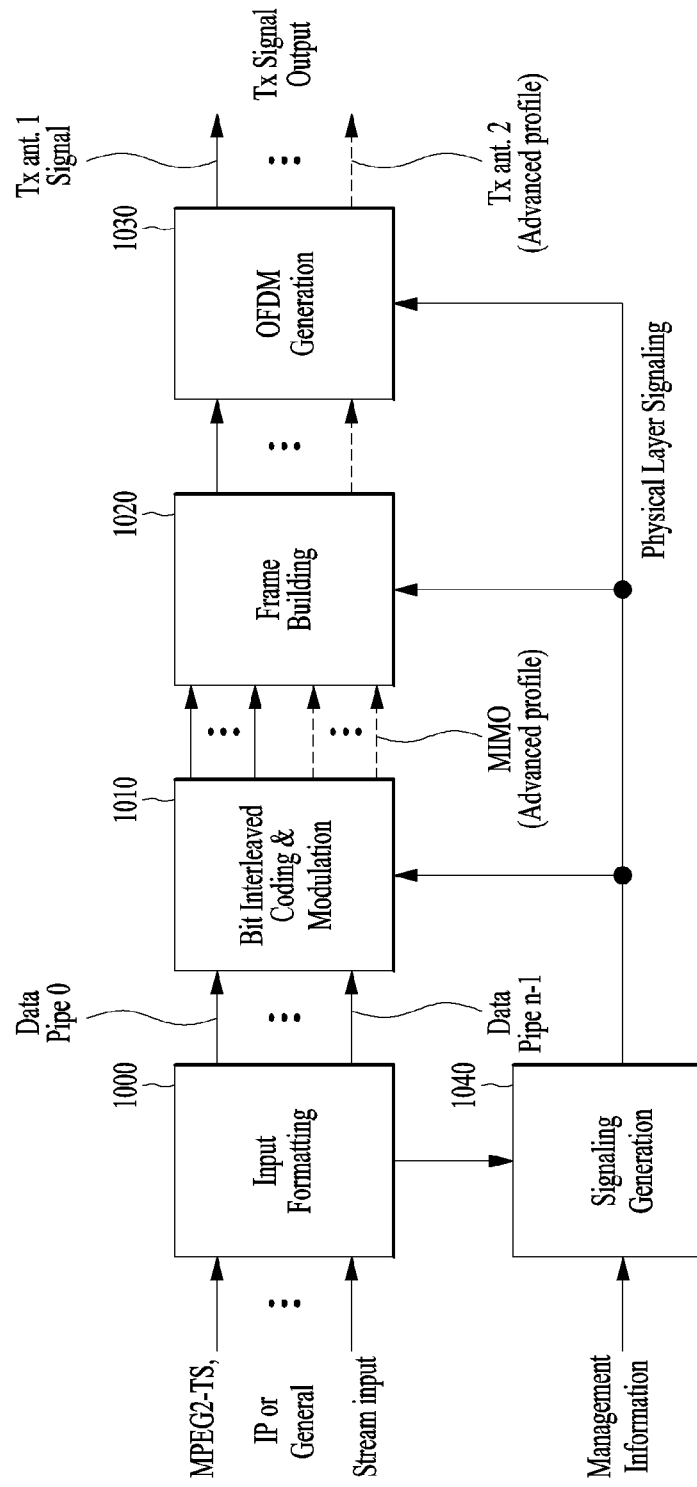
FIG. 18 is a block diagram illustrating a configuration of a broadcast signal transmission apparatus for future broadcast services according to an embodiment of the present invention.

Type 1 DP: DP of a frame where all DPs are mapped to the frame in time division multiplexing (TDM) scheme Type 2 DP: DP of a frame where all DPs are mapped to the frame in frequency division multiplexing (FDM) scheme XFECBLOCK: set of $N_{cells}$ cells carrying all the bits of one LDPC FECBLOCK FIG. 18 illustrates a configuration of a broadcast signal transmission apparatus for future broadcast services according to an embodiment of the present invention.

The broadcast signal transmission apparatus for future broadcast services according to the present embodiment may include an input formatting block 1000, a bit interleaved coding & modulation (BICM) block 1010, a frame building block 1020, an OFDM generation block 1030 and a signaling generation block 1040. Description will be given of an operation of each block of the broadcast signal transmission apparatus.

In input data according to an embodiment of the present invention, IP stream/packets and MPEG2-TS may be main input formats, and other stream types are handled as general streams. In addition to these data inputs, management information is input to control scheduling and allocation of the corresponding bandwidth for each input stream. In addition, the present invention allows simultaneous input of one or a plurality of TS streams, IP stream(s) and/or a general stream(s).

The input formatting block 1000 may demultiplex each input stream into one or a plurality of data pipes, to each of which independent coding and modulation are applied. A DP is the basic unit for robustness control, which affects QoS. One or a plurality of services or service components may be carried by one DP. The DP is a logical channel in a physical layer for delivering service data or related metadata capable of carrying one or a plurality of services or service components.

In addition, a DPU is a basic unit for allocating data cells to a DP in one frame.

An input to the physical layer may include one or a plurality of data streams. Each of the data streams is delivered by one DP. The input formatting block 1000 may covert a data stream input through one or more physical paths (or DPs) into a baseband frame (BBF). In this case, the input formatting block 1000 may perform null packet deletion or header compression on input data (a TS or IP input stream) in order to enhance transmission efficiency. A receiver may have a priori information for a particular part of a header, and thus this known information may be deleted from a transmitter. A null packet deletion block 3030 may be used only for a TS input stream.

In the BICM block 1010, parity data is added for error correction and encoded bit streams are mapped to complex-value constellation symbols. The symbols are interleaved across a specific interleaving depth that is used for the corresponding DP. For the advanced profile, MIMO encoding is performed in the BICM block 1010 and an additional data path is added at the output for MIMO transmission.

The frame building block 1020 may map the data cells of the input DPs into the OFDM symbols within a frame, and perform frequency interleaving for frequency-domain diversity, especially to combat frequency-selective fading channels. The frame building block 1020 may include a delay compensation block, a cell mapper and a frequency interleaver.

The delay compensation block may adjust timing between DPs and corresponding PLS data to ensure that the DPs and the corresponding PLS data are co-timed at a transmitter side. The PLS data is delayed by the same amount as the data pipes by addressing the delays of data pipes caused by the input formatting block and BICM block. The delay of the BICM block is mainly due to the time interleaver. In-band signaling data carries information of the next TI group so that the information is carried one frame ahead of the DPs to be signaled. The delay compensation block delays in-band signaling data accordingly.

The cell mapper may map PLS, DPs, auxiliary streams, dummy cells, etc. to active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. A basic function of the cell mapper is to map a data cell generated by time interleaving for each DP and PLS cell to an array of active OFDM cells (if present) corresponding to respective OFDM symbols in one frame. Service signaling data (such as program specific information (PSI)/SI) may be separately gathered and sent by a DP. The cell mapper operates according to dynamic information produced by a scheduler and the configuration of a frame structure. The frequency interleaver may randomly interleave data cells received from the cell mapper to provide frequency diversity. In addition, the frequency interleaver may operate on an OFDM symbol pair including two sequential OFDM symbols using a different interleaving-seed order to obtain maximum interleaving gain in a single frame.

The OFDM generation block 1030 modulates OFDM carriers by cells produced by the frame building block, inserts pilots, and produces a time domain signal for transmission. In addition, this block subsequently inserts guard intervals, and applies peak-to-average power ratio (PAPR) reduction processing to produce a final RF signal.

Specifically, after inserting a preamble at the beginning of each frame, the OFDM generation block 1030 may apply conventional OFDM modulation having a cyclic prefix as a guard interval. For antenna space diversity, a distributed MISO scheme is applied across transmitters. In addition, a PAPR scheme is performed in the time domain. For flexible network planning, the present invention provides a set of various FFT sizes, guard interval lengths and corresponding pilot patterns.

In addition, the present invention may multiplex signals of a plurality of broadcast transmission/reception systems in the time domain such that data of two or more different broadcast transmission/reception systems providing broadcast services may be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc.

The signaling generation block 1040 may create physical layer signaling information used for an operation of each functional block. This signaling information is also transmitted so that services of interest are properly recovered at a receiver side.

Signaling information according to an embodiment of the present invention may include PLS data. PLS provides the receiver with a means to access physical layer DPs. The PLS data includes PLS1 data and PLS2 data.

The PLS1 data is a first set of PLS data carried in an FSS symbol in a frame having a fixed size, coding and modulation, which carries basic information about the system in addition to the parameters needed to decode the PLS2 data. The PLS1 data provides basic transmission parameters including parameters required to enable reception and decoding of the PLS2 data. In addition, the PLS1 data remains constant for the duration of a frame group.

The PLS2 data is a second set of PLS data transmitted in an FSS symbol, which carries more detailed PLS data about the system and the DPs. The PLS2 contains parameters that provide sufficient information for the receiver to decode a desired DP. The PLS2 signaling further includes two types of parameters, PLS2 static data (PLS2-STAT data) and PLS2 dynamic data (PLS2-DYN data). The PLS2 static data is PLS2 data that remains static for the duration of a frame group and the PLS2 dynamic data is PLS2 data that dynamically changes frame by frame. Details of the PLS data will be described later.

The above-described blocks may be omitted or replaced by blocks having similar or identical functions.

Figure 19:
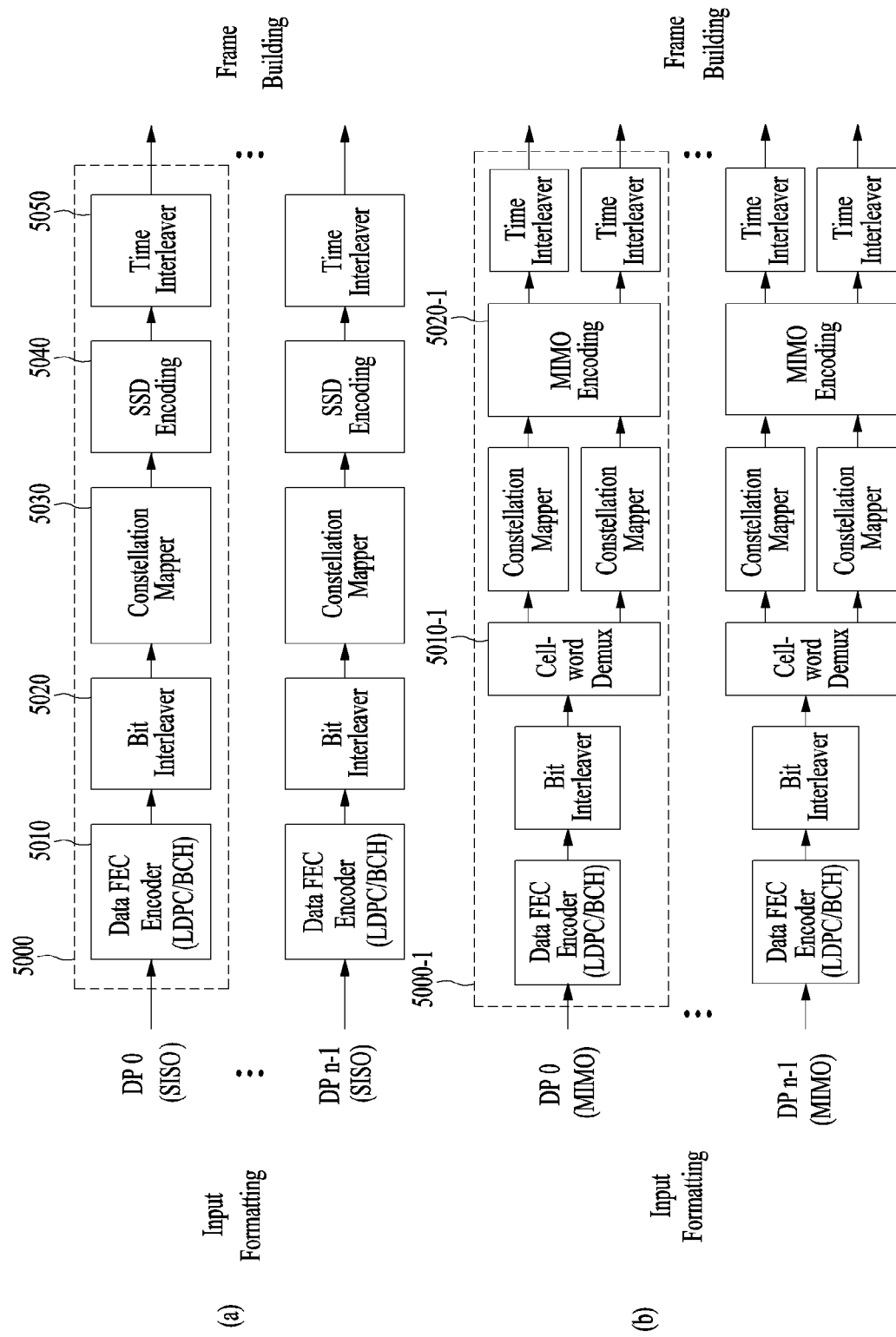
FIG. 19 is a block diagram illustrating a bit interleaved coding & modulation (BICM) block according to an embodiment of the present invention.

FIG. 19 illustrates a BICM block according to an embodiment of the present invention.

The BICM block illustrated in FIG. 19 corresponds to an embodiment of the BICM block 1010 described with reference to FIG. 18.

As described above, the broadcast signal transmission apparatus for future broadcast services according to the embodiment of the present invention may provide a terrestrial broadcast service, mobile broadcast service, UHDTV service, etc.

Since QoS depends on characteristics of a service provided by the broadcast signal transmission apparatus for future broadcast services according to the embodiment of the present invention, data corresponding to respective services needs to be processed using different schemes. Accordingly, the BICM block according to the embodiment of the present invention may independently process respective DPs by independently applying SISO, MISO and MIMO schemes to data pipes respectively corresponding to data paths. Consequently, the broadcast signal transmission apparatus for future broadcast services according to the embodiment of the present invention may control QoS for each service or service component transmitted through each DP.

(a) shows a BICM block applied to a profile (or system) to which MIMO is not applied, and (b) shows a BICM block of a profile (or system) to which MIMO is applied.

The BICM block to which MIMO is not applied and the BICM block to which MIMO is applied may include a plurality of processing blocks for processing each DP.

Description will be given of each processing block of the BICM block to which MIMO is not applied and the BICM block to which MIMO is applied.

A processing block 5000 of the BICM block to which MIMO is not applied may include a data FEC encoder 5010, a bit interleaver 5020, a constellation mapper 5030, a signal space diversity (SSD) encoding block 5040 and a time interleaver 5050.

The data FEC encoder 5010 performs FEC encoding on an input BBF to generate FECBLOCK procedure using outer coding (BCH) and inner coding (LDPC). The outer coding (BCH) is optional coding method. A detailed operation of the data FEC encoder 5010 will be described later.

The bit interleaver 5020 may interleave outputs of the data FEC encoder 5010 to achieve optimized performance with a combination of LDPC codes and a modulation scheme while providing an efficiently implementable structure. A detailed operation of the bit interleaver 5020 will be described later.

The constellation mapper 5030 may modulate each cell word from the bit interleaver 5020 in the base and the handheld profiles, or each cell word from the cell-word demultiplexer 5010-1 in the advanced profile using either QPSK, QAM-16, non-uniform QAM (NUQ-64, NUQ-256, or NUQ-1024) or non-uniform constellation (NUC-16, NUC-64, NUC-256, or NUC-1024) mapping to give a power-normalized constellation point, $e_1$. This constellation mapping is applied only for DPs. It is observed that QAM-16 and NUQs are square shaped, while NUCs have arbitrary shapes. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in the PLS2 data.

The time interleaver 5050 may operates at a DP level. Parameters of time interleaving (TI) may be set differently for each DP. A detailed operation of the time interleaver 5050 will be described later.

A processing block 5000-1 of the BICM block to which MIMO is applied may include the data FEC encoder, the bit interleaver, the constellation mapper, and the time interleaver.

However, the processing block 5000-1 is distinguished from the processing block 5000 of the BICM block to which MIMO is not applied in that the processing block 5000-1 further includes a cell-word demultiplexer 5010-1 and a MIMO encoding block 5020-1.

In addition, operations of the data FEC encoder, the bit interleaver, the constellation mapper, and the time interleaver in the processing block 5000-1 correspond to those of the data FEC encoder 5010, the bit interleaver 5020, the constellation mapper 5030, and the time interleaver 5050 described above, and thus description thereof is omitted.

The cell-word demultiplexer 5010-1 is used for a DP of the advanced profile to divide a single cell-word stream into dual cell-word streams for MIMO processing.

The MIMO encoding block 5020-1 may process an output of the cell-word demultiplexer 5010-1 using a MIMO encoding scheme. The MIMO encoding scheme is optimized for broadcast signal transmission. MIMO technology is a promising way to obtain a capacity increase but depends on channel characteristics. Especially for broadcasting, a strong LOS component of a channel or a difference in received signal power between two antennas caused by different signal propagation characteristics makes it difficult to obtain capacity gain from MIMO. The proposed MIMO encoding scheme overcomes this problem using rotation-based precoding and phase randomization of one of MIMO output signals.

MIMO encoding is intended for a 2×2 MIMO system requiring at least two antennas at both the transmitter and the receiver. A MIMO encoding mode of the present invention may be defined as full-rate spatial multiplexing (FR-SM). FR-SM encoding may provide capacity increase with relatively small complexity increase at the receiver side. In addition, the MIMO encoding scheme of the present invention has no restriction on an antenna polarity configuration.

MIMO processing is applied at the DP level. NUQ ($e_{1,i}$ and $e_{2,i}$) corresponding to a pair of constellation mapper outputs is fed to an input of a MIMO encoder. Paired MIMO encoder output (g1,i and g2,i) is transmitted by the same carrier k and OFDM symbol 1 of respective TX antennas thereof.

The above-described blocks may be omitted or replaced by blocks having similar or identical functions.

Figure 20:
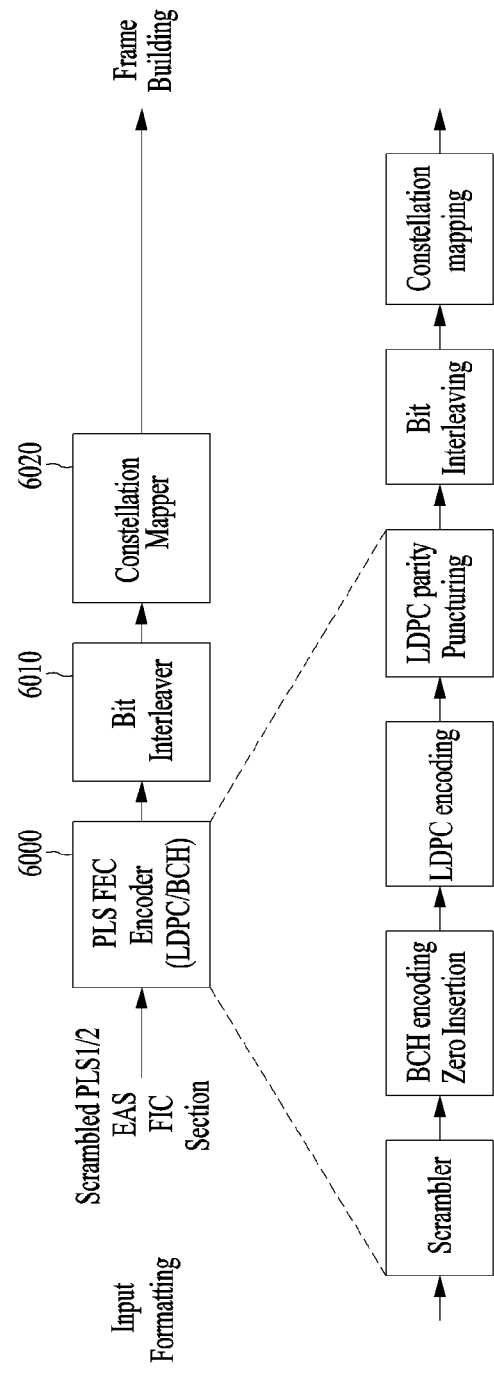
FIG. 20 is a block diagram illustrating a BICM block according to another embodiment of the present invention.

FIG. 20 illustrates a BICM block according to another embodiment of the present invention.

The BICM block illustrated in FIG. 20 corresponds to another embodiment of the BICM block 1010 described with reference to FIG. 18.

FIG. 20 illustrates a BICM block for protection of physical layer signaling (PLS), an emergency alert channel (EAC) and a fast information channel (FIC). The EAC is a part of a frame that carries EAS information data, and the FIC is a logical channel in a frame that carries mapping information between a service and a corresponding base DP. Details of the EAC and FIC will be described later.

Referring to FIG. 20, the BICM block for protection of the PLS, the EAC and the FIC may include a PLS FEC encoder 6000, a bit interleaver 6010 and a constellation mapper 6020.

In addition, the PLS FEC encoder 6000 may include a scrambler, a BCH encoding/zero insertion block, an LDPC encoding block and an LDPC parity puncturing block. Description will be given of each block of the BICM block.

The PLS FEC encoder 6000 may encode scrambled PLS 1/2 data, EAC and FIC sections.

The scrambler may scramble PLS1 data and PLS2 data before BCH encoding and shortened and punctured LDPC encoding.

The BCH encoding/zero insertion block may perform outer encoding on the scrambled PLS 1/2 data using a shortened BCH code for PLS protection, and insert zero bits after BCH encoding. For PLS1 data only, output bits of zero insertion may be permutted before LDPC encoding.

The LDPC encoding block may encode an output of the BCH encoding/zero insertion block using an LDPC code. To generate a complete coded block, $C_{ldpc}$ and parity bits $P_{ldpc}$ are encoded systematically from each zero-inserted PLS information block $I_{ldpc}$ and appended thereto.

$$C_{ldpc} = [I_{ldpc} P_{ldpc}] = [i_0, i_1, \ldots, i_{K_{ldpc}-1}, p_0, p_1, \ldots, p_{N_{ldpc}-K_{ldpc}-1}]$$ [Equation 1]

The LDPC parity puncturing block may perform puncturing on the PLS1 data and the PLS2 data.

When shortening is applied to PLS1 data protection, some LDPC parity bits are punctured after LDPC encoding. In addition, for PLS2 data protection, LDPC parity bits of PLS2 are punctured after LDPC encoding. These punctured bits are not transmitted.

The bit interleaver 6010 may interleave each of shortened and punctured PLS1 data and PLS2 data.

The constellation mapper 6020 may map the bit-interleaved PLS1 data and PLS2 data to constellations.

The above-described blocks may be omitted or replaced by blocks having similar or identical functions.

Figure 21:
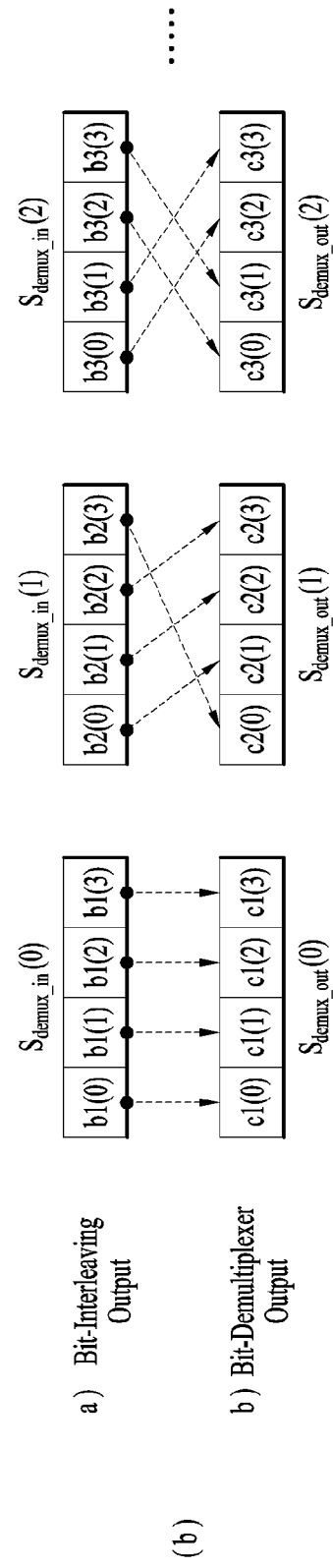
FIG. 21 illustrates a bit interleaving process of physical layer signaling (PLS) according to an embodiment of the present invention.

FIG. 21 illustrates a bit interleaving process of PLS according to an embodiment of the present invention.

Figure 22:
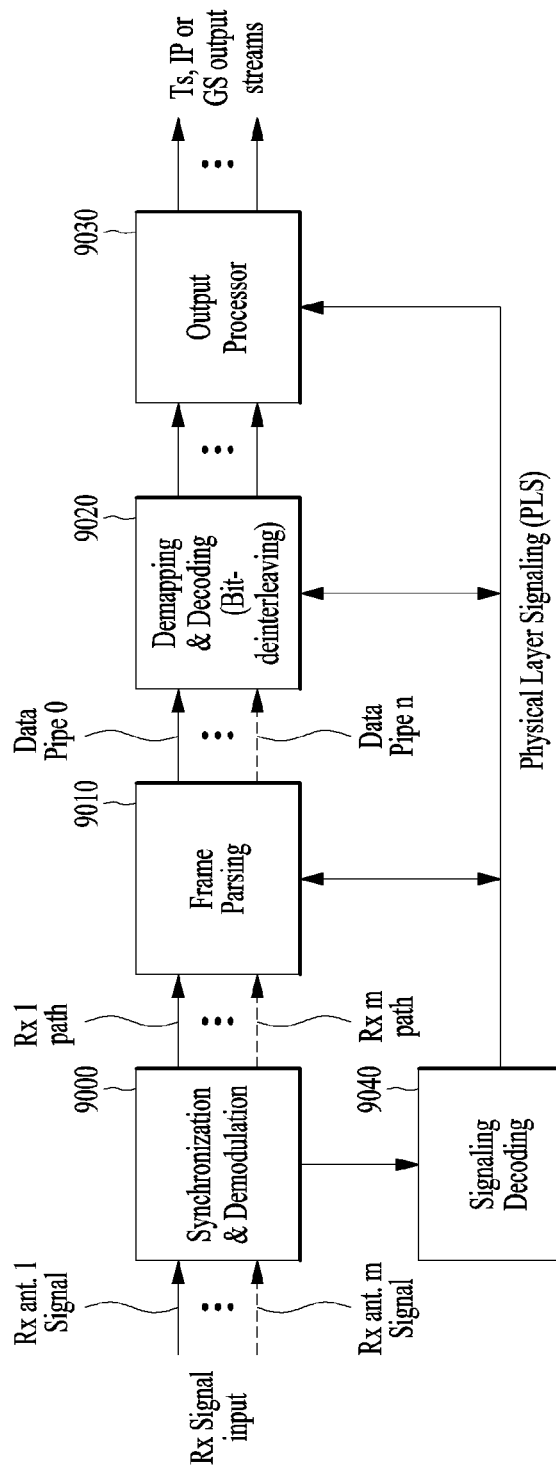
FIG. 22 is a block diagram illustrating a configuration of a broadcast signal reception apparatus for future broadcast services according to an embodiment of the present invention.

Each shortened and punctured PLS1 and PLS2 coded block is interleaved bit-by-bit as described in FIG. 22. Each block of additional parity bits is interleaved with the same block interleaving structure but separately.

In the case of BPSK, there are two branches for bit interleaving to duplicate FEC coded bits in the real and imaginary parts. Each coded block is written to the upper branch first. The bits are mapped to the lower branch by applying modulo $N_{FEC}$ addition with cyclic shifting value floor($N_{FEC}/2$), where $N_{FEC}$ is the length of each LDPC coded block after shortening and puncturing.

In other modulation cases, such as QSPK, QAM-16 and NUQ-64, FEC coded bits are written serially into the interleaver column-wise, where the number of columns is the same as the modulation order.

In the read operation, the bits for one constellation symbol are read out sequentially row-wise and fed into the bit demultiplexer block. These operations are continued until the end of the column Each bit interleaved group is demultiplexed bit-by-bit in a group before constellation mapping. Depending on modulation order, there are two mapping rules. In the case of BPSK and QPSK, the reliability of bits in a symbol is equal. Therefore, the bit group read out from the bit interleaving block is mapped to a QAM symbol without any operation.

In the cases of QAM-16 and NUQ-64 mapped to a QAM symbol, the rule of operation is described in FIG. 23(a). As shown in FIG. 23(a), i is bit group index corresponding to column index in bit interleaving.

FIG. 21 shows the bit demultiplexing rule for QAM-16. This operation continues until all bit groups are read from the bit interleaving block.

FIG. 22 illustrates a configuration of a broadcast signal reception apparatus for future broadcast services according to an embodiment of the present invention.

The broadcast signal reception apparatus for future broadcast services according to the embodiment of the present invention may correspond to the broadcast signal transmission apparatus for future broadcast services described with reference to FIG. 18.

The broadcast signal reception apparatus for future broadcast services according to the embodiment of the present invention may include a synchronization & demodulation module 9000, a frame parsing module 9010, a demapping & decoding module 9020, an output processor 9030 and a signaling decoding module 9040. A description will be given of operation of each module of the broadcast signal reception apparatus.

The synchronization & demodulation module 9000 may receive input signals through m Rx antennas, perform signal detection and synchronization with respect to a system corresponding to the broadcast signal reception apparatus, and carry out demodulation corresponding to a reverse procedure of a procedure performed by the broadcast signal transmission apparatus.

The frame parsing module 9010 may parse input signal frames and extract data through which a service selected by a user is transmitted. If the broadcast signal transmission apparatus performs interleaving, the frame parsing module 9010 may carry out deinterleaving corresponding to a reverse procedure of interleaving. In this case, positions of a signal and data that need to be extracted may be obtained by decoding data output from the signaling decoding module 9040 to restore scheduling information generated by the broadcast signal transmission apparatus.

The demapping & decoding module 9020 may convert input signals into bit domain data and then deinterleave the same as necessary. The demapping & decoding module 9020 may perform demapping of mapping applied for transmission efficiency and correct an error generated on a transmission channel through decoding. In this case, the demapping & decoding module 9020 may obtain transmission parameters necessary for demapping and decoding by decoding data output from the signaling decoding module 9040.

The output processor 9030 may perform reverse procedures of various compression/signal processing procedures which are applied by the broadcast signal transmission apparatus to improve transmission efficiency. In this case, the output processor 9030 may acquire necessary control information from data output from the signaling decoding module 9040. An output of the output processor 9030 corresponds to a signal input to the broadcast signal transmission apparatus and may be MPEG-TSs, IP streams (v4 or v6) and generic streams.

The signaling decoding module 9040 may obtain PLS information from a signal demodulated by the synchronization & demodulation module 9000. As described above, the frame parsing module 9010, the demapping & decoding module 9020 and the output processor 9030 may execute functions thereof using data output from the signaling decoding module 9040.

A frame according to an embodiment of the present invention is further divided into a number of OFDM symbols and a preamble. As shown in (d), the frame includes a preamble, one or more frame signaling symbols (FSSs), normal data symbols and a frame edge symbol (FES).

The preamble is a special symbol that enables fast future-cast UTB system signal detection and provides a set of basic transmission parameters for efficient transmission and reception of a signal. Details of the preamble will be described later.

A main purpose of the FSS is to carry PLS data. For fast synchronization and channel estimation, and hence fast decoding of PLS data, the FSS has a dense pilot pattern than a normal data symbol. The FES has exactly the same pilots as the FSS, which enables frequency-only interpolation within the FES and temporal interpolation, without extrapolation, for symbols immediately preceding the FES.

Figure 23:
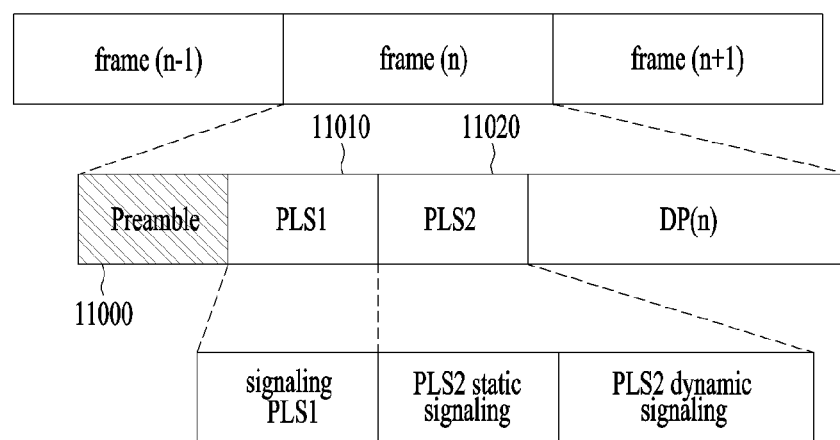
FIG. 23 illustrates a signaling hierarchy structure of a frame according to an embodiment of the present invention.

FIG. 23 illustrates a signaling hierarchy structure of a frame according to an embodiment of the present invention.

FIG. 23 illustrates the signaling hierarchy structure, which is split into three main parts corresponding to preamble signaling data 11000, PLS1 data 11010 and PLS2 data 11020. A purpose of a preamble, which is carried by a preamble symbol in every frame, is to indicate a transmission type and basic transmission parameters of the frame. PLS1 enables the receiver to access and decode the PLS2 data, which contains the parameters to access a DP of interest. PLS2 is carried in every frame and split into two main parts corresponding to PLS2-STAT data and PLS2-DYN data. Static and dynamic portions of PLS2 data are followed by padding, if necessary.

Preamble signaling data according to an embodiment of the present invention carries 21 bits of information that are needed to enable the receiver to access PLS data and trace DPs within the frame structure. Details of the preamble signaling data are as follows.

FFT_SIZE: This 2-bit field indicates an FFT size of a current frame within a frame group as described in the following Table 1.

TABLE 1

| Value | FFT size |
|---|---|
| 00 | 8K FFT |
| 01 | 16K FFT |
| 10 | 32K FFT |
| 11 | Reserved |

GI_FRACTION: This 3-bit field indicates a guard interval fraction value in a current superframe as described in the following Table 2.

TABLE 2

| Value | GI_FRACTION |
|---|---|
| 000 | 1/5 |
| 001 | 1/10 |
| 010 | 1/20 |
| 011 | 1/40 |
| 100 | 1/80 |
| 101 | 1/160 |
| 110 to 111 | Reserved |

EAC_FLAG: This 1-bit field indicates whether the EAC is provided in a current frame. If this field is set to '1', an emergency alert service (EAS) is provided in the current frame. If this field set to '0', the EAS is not carried in the current frame. This field may be switched dynamically within a superframe.

PILOT_MODE: This 1-bit field indicates whether a pilot mode is a mobile mode or a fixed mode for a current frame in a current frame group. If this field is set to '0', the mobile pilot mode is used. If the field is set to '1', the fixed pilot mode is used.

PAPR_FLAG: This 1-bit field indicates whether PAPR reduction is used for a current frame in a current frame group. If this field is set to a value of '1', tone reservation is used for PAPR reduction. If this field is set to a value of '0', PAPR reduction is not used.

RESERVED: This 7-bit field is reserved for future use.

FIG. 24 illustrates PLS1 data according to an embodiment of the present invention.

PLS1 data provides basic transmission parameters including parameters required to enable reception and decoding of PLS2. As mentioned above, the PLS1 data remain unchanged for the entire duration of one frame group. A detailed definition of the signaling fields of the PLS1 data is as follows.

PREAMBLE_DATA: This 20-bit field is a copy of preamble signaling data excluding EAC_FLAG.

NUM_FRAME_FRU: This 2-bit field indicates the number of the frames per FRU.

PAYLOAD_TYPE: This 3-bit field indicates a format of payload data carried in a frame group. PAYLOAD_TYPE is signaled as shown in Table 3.

TABLE 3

| Value | Payload type |
|---|---|
| 1XX | TS is transmitted. |
| X1X | IP stream is transmitted. |
| XX1 | GS is transmitted. |

NUM_FSS: This 2-bit field indicates the number of FSSs in a current frame.

SYSTEM_VERSION: This 8-bit field indicates a version of a transmitted signal format. SYSTEM_VERSION is divided into two 4-bit fields: a major version and a minor version.

Major version: The MSB corresponding to four bits of the SYSTEM_VERSION field indicate major version information. A change in the major version field indicates a non-backward-compatible change. A default value is '0000'. For a version described in this standard, a value is set to '0000'.

Minor version: The LSB corresponding to four bits of SYSTEM_VERSION field indicate minor version information. A change in the minor version field is backwards compatible.

CELL_ID: This is a 16-bit field which uniquely identifies a geographic cell in an ATSC network. An ATSC cell coverage area may include one or more frequencies depending on the number of frequencies used per futurecast UTB system. If a value of CELL_ID is not known or unspecified, this field is set to '0'.

NETWORK_ID: This is a 16-bit field which uniquely identifies a current ATSC network.

SYSTEM_ID: This 16-bit field uniquely identifies the futurecast UTB system within the ATSC network. The futurecast UTB system is a terrestrial broadcast system whose input is one or more input streams (TS, IP, GS) and whose output is an RF signal. The futurecast UTB system carries one or more PHY profiles and FEF, if any. The same futurecast UTB system may carry different input streams and use different RFs in different geographical areas, allowing local service insertion. The frame structure and scheduling are controlled in one place and are identical for all transmissions within the futurecast UTB system. One or more futurecast UTB systems may have the same SYSTEM_ID meaning that they all have the same physical layer structure and configuration.

The following loop includes FRU_PHY_PROFILE, FRU_FRAME_LENGTH, FRU_GI_FRACTION, and RESERVED which are used to indicate an FRU configuration and a length of each frame type. A loop size is fixed so that four PHY profiles (including an FEF) are signaled within the FRU. If NUM_FRAME_FRU is less than 4, unused fields are filled with zeros.

FRU_PHY_PROFILE: This 3-bit field indicates a PHY profile type of an $(i+1)^{th}$ (i is a loop index) frame of an associated FRU. This field uses the same signaling format as shown in Table 8.

FRU_FRAME_LENGTH: This 2-bit field indicates a length of an $(i+1)^{th}$ frame of an associated FRU. Using FRU_FRAME_LENGTH together with FRU_GI_FRACTION, an exact value of a frame duration may be obtained.

FRU_GI_FRACTION: This 3-bit field indicates a guard interval fraction value of an $(i+1)^{th}$ frame of an associated FRU. FRU_GI_FRACTION is signaled according to Table 7.

RESERVED: This 4-bit field is reserved for future use.

The following fields provide parameters for decoding the PLS2 data.

PLS2_FEC_TYPE: This 2-bit field indicates an FEC type used by PLS2 protection. The FEC type is signaled according to Table 4. Details of LDPC codes will be described later.

TABLE 4

| Content | PLS2 FEC type |
| --- | --- |
| 00 | 4K-1/4 and 7K-3/10 LDPC codes |
| 01 to 11 | Reserved |

PLS2_MOD: This 3-bit field indicates a modulation type used by PLS2. The modulation type is signaled according to Table 5.

TABLE 5

| Value | PLS2_MODE |
| --- | --- |
| 000 | BPSK |
| 001 | QPSK |
| 010 | QAM-16 |
| 011 | NUQ-64 |
| 100 to 111 | Reserved |

PLS2_SIZE_CELL: This 15-bit field indicates $C_{total\_partial\_block}$, a size (specified as the number of QAM cells) of the collection of full coded blocks for PLS2 that is carried in a current frame group. This value is constant during the entire duration of the current frame group.

PLS2_STAT_SIZE_BIT: This 14-bit field indicates a size, in bits, of PLS2-STAT for a current frame group. This value is constant during the entire duration of the current frame group.

PLS2_DYN_SIZE_BIT: This 14-bit field indicates a size, in bits, of PLS2-DYN for a current frame group. This value is constant during the entire duration of the current frame group.

PLS2_REP_FLAG: This 1-bit flag indicates whether a PLS2 repetition mode is used in a current frame group. When this field is set to a value of '1', the PLS2 repetition mode is activated. When this field is set to a value of '0', the PLS2 repetition mode is deactivated.

PLS2 REP_SIZE_CELL: This 15-bit field indicates $C_{total\_partial\_block}$, a size (specified as the number of QAM cells) of the collection of partial coded blocks for PLS2 carried in every frame of a current frame group, when PLS2 repetition is used. If repetition is not used, a value of this field is equal to 0. This value is constant during the entire duration of the current frame group.

PLS2_NEXT_FEC_TYPE: This 2-bit field indicates an FEC type used for PLS2 that is carried in every frame of a next frame group. The FEC type is signaled according to Table 10.

PLS2_NEXT_MOD: This 3-bit field indicates a modulation type used for PLS2 that is carried in every frame of a next frame group. The modulation type is signaled according to Table 11.

PLS2_NEXT_REP_FLAG: This 1-bit flag indicates whether the PLS2 repetition mode is used in a next frame group. When this field is set to a value of '1', the PLS2 repetition mode is activated. When this field is set to a value of '0', the PLS2 repetition mode is deactivated.

PLS2_NEXT_REP_SIZE_CELL: This 15-bit field indicates $C_{total\_full\_block}$, a size (specified as the number of QAM cells) of the collection of full coded blocks for PLS2 that is carried in every frame of a next frame group, when PLS2 repetition is used. If repetition is not used in the next frame group, a value of this field is equal to 0. This value is constant during the entire duration of a current frame group.

PLS2_NEXT_REP_STAT_SIZE_BIT: This 14-bit field indicates a size, in bits, of PLS2-STAT for a next frame group. This value is constant in a current frame group.

PLS2_NEXT_REP_DYN_SIZE_BIT: This 14-bit field indicates the size, in bits, of the PLS2-DYN for a next frame group. This value is constant in a current frame group.

PLS2_AP_MODE: This 2-bit field indicates whether additional parity is provided for PLS2 in a current frame group. This value is constant during the entire duration of the current frame group. Table 6 below provides values of this field. When this field is set to a value of '00', additional parity is not used for the PLS2 in the current frame group.

TABLE 6

| Value | PLS2-AP mode |
| --- | --- |
| 00 | AP is not provided |
| 01 | AP1 mode |
| 10 to 11 | Reserved |

PLS2_AP_SIZE_CELL: This 15-bit field indicates a size (specified as the number of QAM cells) of additional parity bits of PLS2. This value is constant during the entire duration of a current frame group.

PLS2_NEXT_AP_MODE: This 2-bit field indicates whether additional parity is provided for PLS2 signaling in every frame of a next frame group. This value is constant during the entire duration of a current frame group. Table 12 defines values of this field.

PLS2_NEXT_AP_SIZE_CELL: This 15-bit field indicates a size (specified as the number of QAM cells) of additional parity bits of PLS2 in every frame of a next frame group. This value is constant during the entire duration of a current frame group.

RESERVED: This 32-bit field is reserved for future use.

CRC_32: A 32-bit error detection code, which is applied to all PLS1 signaling.

FIG. 25 illustrates PLS2 data according to an embodiment of the present invention.

FIG. 25 illustrates PLS2-STAT data of the PLS2 data. The PLS2-STAT data is the same within a frame group, while PLS2-DYN data provides information that is specific for a current frame.

Details of fields of the PLS2-STAT data are described below.

FIC_FLAG: This 1-bit field indicates whether the FIC is used in a current frame group. If this field is set to '1', the FIC is provided in the current frame. If this field set to '0', the FIC is not carried in the current frame. This value is constant during the entire duration of a current frame group.

AUX_FLAG: This 1-bit field indicates whether an auxiliary stream is used in a current frame group. If this field is set to '1', the auxiliary stream is provided in a current frame. If this field set to '0', the auxiliary stream is not carried in the current frame. This value is constant during the entire duration of current frame group.

NUM_DP: This 6-bit field indicates the number of DPs carried within a current frame. A value of this field ranges from 1 to 64, and the number of DPs is NUM_DP+1.

DP_ID: This 6-bit field identifies uniquely a DP within a PHY profile.

DP_TYPE: This 3-bit field indicates a type of a DP. This is signaled according to the following Table 7.

TABLE 7

| Value | DP Type |
|---|---|
| 000 | DP Type 1 |
| 001 | DP Type 2 |
| 010 to 111 | Reserved |

DP_GROUP_ID: This 8-bit field identifies a DP group with which a current DP is associated. This may be used by the receiver to access DPs of service components associated with a particular service having the same DP_GROUP_ID.

BASE_DP_ID: This 6-bit field indicates a DP carrying service signaling data (such as PSI/SI) used in a management layer. The DP indicated by BASE_DP_ID may be either a normal DP carrying the service signaling data along with service data or a dedicated DP carrying only the service signaling data.

DP_FEC_TYPE: This 2-bit field indicates an FEC type used by an associated DP. The FEC type is signaled according to the following Table 8.

TABLE 8

| Value | FEC_TYPE |
|---|---|
| 00 | 16K LDPC |
| 01 | 64K LDPC |
| 10 to 11 | Reserved |

DP_COD: This 4-bit field indicates a code rate used by an associated DP. The code rate is signaled according to the following Table 9.

TABLE 9

| Value | Code rate |
|---|---|
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001 to 1111 | Reserved |

DP_MOD: This 4-bit field indicates modulation used by an associated DP. The modulation is signaled according to the following Table 10.

TABLE 10

| Value | Modulation |
|---|---|
| 0000 | QPSK |
| 0001 | QAM-16 |
| 0010 | NUQ-64 |
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001 to 1111 | Reserved |

DP_SSD_FLAG: This 1-bit field indicates whether an SSD mode is used in an associated DP. If this field is set to a value of '1', SSD is used. If this field is set to a value of '0', SSD is not used.

The following field appears only if PHY_PROFILE is equal to '010', which indicates the advanced profile:

DP_MIMO: This 3-bit field indicates which type of MIMO encoding process is applied to an associated DP. A type of MIMO encoding process is signaled according to the following Table 11.

TABLE 11

| Value | MIMO encoding |
|---|---|
| 000 | FR-SM |
| 001 | FRFD-SM |
| 010 to 111 | Reserved |

DP_TI_TYPE: This 1-bit field indicates a type of time interleaving. A value of '0' indicates that one TI group corresponds to one frame and contains one or more TI blocks. A value of '1' indicates that one TI group is carried in more than one frame and contains only one TI block.

DP_TI_LENGTH: The use of this 2-bit field (allowed values are only 1, 2, 4, and 8) is determined by values set within the DP_TI_TYPE field as follows.

If DP_TI_TYPE is set to a value of '1', this field indicates $P_I$, the number of frames to which each TI group is mapped, and one TI block is present per TI group ($N_{TI}=1$). Allowed values of $P_I$ with the 2-bit field are defined in Table 12 below.

If DP_TI_TYPE is set to a value of '0', this field indicates the number of TI blocks $N_{TI}$ per TI group, and one TI group is present per frame ($P_1=1$). Allowed values of $P_I$ with the 2-bit field are defined in the following Table 12.

TABLE 12

| 2-bit field | $P_I$ | $N_{TI}$ |
|---|---|---|
| 00 | 1 | 1 |
| 01 | 2 | 2 |
| 10 | 4 | 3 |
| 11 | 8 | 4 |

DP_FRAME_INTERVAL: This 2-bit field indicates a frame interval ($f_{JUMP}$) within a frame group for an associated DP and allowed values are 1, 2, 4, and 8 (the corresponding 2-bit field is '00', '01', '10', or '11', respectively). For DPs that do not appear every frame of the frame group, a value of this field is equal to an interval between successive frames. For example, if a DP appears on frames 1, 5, 9, 13, etc., this field is set to a value of '4'. For DPs that appear in every frame, this field is set to a value of '1'.

DP_TI_BYPASS: This 1-bit field determines availability of the time interleaver 5050. If time interleaving is not used for a DP, a value of this field is set to '1'. If time interleaving is used, the value is set to '0'.

DP_FIRST_FRAME_IDX: This 5-bit field indicates an index of a first frame of a superframe in which a current DP occurs. A value of DP_FIRST_FRAME_IDX ranges from 0 to 31.

DP_NUM_BLOCK_MAX: This 10-bit field indicates a maximum value of DP_NUM_BLOCKS for this DP. A value of this field has the same range as DP_NUM_BLOCKS.

DP_PAYLOAD_TYPE: This 2-bit field indicates a type of payload data carried by a given DP. DP_PAYLOAD_TYPE is signaled according to the following Table 13.

TABLE 13

| Value | Payload type |
|---|---|
| 00 | TS |
| 01 | IP |
| 10 | GS |
| 11 | Reserved |

DP_INBAND_MODE: This 2-bit field indicates whether a current DP carries in-band signaling information. An in-band signaling type is signaled according to the following Table 14.

TABLE 14

| Value | In-band mode |
|---|---|
| 00 | In-band signaling is not carried. |
| 01 | INBAND-PLS is carried |
| 10 | INBAND-ISSY is carried |
| 11 | INBAND-PLS and INBAND-ISSY are carried |

DP_PROTOCOL_TYPE: This 2-bit field indicates a protocol type of a payload carried by a given DP. The protocol type is signaled according to Table 15 below when input payload types are selected.

TABLE 15

| Value | If DP_PAYLOAD_TYPE is TS | If DP_PAYLOAD_TYPE is IP | If DP_PAYLOAD_TYPE is GS |
|---|---|---|---|
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_CRC_MODE: This 2-bit field indicates whether CRC encoding is used in an input formatting block. A CRC mode is signaled according to the following Table 16.

TABLE 16

| Value | CRC mode |
|---|---|
| 00 | Not used |
| 01 | CRC-8 |
| 10 | CRC-16 |
| 11 | CRC-32 |

DNP_MODE: This 2-bit field indicates a null-packet deletion mode used by an associated DP when DP_PAYLOAD_TYPE is set to TS ('00'). DNP_MODE is signaled according to Table 17 below. If DP_PAYLOAD_TYPE is not TS ('00'), DNP_MODE is set to a value of '00'.

TABLE 17

| Value | Null-packet deletion mode |
|---|---|
| 00 | Not used |
| 01 | DNP-NORMAL |
| 10 | DNP-OFFSET |
| 11 | Reserved |

ISSY_MODE: This 2-bit field indicates an ISSY mode used by an associated DP when DP_PAYLOAD_TYPE is set to TS ('00'). ISSY_MODE is signaled according to Table 18 below. If DP_PAYLOAD_TYPE is not TS ('00'), ISSY_MODE is set to the value of '00'.

TABLE 18

| Value | ISSY mode |
|---|---|
| 00 | Not used |
| 01 | ISSY-UP |
| 10 | ISSY-BBF |
| 11 | Reserved |

HC_MODE_TS: This 2-bit field indicates a TS header compression mode used by an associated DP when DP_PAYLOAD_TYPE is set to TS ('00'). HC_MODE_TS is signaled according to the following Table 19.

TABLE 19

| Value | Header compression mode |
|---|---|
| 00 | HC_MODE_TS 1 |
| 01 | HC_MODE_TS 2 |
| 10 | HC_MODE_TS 3 |
| 11 | HC_MODE_TS 4 |

HC_MODE_IP: This 2-bit field indicates an IP header compression mode when DP_PAYLOAD_TYPE is set to IP ('01'). HC_MODE_IP is signaled according to the following Table 20.

TABLE 20

| Value | Header compression mode |
|---|---|
| 00 | No compression |
| 01 | HC_MODE_IP 1 |
| 10 to 11 | Reserved |

PID: This 13-bit field indicates the PID number for TS header compression when DP_PAYLOAD_TYPE is set to TS ('00') and HC_MODE_TS is set to '01' or '10'.

RESERVED: This 8-bit field is reserved for future use.

The following fields appear only if FIC_FLAG is equal to '1'.

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following fields appear only if AUX_FLAG is equal to '1'.

NUM_AUX: This 4-bit field indicates the number of auxiliary streams. Zero means no auxiliary stream is used.

AUX_CONFIG_RFU: This 8-bit field is reserved for future use.

AUX_STREAM_TYPE: This 4-bit is reserved for future use for indicating a type of a current auxiliary stream.

AUX_PRIVATE_CONFIG: This 28-bit field is reserved for future use for signaling auxiliary streams.

Figures 26, 27:
FIG. 26 is a table illustrating PLS2 data according to another embodiment of the present invention.
FIG. 27 illustrates a logical structure of a frame according to an embodiment of the present invention.

FIG. 26 illustrates PLS2 data according to another embodiment of the present invention.

FIG. 26 illustrates PLS2-DYN data of the PLS2 data. Values of the PLS2-DYN data may change during the duration of one frame group while sizes of fields remain constant.

Details of fields of the PLS2-DYN data are as below.

FRAME_INDEX: This 5-bit field indicates a frame index of a current frame within a superframe. An index of a first frame of the superframe is set to '0'.

PLS_CHANGE_COUNTER: This 4-bit field indicates the number of superframes before a configuration changes. A next superframe with changes in the configuration is indicated by a value signaled within this field. If this field is set to a value of '0000', it means that no scheduled change is foreseen. For example, a value of '1' indicates that there is a change in the next superframe.

FIC_CHANGE_COUNTER: This 4-bit field indicates the number of superframes before a configuration (i.e., content of the FIC) changes. A next superframe with changes in the configuration is indicated by a value signaled within this field. If this field is set to a value of '0000', it means that no scheduled change is foreseen. For example, a value of '0001' indicates that there is a change in the next superframe.

RESERVED: This 16-bit field is reserved for future use.

The following fields appear in a loop over NUM_DP, which describe parameters associated with a DP carried in a current frame.

DP_ID: This 6-bit field uniquely indicates a DP within a PHY profile.

DP_START: This 15-bit (or 13-bit) field indicates a start position of the first of the DPs using a DPU addressing scheme. The DP_START field has differing length according to the PHY profile and FFT size as shown in the following Table 21.

TABLE 21

| PHY | DP_START field size | |
|---|---|---|
| profile | 64K | 16K |
| Base | 13 bits | 15 bits |
| Handheld | — | 13 bits |
| Advanced | 13 bits | 15 its |

DP_NUM_BLOCK: This 10-bit field indicates the number of FEC blocks in a current TI group for a current DP. A value of DP_NUM_BLOCK ranges from 0 to 1023.

RESERVED: This 8-bit field is reserved for future use.

The following fields indicate FIC parameters associated with the EAC.

EAC_FLAG: This 1-bit field indicates the presence of the EAC in a current frame. This bit is the same value as EAC_FLAG in a preamble.

EAS_WAKE_UP_VERSION_NUM: This 8-bit field indicates a version number of a wake-up indication.

If the EAC_FLAG field is equal to '1', the following 12 bits are allocated to EAC_LENGTH_BYTE. If the EAC_FLAG field is equal to '0', the following 12 bits are allocated to EAC_COUNTER.

EAC_LENGTH_BYTE: This 12-bit field indicates a length, in bytes, of the EAC.

EAC_COUNTER: This 12-bit field indicates the number of frames before a frame where the EAC arrives.

The following fields appear only if the AUX_FLAG field is equal to '1'.

AUX_PRIVATE_DYN: This 48-bit field is reserved for future use for signaling auxiliary streams. A meaning of this field depends on a value of AUX_STREAM_TYPE in a configurable PLS2-STAT.

CRC_32: A 32-bit error detection code, which is applied to the entire PLS2.

FIG. 27 illustrates a logical structure of a frame according to an embodiment of the present invention.

As above mentioned, the PLS, EAC, FIC, DPs, auxiliary streams and dummy cells are mapped to the active carriers of OFDM symbols in a frame. PLS1 and PLS2 are first mapped to one or more FSSs. Thereafter, EAC cells, if any, are mapped to an immediately following PLS field, followed next by FIC cells, if any. The DPs are mapped next after the PLS or after the EAC or the FIC, if any. Type 1 DPs are mapped first and Type 2 DPs are mapped next. Details of types of the DPs will be described later. In some cases, DPs may carry some special data for EAS or service signaling data. The auxiliary streams or streams, if any, follow the DPs, which in turn are followed by dummy cells. When the PLS, EAC, FIC, DPs, auxiliary streams and dummy data cells are mapped all together in the above mentioned order, i.e. the PLS, EAC, FIC, DPs, auxiliary streams and dummy data cells, cell capacity in the frame is exactly filled.

Figure 28:
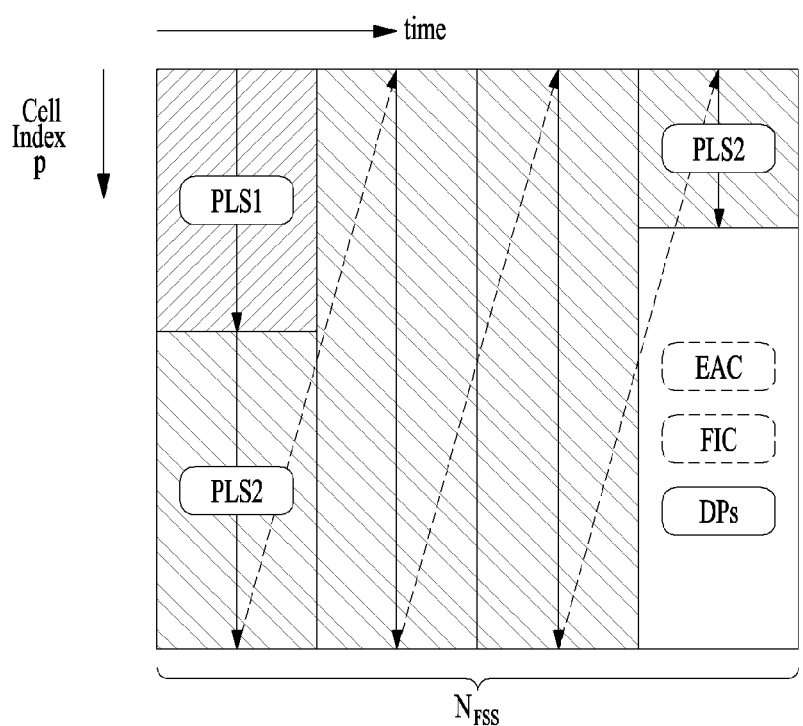
FIG. 28 illustrates PLS mapping according to an embodiment of the present invention.

FIG. 28 illustrates PLS mapping according to an embodiment of the present invention.

PLS cells are mapped to active carriers of FSS(s). Depending on the number of cells occupied by PLS, one or more symbols are designated as FSS(s), and the number of FSS(s) $N_{FSS}$ is signaled by NUM_FSS in PLS1. The FSS is a special symbol for carrying PLS cells. Since robustness and latency are critical issues in the PLS, the FSS(s) have higher pilot density, allowing fast synchronization and frequency-only interpolation within the FSS.

PLS cells are mapped to active carriers of the FSS(s) in a top-down manner as shown in the figure. PLS1 cells are mapped first from a first cell of a first FSS in increasing order of cell index. PLS2 cells follow immediately after a last cell of PLS1 and mapping continues downward until a last cell index of the first FSS. If the total number of required PLS cells exceeds the number of active carriers of one FSS, mapping proceeds to a next FSS and continues in exactly the same manner as the first FSS.

After PLS mapping is completed, DPs are carried next. If an EAC, an FIC or both are present in a current frame, the EAC and the FIC are placed between the PLS and "normal" DPs.

Hereinafter, description will be given of encoding an FEC structure according to an embodiment of the present invention. As above mentioned, the data FEC encoder may perform FEC encoding on an input BBF to generate an FECBLOCK procedure using outer coding (BCH), and inner coding (LDPC). The illustrated FEC structure corresponds to the FECBLOCK. In addition, the FECBLOCK and the FEC structure have same value corresponding to a length of an LDPC codeword.

As described above, BCH encoding is applied to each BBF ($K_{bch}$ bits), and then LDPC encoding is applied to BCH-encoded BBF ($K_{ldpc}$ bits=$N_{bch}$ bits).

A value of $N_{ldpc}$ is either 64,800 bits (long FECBLOCK) or 16,200 bits (short FECBLOCK).

Table 22 and Table 23 below show FEC encoding parameters for the long FECBLOCK and the short FECBLOCK, respectively.

TABLE 22

| LDPC rate | $N_{ldpc}$ | $K_{ldpc}$ | $K_{bch}$ | BCH error correction capability | $N_{bch} - K_{bch}$ |
|---|---|---|---|---|---|
| 5/15 | 64800 | 21600 | 21408 | 12 | 192 |
| 6/15 |  | 25920 | 25728 |  |  |
| 7/15 |  | 30240 | 30048 |  |  |
| 8/15 |  | 34560 | 34368 |  |  |
| 9/15 |  | 38880 | 38688 |  |  |
| 10/15 |  | 43200 | 43008 |  |  |
| 11/15 |  | 47520 | 47328 |  |  |
| 12/15 |  | 51840 | 51648 |  |  |
| 13/15 |  | 56160 | 55968 |  |  |

TABLE 23

| LDPC rate | $N_{ldpc}$ | $K_{ldpc}$ | $K_{bch}$ | BCH error correction capability | $N_{bch} - K_{bch}$ |
|---|---|---|---|---|---|
| 5/15 | 16200 | 5400 | 5232 | 12 | 168 |
| 6/15 |  | 6480 | 6312 |  |  |
| 7/15 |  | 7560 | 7392 |  |  |
| 8/15 |  | 8640 | 8472 |  |  |
| 9/15 |  | 9720 | 9552 |  |  |
| 10/15 |  | 10800 | 10632 |  |  |
| 11/15 |  | 11880 | 11712 |  |  |
| 12/15 |  | 12960 | 12792 |  |  |
| 13/15 |  | 14040 | 13872 |  |  |

Detailed operations of BCH encoding and LDPC encoding are as below.

A 12-error correcting BCH code is used for outer encoding of the BBF. A BCH generator polynomial for the short FECBLOCK and the long FECBLOCK are obtained by multiplying all polynomials together.

LDPC code is used to encode an output of outer BCH encoding. To generate a completed $B_{ldpc}$ (FECBLOCK), $P_{ldpc}$ (parity bits) is encoded systematically from each $I_{ldpc}$ (BCH—encoded BBF), and appended to $I_{ldpc}$. The completed $B_{ldpc}$ (FECBLOCK) is expressed by the following Equation.

$$B_{ldpc} = [I_{ldpc} P_{ldpc}] = [i_0, i_1, \ldots, i_{K_{ldpc}-1}, p_0, p_1, \ldots, p_{N_{ldpc}-K_{ldpc}-1}]$$ [Equation 2]

Parameters for the long FECBLOCK and the short FECBLOCK are given in the above Tables 22 and 23, respectively.

A detailed procedure to calculate $M_{ldpc} - K_{ldpc}$ parity bits for the long FECBLOCK, is as follows.

1) Initialize the parity bits $$p_0 = p_1 = p_2 = \ldots = p_{N_{ldpc}-K_{ldpc}-1}$$ [Equation 3]

2) Accumulate a first information bit–$i_0$, at a parity bit address specified in a first row of addresses of a parity check matrix. Details of the addresses of the parity check matrix will be described later. For example, for the rate of 13/15, $$p_{983} = p_{983} \oplus i_0$$ [Equation 4]

$$p_{2815} = p_{2815} \oplus i_0$$

$$p_{4837} = p_{4837} \oplus i_0$$

$$p_{4989} = p_{4989} \oplus i_0$$

$$p_{6138} = p_{6138} \oplus i_0$$

$$p_{6458} = p_{6458} \oplus i_0$$

$$p_{6921} = p_{6921} \oplus i_0$$

-continued $$p_{6974} = p_{6974} \oplus i_0$$

$$p_{7572} = p_{7572} \oplus i_0$$

$$p_{8260} = p_{8260} \oplus i_0$$

$$p_{8496} = p_{8496} \oplus i_0$$

3) For the next 359 information bits, $i_s$, s=1, 2, ..., 359, accumulate $i_s$ at parity bit addresses using following Equation.

$$\{x+(s \bmod 360) \times Q_{ldpc}\} \bmod(N_{ldpc}-K_{ldpc})$$ [Equation 5]

Here, x denotes an address of a parity bit accumulator corresponding to a first bit $i_0$, and $Q_{ldpc}$ is a code rate dependent constant specified in the addresses of the parity check matrix. Continuing with the example, $Q_{ldpc}=24$ for the rate of 13/15, so for an information bit $i_1$, the following operations are performed.

$$p_{1007} = p_{1007} \oplus i_1$$ [Equation 6]

$$p_{2839} = p_{2839} \oplus i_1$$

$$p_{4861} = p_{4861} \oplus i_1$$

$$p_{5013} = p_{5013} \oplus i_1$$

$$p_{6162} = p_{6162} \oplus i_1$$

$$p_{6482} = p_{6482} \oplus i_1$$

$$p_{6945} = p_{6945} \oplus i_1$$

$$p_{6998} = p_{6998} \oplus i_1$$

$$p_{7596} = p_{7596} \oplus i_1$$

$$p_{8284} = p_{8284} \oplus i_1$$

$$p_{8520} = p_{8520} \oplus i_1$$

4) For a 361th information bit $i_{360}$, an address of the parity bit accumulator is given in a second row of the addresses of the parity check matrix. In a similar manner, addresses of the parity bit accumulator for the following 359 information bits $i_s$, s=361, 362, ..., 719 are obtained using Equation 6, where x denotes an address of the parity bit accumulator corresponding to the information bit $i_{360}$, i.e., an entry in the second row of the addresses of the parity check matrix.

5) In a similar manner, for every group of 360 new information bits, a new row from the addresses of the parity check matrix is used to find the address of the parity bit accumulator.

After all of the information bits are exhausted, a final parity bit is obtained as below.

6) Sequentially perform the following operations starting with i=1.

$$p_i = p_i \oplus p_{i-1}, i=1,2, \ldots, N_{ldpc}-K_{ldpc}-1$$ [Equation 7]

Here, final content of $p_i$ (i=0, 1, ..., $N_{ldpc}-K_{ldpc}-1$) is equal to a parity bit $p_i$.

TABLE 24

| Code rate | $Q_{ldpc}$ |
|---|---|
| 5/15 | 120 |
| 6/15 | 108 |
| 7/15 | 96 |

TABLE 24-continued

| Code rate | $Q_{ldpc}$ |
|---|---|
| 8/15 | 84 |
| 9/15 | 72 |
| 10/15 | 60 |
| 11/15 | 48 |
| 12/15 | 36 |
| 13/15 | 24 |

This LDPC encoding procedure for the short FECBLOCK is in accordance with t LDPC encoding procedure for the long FECBLOCK, except that Table 24 is replaced with Table 25, and the addresses of the parity check matrix for the long FECBLOCK are replaced with the addresses of the parity check matrix for the short FECBLOCK.

TABLE 25

| Code rate | $Q_{ldpc}$ |
|---|---|
| 5/15 | 30 |
| 6/15 | 27 |
| 7/15 | 24 |
| 8/15 | 21 |
| 9/15 | 18 |
| 10/15 | 15 |
| 11/15 | 12 |
| 12/15 | 9 |
| 13/15 | 6 |

FIG. 29 illustrates time interleaving according to an embodiment of the present invention.

(a) to (c) show examples of a TI mode.

A time interleaver operates at the DP level. Parameters of time interleaving (TI) may be set differently for each DP.

The following parameters, which appear in part of the PLS2-STAT data, configure the TI.

DP_TI_TYPE (allowed values: 0 or 1): This parameter represents the TI mode. The value of '0' indicates a mode with multiple TI blocks (more than one TI block) per TI group. In this case, one TI group is directly mapped to one frame (no inter-frame interleaving). The value of '1' indicates a mode with only one TI block per TI group. In this case, the TI block may be spread over more than one frame (inter-frame interleaving).

DP_TI_LENGTH: If DP_TI_TYPE='0', this parameter is the number of TI blocks $N_{TI}$ per TI group. For DP_TI_TYPE='1', this parameter is the number of frames $P_I$ spread from one TI group.

DP_NUM_BLOCK_MAX (allowed values: 0 to 1023): This parameter represents the maximum number of XFEC-BLOCKs per TI group.

DP_FRAME_INTERVAL (allowed values: 1, 2, 4, and 8): This parameter represents the number of the frames $f_{JUMP}$ between two successive frames carrying the same DP of a given PHY profile.

DP_TI_BYPASS (allowed values: 0 or 1): If time interleaving is not used for a DP, this parameter is set to '1'. This parameter is set to '0' if time interleaving is used.

Additionally, the parameter DP_NUM_BLOCK from the PLS2-DYN data is used to represent the number of XFEC-BLOCKs carried by one TI group of the DP.

When time interleaving is not used for a DP, the following TI group, time interleaving operation, and TI mode are not considered. However, the delay compensation block for the dynamic configuration information from the scheduler may still be required. In each DP, the XFECBLOCKs received from SSD/MIMO encoding are grouped into TI groups. That is, each TI group is a set of an integer number of XFEC-BLOCKs and contains a dynamically variable number of XFECBLOCKs. The number of XFECBLOCKs in the TI group of index n is denoted by $N_{xBLOCK-Group}(n)$ and is signaled as DP_NUM_BLOCK in the PLS2-DYN data. Note that $N_{xBLOCK-Group}(n)$ may vary from a minimum value of 0 to a maximum value of $N_{xBLOCK-Group-MAX}$ (corresponding to DP_NUM_BLOCK_MAX), the largest value of which is 1023.

Each TI group is either mapped directly to one frame or spread over $P_I$ frames. Each TI group is also divided into more than one TI block ($N_{TI}$), where each TI block corresponds to one usage of a time interleaver memory. The TI blocks within the TI group may contain slightly different numbers of XFECBLOCKs. If the TI group is divided into multiple TI blocks, the TI group is directly mapped to only one frame. There are three options for time interleaving (except an extra option of skipping time interleaving) as shown in the following Table 26.

TABLE 26

| Modes | Descriptions |
|---|---|
| Option 1 | Each TI group contains one TI block and is mapped directly to one frame as shown in (a). This option is signaled in PLS2-STAT by DP_TI_TYPE = '0' and DP_TI_LENGTH = '1' ($N_{TI}$ = 1). |
| Option 2 | Each TI group contains one TI block and is mapped to more than one frame. (b) shows an example, where one TI group is mapped to two frames, i.e., DP_TI_LENGTH = '2' ($P_I$ = 2) and DP_FRAME_INTERVAL ($I_{JUMP}$ = 2). This provides greater time diversity for low data-rate services. This option is signaled in PLS2-STAT by DP_TI_TYPE = '1'. |
| Option 3 | Each TI group is divided into multiple TI blocks and is mapped directly to one frame as shown in (c). Each TI block may use a full TI memory so as to provide a maximum bit-rate for a DP. This option is signaled in PLS2-STAT by DP_TI_TYPE = '0' and DP_TI_LENGTH = $N_{TI}$, while $P_I$ = 1. |

Typically, the time interleaver may also function as a buffer for DP data prior to a process of frame building. This is achieved by means of two memory banks for each DP. A first TI block is written to a first bank. A second TI block is written to a second bank while the first bank is being read from and so on.

The TI is a twisted row-column block interleaver. For an $s^{th}$ TI block of an $n^{th}$ TI group, the number of rows $N_r$ of a TI memory is equal to the number of cells $N_{cells}$, i.e., $N_r = N_{cells}$ while the number of columns $N_c$ is equal to the number $N_{xBLOCK\_TI}(n,s)$.

Figure 30:
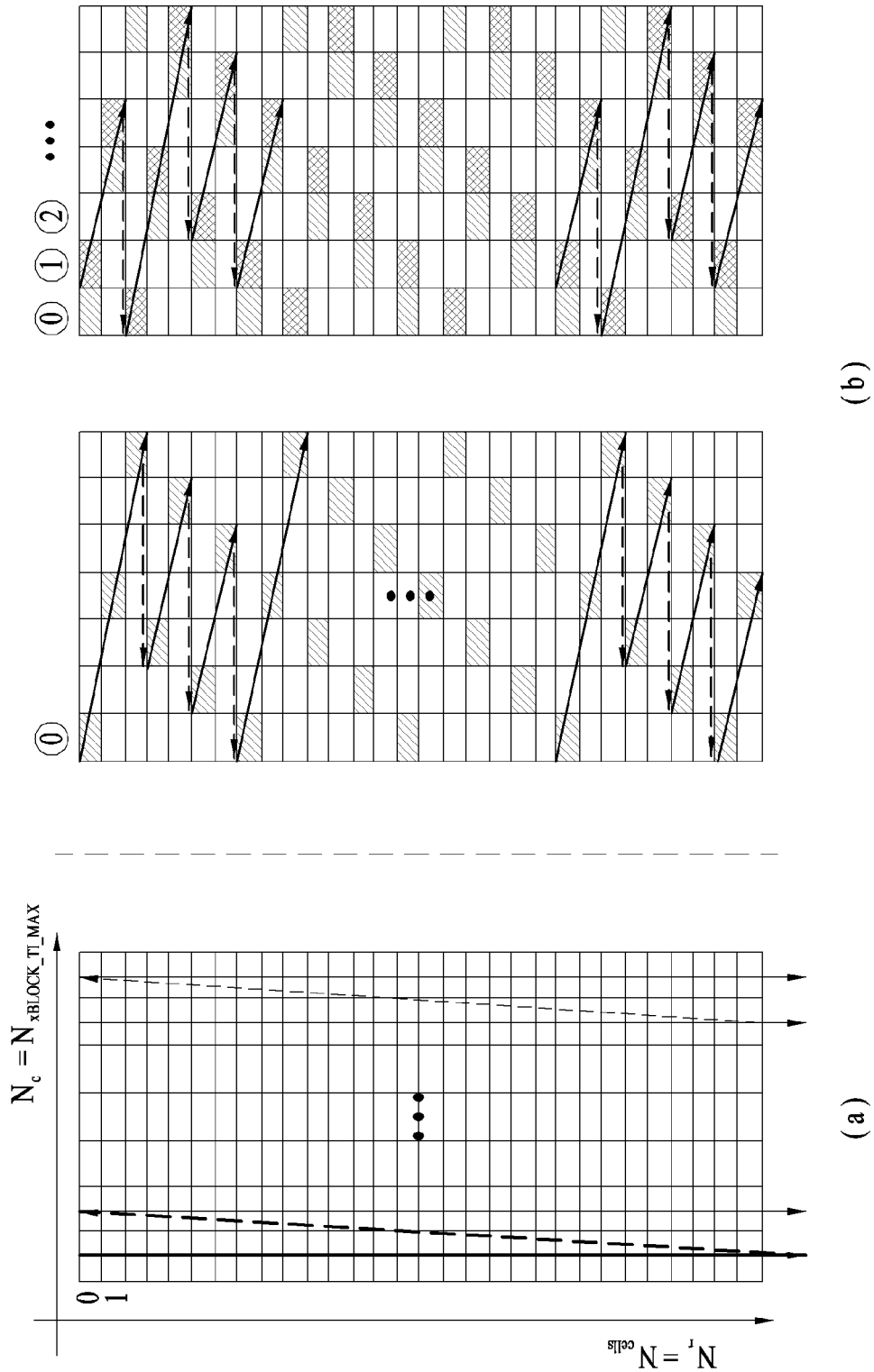
FIG. 30 illustrates a basic operation of a twisted row-column block interleaver according to an embodiment of the present invention.

FIG. 30 illustrates a basic operation of a twisted row-column block interleaver according to an embodiment of the present invention.

FIG. 30(a) shows a write operation in the time interleaver and FIG. 30(b) shows a read operation in the time interleaver. A first XFECBLOCK is written column-wise into a first column of a TI memory, and a second XFECBLOCK is written into a next column, and so on as shown in (a). Then, in an interleaving array, cells are read diagonal-wise. During diagonal-wise reading from a first row (rightwards along a row beginning with a left-most column) to a last row, $N_r$ cells are read out as shown in (b). In detail, assuming $z_{n,s,i}$ (i=0, ..., $N_rN_c$) as a TI memory cell position to be read sequentially, a reading process in such an interleaving array is performed by calculating a row index $R_{n,s,i}$, a column index $C_{n,s,i}$, and an associated twisting parameter $T_{n,s,i}$ as in the following Equation.

$$\text{GENERATE}(R_{n,s,i}, C_{n,s,i}) = \quad [\text{Equation 8}]$$
$$\{$$
$$R_{n,s,i} = \mod(i, N_r),$$
$$T_{n,s,i} = \mod(S_{shift} \times R_{n,s,i}, N_c),$$
$$C_{n,s,i} = \mod\left(T_{n,s,i} + \left\lfloor \frac{i}{N_r} \right\rfloor, N_c\right)$$
$$\}$$

Here, $S_{shift}$ is a common shift value for a diagonal-wise reading process regardless of $N_{xBLOCK\_TI}(n,s)$, and the shift value is determined by $N_{xBLOCK\_TI\_MAX}$ given in PLS2-STAT as in the following Equation.

$$\text{for}\begin{cases} N'_{xBLOCK\,TI\,MAX} = N_{xBLOCK\,TI\,MAX} + 1, & \text{if } N_{xBLOCK\,TI\,MAX} \mod 2 = 0 \\ N'_{xBLOCK\,TI\,MAX} = N_{xBLOCK\,TI\,MAX}, & \text{if } N_{xBLOCK\,TI\,MAX} \mod 2 = 1 \end{cases}, \quad [\text{Equation 9}]$$

$$S_{shift} = \frac{N'_{xBLOCK\,TI\,MAX} - 1}{2}$$

As a result, cell positions to be read are calculated by coordinates $z_{n,s,i} = N_r C_{n,s,i} + R_{n,s,i}$.

FIG. 31 illustrates an operation of a twisted row-column block interleaver according to another embodiment of the present invention.

More specifically, FIG. 31 illustrates an interleaving array in a TI memory for each TI group, including virtual XFEC-BLOCKs when $N_{xBLOCK\_TI}(0,0)=3$, $N_{xBLOCK\_TI}(1,0)=6$, and $N_{xBLOCK\_TI}(2,0)=5$.

A variable number $N_{xBLOCK\_TI}(n,s)=N_r$ may be less than or equal to $N_{xBLOCK\_TI\_MAX}$. Thus, in order to achieve single-memory deinterleaving at a receiver side regardless of $N_{xBLOCK\_TI}(n,s)$, the interleaving array for use in the twisted row-column block interleaver is set to a size of $N_r \times N_c = N_{cells} \times N_{xBLOCK\_TI\_MAX}$ by inserting the virtual XFECBLOCKs into the TI memory and a reading process is accomplished as in the following Equation.

$$p = 0; \quad [\text{Equation 10}]$$
$$\text{for } i = 0; i < N_{cells} N'_{xBLOCK\_TI\_MAX}; i = i + 1$$
$$\{\text{GENERATE}(R_{n,s,i}, C_{n,s,i});$$
$$V_i = N_r C_{n,s,j} + R_{n,s,j}$$
$$\text{if } V_i < N_{cells} N_{xBLOCK\_TI}(n, s)$$
$$\{$$
$$Z_{n,s,p} = V_i; p = p + 1;$$
$$\}$$
$$\}$$

The number of TI groups is set to 3. An option of the time interleaver is signaled in the PLS2-STAT data by DP_TI_TYPE='0', DP_FRAME_INTERVAL='1', and DP_TI_LENGTH='1', i.e., NTI=1, IJUMP=1, and PI=1. The number of XFECBLOCKs, each of which has Ncells=30 cells, per TI group is signaled in the PLS2-DYN data by NxBLOCK_TI(0,0)=3, NxBLOCK_TI(1,0)=6, and NxBLOCK_TI(2,0)=5, respectively. A maximum number of XFECBLOCKs is signaled in the PLS2-STAT data by NxBLOCK_Group_MAX, which leads to $\lfloor N_{xBLOCK\_Group\_MAX}/N_{TI} \rfloor = N_{xBLOCK\_TI\_MAX} = 6$.

The purpose of the Frequency Interleaver, which operates on data corresponding to a single OFDM symbol, is to provide frequency diversity by randomly interleaving data cells received from the frame builder. In order to get maximum interleaving gain in a single frame, a different interleaving-sequence is used for every OFDM symbol pair comprised of two sequential OFDM symbols.

Therefore, the frequency interleaver according to the present embodiment may include an interleaving address generator for generating an interleaving address for applying corresponding data to a symbol pair.

Figure 32:
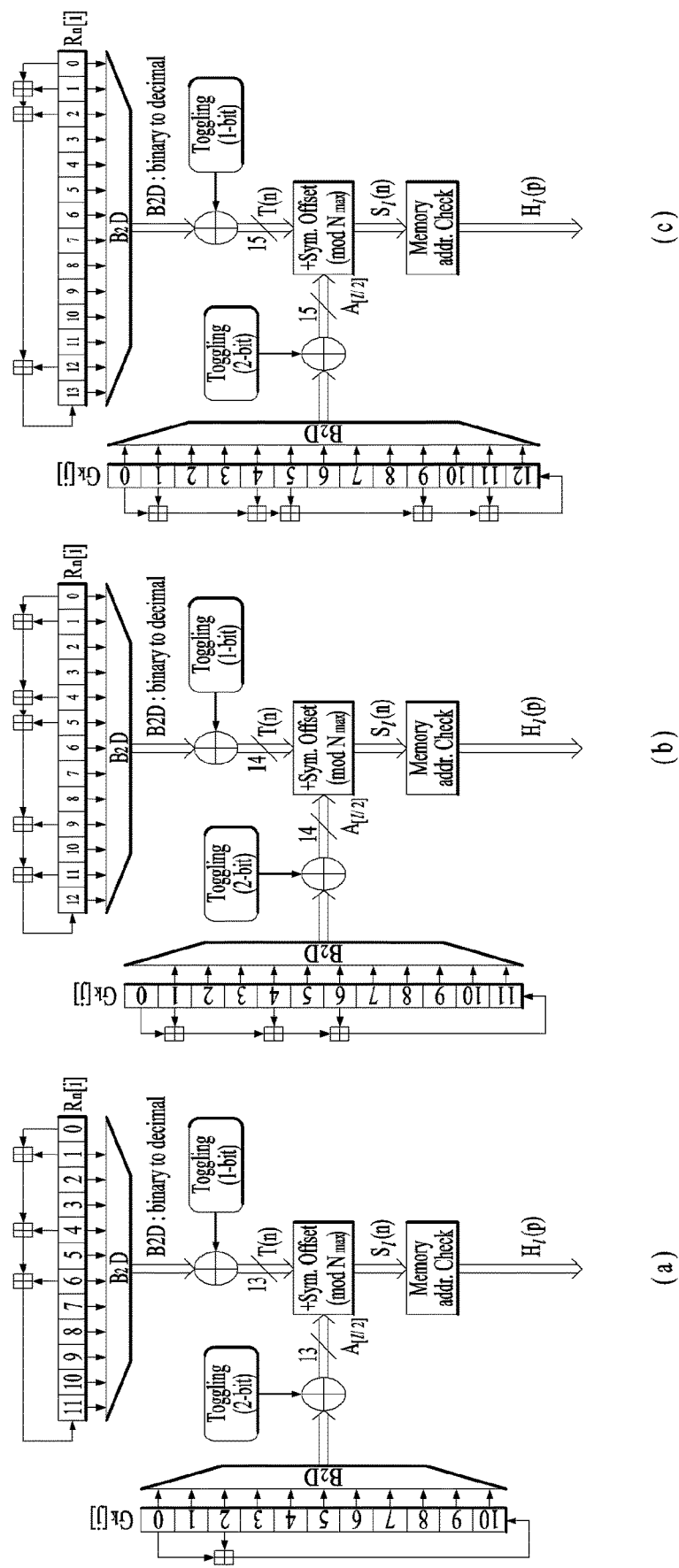
FIG. 32 is a block diagram illustrating an interleaving address generator including a main pseudo-random binary sequence (PRBS) generator and a sub-PRBS generator according to each FFT mode according to an embodiment of the present invention.

FIG. 32 illustrates an interleaving address generator including a main pseudo-random binary sequence (PRBS) generator and a sub-PRBS generator according to each FFT mode according to an embodiment of the present invention.

(a) shows the block diagrams of the interleaving-address generator for 8K FFT mode, (b) shows the block diagrams of the interleaving-address generator for 16K FFT mode and (c) shows the block diagrams of the interleaving-address generator for 32K FFT mode.

The interleaving process for the OFDM symbol pair is described as follows, exploiting a single interleaving-sequence. First, available data cells (the output cells from the Cell Mapper) to be interleaved in one OFDM symbol $O_{m,l}$ is defined as $O_{m,l}=[x_{m,l,0}, \ldots, x_{m,l,p}, \ldots, x_{mj,N_{ldpc}-1}]$ for l=0, ..., $N_{sym}-1$, where $x_{m,l,p}$ is the $p^{th}$ cell of the $l^{th}$ OFDM symbol in the $m^{th}$ frame and $N_{data}$ is the number of data cells: $N_{data}=C_{FSS}$ for the frame signaling symbol(s), $N_{data}=C_{data}$ for the normal data, and $N_{data}=C_{FES}$ for the frame edge symbol. In addition, the interleaved data cells are defined as $P_{m,l}=[v_{m,l,0} \ldots, v_{m,l,N_{ldpc}-1}]$ for For the OFDM symbol pair, the interleaved OFDM symbol pair is given by $v_{m,l,H_i(p)}=x_{m,l,p}$, p=0, ..., $N_{data}-1$, for the first OFDM symbol of each pair $v_{m,l,p}=x_{m,l,H_i(p)}$, p=0, ..., $N_{data}-1$, for the second OFDM symbol of each pair, where $H_l(p)$ is the interleaving
    address generated by a PRBS generator.

FIG. 33 illustrates a main PRBS used for all FFT modes according to an embodiment of the present invention.

(a) illustrates the main PRBS, and (b) illustrates a parameter Nmax for each FFT mode.

FIG. 34 illustrates a sub-PRBS used for FFT modes and an interleaving address for frequency interleaving according to an embodiment of the present invention.

(a) illustrates a sub-PRBS generator, and (b) illustrates an interleaving address for frequency interleaving. A cyclic shift value according to an embodiment of the present invention may be referred to as a symbol offset.

Figure 35:
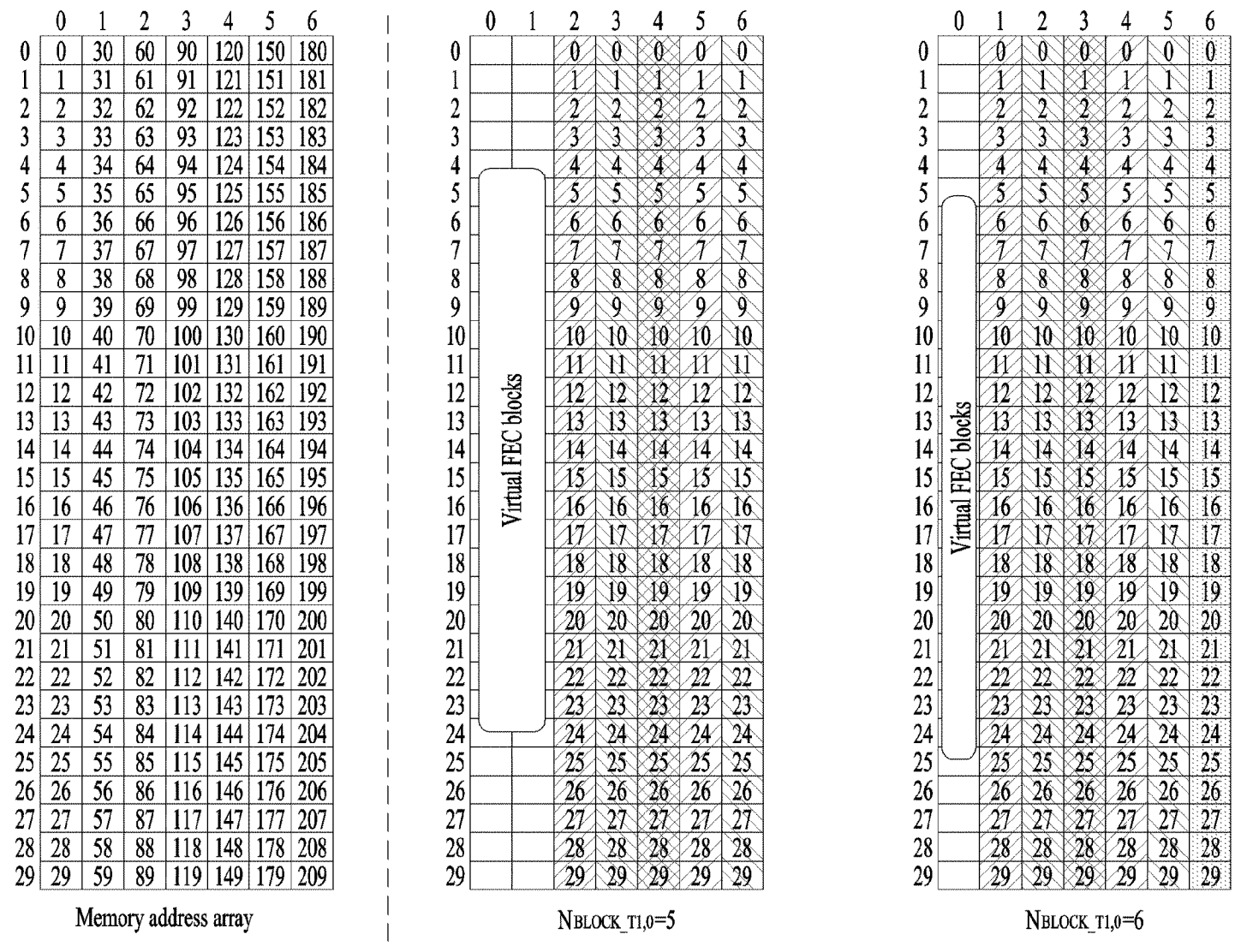

FIG. 35 illustrates a write operation of a time interleaver according to an embodiment of the present invention.

FIG. 35 illustrates a write operation for two TI groups.

A left block in the figure illustrates a TI memory address array, and right blocks in the figure illustrate a write operation when two virtual FEC blocks and one virtual FEC block are inserted into heads of two contiguous TI groups, respectively.

Hereinafter, description will be given of a configuration of a time interleaver and a time interleaving method using both a convolutional interleaver (CI) and a block interleaver (BI) or selectively using either the CI or the BI according to a physical layer pipe (PLP) mode. A PLP according to an embodiment of the present invention is a physical path corresponding to the same concept as that of the above-described DP, and a name of the PLP may be changed by a designer.

A PLP mode according to an embodiment of the present invention may include a single PLP mode or a multi-PLP mode according to the number of PLPs processed by a broadcast signal transmitter or a broadcast signal transmission apparatus. The single PLP mode corresponds to a case in which one PLP is processed by the broadcast signal transmission apparatus. The single PLP mode may be referred to as a single PLP.

The multi-PLP mode corresponds to a case in which one or more PLPs are processed by the broadcast signal transmission apparatus. The multi-PLP mode may be referred to as multiple PLPs.

In the present invention, time interleaving in which different time interleaving schemes are applied according to PLP modes may be referred to as hybrid time interleaving. Hybrid time interleaving according to an embodiment of the present invention is applied for each PLP (or at each PLP level) in the multi-PLP mode.

FIG. 36 illustrates an interleaving type applied according to the number of PLPs in a table.

In a time interleaving according to an embodiment of the present invention, an interleaving type may be determined based on a value of PLP_NUM. PLP_NUM is a signaling field indicating a PLP mode. When PLP_NUM has a value of 1, the PLP mode corresponds to a single PLP. The single PLP according to the present embodiment may be applied only to a CI.

When PLP_NUM has a value greater than 1, the PLP mode corresponds to multiple PLPs. The multiple PLPs according to the present embodiment may be applied to the CI and a BI. In this case, the CI may perform inter-frame interleaving, and the BI may perform intra-frame interleaving.

FIG. 37 is a block diagram including a first example of a structure of a hybrid time interleaver described above.

The hybrid time interleaver according to the first example may include a BI and a CI. The time interleaver of the present invention may be positioned between a BICM chain block and a frame builder.

The BICM chain block illustrated in FIGS. 37 and 38 may include the blocks in the processing block 5000 of the BICM block illustrated in FIG. 19 except for the time interleaver 5050. The frame builder illustrated in FIGS. 37 and 38 may perform the same function as that of the frame building block 1020 of FIG. 18.

As described in the foregoing, it is possible to determine whether to apply the BI according to the first example of the structure of the hybrid time interleaver depending on values of PLP_NUM. That is, when PLP_NUM=1, the BI is not applied (BI is turned OFF) and only the CI is applied. When PLP_NUM>1, both the BI and the CI may be applied (BI is turned ON). A structure and an operation of the CI applied when PLP_NUM>1 may be the same as or similar to a structure and an operation of the CI applied when PLP_NUM=1.

FIG. 38 is a block diagram including a second example of the structure of the hybrid time interleaver described above.

An operation of each block included in the second example of the structure of the hybrid time interleaver is the same as the above description in FIG. 20. It is possible to determine whether to apply a BI according to the second example of the structure of the hybrid time interleaver depending on values of PLP_NUM. Each block of the hybrid time interleaver according to the second example may perform operations according to embodiments of the present invention. In this instance, an applied structure and operation of a CI may be different between a case of PLP_NUM=1 and a case of PLP_NUM>1.

Figure 39:
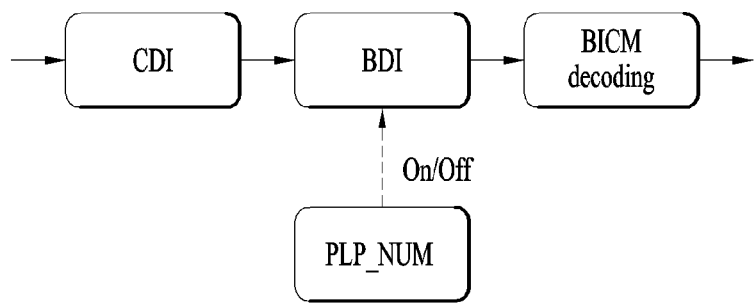
FIG. 39 is a block diagram including a first example of a structure of a hybrid time deinterleaver.

FIG. 39 is a block diagram including a first example of a structure of a hybrid time deinterleaver.

The hybrid time deinterleaver according to the first example may perform an operation corresponding to a reverse operation of the hybrid time interleaver according to the first example described above. Therefore, the hybrid time deinterleaver according to the first example of FIG. 39 may include a convolutional deinterleaver (CDI) and a block deinterleaver (BDI).

A structure and an operation of the CDI applied when PLP_NUM>1 may be the same as or similar to a structure and an operation of the CDI applied when PLP_NUM=1.

It is possible to determine whether to apply the BDI according to the first example of the structure of the hybrid time deinterleaver depending on values of PLP_NUM. That is, when PLP_NUM=1, the BDI is not applied (BDI is turned OFF) and only the CDI is applied.

The CDI of the hybrid time deinterleaver may perform inter-frame deinterleaving, and the BDEI may perform intra-frame deinterleaving. Details of inter-frame deinterleaving and intra-frame deinterleaving are the same as the above description.

Figure 40:
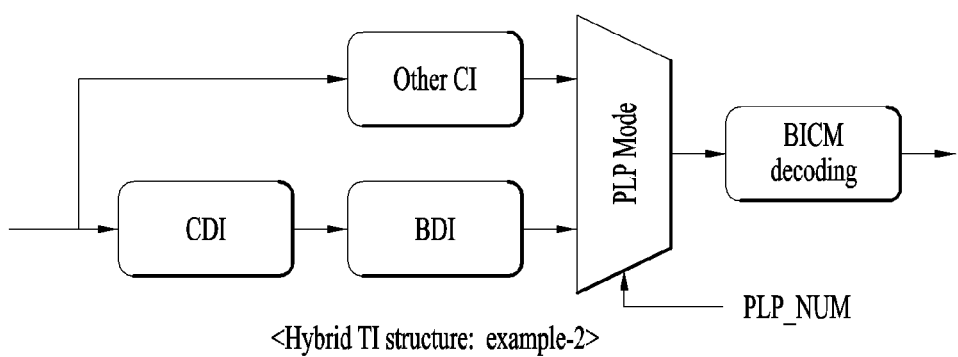
FIG. 40 is a block diagram including a second example of the structure of the hybrid time deinterleaver.

A BICM decoding block illustrated in FIGS. 39 and 40 may perform a reverse operation of the BICM chain block of FIGS. 37 and 38.

FIG. 40 is a block diagram including a second example of the structure of the hybrid time deinterleaver.

The hybrid time deinterleaver according to the second example may perform an operation corresponding to a reverse operation of the hybrid time interleaver according to the second example described above. An operation of each block included in the second example of the structure of the hybrid time deinterleaver may be the same as the above description in FIG. 39.

It is possible to determine whether to apply a BDI according to the second example of the structure of the hybrid time deinterleaver depending on values of PLP_NUM. Each block of the hybrid time deinterleaver according to the second example may perform operations according to embodiments of the present invention. In this instance, an applied structure and operation of a CDI may be different between a case of PLP_NUM=1 and a case of PLP_NUM>1.

Figure 41:
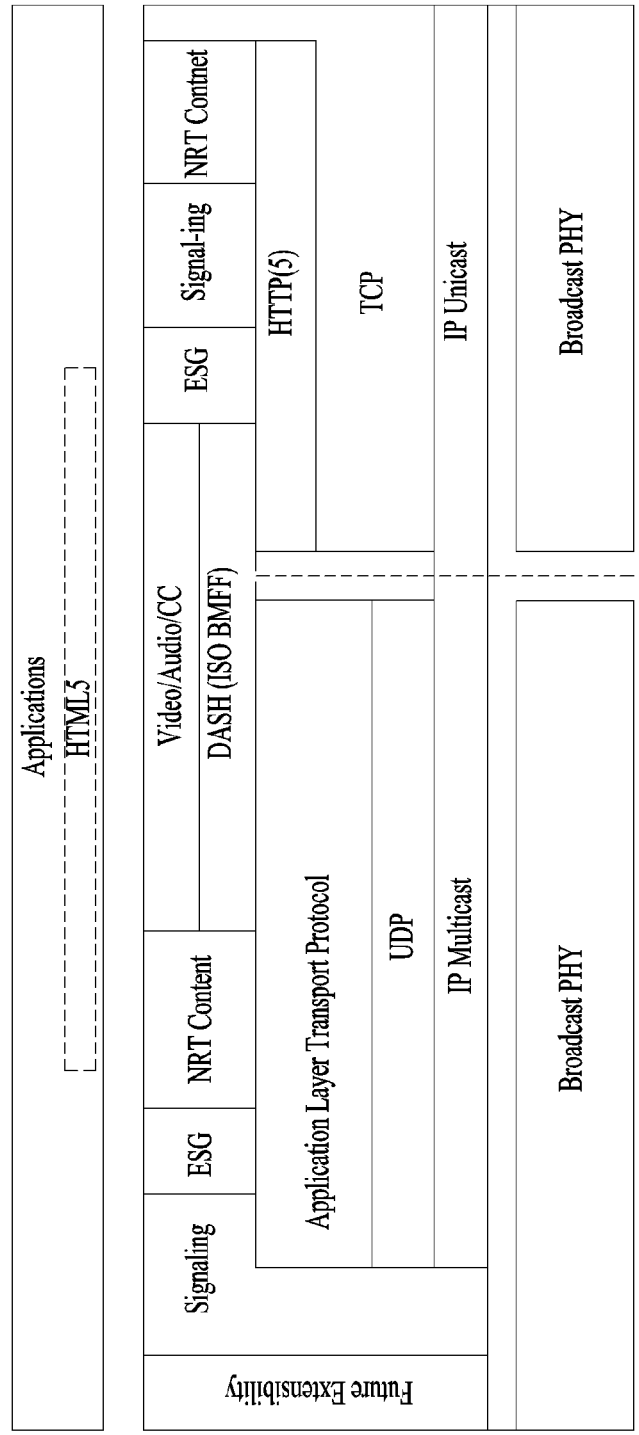
FIG. 41 illustrates a Real-Time Object Delivery over Unidirectional Transport (ROUTE) protocol stack according to an embodiment of the present invention.

FIG. 41 illustrates a Real-Time Object Delivery over Unidirectional Transport (ROUTE) protocol stack according to an embodiment of the present invention.

The next-generation broadcast system supporting the IP-based hybrid broadcasting may include video data, audio data, subtitle data, signaling data, Electronic Service Guide (ESG) data, and/or NRT content data.

Video data, audio data, subtitle data, etc. may be encapsulated in the form of ISO Base Media File (hereinafter referred to as ISO BMFF). For example, data encapsulated in the form of ISO BMFF may have a of MPEG (Moving Picture Expert Group)—DASH (Dynamic Adaptive Streaming over HTTP) segment or a format of Media Processing Unit (MPU). Then, data encapsulated in the form of BMFF may be equally transmitted over the broadcast network or the Internet or may be differently transmitted according to attributes of respective transmission networks.

In the case of the broadcast network, Signaling data, ESG data, NRT Content data, and/or data encapsulated in the form of ISO BMFF may be encapsulated in the form of an application layer transport protocol packet supporting real-time object transmission. For example, data encapsulated in the form of ISO BMFF may be encapsulated in the form of ROUTE (Real-Time Object Delivery over Unidirectional Transport) and MMT transport packet.

Real-Time Object Delivery over Unidirectional Transport (ROUTE) is a protocol for the delivery of files over IP multicast networks. ROUTE protocol utilizes Asynchronous Layered Coding (ALC), the base protocol designed for massively scalable multicast distribution, Layered Coding Transport (LCT), and other well-known Internet standards. ROUTE is an enhancement of and functional replacement for FLUTE with additional features.

ROUTE functions to deliver signaling messages, Electronic Service Guide (ESG) messages, and NRT content. It is particularly well suited to the delivery of streaming media for example MPEG-DASH Media Segment files. ROUTE offers lower end-to-end latency through the delivery chain as compared to FLUTE.

The ROUTE protocol is a generic transport application, providing for the delivery of any kind of object. It supports rich presentation including scene descriptions, media objects, and DRM-related information. ROUTE is particularly well suited to the delivery of real-time media content and offers many features.

For example, ROUTE offers individual delivery and access to different media components, e.g. language tracks, subtitles, alternative video views. And, ROUTE offers support of layered coding by enabling the delivery on different transport sessions or even ROUTE sessions. And, ROUTE offers support for flexible FEC protection, including multi-stage. And, ROUTE offers easy combination with MPEG-DASH enabling synergy between broadcast and broadband delivery modes of DASH. And, ROUTE offers fast access to media when joining a ROUTE and/or transport session. And, ROUTE offers highly extensible by focusing on the delivery concept. And, ROUTE offers compatibility with existing IETF protocols and use of IETF-endorsed extension mechanisms.

The ROUTE protocol is split in two major components. First component is a source protocol for delivery of objects or flows/collection of objects. Second component is a repair protocol for flexibly protecting delivery objects or bundles of delivery objects that are delivered through the source protocol.

The source protocol is independent of the repair protocol, i.e. the source protocol may be deployed without the ROUTE repair protocol. Repair may be added only for certain deployment scenarios, for example only for mobile reception, only in certain geographical areas, only for certain service, etc.

The source protocol is aligned with FLUTE as defined in RFC 6726 as well as the extensions defined in 3GPP TS 26.346, but also makes use of some principles of FCAST as defined in RFC 6968, for example, that the object metadata and the object content may be sent together in a compound object.

In addition to basic FLUTE protocol, certain optimizations and restrictions are added that enable optimized support for real-time delivery of media data; hence, the name of the protocol. Among others, the source ROUTE protocol provides a real-time delivery of object-based media data. And, the source ROUTE protocol provides a flexible packetization, including enabling media-aware packetization as well as transport aware packetization of delivery objects. And, the source ROUTE protocol provides an independence of files and delivery objects, i.e. a delivery object may be a part of a file or may be a group of files.

Delivery objects are the key component of this protocol as the receiver recovers delivery objects and passes those to the application. A delivery object is self-contained for the application, typically associated with certain properties, metadata and timing-related information that are of relevance for the application. In some cases the properties are provided in-band along with the object, in other cases the data needs to be delivered out-of-band in a static or dynamic fashion.

Delivery object may comprise complete or partial files described and accompanied by "FDT Instance". And, Delivery object may comprise HTTP Entities (HTTP Entity Header and HTTP Entity Body) and/or packages of delivery objects.

Delivery object may be a full file or a byte ranges of a file along with FDT Instance. Delivery object may be delivered in real time or in non-real time (timed or non-timed delivery). If timed, certain real-time and buffer restrictions apply and specific extension headers may be used. Dynamic and static metadata may be used to describe delivery object properties. Delivery object may be delivered in specific data structures, especially ISO BMFF structures. In this case a media-aware packetization or a general packetization may be applied.

The delivery format specifies which of the formats are used in order to provide information to the applications.

ROUTE repair protocol is FEC based and enabled as an additional layer between the transport layer (e.g., UDP) and the object delivery layer protocol. The FEC reuses concepts of FEC Framework defined in RFC 6363, but in contrast to the FEC Framework in RFC 6363 the ROUTE repair protocol does not protect packets, but instead it protects delivery objects as delivered in the source protocol. Each FEC source block may consist of parts of a delivery object, as a single delivery object (similar to FLUTE) or by multiple delivery objects that are bundled prior to FEC protection. ROUTE FEC makes use of FEC schemes in a similar sense to that defined in RFC 5052, and uses the terminology of that document. The FEC scheme defines the FEC encoding and decoding, and it defines the protocol fields and procedures used to identify packet payload data in the context of the FEC scheme.

In ROUTE all packets are LCT packets as defined in RFC 5651. Source and repair packets may be distinguished by at least one of a ROUTE session, a LCT transport session, and/or a PSI bit. Different ROUTE sessions are carried on different IP/UDP port combinations. Different LCT transport sessions use different TSI values in the LCT header. And, if source and repair packets are carried in the same LCT transport session, they may be distinguished by the PSI bit in the LCT. This mode of operation is mostly suitable for FLUTE compatible deployments.

ROUTE defines the source protocol including packet formats, sending behavior and receiving behavior. And, ROUTE defines the repair protocol. And, ROUTE defines a metadata for transport session establishment and a metadata for object flow delivery. And ROUTE defines recommendations for MPEG DASH configuration and mapping to ROUTE to enable rich and high-quality linear TV broadcast services.

The scope of the ROUTE protocol is the reliable delivery of delivery objects and associated metadata using LCT packets. The objects are made available to the application through a Delivery Object Cache. The implementation of this cache is application dependent.

The ROUTE protocol focuses on the format of the LCT packets to deliver the delivery objects and the reliable delivery of the delivery object using a repair protocol based on FEC. And, the ROUTE protocol focuses on the definition and delivery of object metadata along with the delivery objects to enable the interface between the delivery object cache and the application. And, the ROUTE protocol focuses on the ROUTE and LCT session description to establish the reception of objects along with their metadata. And, the ROUTE protocol focuses on the normative aspects (formats, semantics) of auxiliary information to be delivered along with the packets to optimize the performance for specific applications, e.g., real-time delivery.

In addition, the ROUTE protocol provides recommended mappings of specific DASH Media Presentation formats to ROUTE delivery as well as suitable DASH formats to be used for the delivery. The key issue is that by using ROUTE, the DASH media formats may be used as is. This architectural design enables converged unicast/broadcast services.

In sender operation of the ROUTE protocol, a ROUTE session is established that delivers LCT packets. These packets may carry source objects or FEC repair data. A source protocol consists of one or more LCT sessions, each carrying associated objects along with their metadata. The metadata may be statically delivered in the LCT Session Instance Description (LSID) or may be dynamically delivered, either as a compound object in the Entity Mode or as LCT extension headers in packet headers. The packets are carried in ALC using a specific FEC scheme that permits flexible fragmentation of the object at arbitrary byte boundaries. In addition, delivery objects may be FEC protected, either individually or in bundles. In either case, the bundled object is encoded and only the repair packets are delivered. In combination with the source packets, this permits the recovery delivery object bundles. Note that one or multiple repair flows may be generated, each with different characteristics, for example to supported different latency requirements, different protection requirements, etc.

A DMD (Dynamic MetaData) is metadata to generate FDT equivalent descriptions dynamically at the client. It is carried in the entity-header in the Entity Mode and is carried in the LCT header in other modes of delivery.

The ROUTE protocol supports different protection and delivery schemes of the source data. It also supports all existing use cases for NRT delivery, as it can be deployed in a backward-compatible mode.

The ROUTE session is associated to an IP address/port combination. Typically, by joining such a session, all packets of the session can be received and the application protocol may apply further processing.

Each ROUTE session constitutes of one or multiple LCT transport sessions. LCT transport sessions are a subset of a ROUTE session. For media delivery, an LCT transport session typically would carry a media component, for example a DASH Representation. From the perspective of broadcast DASH, the ROUTE session can be considered as the multiplex of LCT transport sessions that carry constituent media components of one or more DASH Media Presentations. Within each LCT transport session, one or multiple objects are carried, typically objects that are related, e.g. DASH Segments associated to one Representation. Along with each object, metadata properties are delivered such that the objects can be used in applications. Applications include, but are not limited to, DASH Media Presentations, HTML-5 Presentations, or any other object-consuming application.

The ROUTE sessions may be bounded or unbounded from the temporal perspective. The ROUTE session contains one or multiple LCT transport sessions. Each transport session is uniquely identified by a unique Transport Session Identifier (TSI) value in the LCT header.

Before a receiver can join a ROUTE session, the receiver needs to obtain a ROUTE Session Description. The ROUTE Session Description contains at least one of the sender IP address, the address and port number used for the session, the indication that the session is a ROUTE session and that all packets are LCT packets, and/or other information that is essential to join and consume the session on an IP/UDP level.

The Session Description could also include, but is not limited to, the data rates used for the ROUTE session and any information on the duration of the ROUTE session.

The Session Description could be in a form such as the Session Description Protocol (SDP) as defined in RFC 4566 or XML metadata as defined in RFC 3023. It might be carried in any session announcement protocol using a proprietary session control protocol, located on a web page with scheduling information, or conveyed via email or other out-of-band methods.

Transport sessions are not described in the ROUTE session description, but in the LCT Session Instance Description (LSID). Transport sessions (i.e., LCT transport sessions or simply LCT sessions) may contain either or both of Source Flows and Repair Flows. The Source Flows carry source data. And, the Repair Flows carry repair data.

The LCT transport sessions contained in a ROUTE session are described by the LCT Session Instance description (LSID). Specifically, it defines what is carried in each constituent LCT transport session of the ROUTE session. Each transport session is uniquely identified by a Transport Session Identifier (TSI) in the LCT header.

The LSID describes all transport sessions that are carried on this ROUTE session. The LSID may be delivered in the same ROUTE session containing the LCT transport sessions or it may be delivered by means outside the ROUTE session, e.g. through unicast or through a different ROUTE session. In the former case, the LSID shall be delivered on a dedicated LCT transport session with TSI=0, and furthermore, it shall be a delivery object identified by TOI=0. For any object delivered on TSI=0, the Entity Mode should be used. If those objects are not delivered in the Entity Mode, then the LSID must be recovered prior to obtaining the extended FDT for the received object.

The Internet Media Type of the LSID is application/xml+route+lsid.

The LSID may reference other data fragments. Any object that is referenced in the LSID may also be delivered on TSI=0, but with a different value of TOI than the LSID itself, or it may be delivered on a separate LCT session with dedicated TSI≠0.

The LSID element may contain version attribute, validity attribute, and/or expiration attribute. The LSID element may be updated accordingly using version attribute as well as validity attribute and expiration attribute. For example certain transport sessions may be terminated after some time and new session may start.

The version attribute indicates a version of this LSID element. The version is increased by one when the descriptor is updated. The received LSID element with highest version number is the currently valid version.

The validity attribute indicates date and/or time from which the LSID element is valid. The validity attribute may or may not be present. If not present, the receiver should assume the LSID element version is valid immediately.

The expiration attribute indicates date and time when the LSID element expires. The expiration attribute may or may not be present. If not present the receiver should assume the LSID element is valid for all time, or until it receives a newer LSID element with an associated expiration value.

The LSID element may contain at least one Transport-Session element. TransportSession element provides information about LCT transport sessions. Each TransportSession element may contain tsi attribute, SourceFlow element, and/or RepairFlow element.

tsi attribute specifies the transport session identifier. The session identifiers must not be 0. SourceFlow element provides information of a source flow carried on the transport session. RepairFlow element provides information of a repair flow carried on the transport session.

Thereafter, data encapsulated in the form of the application layer transport protocol packet may be packetized according to the IP/UDP scheme. The data packetized by the IP/UDP scheme may be referred to as the IP/UDP datagram, and the IP/UDP datagram may be loaded on the broadcast signal and then transmitted.

In the case of the Internet, data encapsulated in the form of ISO BMFF may be transferred to the receiver according to the streaming scheme. For example, the streaming scheme may include MPEG-DASH.

The signaling data may be transmitted using the following methods.

In the case of the broadcast network, signaling data may be transmitted through a specific data pipe (hereinafter referred to as DP) of a transport frame (or frame) applied to a physical layer of the next-generation broadcast transmission system and broadcast network according to attributes of the signaling data. For example, the signaling format may be encapsulated in the form of a bitstream or IP/UDP datagram.

In the case of the Internet, the signaling data may be transmitted as a response to a request of the receiver.

ESG data and NRT content data may be transmitted using the following methods.

In the case of the broadcast network, ESG data and NRT content data may be encapsulated in the form of an application layer transport protocol packet. Thereafter, data encapsulated in the form of the application layer transport protocol packet may be transmitted in the same manner as described above.

In the case of the Internet, ESG data and NRT content data may be transmitted as a response to the request of the receiver.

The physical layers (Broadcast PHY and broadband PHY) of the broadcast signal transmission apparatus according to the embodiment may be shown in FIG. 1. In addition, the physical layers of the broadcast signal reception apparatus may be shown in FIG. 9.

The signaling data and the IP/UDP datagram may be transmitted through a specific data pipe (hereinafter referred to as DP) of a transport frame (or frame). For example, the input formatting block 1000 may receive the signaling data and the IP/UDP datagram, each of the signaling data and the IP/UDP datagram may be demultiplexed into at least one DP. The output processor 9300 may perform the operations opposite to those of the input formatting block 1000.

The following description relates to an exemplary case in which data encapsulated in the form of ISO BMFF is encapsulated in the form of ROUTE transport packet, and a detailed description of the exemplary case will hereinafter be described in detail.

Figure 42:
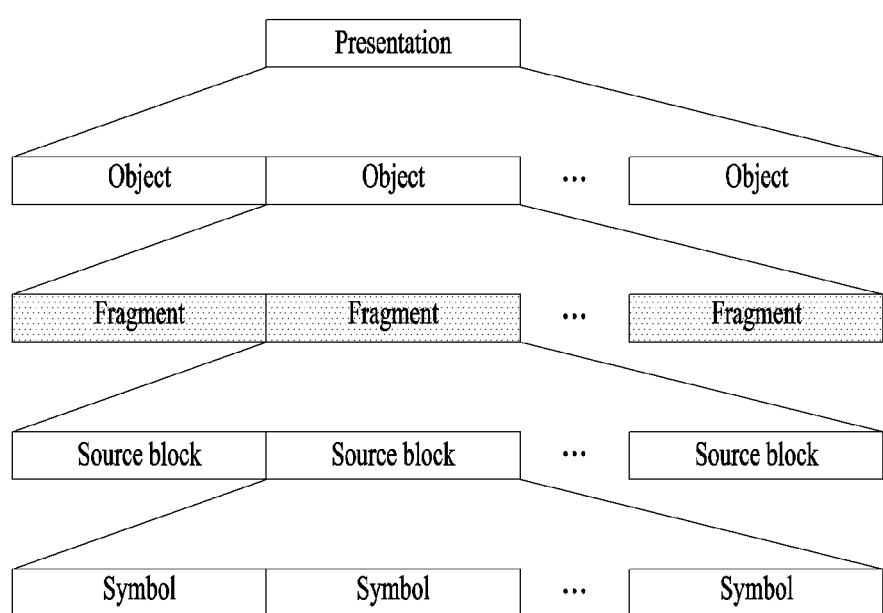
FIG. 42 illustrates a data structure of file-based multimedia content according to an embodiment of the present invention.

FIG. 42 illustrates a data structure of file-based multimedia content according to an embodiment of the present invention.

The data structure of the file-based multimedia content according to the embodiment is shown in FIG. 42. The term "file-based multimedia content" may indicate multimedia content composed of at least one file.

The multimedia content such as a broadcast program may be composed of one presentation. The presentation may include at least one object. For example, the object may be a file. In addition, the object may include at least one fragment.

In accordance with the embodiment, the fragment may be a data unit capable of being independently decoded and reproduced without depending on the preceding data. For example, the fragment including video data may begin from an IDR picture, and header data for parsing media data does not depend on the preceding fragment. The fragment according to the embodiment may be divided and transmitted in units of at least one transfer block (TB).

In accordance with the embodiment, the transfer block (TB) may be a minimum data unit capable of being independently and transmitted without depending on the preceding data. In addition, the TB may be a significant data unit configured in the form of a variable-sized GOP or chunk. For example, the TB may include at least one chunk composed of the same media data as in GOP of video data. The term "chunk" may indicate a segment of the content. In addition, the TB may include at least one source block.

GOP is a basic unit for performing coding used in video coding and is a data unit with a variable size indicating a set of frames including at least one I-frame. According to an embodiment of the present invention, media data is transmitted in an object internal structure unit as an independently meaningful data unit, and thus GOP may include Open GOP and Closed GOP.

In Open GOP, B-frame in one GOP may refer to I-frame or P-frame of an adjacent GOP. Thus, Open GOP can seriously enhance coding efficiency. In Closed GOP, B-frame or P-frame may refer to only a frame in the corresponding GOP and may not refer to frames in GOPs except for the corresponding GOP.

The TB may include at least one data, and respective data pieces may have the same or different media types. For example, the media type may include an audio type and a video type. That is, the TB may also include one or more data pieces having different media types in the same manner as in the audio and video data.

The fragment according to the embodiment may include a fragment header and a fragment payload.

The fragment header may include timing information and indexing information to parse the above-mentioned chunks. The fragment header may be comprised of at least one TB. For example, the fragment header may be contained in one TB. In addition, at least one chunk data constructing the fragment payload may be contained in at least one TB. As described above, the fragment header and the fragment payload may be contained in at least one TB.

The TB may be divided into one or more symbols. At least one symbol may be packetized. For example, the broadcast signal transmission apparatus according to the embodiment may packetize at least one symbol into the LCT packet.

The broadcast signal transmission apparatus according to the embodiment may transmit the packetized data to the broadcast signal reception apparatus.

Figure 43:
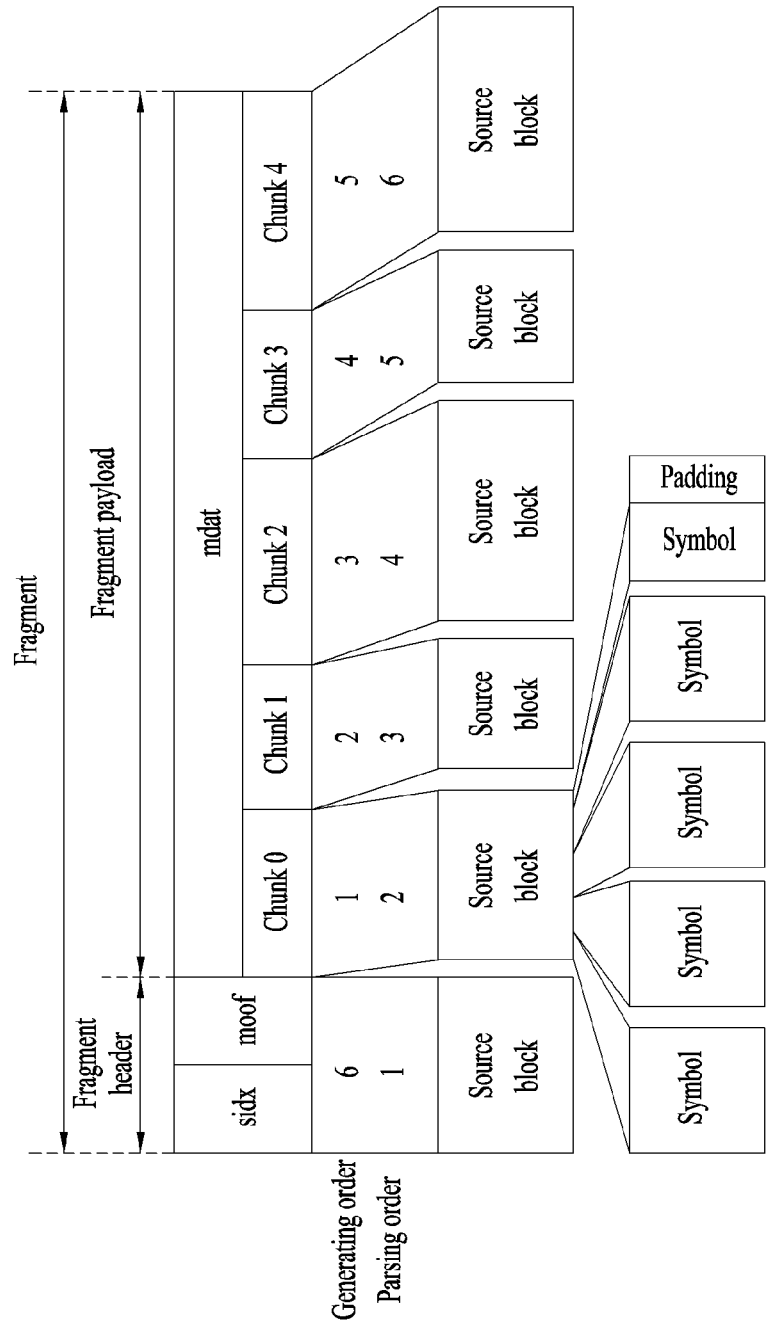
FIG. 43 illustrates a media segment structure of MPEG-DASH to which the data structure is applied.

FIG. 43 illustrates a media segment structure of MPEG-DASH to which the data structure is applied.

Referring to FIG. 43, the data structure according to the embodiment is applied to a media segment of MPEG-DASH.

The broadcast signal transmission apparatus according to the embodiment include multimedia contents having a plurality of qualities in the server, provides the multimedia contents appropriate for the user broadcast environment and the environment of the broadcast signal reception apparatus, such that it can provide the seamless real-time streaming service. For example, the broadcast signal transmission apparatus may provide the real-time streaming service using MPEG-DASH.

The broadcast signal transmission apparatus can dynamically transmit XML-type MPD (Media Presentation Description) and a segment of binary-format transmit (Tx) multimedia content to the broadcast signal reception apparatus using the ROUTE protocol according to the broadcast environment and the environment of the broadcast signal reception apparatus.

MPD is comprised of a hierarchical structure, and may include a structural function of each layer and roles of each layer.

The segment may include a media segment. The media segment may be a data unit having a media-related object format being separated per quality or per time to be transmitted to the broadcast signal reception apparatus so as to support the streaming service. The media segment may include information regarding a media stream, at least one access unit, and information regarding a method for accessing Media Presentation contained in the corresponding segment such as a presentation time or index. In addition, the media segment may be divided into at least one subsegment by the segment index.

MPEG-DASH content may include at least one media segment. The media segment may include at least one fragment. For example, the fragment may be the above-mentioned subsegment. As described above, the fragment may include a fragment header and a fragment payload.

The fragment header may include a segment index box (sidx) and a movie fragment box (moof). The segment index box may provide an initial presentation time of media data present in the corresponding fragment, a data offset, and SAP (Stream Access Points) information. The movie fragment box may include metadata regarding a media data box (mdat). For example, the movie fragment box may include timing, indexing, and decoding information of a media data sample contained in the fragment.

The fragment payload may include the media data box (mdat). The media data box (mdat) may include actual media data regarding the corresponding media constituent elements (video and audio data, etc.).

The encoded media data configured on a chunk basis may be contained in the media data box (mdat) corresponding to the fragment payload. As described above, samples corresponding to the same track may be contained in one chunk.

The broadcast signal transmission apparatus may generate at least one TB through fragment segmentation. In addition, the broadcast signal transmission apparatus may include the fragment header and the payload data in different TBs so as to discriminate between the fragment header and the payload data.

In addition, the broadcast signal transmission apparatus may transmit a transfer block (TB) divided on a chunk basis so as to segment/transmit data contained in the fragment payload. That is, the broadcast signal transmission apparatus according to the embodiment may generate a TB in a manner that a border of the chunk is identical to a border of the TB.

Thereafter, the broadcast signal transmission apparatus segments at least one TB such that it can generate at least one symbol. All symbols contained in the object may be identical to each other. In addition, the last symbol of TB may include a plurality of padding bytes such that all symbols contained in the object have the same length.

The broadcast signal transmission apparatus may packetize at least one symbol. For example, the broadcast signal transmission apparatus may generate the LCT packet on the basis of at least one symbol.

Thereafter, the broadcast signal transmission apparatus may transmit the generated LCT packet.

In accordance with the embodiment, the broadcast signal transmission apparatus first generates the fragment payload, and generates the fragment header so as to generate the fragment. In this case, the broadcast signal transmission apparatus may generate a TB corresponding to media data contained in the fragment payload. For example, at least TB corresponding to media data contained in the media data box (mdat) may be sequentially generated on a chunk basis. Thereafter, the broadcast signal transmission apparatus may generate the TB corresponding to the fragment header.

The broadcast signal transmission apparatus may transmit the generated TB according to the generation order so as to broadcast the media content in real time. In contrast, the broadcast signal reception apparatus according to the embodiment first parses the fragment header, and then parses the fragment payload.

The broadcast signal transmission apparatus may transmit data according to the parsing order when media data is pre-encoded or TB is pre-generated.

FIG. 44 illustrates a Layered Coding Transport (LCT) packet structure for file transmission according to an embodiment of the present invention.

An application layer transport session may be composed of an IP address and a port number. If the application layer transport session is the ROUTE protocol, the ROUTE session may be composed of one or more LCT (Layered Coding Transport) sessions. For example, if one media component is transmitted through one LCT transport session, at least one media component may be multiplexed and transmitted through one application layer transport session. In addition, at least one transport object may be transmitted through one LCT transport session.

Referring to FIG. 44, if the application layer transmission protocol is based on the LCT, each field of the LCT packet may indicate the following information.

The LCT packet may include an LCT version number field (V), a congestion control flag field (C), a reserved field (R), a transport session identifier flag field (S), a transport object identifier flag field (O), a half-word flag field (H), a sender current time present flag field (T), an expected residual time present flag field (R), a close session flag field (A), a close object flag field (B), an LCT header length field (HDR_LEN), a codepoint field (CP), a congestion control information field (CCI), a transport session identifier field (TSI), a transport object identifier field (TOI), a header extensions field, an FEC payload ID field, and/or an encoding symbol(s) field.

LCT version number field(V) indicates the protocol version number. For example, this field indicates the LCT version number. The version number field of the LCT header MUST be interpreted as the ROUTE version number field. This version of ROUTE implicitly makes use of version '1' of the LCT building block. For example, the version number is '0001b'.

Congestion control flag field(C) indicates the length of Congestion Control Information field. C=0 indicates the Congestion Control Information (CCI) field is 32-bits in length. C=1 indicates the CCI field is 64-bits in length. C=2 indicates the CCI field is 96-bits in length. C=3 indicates the CCI field is 128-bits in length.

Reserved field(R) reserved for future use. For example, Reserved field(R) may be Protocol-Specific Indication field (PSI). Protocol-Specific Indication field (PSI) may be used as an indicator for a specific purpose in the LCT higher protocol. PSI field indicates whether the current packet is a source packet or an FEC repair packet. As the ROUTE source protocol only delivers source packets, this field shall be set to '10b'.

Transport Session Identifier flag field(S) indicates the length of Transport Session Identifier field.

Transport Object Identifier flag field(0) indicates the length of Transport Object Identifier field. For example, the object may indicate one file, and the TOI may indicate ID information of each object, and a file having TOI=0 may be referred to as FDT.

Half-word flag field (H) may indicate whether half-word (16 bits) will be added to the length of TSI or TOI field.

Sender Current Time present flag field(T) indicates whether the Sender Current Time (SCT) field is present or not. T=0 indicates that the Sender Current Time (SCT) field is not present. T=1 indicates that the SCT field is present. The SCT is inserted by senders to indicate to receivers how long the session has been in progress.

Expected Residual Time present flag field(R) indicates whether the Expected Residual Time (ERT) field is present or not. R=0 indicates that the Expected Residual Time (ERT) field is not present. R=1 indicates that the ERT field is present. The ERT is inserted by senders to indicate to receivers how much longer the session/object transmission will continue.

Close Session flag field (A) may indicate whether session completion or an impending state of the session completion.

Close Object flag field (B) may indicate completion or impending completion of a transmitting object.

LCT header length field(HDR_LEN):indicates total length of the LCT header in units of 32-bit words.

Codepoint field(CP) indicates the type of the payload that is carried by this packet. Depending on the type of the payload, additional payload header may be added to prefix the payload data.

Congestion Control Information field (CCI) may be used to transmit congestion control information (e.g., layer numbers, logical channel numbers, sequence numbers, etc.). The Congestion Control Information field in the LCT header contains the required Congestion Control Information.

Transport Session Identifier field (TSI) is a unique ID of a session. The TSI uniquely identifies a session among all sessions from a particular sender. This field identifies the Transport Session in ROUTE. The context of the Transport Session is provided by the LSID (LCT Session Instance description).

LSID defines what is carried in each constituent LCT transport session of the ROUTE session. Each transport session is uniquely identified by a Transport Session Identifier (TSI) in the LCT header. LSID may be transmitted through the same ROUTE session including LCT transport sessions, and may also be transmitted through Web. LSID may be transmitted through the same ROUTE session including LCT transmission sessions and may also be transmitted through a communication network, a broadcast network, the Internet, a cable network, and/or a satellite network. The scope or spirit of a transmission unit of LSID is not limited thereto. For example, LSID may be transmitted through a specific LCT transport session having TSI=0. LSID may include signaling information regarding all transport sessions applied to the ROUTE session. LSID may include LSID version information and LSID validity information. In addition, LSID may include a transport session through which the LCT transport session information is transmitted. The transport session information may include TSI information for identifying the transport session, source flow information that is transmitted to the corresponding TSI and provides information regarding a source flow needed for source data transmission, repair flow information that is transmitted to the corresponding TSI and provides information regarding a repair flow needed for transmission of repair data, and transport session property information including additional characteristic information of the corresponding transport session.

Transport Object Identifier field (TOI) is a unique ID of the object. The TOI indicates which object within the session this packet pertains to. This field indicates to which object within this session the payload of the current packet belongs to. The mapping of the TOI field to the object is provided by the Extended FDT.

Extended FDT specifies the details of the file delivery data. This is the extended FDT instance. The extended FDT together with the LCT packet header may be used to generate the FDT-equivalent descriptions for the delivery object. The Extended FDT may either be embedded or may be provided as a reference. If provided as a reference the Extended FDT may be updated independently of the LSID. If referenced, it shall be delivered as in-band object on TOI=0 of the included source flow.

Header Extensions field may be used as an LCT header extension part for transmission of additional information. The Header Extensions are used in LCT to accommodate optional header fields that are not always used or have variable size.

For example, EXT_TIME extension is used to carry several types of timing information. It includes general purpose timing information, namely the Sender Current Time (SCT), Expected Residual Time (ERT), and Sender Last Change (SLC) time extensions described in the present document. It can also be used for timing information with narrower applicability (e.g., defined for a single protocol instantiation); in this case, it will be described in a separate document.

FEC Payload ID field may include ID information of Transmission Block or Encoding Symbol. FEC Payload ID may indicate an ID to be used when the above file is FEC-encoded. For example, if the FLUTE protocol file is FEC-encoded, FEC Payload ID may be allocated for a broadcast station or broadcast server configured to identify the FEC-encoded FLUTE protocol file.

Encoding Symbol(s) field may include Transmission Block or Encoding symbol data.

The packet payload contains bytes generated from an object. If more than one object is carried in the session, then the Transmission Object ID (TOI) within the LCT header MUST be used to identify from which object the packet payload data is generated.

The LCT packet according to the embodiment may include Real Time Support Extension field (EXT_RTS) corresponding to an extension format of a Header Extensions field. EXT_RTS may include segmentation generation and consumption information of the file, and will hereinafter be referred to as fragment information. The LCT packet according to the embodiment includes EXT_RTS corresponding to an extension format of the Header Extensions field, and may support real-time file transmission and consumption information using a method compatible with the legacy LCT.

The fragment information (EXT_RTS) according to the embodiment may include Header Extension Type field (HET), Fragment Start Indicator field (SI), Fragment Header flag field (FH), and Fragment Header Complete Indicator field (FC).

Header Extension Type field (HET) may indicate the corresponding Header Extension type. The HET field may be an integer of 8 bits. Basically, if HET for use in LCT is in the range of 0 to 127, a variable-length header extension in units of a 32-bit word is present, and the length of HET is written in the Header Extension Length field (HEL) subsequent to HET. If HET is in the range of 128 to 255, Header Extension may have a fixed length of 32 bits.

The fragment information (EXT_RTS) according to the embodiment has a fixed length of 32 bits, such that the corresponding Header Extension type may be identified using one unique value from among the values of 128 to 255, and may identify the corresponding Header Extension type.

SI field may indicate that the corresponding 1CT packet includes a start part of the fragment. If a user in the broadcast environment approaches a random access of a file through which the corresponding file-based multimedia content is transmitted, packets having "SI field=0" from among the initial reception packets are discarded, the packets starting from a packet having "SI field=1" starts parsing, so that the packet processing efficiency and the initial delay time can be reduced.

FH field may indicate that the corresponding LCT packet includes the fragment header part. As described above, the fragment header is characterized in that a generation order and a consumption order of the fragment header are different from those of the fragment payload. The broadcast signal reception apparatus according to the embodiment may rearrange transmission blocks sequentially received on the basis of the FH field according to the consumption order, so that it can regenerate the fragment.

FC field may indicate that the corresponding packet includes the last data of the fragment. For example, if the fragment header is transmitted after the fragment payload is first transmitted, the FC field may indicate inclusion of the last data of the fragment header. If the fragment header is first transmitted and the fragment payload is then transmitted, the FC field may indicate inclusion of the last data of the fragment payload. The following description will hereinafter disclose an exemplary case in which the fragment payload is first transmitted and the fragment is then transmitted.

If the broadcast signal reception apparatus receives the packet having "FC field=1", the broadcast signal reception apparatus may recognize reception completion of the fragment header, and may perform fragment recovery by combining the fragment header and the fragment payload.

Padding Bytes field (PB) may indicate the number of padding bytes contained in the corresponding LCT packet. In the legacy LCT, all LCT packets corresponding to one object must be identical to each other. However, when a transmission block (TB) is divided according to the data construction method, the last symbol of each TB may have a different length. Therefore, the broadcast signal transmission apparatus according to the embodiment fills a residual part of the packet with padding bytes, such that it can support the real-time file transmission using a fixed-length packet according to the method compatible with the legacy LCT.

Reserved field reserved for future use.

FIG. 45 illustrates a structure of an LCT packet according to an embodiment of the present invention.

Some parts of FIG. 45 are substantially identical to those of FIG. 44, and as such a detailed description thereof will herein be omitted, such that FIG. 45 will hereinafter be described centering on a difference between FIG. 44 and FIG. 45.

Referring to FIG. 45, fragment information (EXT_RTS) according to an embodiment may include a Fragment Header Length field (FHL) instead of the FC field shown in FIG. 44.

FHL field indicates the number of constituent symbols of the fragment, so that it can provide specific information as to whether reception of the fragment is completed. The FHL field may indicate a total number of symbols corresponding to respective fragments including the fragment header and the fragment payload. In addition, the FHL field may indicate a total number of symbols to be transmitted later from among the fragment header and the fragment payload.

For example, if the fragment payload is first transmitted and the fragment header is then transmitted, the FHL field may indicate a total number of symbols corresponding to the fragment header. In this case, the FHL field may indicate the length of the fragment header.

If the fragment header is first transmitted and the fragment payload is then transmitted, the FHL field may indicate a total number of symbols corresponding to the fragment payload. In this case, the FHL field may indicate the length of the fragment payload.

The following description will hereinafter disclose an exemplary case in which the fragment payload is first transmitted and the fragment header is then transmitted.

The broadcast signal reception apparatus according to an embodiment may receive the LCT packet including the fragment header corresponding to the number of symbols displayed on the FHL field. The broadcast signal reception apparatus checks the number of reception times of the LCT packet including the fragment header, so that it can identify reception completion of the fragment header. Alternatively, the broadcast signal reception apparatus checks the number of TBs corresponding to the fragment header, so that it can identify reception completion of the fragment header.

FIG. 43 is a diagram illustrating a structure of a packet including object type information according to another embodiment of the present invention.

In addition to the aforementioned method, the object type information can identify a type of an object that is transmitted in a current packet using LCT header extension. The object type information using LCT header extension can be applied to a packet, etc. for a transport protocol such as a realtime protocol (RTP), etc.

The object type information may include a header extension type (HET) field, a type field, and/or a reserved field.

The HET field may be an 8-bit integer and may indicate a type of the corresponding header extension. For example, the HET field may be one characteristic value among values of 128 to 255 and may identify a type of the corresponding header extension. In this case, the header extension may have a fixed length of 32 bits.

The type field may indicate a type of an object that is transmitted in a current LCT packet or packets to which the same TOI is applied. Hereinafter, the type field may be represented by object type information. When MPEG-DASH content is transmitted in the LCT packet, the object type may include the regular file, initialization segment, media segment, and self-initializing segment according to a value of the object type information.

For example, when a value of the object type information is "0x00", the object type may indicate "regular file", when a value of the object type information is "0x01", the object type may indicate "initialization segment", when a value of the object type information is "0x10", the object type may indicate "media segment", and when a value of the object type information is "0x11", the object type may indicate "self-initializing segment".

The reserved field is reserved for future use.

Hereinafter, a detailed description for FIG. 43 is the same as in the above detailed description, and thus will be omitted herein.

Figures 46, 47:
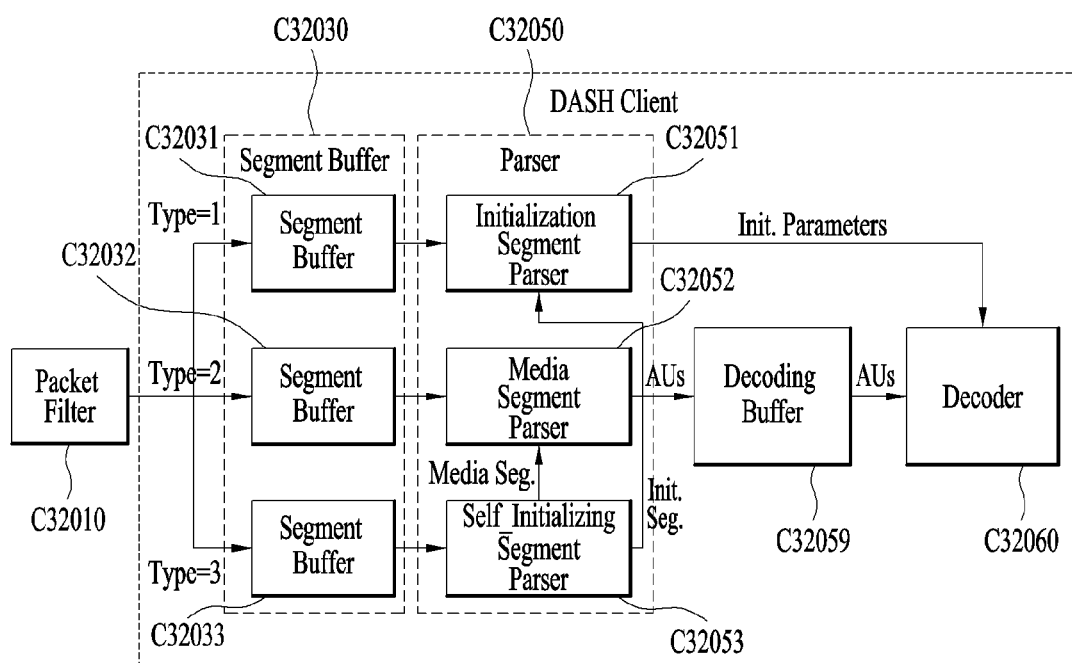
FIG. 46 is a diagram illustrating a structure of a packet including object type information according to another embodiment of the present invention.
FIG. 47 is a diagram illustrating a structure of a broadcast signal receiving apparatus using object type information according to another embodiment of the present invention.

FIG. 47 is a diagram illustrating a structure of a broadcast signal receiving apparatus using object type information according to another embodiment of the present invention.

The broadcast signal receiving apparatus may include a packet filter C32010, a segment buffer C32030, the parser C32050, a decoding buffer C32059, and/or the decoder C32060.

The packet filter C32010 may identify the object type information from at least one received packet and classify the object type information so as to perform a procedure corresponding to each object type based on the object type information.

For example, when the object type information is "1", the packet filter C32010 may transmit data of an LCT packet to the initialization segment parser C32051 through a segment buffer C32031, when the object type information is "2", the packet filter C32010 may transmit data of an LCT packet to the media segment parser C32052 through a segment buffer C32032, when the object type information is "3", the packet filter C32010 may transmit data of an LCT packet to the self-initializing segment parser C32053 through a segment buffer C32033.

The segment buffer C32030 may receive data of an LCT packet from a packet filter and store the data for a predetermined period of time. The segment buffer C32030 may be present as one component or a plurality of segment buffers C32031, C32032, and C32033.

The parser C32050 may parse at least one object based on the object type information and generate initialization information for access to representation and at least one access unit. To this end, the parser C32050 may include the initialization segment parser C32051, the media segment parser C32052, and/or the self-initializing segment parser C32053.

The initialization segment parser C32051 may parse initialization segment stored in the segment buffer C32031 and generate initialization information for access to representation. In addition, the initialization segment parser C32051 may receive initialization segment from the self-initializing segment parser C32053 and generate initialization information for access to representation.

The media segment parser C32052 may parse media segment stored in the segment buffer C32032 and generate information about media stream, at least one access unit, and information about a method for access to media presentation in the corresponding segment, such as presentation time or Index. In addition, the media segment parser C32052 may receive media segment from the self-initializing segment parser c32053 and generate information of media stream, at least one access unit, and information about a method for access to media presentation in the corresponding segment, such as presentation time or index.

The self-initializing segment parser C32053 may parse self-initializing segment stored in the segment buffer c32033 and generate initialization segment and media segment.

The decoding buffer C32059 may receive at least one access unit from the parser C32050 or the media segment parser C32052 and store the access unit for a predetermined period of time.

The decoder C32060 may initialize the corresponding decoder C32060 based on the initialization information. In addition, the decoder C32060 may decode at least one object. In this case, the decoder C32060 may receive information about an object in the form of at least one access unit and may decode at least one access unit to generate media data.

As described above, upon transmitting MPEG-DASH content, a broadcast signal transmitting apparatus according to another embodiment of the present invention may transmit object type information indicating a type of an object that is transmitted in a current packet. In addition, the broadcast signal transmitting apparatus may identify a type of an object in a packet received based on the object type information and perform an appropriate process on each object.

FIG. 48 is a diagram illustrating a structure of a packet including type information according to another embodiment of the present invention.

Upon transmitting data in an object internal structure unit as an independently meaningful unit, a broadcast signal transmitting apparatus may transmit data with a variable size. Thus, upon receiving and identifying an object internal structure even prior to receiving one entire object, a broadcast signal receiving apparatus may perform reproduction in an object internal structure unit. As a result, multimedia content may be transmitted and reproduced through a broadcast network in real time. According to another embodiment of the present invention, in order to identify an object internal structure, Type information and Boundary Information may be used.

Hereinafter, type information for identification of an object internal structure will be described in detail.

During transmission of MPEG-DASH content, packet information may include type information using LCT header extension. The type information may indicate a type of an object internal structure that is transmitted in a current packet. The type information may be referred to as internal structure type information for differentiation from object type information. The type information can be applied to a packet, etc. for a transport protocol such as realtime protocol (RTP), etc.

The type information may include a header extension type field (HET), an internal unit type field, and/or a reserved field.

The HET field is the same as in the above description and thus a detailed description thereof is omitted herein.

The internal structure type field may indicate a type of an object internal structure transmitted in an LCT packet.

An object may correspond to a segment of MPEG-DASH and an object internal structure may correspond to a lower component included in the object. For example, a type of the object internal structure may include fragment, chunk or GOP, an access unit, and a NAL unit. The type of the object internal structure may not be limited thereto and may further include meaningful units.

The fragment refers to a data unit that can be independently decoded and reproduced without dependence upon preceding data. Alternatively, the fragment may refer to a data unit including one pair of movie fragment box (moof) and media data container box (mdat). For example, the fragment may correspond to subsegment of MPEG-DASH or correspond to a fragment of MMT. The fragment may include at least one chunk or at least one GOP.

The chunk is a set of adjacent samples with the same media type and is a data unit with a variable size.

GOP is a basic unit for performing coding used in video coding and is a data unit with a variable size indicating a set of frames including at least one I-frame. According to another embodiment of the present invention, media data is transmitted in an object internal structure unit as an independently meaningful data unit, and thus GOP may include Open GOP and Closed GOP.

In Open GOP, B-frame in one GOP may refer to I-frame or P-frame of an adjacent GOP. Thus, Open GOP can seriously enhance coding efficiency. In Closed GOP, B-frame or P-frame may refer to only a frame in the corresponding GOP and may not refer to frames in GOPs except for the corresponding GOP.

The access unit may refer a basic data unit of encoded video or audio and include one image frame or audio frame.

The NAL unit is an encapsulated and compressed video stream including summary information, etc. about a slice compressed in consideration of communication with a network device. For example, the NAL unit is a data unit obtained by packetizing data such as a NAL unit slice, a parameter set, SEI, etc. in a byte unit.

The reserved field may be reserved for future use.

Hereinafter, for convenience of description, the internal structure type field may be represented by type information.

FIG. 49 is a diagram illustrating a structure of a packet including boundary information according to another embodiment of the present invention.

Hereinafter, boundary information for identification of an object internal structure will be described in detail.

During transmission of MPEG-DASH content, packet information may include boundary information using LCT header extension. The boundary information may indicate a boundary of an object internal structure that is transmitted in a current packet. The boundary information can be applied to a packet, etc. for a transport protocol such as a realtime protocol (RTP), etc.

The boundary information may include a header extension type field (HET), a start flag field (SF), a reserved field, and/or an offset field.

The HET field is the same as in the above description and thus is not described in detail.

The start flag field (SF) may indicate that an LCT packet includes a start point of an object internal structure.

The reserved field may be reserved for future use.

The offset field may include position information indicating a start point of the object internal structure in an LCT packet. The position information may include a byte distance to the start point of the object internal structure from a payload start point of the LCT packet.

As described above, a broadcast signal transmitting apparatus may not transmit data in object units based on type information and boundary information and may transmit data in an object internal structure unit with a variable length.

A broadcast signal receiving apparatus may not receive and reproduce data in object units and may receive and reproduce data in an object internal structure unit with a variable length. Thus, the broadcast signal receiving apparatus may identify the object internal structure based on type information and boundary information and perform reproduction for each received object internal structure.

For example, the broadcast signal receiving apparatus may identify a type of a current object internal structure based on packets corresponding to start and end points of the object internal structure represented by the boundary information or type information included in at least one packet transmitted between the start and end points.

As a result, the broadcast signal receiving apparatus may rapidly identify the object internal structure and perform reproduction in real time even prior to receiving one entire object.

FIG. 50 is a diagram illustrating a structure of a packet including mapping information according to another embodiment of the present invention.

According to another embodiment of the present invention, an object internal structure can be identified using mapping information in addition to the aforementioned type information and boundary information.

During transmission of DASH content, the packet information may include the mapping information using LCT header extension. The mapping information maps at least one of a session transmitted in a current packet, an object and an object internal structure to at least one of a transport session identifier (TSI) and a transport object identifier (TOI). The mapping information may be used in a packet, etc. for a transport protocol such as a realtime protocol (RTP), etc.

According to an embodiment of the present invention, mapping information may include a header extension type field (HET), a header extension length field (HEL), and a uniform resource locator field (URL).

The HET field is the same as in the above description and is not described in detail.

The HEL field indicates an overall length of LCT header extension with a variable length. Basically, when HET has a value between 0 and 127, header extension with a variable length of a 32-bit word unit in LCT, and the HEL field subsequent to the HET field indicates an overall length of LCT header extension in a 32-bit word unit.

The URL field may be a variable field and may include a session for current transmission, an object, and a unique address on the Internet of an object internal structure.

Hereinafter, for convenience of description, the URL field may be represented via mapping information.

The mapping information may indicate URL of signaling information. In addition, the mapping information may include an identifier allocated by the signaling information as well as a session, an object, or a unique address of an object internal structure. The identifier may include a period ID, an adaptation set ID, a representation ID, and a component ID. Accordingly, in the case of MPEG-DASH content, the mapping information may include a segment URL, a representation ID, a component ID, an adaptation set ID, a period ID, etc.

For more perfect mapping, signaling information according to another embodiment of the present invention may further include mapping information for mapping URL of an object or identifier to TOI or TSI. That is, the signaling information may further include a portion of the URL of the object or identifier, to which currently transmitted TOI and TSI are mapped. In this ca se, the mapping information may be information for mapping the URL of the object or identifier to TOI or TSI according to one of 1:1, 1:multi, and multi:1.

FIG. 51 is a diagram illustrating a structure of an LCT packet including grouping information according to another embodiment of the present invention.

According to another embodiment of the present invention, in addition to the aforementioned method, an object internal structure can be identified using the grouping information.

An LCT packet according to another embodiment of the present invention may include a session group identifier field (SGI) and a divided transport session identifier field (DTSI). SGI and DTSI are the form obtained by splitting a legacy transport session identifier field (TSI).

An LCT packet according to another embodiment of the present invention may include an object group identifier field (OGI) and a divided transport object identifier field (DTOI). OGI and DTOI are the form obtained by splitting a legacy transport object identifier field (TOI).

The S field indicates a length of a legacy TSI field, the O field indicates a length of a legacy TOI, and the H field indicates whether half-word (16 bits) is added to a length of a legacy TOI field and legacy TSI field.

Accordingly, the sum of lengths of the SGI field and DTSI field may be the same as a legacy TSI field and may be determined based on values of the S field and H field. In addition, the sum of lengths of the OGI field and DTOI field may be the same as a legacy TOI field and may be determined based on values of the O field and H field.

According to another embodiment of the present invention, the legacy TSI and TOI may be subdivided into SGI, DTSI, OGI, and DTOI, and SGI, DTSI, OGI, and DTOI may identify different data units.

SGI, DTSI, OGI, and DTO will be described in detail with reference to the next diagram.

Figure 52:
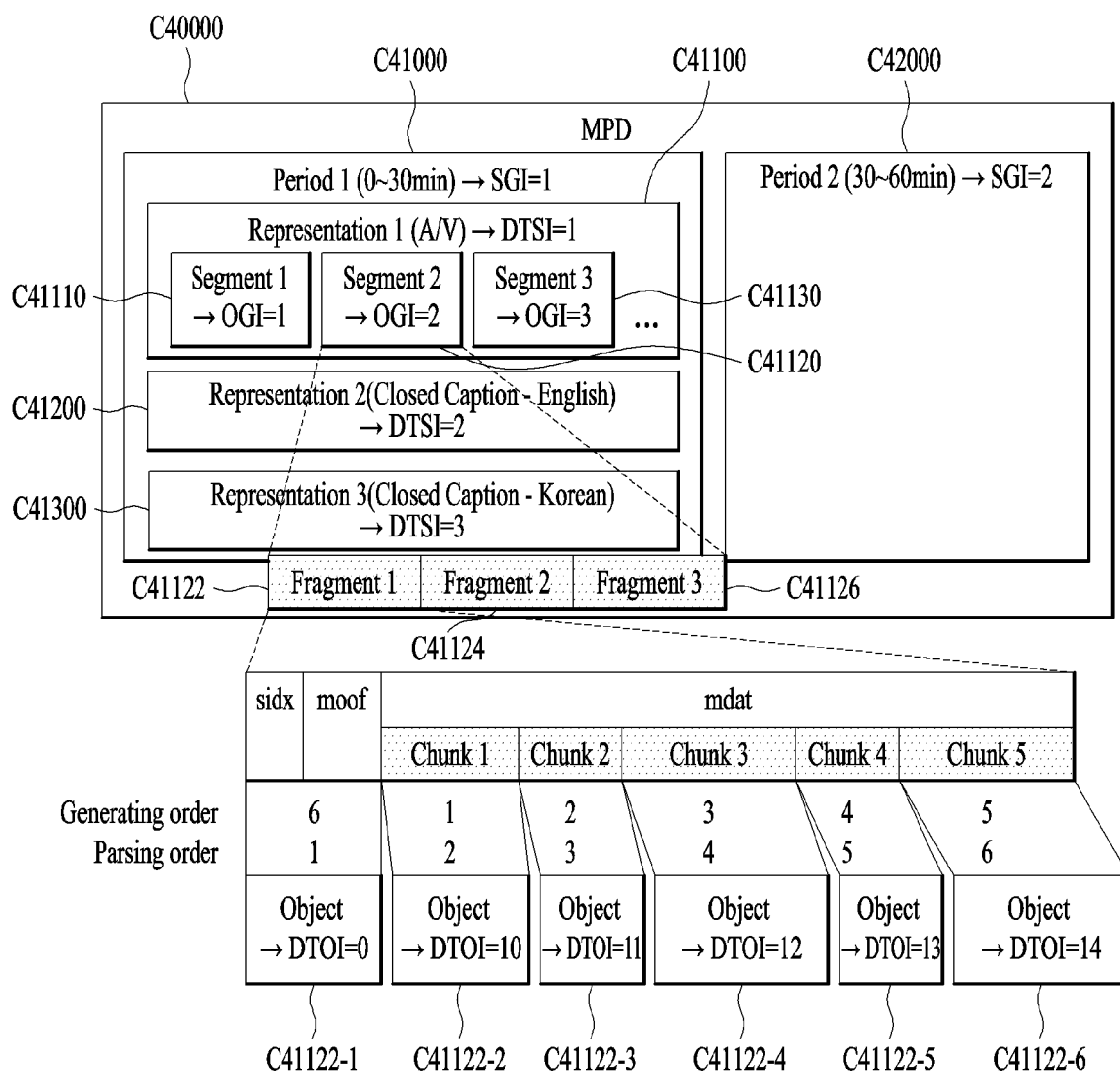
FIG. 52 is a diagram illustrating grouping of a session and an object according to another embodiment of the present invention.

FIG. 52 is a diagram illustrating grouping of a session and an object according to another embodiment of the present invention.

Media presentation description (MPD) is an element for providing MPEG-DASH content as a streaming service.

Media presentation description (MPD) is an element for providing MPEG-DASH content as a streaming service. For example, the aforementioned presentation may be the concept of one service and may correspond to a package of MMT and MPD of MPEG-DASH. MPD C40000 may include at least one period. For example, the MPD C40000 may include a first period C41000 and a second period C42000.

The Period is an element obtained by dividing MPEG-DASH content according to reproduction time. An available bit rate, a language, a caption, a subtitle, etc. may not be changed in the period. Each period may include start time information and periods may be arranged in ascending order of a start time in MPD. For example, the first period C41000 is an element in a period of 0 to 30 min, and the second period C42000 is an element in a period of 30 to 60 min. A period may include at least one adaptationset (not shown) as a lower element.

The adaptationset is a set of at least one media content component of an interchangeable encoded version. The adaptationset may include at least one Representation as a lower element. For example, The adaptationset may include first representation C41100, second representation C41200, and third representation C41300.

Representation may be an element of a transmissible encoded version of at least one media content component and may include at least one media stream. A media content component may include a video component, an audio component, and a caption component. Representation may include information about quality of the media content component. Thus, a broadcast signal receiving apparatus may change representation in one adaptationset in order to adapt to a network environment.

For example, first representation C41100 may be a video component with a frequency bandwidth of 500 kbit/s, second representation C41200 may be a video component with a frequency bandwidth of 250 kbit/s, and third representation C41300 may be a video component with a frequency bandwidth of 750 kbit/s. Representation may include at least one segment as a lower element. For example, the first representation C41100 may include a first segment C41110, a second segment C41120, and a third segment C41130.

Segment is an element with a greatest data unit, which can be retrieved according to one HTTP request. URL may be provided to each segment. For example, the aforementioned object may be the concept corresponding to a file, initialization segment, media segment, or self-initializing segment, may correspond to a segment of MPEG-DASH, and may correspond to MPU of MMT. Each Segment may include at least one fragment as a lower element. For example, the second segment C41120 may include a first fragment C41122, a second fragment C41124, and a third fragment C41126.

Fragment refers to a data unit that can be independently decoded and reproduced without depending upon preceding data. For example, Fragment may correspond to subsegment of MPEG-DASH and fragment of MMT. Fragment may include at least one chunk or at least one GOP. For example, the first fragment C41122 may include a fragment header and a fragment payload. The fragment header may include a segment index box (sidx) and a movie fragment box (moof). The fragment payload may include a media data container box (mdat). The media data container box (mdat) may include first to fifth Chunks.

The chunk is a set of adjacent samples having the same media type and is a data unit with a variable size.

According to the aforementioned embodiment of the present invention, TSI may identify a transport session, and each representation may be mapped to each TSI. In addition, TOI may identify a transport object in a transport session and each segment may be mapped to each TOI.

However, according to another embodiment of the present invention, TSI may be divided into GSI and DTSI, TOI is divided into OGI and DTOI, and GSI, DTSI, GOI, and DTOI may be mapped to respective new data units, which is not limited to the following embodiment of the present invention.

For example, SGI may identify a group of the same transport session and each period may be mapped to each SGI. A value of SGI of a first period C41000 may be mapped to "1" and a value of SGI of a second period C42000 may be mapped to "2". The value of SGI may not be limited to the aforementioned embodiment and may have the same value as period ID for identification of period.

DTSI may identify a transport session and each representation may be mapped to each DTSI. A value of DTSI of the first representation C41100 may be mapped to "1", a value of DTSI of the second representation C41200 may be mapped to "2", and a value of the DTSI of the third representation C41300 may be mapped to "3". The value of DTSI may not be limited to the aforementioned embodiment and may have the same value as a representation ID for identification of representation.

OGI may identify a group of the same object in a transport session and each Segment may be mapped to each OGI. A value of OGI of the first segment C41110 may be mapped to "1", a value of OGI of the second segment C41120 may be mapped to "2", and a value of OGI of the third segment C41130 may be mapped to "3".

DTOI may identify a delivery object. One delivery object may be one ISO BMFF file or a part of one ISO BMFF file. The part of one ISO BMFF file may include a GOP, a chunk, an access unit and/or an NAL unit.

For example, a fragment header, and each chunk or each GOP of a fragment payload may be mapped to each DTOI. A value of DTOI of a header of the first fragment C41122 may be mapped to "0" and values of DTOI of first to fifth chunks in a payload of the first fragment C41122 may be mapped to "10" to "14".

In the case of DTOI, usage may be defined according to a given value. For example, a DTOI value may be set in an ascending order or a descending order according to an arrangement order of objects. In this case, a broadcast signal receiving apparatus may re-arrange objects based on a DTOI value and generate a fragment or a segment. In addition, a specific DTOI value may indicate a fragment header. In this case, the broadcast signal transmitting apparatus or the broadcast signal receiving apparatus may determine whether a fragment header is completely transmitted based on the corresponding DTOI value.

If a delivery object means one segment, a group of delivery objects may correspond to a content component such as DASH representation. In this case, DTIO may be mapped to a segment and OGI may be mapped to representation. For example, OGI may be mapped to a representation ID, a content component ID, etc. in one-to-one correspondence and may be used as information for multiplexing/demultiplexing content components transmitted within one session.

Figure 53:
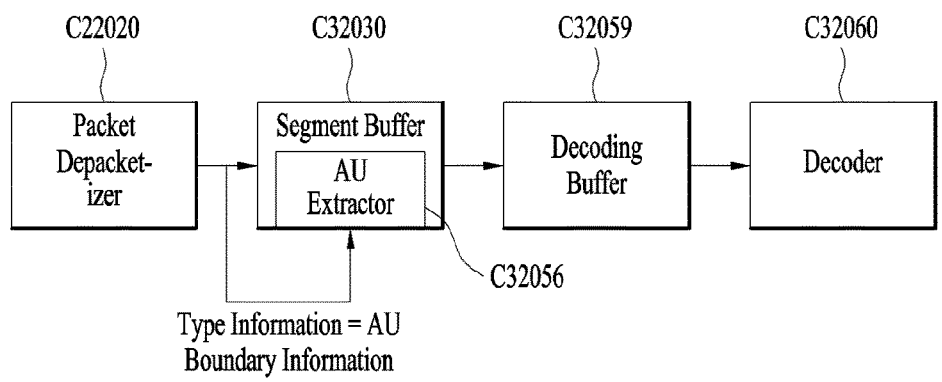
FIG. 53 is a diagram illustrating a structure of a broadcast signal receiving apparatus using packet information according to another embodiment of the present invention.

FIG. 53 is a diagram illustrating a structure of a broadcast signal receiving apparatus using packet information according to another embodiment of the present invention.

Hereinafter, an operation and configuration of a broadcast signal receiving apparatus when a type of an object internal structure is an access unit will be described.

The broadcast signal receiving apparatus may further include a packet depacketizer C22020, a segment buffer C32030, an AU extractor C32056, a decoding buffer C32059, and/or a decoder C32060.

The packet depacketizer C22020 may depacketize at least one packet and extract packet information contained in a packet header. For example, the packet depacketizer C22020 may extract type information and boundary information included in the packet header and extract at least one symbol included in a packet payload. At least one symbol may be a symbol included in the object internal structure or a symbol included in an object.

The packet depacketizer C22020 may transmit the at least one extracted object or the at least one extracted object internal structure to the decoder C32060.

The segment buffer C32030 may receive packet of an LCT packet from the packet depacketizer C22020 and store the data for a predetermined period of time. The segment buffer C32030 may be repeated by an object buffer C32030. The segment buffer C32030 may further include the AU extractor C32056, a chunk extractor (not shown), and/or a fragment extractor (not shown). In addition, the segment buffer C320300 may further include a fragment buffer (not shown) and/or a chunk buffer (not shown).

When type information indicates that the type of the object internal structure is an access unit, the segment buffer C32030 may include the AU extractor C32056. However, the present invention is not limited thereto, and the AU extractor C32056 may be present independently from the segment buffer C32030.

The AU extractor C32056 may extract the access unit stored in the segment buffer C32030 based on boundary information. For example, one access unit may be from a start point of the access unit indicated by the boundary information to a start point of the next access unit.

Then the AU extractor C32056 may transmit the extracted access unit to the decoder C32060 through the decoding buffer C32059.

As described above, even if the broadcast signal receiving apparatus does not receive one entire object, upon completely receiving an internal structure of the corresponding object based on the type information and boundary information, the AU extractor C32056 may immediately extract the object internal structure and may transmit the object internal structure to the decoder C32060.

The decoding buffer C32059 may receive data from the segment buffer C32030 and store the data for a predetermined period of time. The access unit may be transmitted to the decoder C32060 or another component for a processing time given to the access unit in the decoding buffer C32059. In this case, timing information about the processing time such as a presentation time stamp (PTS), etc. may be given to the access unit in the form of LCT header extension.

The decoder C32060 may receive the object internal structure and decode the corresponding object internal structure based on the type information. In this case, the decoder C32060 may receive the corresponding object internal structure in the form of an access unit as well as in the form of object internal structure.

When type information indicates that the type of the object internal structure is an access unit, the decoder C32060 may decode the corresponding access unit as an internal structure of the corresponding object even prior to receiving an entire corresponding object.

Figure 54:
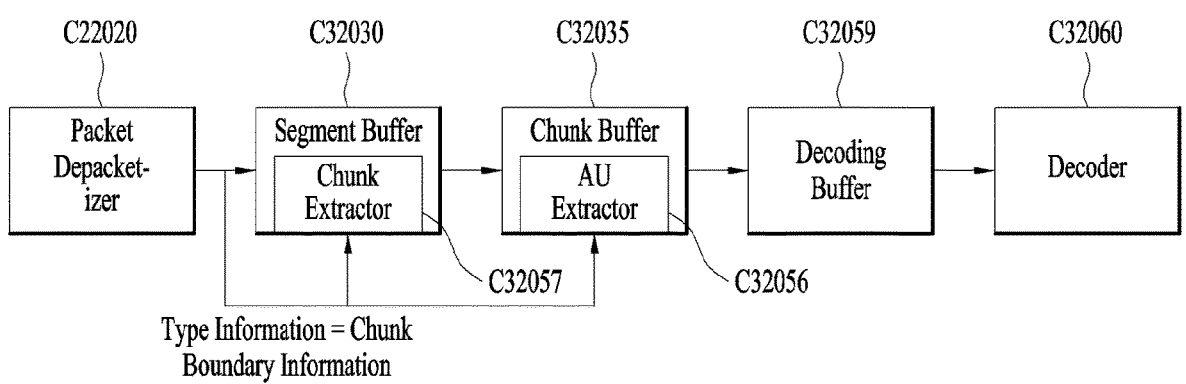
FIG. 54 is a diagram illustrating a structure of a broadcast signal receiving apparatus using packet information according to another embodiment of the present invention.

FIG. 54 is a diagram illustrating a structure of a broadcast signal receiving apparatus using packet information according to another embodiment of the present invention.

The same components as the aforementioned components among the components illustrated in the diagram are the same as in the above description, and thus a detailed description thereof will be omitted herein.

Hereinafter, an operation and configuration of a broadcast signal receiving apparatus when a type of an object internal structure is chunk or GOP will be described. The broadcast signal receiving apparatus may further include a packet depacketizer C22020, a segment buffer C32030, a chunk buffer C32035, a decoding buffer C32059, and/or a decoder C32060.

The packet depacketizer C22020 may transmit at least one extracted object or at least one object internal structure to the decoder C32060 through the segment buffer C32030.

The segment buffer C32030 may include the chunk extractor C32057. In addition, the segment buffer C32030 may further include the chunk buffer C32035.

When type information indicates that the type of the object internal structure is chunk or GOP, the chunk extractor C32057 may extract chunk or GOP stored in the segment buffer C32030 based on boundary information. For example, one chunk or GOP may be from a start point of the chunk or GOP indicated by the boundary information to a start point of the next chunk or GOP. The chunk extractor C32057 may be present in the segment buffer C32030 or independently.

The chunk buffer C32035 may receive at least one chunk or GOP and store the chunk or GOP for a predetermined period of time. The chunk buffer C32035 may be present in the segment buffer C32030 or independently. The chunk buffer C32035 may further include the AU extractor C32056.

The AU extractor C32056 may extract at least one access unit from the chunk or GOP stored in the chunk buffer C32035. Then the AU extractor C32056 may transmit the at least one extracted access unit to the decoder C32060 through the decoding buffer C32059.

When type information indicates that the type of the object internal structure is chunk or GOP, the decoder C32060 may decode the corresponding chunk or GOP as an internal structure of the corresponding object even prior to receiving an entire corresponding object.

Figure 55:
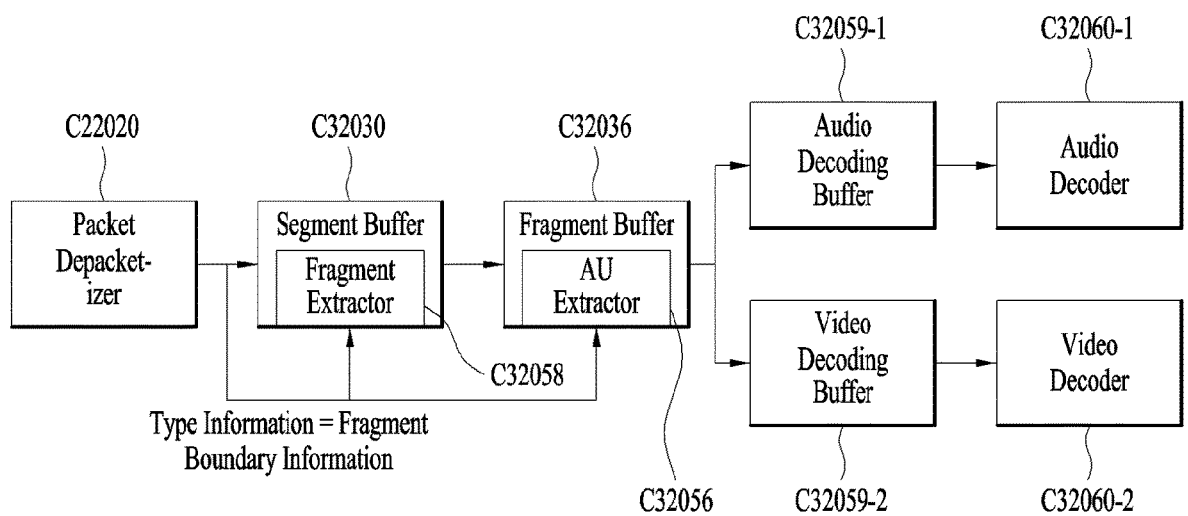
FIG. 55 is a diagram illustrating a structure of a broadcast signal receiving apparatus using packet information according to another embodiment of the present invention.

FIG. 55 is a diagram illustrating a structure of a broadcast signal receiving apparatus using packet information according to another embodiment of the present invention.

The same components as the aforementioned components among the components illustrated in the diagram are the same as in the above description, and thus a detailed description thereof will be omitted herein.

Hereinafter, an operation and configuration of a broadcast signal receiving apparatus when a type of an object internal structure is fragment will be described. The broadcast signal receiving apparatus may further include a packet depacketizer C22020, a segment buffer C32030, a fragment buffer C32036, an audio decoding buffer C32059-1, a video decoding buffer C32059-2, an audio decoder C32060-1, and/or a video decoder C32060-2.

The packet depacketizer C22020 may transmit at least one extracted object or at least one extracted object internal structure to the audio decoder C32060-1 and/or the video decoder C32060-2.

A segment buffer C320300 may include the fragment extractor C32058. In addition, the segment buffer C32030 may further include a fragment buffer C32036.

When the type information indicates that the type of the object internal structure is fragment, the fragment extractor C32058 may extract fragment stored in the segment buffer C320300. For example, one fragment may be from a start point of the fragment to a start point of the next fragment. The fragment extractor C32058 may be present in the segment buffer C32030 or independently.

The fragment buffer C32036 may receive fragment or store the fragment for a predetermined period of time. The fragment buffer C32036 may be present in the segment buffer C32030 or independently. The fragment buffer C32036 may further include the AU extractor C32056. In the fragment buffer C32036 may further include a chunk buffer (not shown).

The AU extractor C32056 may extract at least one access unit from fragment stored in the fragment buffer C32036. The AU extractor C32056 may be present in the fragment buffer C32036 or independently. In addition, the broadcast signal receiving apparatus may further include a chunk buffer (not shown), and the AU extractor C32056 may extract at least one access unit from chunk or GOP included in the chunk buffer. Then the AU extractor C32056 may transmit at least one extracted access unit to the audio decoder C32060-1 and/or the video decoder C32060-2.

The decoding buffer may include an audio decoding buffer C32059-1 and/or a video decoding buffer C32059-2. The audio decoding buffer C32059-1 may receive data associated with audio and store the data for a predetermined period of time. The video decoding buffer C32059-2 may receive data associated with video and store the data for a predetermined period of time.

When the type information indicates that the type of the object internal structure is fragment, the decoder may decode the corresponding fragment as an internal structure of the corresponding object even prior to receiving an entire corresponding object. The decoder may further include the audio decoder C32060-1 for decoding data associated with audio and/or the video decoder C32060-2 for decoding data associated with video.

As described above, the broadcast signal transmitting apparatus may not transmit data in an object unit and may transmit data in an object internal structure unit with a variable length. In this case, the broadcast signal transmitting apparatus may transmit the transmitted type information and boundary information of the object internal structure.

The broadcast signal receiving apparatus may not reproduce data in an object unit and may reproduce data in an object internal structure unit with a variable length. Accordingly, the broadcast signal receiving apparatus may identify an object internal structure based on the type information and boundary information and perform reproduction for each received object internal structure.

FIG. 56 is a diagram showing the structure of a packet including priority information according to another embodiment of the present invention.

The packet according to another embodiment of the present invention may be a ROUTE packet and the ROUTE packet may represent an ALC/LCT packet. Hereinafter, for convenience, the ROUTE packet and/or the ALC/LCT packet may be referred to as an LCT packet. The LCT packet format used by ROUTE follows the ALC packet format, i.e. the UDP header followed by the LCT header and the FEC Payload ID followed by the packet payload.

The LCT packet may include a packet header and a packet payload. The packet header may include metadata for the packet payload. The packet payload may include data of MPEG-DASH content.

For example, the packet header may include an LCT version number field (V), a Congestion control flag field (C), a Protocol-Specific Indication field (PSI), a Transport Session Identifier flag field (S), a Transport Object Identifier flag field (O), a Half-word flag field (H), a Close Session flag field (A), a Close Object flag field (B), an LCT header length field (HDR_LEN), a Codepoint field (CP), a Congestion Control Information field (CCI), a Transport Session Identifier field (TSI), a Transport Object Identifier field(TOI), a Header Extensions field, and/or an FEC Payload ID field.

In addition, the packet payload may include an Encoding Symbol(s) field.

For a detailed description of fields having the same names as the above-described fields among the fields configuring the LCT packet according to another embodiment of the present invention, refer to the above description.

The packet header may further include priority information (Priority) indicating priority of the packet payload. The priority information may use two bits located at twelfth and thirteenth bits from a start point of each packet to indicate the priority of the packet payload. In this case, since two bits are used, it is possible to decrease the size of the packet header and to increase efficiency.

The priority information (Priority) may indicate the priority of the packet payload transmitted using a current LCT packet among the LCT packets included in one file. That is, the priority information may indicate relative priority of the packet payload transmitted using a current LCT packet among packets having the same TSI or TOI.

For example, the priority information may have a value of 0 to 3. As the value of the priority information decreases, the priority of the packet payload increases in processing of total file-based media data. As the value of the priority information increases, the priority of the packet payload decreases.

TSI may identify an LCT transport session and TOI may identify a delivery object.

Each ROUTE session consists of one or multiple LCT transport sessions. LCT transport sessions are a subset of a ROUTE session. For media delivery, an LCT transport session would typically carry a media component, for example an MPEG-DASH Representation. From the perspective of broadcast MPEG-DASH, the ROUTE session can be considered as the multiplex of LCT transport sessions that carry constituent media components of one or more DASH Media Presentations. Within each LCT transport session, one or multiple Delivery Objects are carried, typically Delivery Objects that are related, e.g. MPEG-DASH Segments associated to one Representation. Along with each Delivery Object, metadata properties are delivered such that the Delivery Objects can be used in applications.

One delivery object may be one ISO BMFF file or a part of one ISO BMFF file. The part of one ISO BMFF file may include a fragment, a GOP, a chunk, an access unit and/or an NAL unit.

As one embodiment, one TSI may match one track (MPEG-DASH representation) and one TOI may match one ISO MBFF file. In addition, one ISO BMFF file may include "ftyp", "moov", "moof" and/or "mdat".

"ftyp" is a container including information about file type and compatibility. "moov" is a container including all metadata for reproducing media data. If media content is divided into at least one media datum within one file or if media content is divided into at least one file, "moof" is a container including metadata for each divided media data. "mdat" includes media data such as audio data and video data. "mdat" may include at least one "I-frame", "P-frame" and/or "B-frame".

An "I-frame" refers to a frame generated using a spatial compression technique only independent of the frames, instead of a temporal compression technique using previous and next frames of a corresponding frame in MPEG. Since the "I-frame" is directly coded and generated from an image, the "I-frame" is composed of inter blocks only and may serve as a random access point. In addition, the "I-frame" may be a criterion of a "P-frame" and/or "B-frame" generated by predicting temporal motion. Accordingly, since the "I-frame reduces an extra spatial element of a frame thereof to perform compression, the "I-frame" provides a low compression rate. That is, according to the result of compression, the number of bits may be greater than the number of bits of other frames.

The "P-frame" means a screen generated by predicting motion with respect to a later scene in MPEG. The "P-frame" is a screen obtained by referring to a latest "I-frame" and/or "B-frame" and predicting a next screen via inter-screen forward prediction only. Accordingly, the "P-frame" provides a relatively high compression rate.

The "B-frame" refers to a predicted screen generated by predicting bidirectional motion in detail from previous and/or next "P-frames" and/or "I-frames" in a temporally predicted screen. The "B-frame" is coded and/or decoded based on a previous "I-frame" and/or "P-frame", a current frame and/or a next "I-frame" and/or "P-frame". Accordingly, coding and/or decoding time delay occurs. However, the "B-frame" provides the highest compression rate and does not form the basis of coding and/or decoding of the "P-frame" and/or "I-frame" so as not to propagate errors.

As described above, the priorities of "ftyp", "moov", "moof" and/or "mdat" in one ISO BMFF file may be different. Accordingly, packets including "ftyp", "moov", "moof" and/or "mdat" have the same TSI and/or TOI but may have different priorities.

For example, the priority information of the packet including "ftyp" and "moov" has a value of "0", the priority information of the packet including "moof" has a value of "1", the priority information of the packet including the "I-frame" has a value of "1", the priority information of the packet including the "P-frame" has a value of "2" and/or the priority information of the packet including the "B-frame" has a value of "3".

The broadcast signal transmission apparatus may assign priorities for packet data processing in order of a packet including "ftyp" and "moov", a packet including "moof", a packet including an "I-Picture", a packet including a "P-Picture" and/or a packet including a "B-Picture", if MPEG-DASH segments including video data, such as advanced video coding (AVC)/high efficiency video coding (HEVC), are transmitted.

In addition, intermediate nodes such as a relay and/or a router over a network may preferentially transmit a packet having high priority and selectively transmit a packet having low priority, according to network bandwidth and service purpose. Accordingly, the priority information is easily applicable to various service states.

In addition, the broadcast signal transmission apparatus may preferentially extract a packet having high priority (that is, a packet having a low priority information value) and selectively extract a packet having low priority (that is, a packet having high priority information value), based on the priority information of "ftyp", "moov", "moof", "I-Picture", "P-Picture" and/or "B-Picture", when video data such as AVC/HEVC is received, thereby configuring one sequence. As a modified embodiment, the broadcast signal reception apparatus may selectively extract a sequence having a high frame rate and a sequence having a low frame rate.

FIG. 57 is a diagram showing the structure of a packet including priority information according to another embodiment of the present invention.

The packet according to another embodiment of the present invention may be an LCT packet and the LCT packet may include a packet header and a packet payload. The packet header may include metadata for the packet payload. The packet payload may include data of MPEG-DASH content.

For example, the packet header may include an LCT version number field (V), a Congestion control flag field (C), a Protocol-Specific Indication field (PSI), a Transport Session Identifier flag field (S), a Transport Object Identifier flag field(O), a Half-word flag field (H), a Close Session flag field (A), a Close Object flag field(B), an LCT header length field (HDR_LEN), a Codepoint field (CP), a Congestion Control Information field (CCI), a Transport Session Identifier field (TSI), a Transport Object Identifier field (TOI), a Header Extensions field, and/or an FEC Payload ID field.

In addition, the packet payload may include an Encoding Symbol(s) field.

For a detailed description of fields having the same names as the above-described fields among the fields configuring the LCT packet according to another embodiment of the present invention, refer to the above description.

The packet header may further include priority information (EXT_TYPE) indicating the priority of the packet payload. The priority information (EXT_TYPE) may use an LCT header extension to indicate relative priority of the packet payload transmitted using a current packet. If the LCT header extension is used, a broadcast signal reception apparatus which does not support the LCT header extension may skip the priority information (EXT_TYPE), thereby increasing extensibility. The priority information (EXT_TYPE) using the LCT header extension is applicable to a packet for a transmission protocol such as real-time protocol (RTP).

The priority information (EXT_TYPE) may include a header extension type (HET) field, a priority field and/or a reserved field. According to embodiments, the priority information (EXT_TYPE) may include the priority field only.

The HET field may be an integer having 8 bits and may indicate the type of the header extension. For example, the HET field may identify the type of the header extension using one unique value among values of 128 to 255. In this case, the header extension may have a fixed length of 32 bits.

The priority field may indicate the priority of the packet payload transmitted using a current LCT packet among the LCT packets included in one file. In addition, the priority field may indicate the relative priority of the packet payload transmitted using the current LCT packet among the packets having the same TSI or TOI.

For example, the priority information may have a value of 0 to 255. As the value of the priority information decreases, the priority of the packet payload increases in processing of file-based media data.

For example, the priority information of the packet including "ftyp" and "moov" has a value of "0", the priority information of the packet including "moof" has a value of "1", the priority information of the packet including the "I-frame" has a value of "2", the priority information of the packet including the "P-frame" has a value of "3" and/or the priority information of the packet including the "B-fame" has a value of "4".

The reserved field may be a field reserved for future use.

Hereinafter, the same description as the above description will be omitted.

Figure 58:
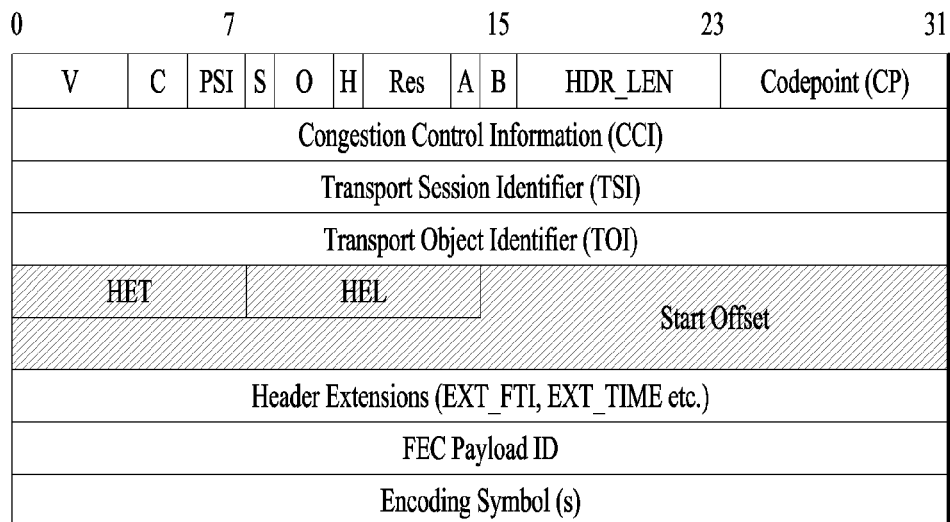
FIG. 58 is a diagram showing the structure of a packet including offset information according to another embodiment of the present invention.

FIG. 58 is a diagram showing the structure of a packet including offset information according to another embodiment of the present invention.

The packet according to another embodiment of the present invention may be an LCT packet and the LCT packet may include a packet header and a packet payload. The packet header may include metadata for the packet payload. The packet payload may include data of MPEG-DASH content.

For example, the packet header may include an LCT version number field (V), a Congestion control flag field (C), a Protocol-Specific Indication field (PSI), a Transport Session Identifier flag field (S), a Transport Object Identifier flag field (O), a Half-word flag field (H), a Reserved field (Res), a Close Session flag field (A), a Close Object flag field (B), an LCT header length field (HDR_LEN), a Codepoint field (CP), a Congestion Control Information field (CCI), a Transport Session Identifier field (TSI), a Transport Object Identifier field(TOI), a Header Extensions field, and/or an FEC Payload ID field.

In addition, the packet payload may include an Encoding Symbol(s) field.

For a detailed description of fields having the same names as the above-described fields among the fields configuring the LCT packet according to another embodiment of the present invention, refer to the above description.

The packet header may further include offset information. The offset information may indicate an offset within a file of the packet payload transmitted using a current packet. The offset information may indicate the offset in bytes from a start point of the file. The offset information may be in the form of LCT header extension and may be included in an FEC payload ID field.

As one embodiment, the case in which the LCT packet includes the offset information (EXT_OFS) in the form of LCT header extension will be described.

If the LCT header extension is used, the receiver which does not support LCT extension skips the offset information (EXT_OFS), thereby increasing extensibility. The offset information (EXT_OFS) using LCT header extension is applicable to a packet for a transport protocol such as real-time protocol (RTP).

The offset information (EXT_OFS) may include a header extension type (HET) field, a header extension length (HEL) field and a start offset (Start Offset) field only.

The HET field is equal to the above description and a detailed description thereof will be omitted.

The HEL field indicates the total length of LCT header extension having a variable length. Fundamentally, in LCT, if the HET has a value of 0 to 127, variable-length header extension of a 32-bit word unit exists and the HEL field following the HET field indicates the total length of LCT header extension in 32-bit word units.

The start offset field may have a variable length and indicate an offset within a file of the packet payload transmitted using the current packet. The start offset field may indicate the offset in bytes from the start point of the file.

The LCT packet may include the offset information (Start Offset) not only in the format of LCT header extension but also in an FEC payload ID field. Hereinafter, the case in which the LCT packet includes the offset information in the FEC payload ID field will be described.

The FEC Payload ID field contains information that indicates to the FEC decoder the relationships between the encoding symbols carried by a particular packet and the FEC encoding transformation. For example, if the packet carries source symbols, then the FEC Payload ID field indicates which source symbols of the object are carried by the packet. If the packet carries repair symbols, then the FEC Payload ID field indicates how those repair symbols were constructed from the object.

The FEC Payload ID field may also contain information about larger groups of encoding symbols of which those contained in the packet are part. For example, the FEC Payload ID field may contain information about the source block the symbols are related to.

The FEC Payload ID contains Source Block Number (SBN) and/or Encoding Symbol ID (ESI). SBN is a non-negative integer identifier for the source block that the encoding symbols within the packet relate to. ESI is a non-negative integer identifier for the encoding symbols within the packet.

The FEC payload ID field according to another embodiment of the present invention may further include offset information (Start Offset).

An FEC Payload ID field is used that specifies the start address in octets of the delivery object. The FEC Payload ID field may be sent in several ways.

An FEC Payload ID field is used that specifies the start address in octets of the delivery object. This information may be sent in several ways.

First, a simple new FEC scheme with FEC Payload ID set to size 0. In this case the packet shall contain the entire object as a direct address (start offset) using 32 bits.

Second, existing FEC schemes that are widely deployed using the Compact No-Code as defined in RFC 5445 in a compatible manner to RFC 6330 where the SBN and ESI defines the start offset together with the symbol size T.

Third, the LSID provides the appropriate signaling to signal any of the above modes using the @sourceFecPayloadID attribute and the FECParameters element.

Hereinafter, the offset information will be described in detail.

In a conventional FLUTE protocol, the offset information did not need to be transmitted. In the conventional FLUTE protocol, since an object (e.g., a file) is transmitted in non real time, one object was divided into at least one data having a fixed size and was transmitted.

For example, in the conventional FLUTE protocol, one object was divided into at least one source block having a fixed size, each source block was divided into at least one symbol having a fixed size, and a header was added to each symbol, thereby generating an LCT packet (or a FLUTE packet). In the conventional FLUTE protocol, one LCT packet may comprise only one fixed size symbol.

Since each source block and/or symbol has a fixed size, the receiver may recognize the position of each source block and/or symbol within the object based on identification information of the source block and/or symbol. Accordingly, the receiver may receive all source blocks and/or symbols configuring one object and then reconfigure the object based on the identification information of the received source blocks and/or symbols.

While the object is transmitted in non real time in the conventional FLUTE protocol, the object is divided into delivery objects each having a variable size and is transmitted in real time in delivery object units in a ROUTE protocol according to another embodiment of the present invention. For example, the ROUTE protocol may transmit the object on the basis of an object internal structure unit having a variable size.

One delivery object may be one ISO BMFF file or a part of one ISO BMFF file. The part of one ISO BMFF file may include a fragment, a GOP, a chunk, an access unit and/or an NAL unit. The part of one ISO BMFF field may mean the above-described object internal structure. The object internal object is an independently meaningful data unit and the type of the object internal structure is not limited thereto and may further include meaningful units.

In the LCT packet according to another embodiment of the present invention, each LCT packet (or ALC/LCT packet, ROUTE packet) may comprise at least one encoding symbol. In the ROUTE protocol according to another embodiment of the present invention, one LCT packet may comprise plural encoding symbols. And, each encoding symbol may be variable size.

In the LCT packet according to another embodiment of the present invention, each TSI may match each track. For example, each TSI may match one of a video track, an audio track and/or representation of MPEG-DASH. In addition, each TOI may be mapped to each delivery object. For example, if TOI is mapped to a segment of MPEG-DASH, the delivery object may be an ISO BMFF file. In addition, each TOI may be mapped to one of a fragment, a chunk, a GOP, an access unit and/or an NAL unit.

When the receiver receives LCT packets in real time on the basis of a delivery object unit having a variable size, the receiver may not recognize where the received LCT packets are located within the object. For example, when the receiver receives LCT packets in an arbitrary order, the receiver may not align the LCT packets in sequence and may not accurately restore and/or parse the delivery object.

Accordingly, the offset information according to another embodiment of the present invention may indicate the offset of the currently transmitted packet payload within the file (e.g., the object). The receiver may recognize that the currently transmitted packets have first data of the file based on the offset information. In addition, the receiver may recognize the order of the currently transmitted packets within the delivery object based on the offset information. In addition, the receiver may recognize the offset within the file of the packet payload currently transmitted by the packets and the offset within the file of the delivery object currently transmitted by the packets, based on the offset information.

For example, TSI may match video track (MPEG-DASH representation and TOI may match an ISO BMFF file (e.g., an object). In this case, the delivery object may represent an ISO BMFF file. One video track (MPEG-DASH representation, TSI=1) may include a first object (TSI=1, TOI=1) and a second object (TSI=1, TOI=2). The first object (TSI=1, TOI=1) may sequentially include a first packet (TSI=1, TOI=1, Start Offset=0), a second packet (TSI=1, TOI=1, Start Offset=200), a third packet (TSI=1, TOI=1, Start Offset=400), a fourth packet (TSI=1, TOI=1, Start Offset=800) and a fifth packet (TSI=1, TOI=1, Start Offset=1000).

In this case, if the value of the offset information (Start Offset) is "0", the packet payload of the packet may have first data of the file. Since the value of the offset information (Start Offset) of the first packet is "0", the receiver may recognize that the packet payload of the first packet has first data of the first object.

In addition, the value of the offset information (Start Offset) may indicate the order of packets within the object. Since the offset information sequentially increases from the first packet to the fifth packet within the first object, the receiver may recognize that the first packet to the fifth packet are sequentially arranged within the first object.

Accordingly, the receiver may sequentially align the received LCT packets within each object and accurately restore each delivery object and/or object based on the offset information. In addition, the receiver may accurately parse and/or decode each delivery object and/or object based on the offset information.

When the receiver receives the LCT packets in real time on the basis of a delivery object unit having a variable size, the receiver may not recognize where the received LCT packets are located within the object (e.g., the file). For example, if the LCT packets are transmitted in arbitrary sequence, the receiver may not accurately confirm the offset within the object of the received LCT packets and thus may not accurately restore the delivery object and/or object via collection of the LCT packets.

For example, TSI may match video track (MPEG-DASH representation) and TOI may match a chunk. In this case, one video track (MPEG-DASH representation, TSI=1) may include a first object (TSI=1) and a second object (TSI=1). In addition, the first object may include a first chunk (TSI=1, TOI=1), a second chunk (TSI=1, TOI=2) and/or a third chunk (TSI=1, TOI=3) and the second object may include a fourth chunk (TSI=1, TOI=4) and/or a fifth chunk (TSI=1, TOI=5).

The receiver may receive a first packet (TSI=1, TOI=1, Start Offset=0) including a first chunk, a second packet (TSI=1, TOI=2, Start Offset=200) including a second chunk, a third packet (TSI=1, TOI=3, Start Offset=1000) including a third chunk, a fourth packet (TSI=1, TOI=4, Start Offset=0) including a fourth chunk and a fifth packet (TSI=1, TOI=5, Start Offset=1000) including a fifth chunk. Although one packet includes one chunk in this description, one chunk may include at least one packet.

If TOI does not match an object (e.g., a file) but matches an object internal structure which is a data unit smaller than an object, the receiver may identify the object unless there is information for identifying the object.

Accordingly, the receiver may not accurately determine whether the received first packet, second packet and/or third packet belong to the first object or the second object using TSI and TOI only. In addition, the receiver may not determine whether the received fourth packet and/or fifth packet belong to the first object or the second object using TSI and TOI only.

That is, the receiver may identify that the first packet to the fifth packet are sequentially arranged based on TSI and TOI but may not identify whether the third packet belongs to the first object or the second object using TSI and TOI only. In addition, the receiver may identify that the fifth packet is a next packet of the third packet based on TSI and TOI but may not identify whether the fourth packet belongs to the first object or the second object using TSI and TOI only.

In this case, the receiver may not accurately restore the first object even when receiving the first packet, the second packet and/or the third packet. In addition, the receiver may not accurately restore the second object even when receiving the fourth packet and/or the fifth packet. As a result, the receiver may not reproduce content in real time.

Accordingly, the LCT packets according to another embodiment of the present invention provide offset information (Start Offset). The offset information may indicate the offset of the currently transmitted packet payload within the object. The receiver may identify the object internal structure and/or packets included in the same object based on the offset information.

If the value of the offset information is "0", the packet is a first packet of the object. That is, since the offset information of the first packet and the fourth packet is "0", the first packet and the fourth packet respectively belong to different objects and respectively indicate first packets of the respective objects. The receiver may identify that the first packet, the second packet and/or the third packet belong to the first object and the fourth packet and the fifth packet belong to the second object, based on the offset information as well as TSI and/or TOI.

Accordingly, the receiver identify where the received LCT packets are located within each object based on at least one of TSI, TOI and/or offset information and align the received LCT packets in sequence. For example, the receiver may align the packets such that the offset information and TOI sequentially increase.

Then, the receiver may identify a packet having offset information of "0" to a previous packet of a next packet having offset information of "0" using one object. The receiver may identify the delivery object and/or the object internal structure within one object based on TOI.

In addition, the receiver may accurately restore each delivery object and/or object.

In addition, the receiver may accurately parse and/or decode each delivery object and/or object based on at least one of TSI, TOI and/or offset information.

As described above, when the transmitter transmits data in object internal structure units as an independently meaningful unit, it is possible to transmit data with a variable size in real time. Accordingly, when the receiver receives and identifies the object internal structure even before completely receiving one object, the receiver may reproduce the object in object internal structure units. As a result, file (or object) based multimedia content may be transmitted and reproduced via a broadcast network in real time.

Figure 59:
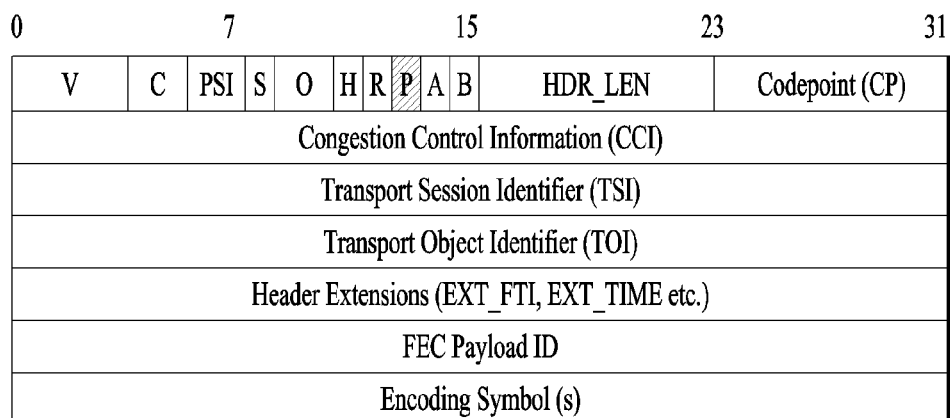
FIG. 59 is a diagram showing the structure of a packet including random access point (RAP) information according to another embodiment of the present invention.
Figure 62:
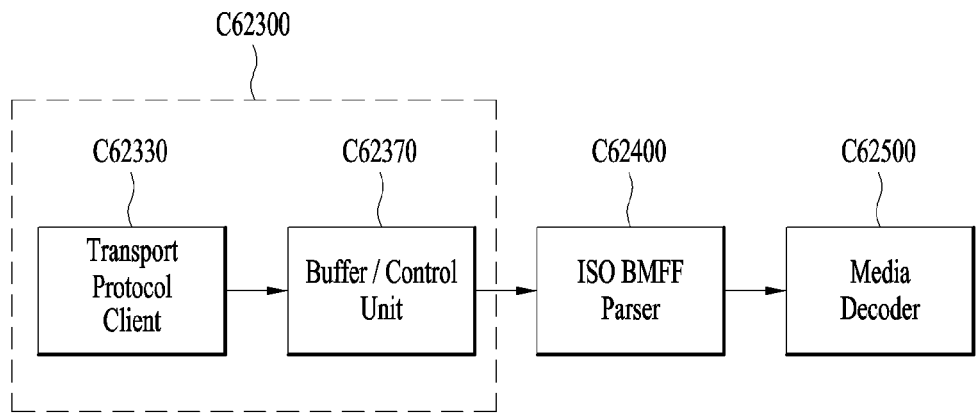
FIG. 62 is a diagram illustrating a structure of a broadcast signal receiving apparatus according to another embodiment of the present invention.

FIG. 59 is a diagram showing the structure of a packet including random access point (RAP) information according to another embodiment of the present invention.

The packet according to another embodiment of the present invention may be an LCT packet and the LCT packet may include a packet header and a packet payload. The packet header may include metadata for the packet payload. The packet payload may include data of MPEG-DASH content.

For example, the packet header may include an LCT version number field (V), a Congestion control flag field (C), a Protocol-Specific Indication field (PSI), a Transport Session Identifier flag field (S), a Transport Object Identifier flag field (O), a Half-word flag field(H), a Reserved field (Res), a Close Session flag field (A), a Close Object flag field (B), an LCT header length field (HDR_LEN), a Codepoint field(CP), a Congestion Control Information field (CCI), a Transport Session Identifier field (TSI), a Transport Object Identifier field (TOI), a Header Extensions field, and an FEC Payload ID field.

In addition, the packet payload may include an encoding symbol(s) field.

For a detailed description of fields having the same names as the above-described fields among the fields configuring the LCT packet according to another embodiment of the present invention, refer to the above description.

The packet header may further include random access point (RAP) information (P). The RAP information (P) may indicate whether data corresponding to the random access point (RAP) is included in the packet payload currently transmitted by the packet. The RAP information (P) may use one bit located at a twelfth or thirteenth bit from a start point of each packet to indicate whether the data corresponding to the random access point (RAP) is included in the packet payload currently transmitted by the packet. In this case, since one bit is used, it is possible to decrease the size of the packet header and to increase efficiency.

The random access point (RAP) may be encoded without referring to other frames and means a basic frame able to be randomly accessed. For example, an "I-frame" means a frame which is generated using a spatial compression technique only independently of other frames without a temporal compression technique using a previous frame and a subsequent frame of a corresponding frame in MPEG. Accordingly, since the "I-frame" is directly coded and generated from an image, the "I-frame" is composed of inter blocks only and may serve as a random access point.

The receiver may identify packets able to be randomly accessed from a packet sequence, which is being transmitted, based on the RAP information (P). For example, if the payload of the received packet includes data about the "I-frame", the RAP information (P) may indicate that the packet includes data corresponding to the random access point (RAP). In addition, if the payload of the received packet includes data about "B-frame" and/or "P-frame", the RAP information (P) may indicate that the packet does not include data corresponding to the random access point (RAP).

When the receiver sequentially receives GOP data starting from a specific time, if a first packet corresponds to an RAP such as "I-frame", the receiver may start decoding at that packet. However, if the first packet corresponds to a non-RAP such as "B-frame" and/or "P-frame", the receiver may not start decoding at that packet. In this case, the receiver may skip a packet corresponding to a non-RAP and start decoding at a next packet corresponding to an RAP such as "I-frame".

Accordingly, in channel tuning in a broadcast environment or in approaching an arbitrary point within a sequence according to a user request, since the receiver skips the packet which does not correspond to the RAP based on the RAP information (P) and starts decoding at the packet corresponding to the RAP, it is possible to increase packet reception and decoding efficiency.

FIG. 60 is a diagram showing the structure of a packet including random access point (RAP) information according to another embodiment of the present invention.

The packet according to another embodiment of the present invention may be an LCT packet and the LCT packet may include a packet header and a packet payload. The packet header may include metadata for the packet payload. The packet payload may include data of MPEG-DASH content.

For example, the packet header may include an LCT version number field (V), a Congestion control flag field (C), a Protocol-Specific Indication field (PSI), a Transport Session Identifier flag field (S), a Transport Object Identifier flag field (O), a Half-word flag field (H), a Reserved field (Res), a Close Session flag field (A), a Close Object flag field (B), an LCT header length field (HDR_LEN), a Codepoint field (CP), a Congestion Control Information field (CCI), a Transport Session Identifier field (TSI), a Transport Object Identifier field(TOI), a Header Extensions field, and an FEC Payload ID field.

In addition, the packet payload may include an encoding symbol(s) field.

The packet header may further include random access point (RAP) information (P).

For a detailed description of fields having the same names as the above-described fields among the fields configuring the LCT packet according to another embodiment of the present invention, refer to the above description.

The RAP information (P) may use one bit located at a sixth or seventh bit from a start point of each packet to indicate whether data corresponding to the random access point (RAP) is included in the packet payload currently transmitted by the packet. In this case, since one bit is used, it is possible to decrease the size of the packet header and to increase efficiency.

Since the packet according to another embodiment of the present invention includes the RAP information (P) using the bit located at the sixth or seventh bit of the packet header, the bit located at the twelfth or thirteenth bit of the packet header may be used for other purposes.

For example, the packet may include the RAP information (P) using the bit located at the sixth or seventh bit of the packet header and include the above-described object type information and/or priority information using the bit located at the twelfth and/or thirteenth bit of the packet header.

FIG. 61 is a diagram showing the structure of a packet including real time information according to another embodiment of the present invention.

The packet according to another embodiment of the present invention may be an LCT packet and the LCT packet may include a packet header and a packet payload. The packet header may include metadata for the packet payload. The packet payload may include data of MPEG-DASH content.

For example, the packet header may include an LCT version number field (V), a Congestion control flag field (C), a Protocol-Specific Indication field (PSI), a Transport Session Identifier flag field (S), a Transport Object Identifier flag field (O), a Half-word flag field (H), a Reserved field (Res), a Close Session flag field (A), a Close Object flag field (B), an LCT header length field (HDR_LEN), a Codepoint field (CP), a Congestion Control Information field (CCI), a Transport Session Identifier field (TSI), a Transport Object Identifier field (TOI), a Header Extensions field, and/or an FEC Payload ID field.

In addition, the packet payload may include an encoding symbol(s) field.

For a detailed description of fields having the same names as the above-described fields among the fields configuring the LCT packet according to another embodiment of the present invention, refer to the above description.

The transmitter may indicate whether the object and/or object internal structure transmitted by the LCT packet is transmitted in real time or in non real time via real time information (T) defined at a file delivery table (FDT) level and/or a delivery object level. The delivery object level may include an object level and/or an object internal structure level.

If the real time information (T) is defined at the FDT level, the real time information (T) may indicate whether all data described in the FDT is transmitted in real time or non real time. For example, an LSID may include real time information (T). In addition, if the real time information (T) is defined at the FDT level, the real time information (T) may indicate whether all objects described in the FDT are transmitted in real time or in non real time. Here, all objects described in the FDT may indicate all objects belonging to a corresponding LCT transport session.

In addition, if the real time information (T) is defined at the delivery object level, the real time information (T) may indicate whether all data belonging to the delivery object is transmitted in real time or in non real time. For example, if the delivery object matches an object and the real time information (T) is defined at the delivery object level, the real time information T may indicate whether all data belonging to the object is transmitted in real time or in non real time. In addition, if the delivery object matches an object internal structure and the real time information (T) is defined at the delivery object level, the real time information (T) may indicate whether all data belonging to the object internal structure is transmitted in real time or in non real time.

As one embodiment, if the real time information (T) is defined at the delivery object level, the packet header may further include real time information (T). The real time information (T) may indicate whether the delivery object transmitted by the LCT packet is transmitted in real time or in non real time.

For example, the delivery object may be a data unit matching TOI. In addition, the value of the real time information (T) of "0" may indicate that the delivery object transmitted by the LCT packet is transmitted in non real time and the value of the real time information (T) of "1" may indicate that the delivery object transmitted by the LCT packet is transmitted in real time.

The real time information (T) may use a first bit of a TOI field to indicate that the delivery object transmitted by the LCT packet is transmitted in real time or in non real time.

As described above, if the TOI field is divided into an OGI field and a DTOI field, the real time information (T) may use a first bit of the OGI field to indicate whether the delivery object transmitted by the LCT packet is transmitted in real time or in non real time.

Since the real time information (T) is included in the first bit of the TOI field and/or the OGI field, the transmitter may transmit real-time data and non-real-time data within one LCT transport session (e.g., video track, audio track and representation of MPEG-DASH). For example, the transmitter may transmit audio data and/or video data within one LCT transport session in real time and transmit an image and/or an application in non real time. In addition, the transmitter may transmit some delivery objects within one LCT transport session in real time and transmit the remaining delivery objects in non real time.

In addition, since the real time information (T) is included in a first bit of an existing TOI field, the LCT packet according to another embodiment of the present invention can guarantee backward compatibility with an existing ALC/LCT and/or FLUTE protocol.

FIG. 6 is a diagram illustrating a structure of a broadcast signal receiving apparatus according to another embodiment of the present invention.

A receiver may identify specific IP/UDP datagram included in a broadcast signal and extract the specific IP/UDP datagram. The receiver may extract a specific IP packet and use IP/Port information during this procedure. The receiver may extract IP/UDP datagram including a specific packet and transmit the packet included in the corresponding datagram to each apparatus. The receiver may extract a transport protocol packet from the IP/UDP datagram.

The transport protocol packet may include an ALC/LCT extension packet, a timeline packet, and/or a signaling packet.

The ALC/LCT extension packet may transmit broadcast data.

For example, the broadcast data may include at least one delivery object included in broadcast data. The ALC/LCT extension packet may include the aforementioned ROUTE packet and include an ALC/LCT packet having the aforementioned header extension information.

The timeline packet may transmit data for synchronization of a broadcast system, a broadcast receiver, and/or a broadcast service/content.

The signaling packet may transmit signaling information. The signaling information may include information for discovery of a service and/or description information on the service. For example, the signaling information may include content of a header of the aforementioned ALC/LCT packet and header extension of the ALC/LCT packet. In addition, the signaling information may include content of both service layer signaling (SLS) information of the aforementioned ROUTE protocol and/or an MMT signaling message of an MMTP protocol.

In some embodiments, the signaling information may be included in the header of the transport protocol packet and/or the ALC/LCT extension packet.

Referring to the drawing, the receiver may include a transport protocol client C62330, a buffer/control unit C62370, an ISO BMFF parser C62400, and/or a media decoder C62500. The delivery object processor C62300 may include the transport protocol client C62330 and/or the buffer/control unit C62370.

The transport protocol client C62330 may parse a transport protocol packet to generate at least one delivery object and/or service layer signaling information.

For example, the transport protocol packet may be a transport protocol packet of an application layer and may include a ROUTE packet and/or an MMTP packet. The ROUTE packet may include the aforementioned asynchronous layered coding/layered coding transport (ALC/LCT) packet and/or an ALC/LCT extension packet. The MMTP packet may represent a formatted unit of media data transmitted using an MMT protocol.

For example, the delivery object may be at least one data unit included in a content component of a service. In addition, the delivery object may be one of one complete file, a part of the file, an HTTP Entity, a group of the file, and/or a group of the HTTP Entity. The part of the file may be a file of a byte range. The HTTP Entity may include an HTTP Entity Header and/or an HTTP Entity body. In addition, the delivery object may include a segment of MPEG-DASH or a portion of the Segment. In addition, the delivery object may include MPU of MMTP, a portion of the MPU, and/or Fragment. The delivery object may be one ISO BMFF file or a portion of one ISO BMFF file. The portion of one ISO BMFF file may include a fragment, GOP, chunk, an access unit, and/or a NAL unit.

For example, the service layer signaling information may include information for discovery and/or access of at least one service and/or at least one content component. In addition, the service layer signaling information may describe at least one feature of a service such as a list of at least one component included in a service, a place for acquisition of at least one component, and/or capabilities of a receiver, required for meaningful presentation of a service. In addition, the service layer signaling information may include user service bundle description (USBD), service-level transport session instance description (S-TSID), and/or DASH media presentation description (MPD).

The transport protocol client C62330 may extract a file for transmission of general data from a transport protocol packet or extract ISO base media file format (ISO BMFF) object data. The transport protocol client C62330 may additionally acquire information related to timing during extraction of the ISO BMFF object data. The transport protocol client C62330 may use delivery mode and/or transport session identifier (TSI) information during extraction of the general file and/or the ISO BMFF object data.

In addition, the transport protocol client C62330 may process the transport protocol packet. The transport protocol client C62330 may interpret the transport protocol packet (e.g., an LCT packet, an ALC/LCT packet, an ALC/LCT extension packet, and a ROUTE packet) to generate header information and the aforementioned header extension information.

For example, the extension information may include fragment information EXT_RTS, object type information, type information, boundary information, mapping information, a session group identifier field SGI, a divided transport session identifier field DTSI, an object group identifier field OGI, a divided transport object identifier field DTOI, a priority information, offset information EXT_OFS, RAP information P, real-time information T, timestamp, and/or length information of a delivery object.

In addition, the transport protocol client C62330 may interpret payload data of the transport protocol packet to generate a delivery object. For example, the payload may be an encoding symbol.

The service layer signaling information according to an embodiment of the present invention may include header information and header extension information. In addition, the service layer signaling information may be transmitted in payload data of the transport protocol packet in the form of a delivery object.

The buffer/control unit C62370 may buffer the delivery object and control an overall process of a receiver. The buffer/control unit C62370 may also be referred to as a receiver/buffer control unit C62370.

In addition, the buffer/control unit C62370 may control a series of operations for processing broadcast data using information on a channel map including each broadcast channel. The buffer/control unit C62370 may receive user input using a user interface (UI) or an event on a system and process the received user input or event. The buffer/control unit C62370 may control a physical layer controller (not shown) using a transport parameter to process a broadcast signal in a physical layer. When the receiver processes data related to MPEG-DASH, the buffer/control unit C62370 may extract MPD or extract positional information (e.g., URL—uniform resource locator information) for acquisition of the MPD and transmit the extracted information to an apparatus for processing data related to the MPEG-DASH.

For example, the buffer/control unit C62370 may transmit a delivery object buffered based on the service layer signaling information to the ISO BMFF parser C62400 and/or the media decoder C62500. For example, the buffer/control unit C62370 may transmit the buffered delivery object to the ISO BMFF parser C62400 and/or the media decoder C62500 at a predetermined time point based on timestamp information included in the signaling information.

In addition, the buffer/control unit C62370 may control an overall process based on signaling information, user input, and/or system clock.

The ISO BMFF parser C62400 may parse at least one delivery object included in a content component of a service to extract at least one access unit, timing information, and/or information (or a parameter) required to decode the access unit.

For example, the delivery object may be a portion of one ISO BMFF file or one ISO BMFF file. The portion of one ISO BMFF file may include a fragment, GOP, chunk, an access unit, and/or a NAL unit. In addition, the delivery object may include a Segment of MPEG-DASH, a portion of the Segment, and/or a Subsegment. In addition, the delivery object may include MPU of MMTP, a portion of the MPU, and/or Fragment.

When two or more media streams are included in the Media Segment, the ISO BMFF parser C62400 may perform a demuxing process. In this case, the ISO BMFF parser C62400 may be connected to two or more media decoders C62500.

For example, when at least one access unit included in a video content component and at least one access unit included in an audio content component are included in the delivery object, the ISO BMFF parser C62400 may extract at least one access unit included in the video content component and transmit the extracted access unit to a video decoder (not shown). In addition, the ISO BMFF parser C62400 may extract at least one access unit included in the audio content component and transmit the extracted access unit to an audio decoder (not shown).

The media decoder C62500 may decode at least one delivery object. The media decoder C62500 may decode at least one access unit based on the signaling information (e.g., timing information, information required for decoding, and/or information for rendering) and/or render the at least one decoded access unit.

For example, the media decoder C62500 may buffer at least one access unit in order to decode at least one access unit at a predetermined decoding time. In addition, the media decoder C62500 may buffer at least one access unit in order to render the at least one decoded access unit at a predetermined presentation time.

In addition, the media decoder C62500 may re-order the at least one decoded access unit.

For example, a decoding order and a rendering order of at least access unit may be different. In this regard, the media decoder C62500 may re-order the at least one decoded access unit at the rendering order.

Figure 63:
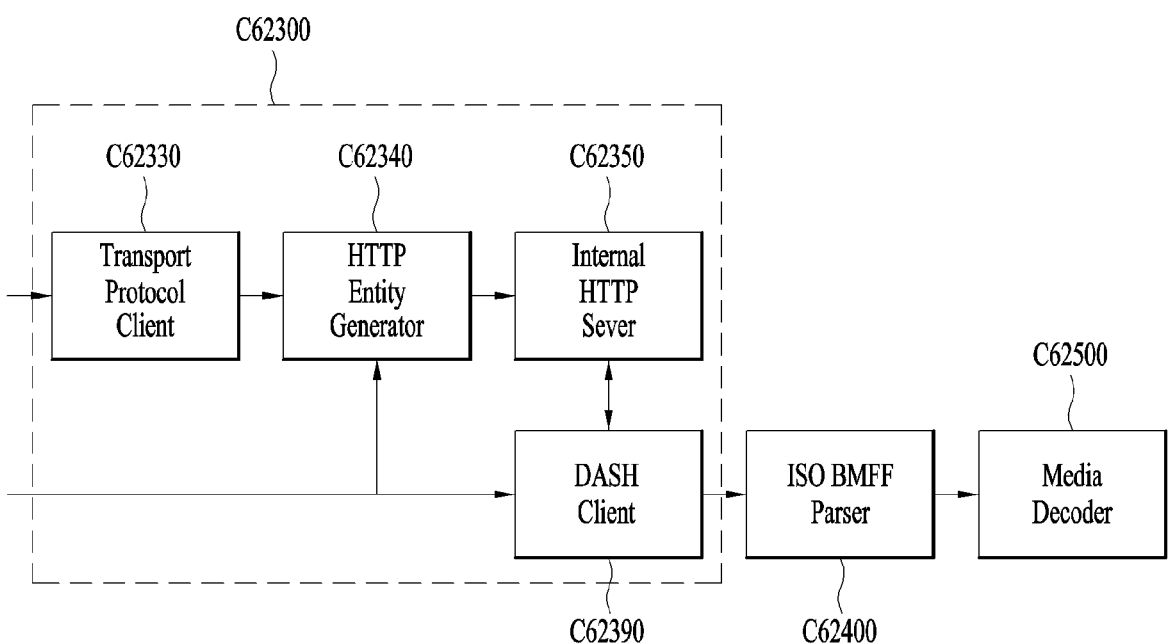
FIG. 63 is a diagram illustrating a structure of a broadcast signal receiving apparatus according to another embodiment of the present invention.

FIG. 63 is a diagram illustrating a structure of a broadcast signal receiving apparatus according to another embodiment of the present invention.

A receiver according t to another embodiment of the present invention may generate and process an HTTP entity based on the received transport protocol packet.

To this end, the receiver may include the delivery object processor C62300, the ISO BMFF parser C62400, and/or the media decoder C62500. The delivery object processor C62300 may include the transport protocol client C62330, an HTTP entity generator C62340, an internal HTTP server C62350, and/or a DASH client C62390.

The transport protocol client C62330 may parse the transport protocol packet to generate at least one delivery object and/or signaling information (or service layer signaling information). A detailed description of the transport protocol client C62330 is the same as the above description.

The HTTP entity generator C62340 may generate an HTTP Entity based on the delivery object and the signaling information (or service layer signaling information).

For example, the HTTP entity generator C62340 may generate the HTTP Entity based on delivery object transmitted from the transport protocol client C62330 and/or basic information and/or extension information of the transport protocol packet.

The HTTP entity generator C62340 may receive an MPD. The HTTP entity generator C62340 may generate the HTTP Entity based on a delivery object, signaling information, and/or MPD. For example, the HTTP entity generator C62340 may refer to and interpret the MPD in order to generate the HTTP Entity.

An HTTP Entity body may be generated based on the delivery object. For example, the HTTP entity body may include a file, a part of the file, and/or a group of the file. A part of the file may be data of a byte range. In addition, one HTTP entity body may include one Media Segment and/or one Chunk.

The HTTP Entity header may be generated based on signaling information (or service layer signaling information) and MPD. For example, the HTTP Entity header may be generated based on basic information and extension information of the transport protocol packet and/or MPD. A detailed description of generation of the HTTP Entity header will be given below.

The internal HTTP server C62350 may store the HTTP Entity. The internal HTTP server C62350 may transmit a delivery object corresponding to the HTTP Entity body to the DASH client C62390.

For example, the internal HTTP server C62350 may include a storage (not shown) for storing the received HTTP Entity.

Each HTTP Entity may be effective up to a time specified in a field "Expires" of the HTTP Entity header from a time stored in the storage.

Upon receiving a request for a delivery object (or an HTTP Entity) from the DASH client C62390 during the effective time, the internal HTTP server C62350 may transmit a delivery object corresponding to the HTTP entity body of the HTTP Entity to the DASH client C62390 in the form of a response.

For example, the internal HTTP server C62350 may receive the request for the delivery object from the DASH client C62390 based on a URL included in the MPD.

Alternatively, the internal HTTP server C62350 may transmit a delivery object to the DASH client C62390 anytime in the form of a response when a requested delivery object (or an HTTP entity) is present in a storage without limitation of the effective time.

For example, the internal HTTP server C62350 may transmit the Media segment or chunk to the DASH client C62390 in the form of a response.

The internal HTTP server C62350 may receive information on an effective time of a file such as an HTTP entity in the storage to a separate interface and may define and execute a unique mechanism for file management.

The DASH client C62390 may receive MPD information. The DASH client C62390 may request the internal HTTP server C62350 to transmit a delivery object (or HTTP Entity) based on the MPD information. In addition, the DASH client C62390 may transmit the received delivery object to the ISO BMFF parser C62400 and/or the media decoder C62500.

The DASH client C62390 may receive and interpret the MPD information and request the internal HTTP server C62350 to transmit the delivery object (or HTTP Entity) based on a URL included in the MPD. For example, the DASH client C62390 may request the internal HTTP server C62350 to transmit Media Segment or Chunk for presentation of a corresponding service based on the URL.

A time for request and/or transmission of the delivery object (e.g. Segment or chunk) may be determined based on DASH timeline included in the MPD.

The ISO BMFF parser C62400 may parse at least one delivery object included in a content component of a service to extract at least one access unit, timing information, and/or information (or a parameter) required to decode the access unit. A detailed description of the ISO BMFF parser C62400 is the same as above description.

The media decoder C62500 may decode at least one access unit based on the signaling information (e.g., timing information, information required for decoding, and/or information required for rendering) and/or render the at least one decoded access unit.

Figures 64, 65:
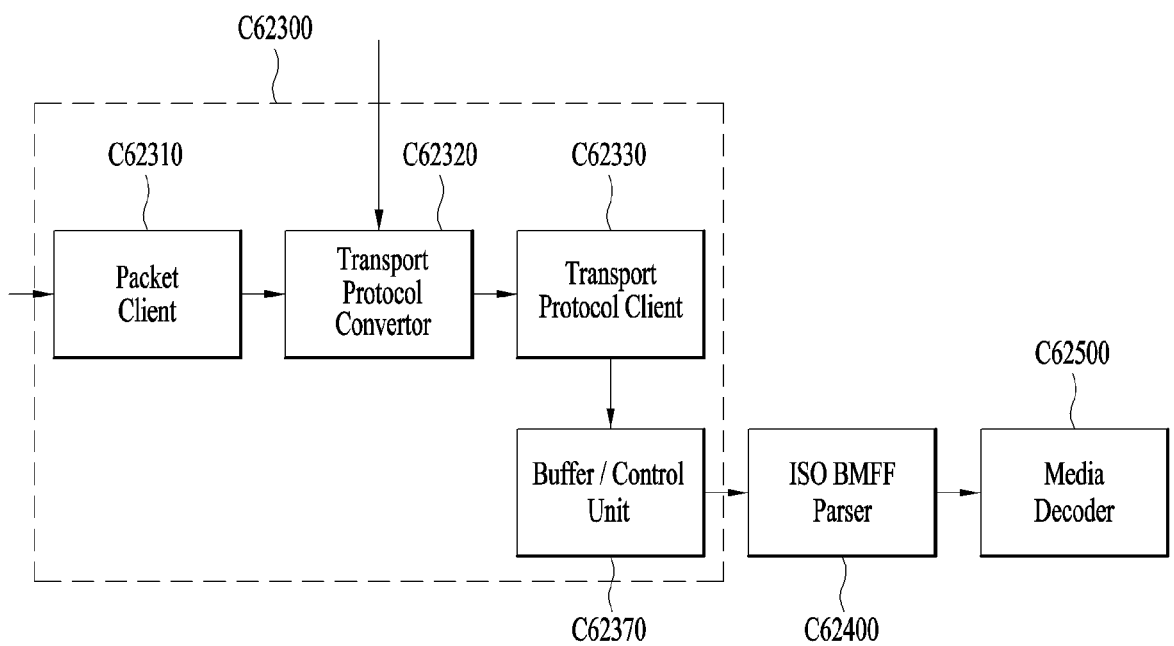
FIG. 64 is a diagram illustrating a method of formatting an HTTP Entity header according to another embodiment of the present invention.
FIG. 65 is a diagram illustrating a structure of a broadcast signal receiving apparatus according to another embodiment of the present invention.

FIG. 64 is a diagram illustrating a method of formatting an HTTP Entity header according to another embodiment of the present invention.

First, an HTTP Entity will be described.

The HTTP Entity may be information transmitted as a payload of request or response. The HTTP Entity may include an HTTP Entity header and an HTTP Entity Body. For example, a request message and/or a response message may transmit the HTTP Entity.

According to who transmits and receives the HTTP Entity, a sender and a recipient may be one of a client and a server.

The HTTP Entity header may include metadata on the HTTP Entity body. In addition, when the HTTP Entity body is not present, the HTTP Entity may include metadata on resources identified according to a request.

The HTTP Entity may include an Allow field, a Content-Encoding field, a Content-Language field, a Content-Length field, a Content-Location field, a Content-MD5 field, a Content-Range field, a Content-Type field, an Expires field, a Last-Modified field, and/or an extension-header field.

The Allow field may list at least one method supported by resources identified according to Request-URI. The Allow field may indicate at least one effective method related to resources, to the recipient. For example, the Allow field may indicate one of "GET", "HEAD", and/or "PUT".

The Content-Encoding field may indicate a modifier of a media type. The Content-Encoding field may indicate a type of additional content coding to be applied to the HTTP Entity body. In addition, the Content-Encoding field may indicate a type of a decoding mechanism in order to acquire a media type referred to by the Content-Type field.

The content-Language field may describe at least one natural language of an audience, intended by the HTTP Entity.

The Content-Length field may indicate a size of the HTTP Entity body.

The Content-Location field may include a resource address of an HTTP Entity included in a message. The Content-Location field may include a resource address of the HTTP Entity included in a message when the HTTP Entity can be accessed from a separate location from a URL of a request resource. For example, the Content-Location field may include a base URI of the HTTP Entity.

The Content-MD5 field may be MD5 digest of the HTTP Entity body for providing end-to-end message integrity check (MIC) of the HTTP Entity.

The Content-Range field may be transmitted together with a partial HTTP Entity body in order to specify a position of the partial HTTP Entity-payload in a full HTTP Entity-payload. For example, the Content-Range field may include first-byte-pos information, last-byte-pos information, and/or instance-length information. The first-byte-pos information may indicate a start position of the partial HTTP Entity body. The last-byte-pos information may indicate a last position of the partial HTTP Entity body. The instance-length information may specify the length of a selected resource.

The Content-Type field may indicate a media type of the HTTP Entity transmitted to the recipient.

The Expires field may include date/time information for receiving an effective request. Presence of the Expires field may not refer to modification or cease of original resources at, before, and/or after a corresponding time.

The Last-Modified field may indicate date and/or time information in which variant of an origin server is deemed to be lastly modified.

The extension-header field may include an additional HTTP Entity header without variant of a protocol.

The HTTP Entity body transmitted together with an HTTP request or response may be format or encoding defined by the HTTP Entity header. The HTTP entity body may include a file, a part of the file, and/or a group of the file. A part of the file may be data of a byte range. In addition, one HTTP entity body may include one Media Segment and/or one Chunk.

Hereinafter, a method of formatting an HTTP Entity header by a receiver according to another embodiment of the present invention will be described.

Referring to the drawing, information items of a left side of a table may indicate signaling information (or service layer signaling information). For example, the signaling information may include basic information of the transport protocol packet, extension information, and/or MPD.

Information items of a right side of the table may indicate a field included in the HTTP Entity header.

First, the HTTP entity generator C62340 may format a Content-Length field based on an OGI field and a DTOI field that are included in a header of the transport protocol packet, and/or a transfer-length field included in EXT_FTI.

According to another embodiment of the present invention, the TOI may be divided into OGI and DTOI and each of the OGI and the DTOI may be mapped to each new data unit. In this case, the OGI may identify a group of the same delivery object in a transfer session and the DTOI may identify a Subsegment, fragment, GOP and/or Chunk. Hereinafter, it is assumed that the OGI identifies the Media Segment and the DTOI identifies Chunk. In some embodiments, DTOI to the TOI.

A delivery object according to another embodiment of the present invention may be protected by Forward Error Correction (FEC). An FEC code may provide protection of packet loss. Accordingly, the FEC code may support reliable transmission of content.

The FEC code may include FEC information. The FEC information may include an FEC Encoding ID, an FEC Instance ID, an FEC Payload ID, and/or FEC Object Transmission Information.

The FEC Encoding ID may identify a used FEC encoder. In addition, the FEC Encoding ID may allow a receiver to select a suitable FEC decoder. The FEC Instance ID may include more detailed identification information of an FEC encoder used for a specific FEC scheme. At least one encoding symbol present in a payload of an FEC Payload ID packet may be identified. The FEC Object Transmission Information may include information related to encoding of a specific object required by an FEC encoder. For example, the FEC Object Transmission Information may include length information of at least one source block included in an object, length information of all objects, and/or specific parameters of an FEC encoder.

The FEC Object Transmission Information may be included in FDT and/or EXT_FTI included in extension information of the transport protocol packet.

The EXT_FTI may specific structure and attributes of FEC Object Transmission Information to be applied to an FEC Encoding ID.

The EXT_FTI may include a HET field, a HEL field, a Transfer Length field, an FEC Instance ID field, and/or an FEC Encoding ID Specific Format field.

The HET field may have a value of 64.

The HEL field may indicate an entire length of LCT Header Extension with a variable length.

The Transfer Length field may indicate a delivery object (or a transport object) for transmission of a file of a byte unit.

The FEC Instance ID field may include more detailed identification information of an FEC encoder used for a specific FEC scheme.

The FEC Encoding ID Specific Format field may include specific parameters of the FEC encoder. Different FEC schemes may require encoding parameters of different sets. Accordingly, a structure and length of the FEC Encoding ID Specific Format field may be changed according to an FEC Encoding ID.

For example, the Content-Length field may indicate the sum of Transfer-length of at least one delivery object having the same OGI. When number system conversion is required, the Content-Length field may have a value to which number system of the Content-Length field is applied.

Then, the HTTP entity generator C62340 may format a Content-Location field based on mapping information.

The mapping information may include an identifier allocated from signaling information as well as a unique address (e.g. URL) of a delivery object. In addition, the mapping information may indicate the URL of the signaling information.

For example, the Content-Location field may indicate a URL included in the mapping information. When format conversion is required, the Content-Location field may have a value to which format conversion is applied.

Then, the HTTP entity generator C62340 may format a Content-Range field based on offset information EXT_OFS, an OGI field and DTOI field included in a header of the transport protocol packet, and/or a Transfer-length field included in the EXT_FTI.

Offset information EXT_OFS may include a Start Offset field. A Start Offset field may have a variable length and indicate offset in a file of a packet payload transmitted by a current packet. The Start Offset field may indicate offset as a byte number from a start point of a file.

For example, the first-byte-pos information may indicate offset of a current delivery object (e.g. Chunk) in a file. When number system conversion is required, the first-byte-pos information may have a value to which number system conversion is applied.

In addition, the last-byte-pos information may indicate a value obtained by adding a Transfer-Length to offset of the current delivery object (e.g. chunk) in the file. When number system conversion is required, the last-byte-pos information may have a value to which number system conversion is applied.

In addition, the instance-length information may indicate the sum of Transfer-Length of at least one delivery object having the same OGI. When number system conversion is required, the instance-length information may have a value to which number system conversion is applied.

When a value of the Content-Range field cannot be calculated during generation of the HTTP entity, the Content-Range field may be omitted. In addition, when one file (e.g. segment) is transmitted through one delivery object, the Content-Range field may be omitted.

Then, the HTTP entity generator C62340 may format an Expires field based on mapping information and/or MPD.

For example, the Expires field may indicate availability end time of a segment in DASH availability timeline.

A value of the Expires field may be determined according to the following expression. In the expression, the segment start time may belong to the same period and representation and may be the sum of duration of segments described prior to a corresponding segment. The segment and the delivery object (e.g. ALC/LCT extension object) may be mapped by a URL.

Expires of Current
    segment=MPD@availabilityStartTime+
    Period@start+segment start time SegmentList/

SegmentTemplate@duration
(+MPD@timeShiftBufferDepth)

In addition, the HTTP entity generator C62340 may format the Expires field based on timestamp. The timestamp information may be included in the EXT_MEDIA_TIME.

For example, the Expires field may indicate the timestamp information without reference to MPD information. The timestamp information may be provided by extension information (e.g. LCT header extension) of a transport protocol packet such as EXT_MEDIA_TIME.

Expires of current segment=Timestamp of next
Segment=Timestamp of current segment+duration of Segment (Timestamp of current Segment−Timestamp of previous Segment)

Additional delay time required for a procedure of stacking a segment in a broadcast stream, transmitting the segment, and interpreting the segment may be considered in the above two expressions.

FIG. 65 is a diagram illustrating a structure of a broadcast signal receiving apparatus according to another embodiment of the present invention.

A receiver according to another embodiment of the present invention may format and process an object of the form of an HTTP Entity as a transport protocol packet. For example, the receiver may receive an ALC/LCT packet and generate an object of the form of a HTTP Entity. In addition, the receiver may generate a transport protocol packet (e.g. ALC/LCT extension packet) based on an object in the form of an HTTP Entity. The ALC/LCT packet, the object of the form of an HTTP Entity, and/or the transport protocol packet may transmit at least one delivery object.

Referring to the drawing, the receiver may include the delivery object processor C62300, the ISO BMFF parser C62400, and/or the media decoder C62500. The delivery object processor C62300 may include a packet client C62310, a transport protocol convertor C62320, a transport protocol client C62330, and/or the buffer/control unit C62370.

The packet client C62310 may receive at least one packet for transmission of a service and parse the received packet to recover at least one object. For example, the received packet may include an ALC/LCT packet. In addition, an object may include an HTTP Entity. The packet client C62310 may also be referred as an ALC/LCT client C62310.

The transport protocol convertor C62320 may receive MPD information. The transport protocol convertor C62320 may convert an object (e.g. HTTP Entity) into at least one transport protocol packet based on MPD including description of DASH Media Presentation corresponding to a service.

For example, a transport protocol converter may be HTTP Entity to ALC/LCT+Convertor. In addition, the transport protocol packet may include an ALC/LCT extension packet, a timeline packet, and/or a signaling packet.

The transport protocol convertor C62320 may interpret MPD and refer to MPD information in order to format the transport protocol packet.

The transport protocol convertor C62320 may generate a payload of at least one transport protocol packet based on one HTTP entity body. In addition, the transport protocol convertor C62320 may generate a header of at least one transport protocol packet based on an HTTP entity header and MPD information.

The transport protocol convertor C62320 may include a packetization function in order to contain the received object in the transport protocol packet.

The transport protocol client C62330 may parse the transport protocol packet to generate at least one delivery object and/or service layer signaling information.

A detailed description of the buffer/control unit C62370, the ISO BMFF parser C62400, and/or the media decoder C62500 is the same as the above description.

FIG. 66 is a diagram illustrating a method of formatting an HTTP Entity header according to another embodiment of the present invention.

Referring to the drawing, information items to the left of the table may indicate information included in the HTTP Entity header and/or MPD. Information items to the right of the table may indicate service layer signaling information. For example, the service layer signaling information may include basic information and/or extension information (e.g. header information of an ALC/LCT extension packet) of the transport protocol packet.

First, the transport protocol convertor C62320 may format mapping information based on a Content-Location field included in the HTTP Entity header.

The Content-Location field may include a resource address of an HTTP Entity included in a message. The mapping information may include a URL field. The URL field may have a variable length and may include a unique address of the delivery object.

For example, the URL field may indicate information on the Content-Location field. When format conversion is required, the URL field may have a value to which format conversion is applied.

Then, the transport protocol convertor C62320 may format offset information, an OGI field, and/or a DTOI field based on the Content-Range field. As described above, the DTOI field may also be referred to as a TOI field.

For example, the Start Offset field of the offset information may indicate first-byte-pos information of a current Content-Range. When number conversion system is required, the Start Offset field may have a value to which number system conversion is applied.

In addition, DTOI fields may indicate respective objects for respective Content-Ranges. That is, objects may be set for respective Content-Ranges and respective DTOI values may be provided to the respective Content-Ranges.

In addition, the OGI field may indicate the same OGI value of at least one object transmitted from one HTTP entity. That is, the same OGI value may be provided to at least one object transmitted from one HTTP entity.

When one file (segment) is transmitted through one object, an OGI field may not be used.

Then, the transport protocol convertor C62320 may format timestamp information based on MPD.

For example, the timestamp information may indicate a value corresponding to earliest presentation time of a segment of the DASH presentation timeline.

The timestamp information may be determined according to the following expression.

Timestamp information=earliest presentation time of
current segment=MPD@availabilityStartTime+
Period @start+segment start time
(+MPD@suggestedPresentationDelay)

In the expression, segment start time may belong to the same period and representation and may be the sum of duration of segments described prior to a corresponding segment. The segment and the delivery object (e.g., ALC/LCT+object) may be mapped by a URL.

Additional delay time required for a procedure of stacking a segment in a broadcast stream, transmitting the segment, and interpreting the segment may be considered in the above expression.

Hereinafter, operation of a receiver for transmitting file-based multimedia content in a pull mode will be described.

The mode for transmitting file-based multimedia content according to an embodiment of the present invention may be a pull mode. The pull mode refers to a mode for setting a media player as a client, setting middleware of a content reception unit as a server and transmitting content between the client and the server. According to the pull mode, it is possible to implement a client-server architecture style receiver structure.

Figure 67:
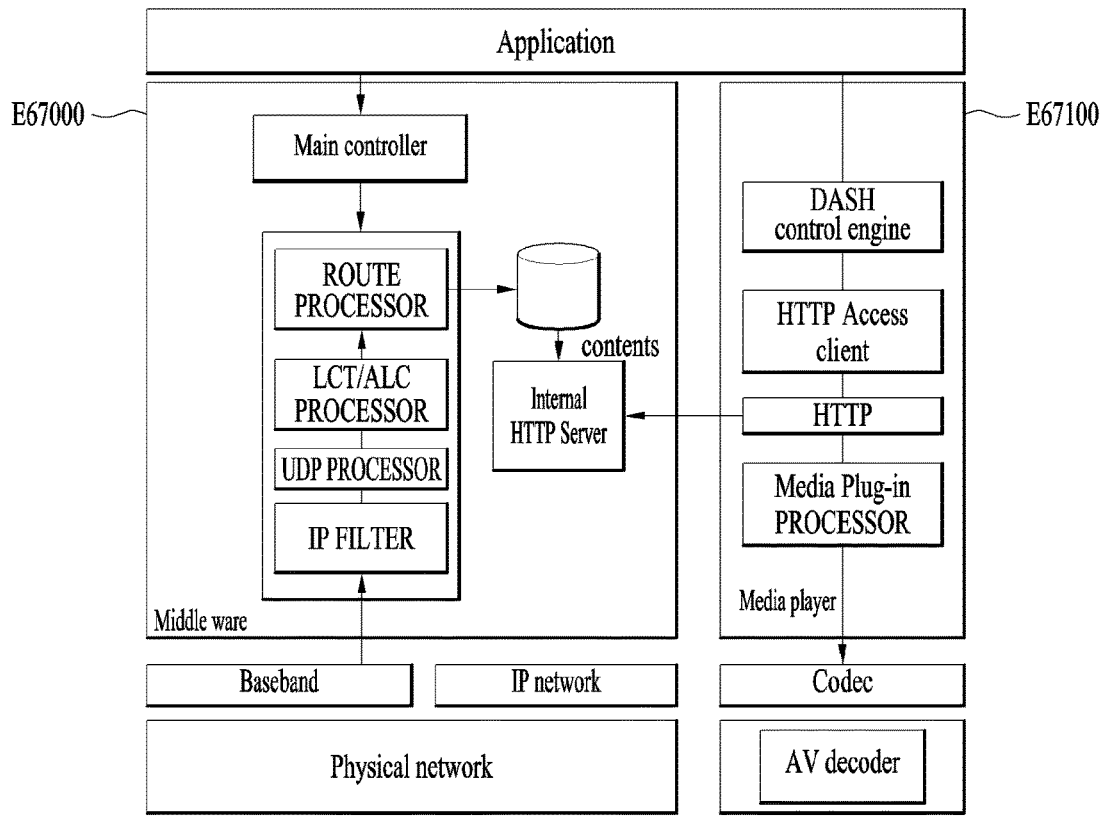
FIG. 67 is a diagram illustrating the structure of a receiver in a pull mode according to an embodiment of the present invention.

FIG. 67 is a diagram illustrating the structure of a receiver in a pull mode according to an embodiment of the present invention.

More specifically, FIG. 67 shows the structure of a ROUTE receiver for processing file content transmission in a pull mode. As described above, the receiver using the pull mode according to the embodiment of the present invention may include middleware E67000 and a media player E67100. The media player E67100 according to the embodiment of the present invention may be referred to as a DASH player, which may be changed according to designer. In particular, the middleware E67000 according to the embodiment of the present invention may include an internal HTTP server. According to the pull mode using the internal HTTP server, it is possible to implement a client-server style receiver structure employing the same method as an existing streaming service. In addition, when content is played back by the receiver according to the pull mode using the internal HTTP server, pipeline load and initialization operation may be minimized and thus performance efficiency may be improved. In addition, the pull mode using the internal HTTP server may increase reusability of the media player E67100 and may be implemented by minimally modifying a currently commercialized media player, thereby improving portability.

More specifically, the middleware E67000 according to the embodiment of the present invention may include a main controller, a ROUTE processor, an LCT/ALC processor, a UDP processor, an IP filter, a DB and an internal HTTP server. In addition, the media player E67100 according to the embodiment of the present invention may include a DASH control engine, an HTTP access client, and a media plug-in processor.

Hereinafter, operation of the middleware E67000 will be described. The LCT/ALC processor, the UDP processor and the IP filter included in the middle ware E67000 according to the embodiment of the present invention may perform IP filtering, UDP processing and LCT/ALC decapsulation, etc. with respect to BB packets (or signals) of a broadcast signal received from a physical network. The ROUTE processor may acquire an MPD, initialization segments and media segments of video and audio from the processed signals. Thereafter, the ROUTE processor may transmit the acquired MPD, initialization segments and media segments of video and audio to the internal HTTP server. The internal HTTP server may transmit real content to the media player E67100 using an Http Get response. Accordingly, until the internal HTTP server receives an Http GET message from the media player E67100, the MPD, initialization segments and media segments of video and audio may be continuously stored in the DB of the middleware E67000. Thereafter, the internal HTTP server may receive the Http GET message (or request) from the media player E67100 and transmit the real content stored in the DB using the Http Get response.

Hereinafter, operation of the media player E67100 will be described. The media player E67100 or the HTTP access client included in the media player E67100 according to the embodiment of the present invention may request the MPD, initialization segments and media segments of video and audio, that is, content to be played back, from the middleware E67000 or the internal HTTP server using the Http GET message (or request), upon changing to a new channel FIG. 68 is a flowchart illustrating operation of the receiver using the above-described pull mode.

Figure 68:
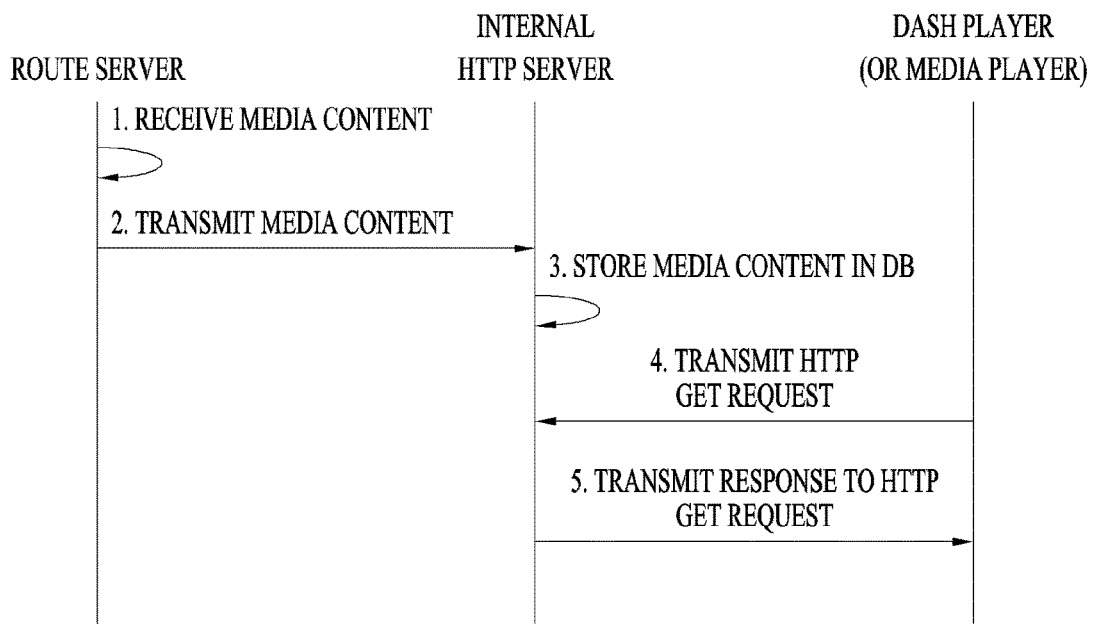
FIG. 68 is a flowchart illustrating operation of the receiver in the above-described pull mode.

More specifically, FIG. 68 is a flowchart illustrating a process of, at an internal HTTP server, transmitting media content received from a ROUTE processor to a media player using an HTTP GET request.

1. The ROUTE processor may receive the media content. More specifically, the ROUTE processor may acquire the MPD, initialization segments and media segments of video and audio from signals subjected to processing such as IP filtering, UDP processing and LCT/ALC decapsulation, etc.

2. The ROUTE processor may transmit the media content to the internal HTTP server.

3. The internal HTTP server may store the media content in the DB. As described above, the MPD, initialization segments and media segments of video and audio may be continuously stored in the DB of the middleware E67000 until the internal HTTP server receives the Http GET message from the media player E67100.

4. The media player E67100 may transmit the HTTP GET message (or request) to the internal HTTP server. As described above, the media player E67100 may transmit the Http GET message (or request) to the middleware E67000 or the internal HTTP server to request the MPD, initialization segments and media segments of video and audio, that is, content to be played back, upon changing to a new channel 5. The internal HTTP server may transmit a response to the HTTP GET request. More specifically, the internal HTTP server may transmit content to be played back on the media player E67100 using the Http Get response.

Hereinafter, a pull mode according to another embodiment of the present invention will be described.

In the pull mode according to another embodiment of the present invention, real content is transmitted using inter process communication (IPC). More specifically, the pull mode according to another embodiment of the present invention refers to a method of delivering an HTTP POST request (or message) to a media player as signaling information indicating that an internal HTTP client has received content, storing real content in a shared memory IPC and directly acquiring content to be played back by the media player from the shared memory IPC.

Figure 69:
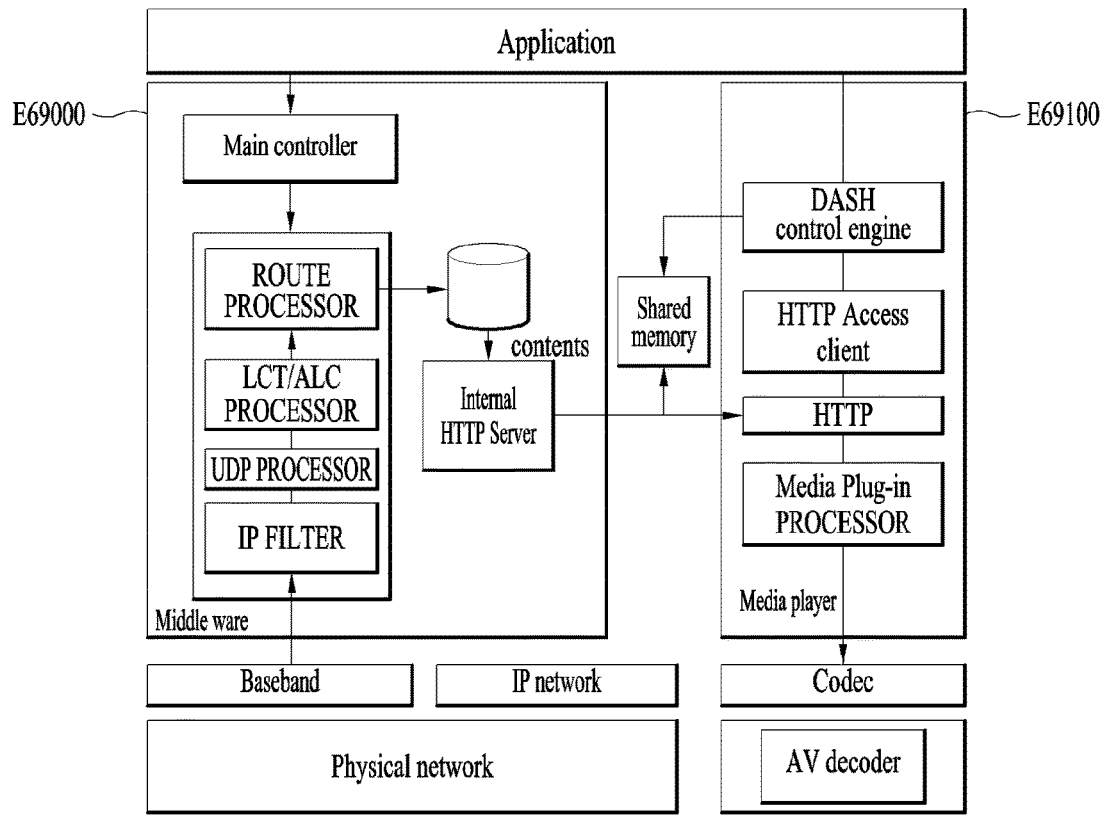
FIG. 69 is a diagram illustrating the structure of a receiver in a pull mode according to another embodiment of the present invention.

FIG. 69 is a diagram illustrating the structure of a receiver in a pull mode according to another embodiment of the present invention.

More specifically, FIG. 69 shows the structure of a ROUTE receiver according to a pull mode using shared memory IPC. As described above, the receiver using the pull mode according to the embodiment of the present invention may include a middleware E69000 and a media player E69100. The media player E67100 according to the embodiment of the present invention may be referred to as a DASH player and may be changed according to designer. In particular, the middleware E69000 according to the embodiment of the present invention may include an internal HTTP client.

More specifically, the middleware E69000 according to the embodiment of the present invention may include a main controller, a ROUTE processor, an LCT/ALC processor, a UDP processor, an IP filter, a DB and an internal HTTP client. In addition, the media player E69100 according to the embodiment of the present invention may include a DASH control engine, an HTTP access client and a media plug-in processor.

The basic operation of the middleware E69000 according to the embodiment of the present invention is equal to the middleware E67000 of FIG. 67 except that the internal HTTP client is included instead of the internal HTTP server. As described above, the ROUTE processor may transmit the acquired MPD, initialization segments and media segments of video and audio (or content) to the internal HTTP client. The internal HTTP client may transmit the Http POST message (or the request) to the media player E69100. Thereafter, the internal HTTP client may store the received content in the shared memory IPC.

Hereinafter, operation of the media player E67100 will be described. The media player E69100 or the HTTP access client included in the media player E69100 according to the embodiment of the present invention may receive an Http POST message. Thereafter, the media player E69100 or the HTTP access client included in the media player E69100 may acquire the MPD, initialization segments and media segments of video and audio, that is, content to be played back, stored in the shared memory IPC, upon changing to a new channel. Thereafter, the content may be played back by the media plug-in processor.

Figure 70:
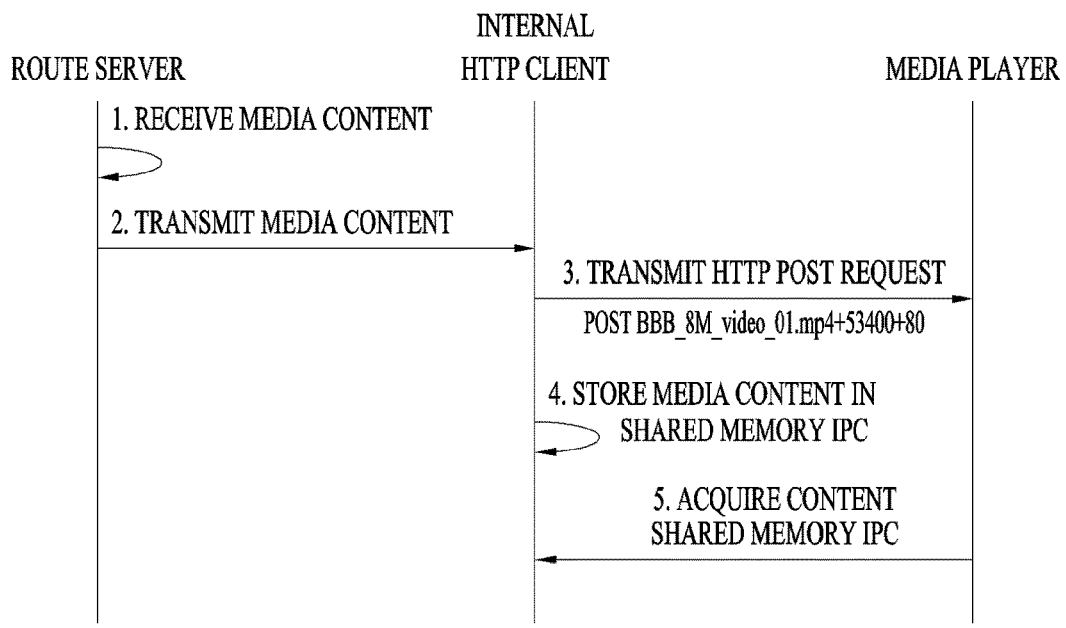
FIG. 70 is a flowchart illustrating operation of the receiver using the above-described pull mode.

FIG. 70 is a flowchart illustrating operation of the receiver using the above-described pull mode.

More specifically, FIG. 70 is a flowchart illustrating a process of, at an internal HTTP client, receiving media content from a ROUTE processor and transmitting an HTTP POST message (request) to a media player.

1. The ROUTE processor may receive the media content. As described above, the ROUTE processor may acquire the MPD, initialization segments and media segments of video and audio from processed signals.

2. The ROUTE processor may transmit the media content to the internal HTTP client.

3. The internal HTTP client may transmit the HTTP POST message (or request) to the media player E69100.

4. Thereafter, the internal HTTP client may store the received content in the shared memory IPC.

5. The media player E69100 may acquire the MPD, initialization segments and media segments of video and audio stored in the shared memory IPC, that is, content to be played back. More specifically, the media player E69100 may compare the content stored in the shared memory IPC with the content to be played back using filename, filesize, and service ID information included in the HTTP POST message and acquire (fetch) content to be played back.

When audio and video components configuring one service are transmitted through a broadcast or broadband network, the receiver according to the embodiment of the present invention may operate in a push and pull mode (or using a push and pull method).

In this case, the receiver does not include an internal HTTP server. In addition, the receiver may operate in the push mode upon receiving content through the broadcast network and operate in the pull mode upon receiving content through the broadband network.

That is, since the receiver may operate in the push or pull mode depending on on which path content is received, the receiver requires information indicating the delivery path of content (or representation). In the present invention, a CMT or MPD including information indicating the delivery path of content is proposed. The information indicating the delivery path of content according to the embodiment of the present invention may be represented in the form of a flag, which may be changed according to designer.

More specifically, an interface, such as a CMT, for disabling an external module, which knows on which delivery path each representation is delivered, such as a signaling module, to request a specific component from a DASH client, may be added and control may be performed using the interface.

In addition, in order to disable the DASH client to request video delivered in the push mode through the broadcast network, the MPD according to the embodiment of the present invention may include only second audio or all components (video 1 and audio 2) configuring a service.

The MPD may include a flag indicating whether each content or representation is delivered through the broadcast network or the broadband network, when the MPD includes all components. Accordingly, the DASH client may check the flag and may not request the representation delivered in the push mode through the broadcast network.

FIG. 71 is a diagram illustrating a CMT and an MPD defining a flag according to an embodiment of the present invention.

More specifically, (a) of FIG. 71 shows a CMT according to an embodiment of the present invention and (b) of FIG. 71 shows an MPD of an XML format.

As shown in (a), the CMT may include each service, MPD information corresponding to the service, etc. Sub attributes of broadcastCom information shown in the figure may indicate whether content is transmitted through the broadcast network and represent related information.

The sub attributes of BBComp information may indicate whether content is transmitted over the Internet and represent related information.

As shown in (b), information indicating the delivery path of the content may be represented in the form of a flag and included in the MPD of the XML format. The MPD according to the embodiment of the present invention may include a broadcast_flag and/or a broadband_flag.

More specifically, if the broadcast_flag is 1, this indicates that content (or representation) is currently being transmitted through the broadcast network and, if the broadcast_flag is 0, this indicates that content (or representation) is not currently being transmitted through the broadcast network. Similarly, if the broadband_flag is 1, this indicates that content (or representation) is currently being transmitted through the broadband network and, if the broadband_flag is 0, this indicates that content (or representation) is not currently being transmitted through the broadband network. Accordingly, the receiver (or the DASH client) may check whether content is transmitted using the flag of the MPD.

FIG. 72 is a flowchart illustrating operation of a receiver using a pull mode according to an embodiment of the present invention.

More specifically, FIG. 72 shows operation of the receiver according to the pull mode described with reference to FIGS. 67 to 70.

The receiver according to the embodiment of the present invention may change the state of the receiver to a changing channel state (SE72000).

When a user inputs a channel up/down input signal, the receiver according to the embodiment of the present invention may determine whether switching to the same physical channel is performed (SE72100). Upon determining that switching to the same physical channel is performed, the receiver according to the embodiment of the present invention may set the physical channel (SE72101).

Upon determining that switching to the same physical channel is not performed, the receiver according to the embodiment of the present invention may determine whether switching to the same IP/port channel is performed (SE72200). Upon determining that switching to the same IP/port channel is performed, the receiver according to the embodiment of the present invention may set the IP/port channel (SE72201).

Upon determining that switching to the same IP/port channel is not performed, the receiver according to the embodiment of the present invention may determine whether switching to the same session channel is performed (SE72300). Upon determining that switching to the same session channel is performed, the receiver according to the embodiment of the present invention may set the session channel (SE72301).

Upon determining that switching to the same session channel is not performed, the receiver according to the embodiment of the present invention may determine whether previous content is received (SE72400). If Http GET requests are queued in a channel change state, content of the previous channel may be received.

Upon determining that the content of the previous channel is received, the receiver according to the embodiment of the present invention may perform flushing with respect to the requests and remove the content of the previous channel (SE72500). More specifically, the receiver according to the embodiment of the present invention may ignore the HTTP GET requests using an Http 200 OK response and remove the received content of the previous channel Thereafter, the receiver according to the embodiment of the present invention may receive media content (SE72600). More specifically, the ROUTE processor of the receiver may acquire an MPD, initialization segments and media segments of video and audio from signals subjected to processing such as IP filtering, UDP processing and LCT/ALC decapsulation, etc.

Thereafter, the receiver according to the embodiment of the present invention may determine whether a request for real content is made (SE72700).

Upon determining that the request is made, the internal HTTP server of the receiver may ignore the request for the real content using an Http 200 OK response (SE72701). Upon determining that the request is not made, the MPD, initialization segments and media segments of video and audio may be stored in the DB (SE72702).

Thereafter, the receiver may determine whether a request for an MPD is made (SE72800). More specifically, the internal HTTP server of the receiver may receive an Http GET request from the media player and transmit content using the response to the HTTP Get request (SE72900). In addition, according to the pull mode, the internal HTTP client of the receiver may transmit an Http POST message to the media player and store content in the shared memory IPC.

In addition, the receiver according to the embodiment of the present invention may change the state of the receiver to a channel changed state (SE72901).

Thereafter, the media player of the receiver may play back the received content using the Http GET response according to the pull mode or acquire and play back the content from the shared memory IPC.

Figure 73:
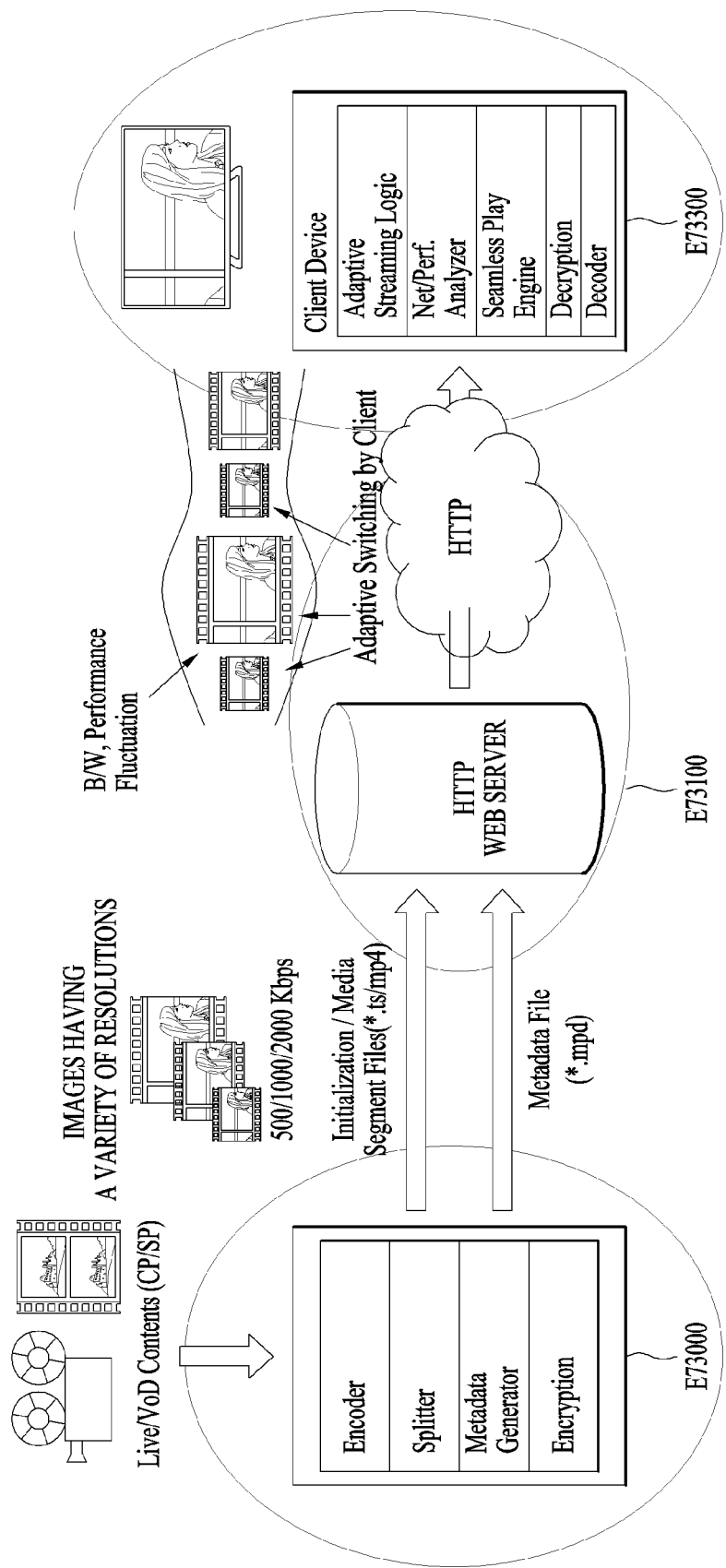
FIG. 73 is a diagram illustrating the configuration of an MPEG DASH based system.

FIG. 73 is a diagram illustrating the configuration of an MPEG DASH based system.

As shown in the figure, the MPEG DASH system may include a streaming server E73000, an HTTP web server E73100 and a receiver (or a DASH client or a client device) E73200.

The MPEG DASH based streaming server E73000 may encode live or VoD images (or content) into images having a variety of resolutions and split the encoded images into images having a constant time length. In this case, a unit of splitting each image may be a segment or chunk and may be a basic unit used for the receiver E73200 to request content.

In addition, the server E73000 may generate an MPD including information about content and transmit the split image and the MPD to the HTTP web server D73100.

The receiver E73200 may request and receive/parse the MPD from the HTTP server E73100 and request content having suitable resolution from the HTTP server according to available network bandwidth. Accordingly, even when the network bandwidth is changed, the receiver E73200 may request and receive content having resolution suitable for bandwidth and seamlessly play back a moving image.

When the above MPEG DASH system is applied to a multicast network (e.g., eMBMS), a next-generation broadcast system may have a simple protocol stack and structure regardless of a delivery network (e.g., a broadcast network or a broadband network) to be used.

However, since the MPEG DASH system operates such that the DASH client (receiver) requests content having resolution suitable for bandwidth (e.g., speed) of a network from a server and the server provides the content, the receiver should request desired content from the server even when DASH content is transmitted through the broadcast network.

However, since the broadcast network uses the push method of, at the server, supplying content regardless of the request of the receiver unlike the broadband network, a point of time when the receiver or the DASH client requests DASH content to be decoded and a point of time when the server transmits DASH content may be different. Accordingly, when the receiver performs channel change, a channel change time may be delayed as compared to an existing digital broadcast system.

Hereinafter, in order to shorten the channel change time of the receiver, if MPEG DASH content (e.g., segment or chunk) is transmitted through the broadcast network, push operation of the receiver and necessary information for optimizing the channel change time of the receiver will be described.

Figure 74:
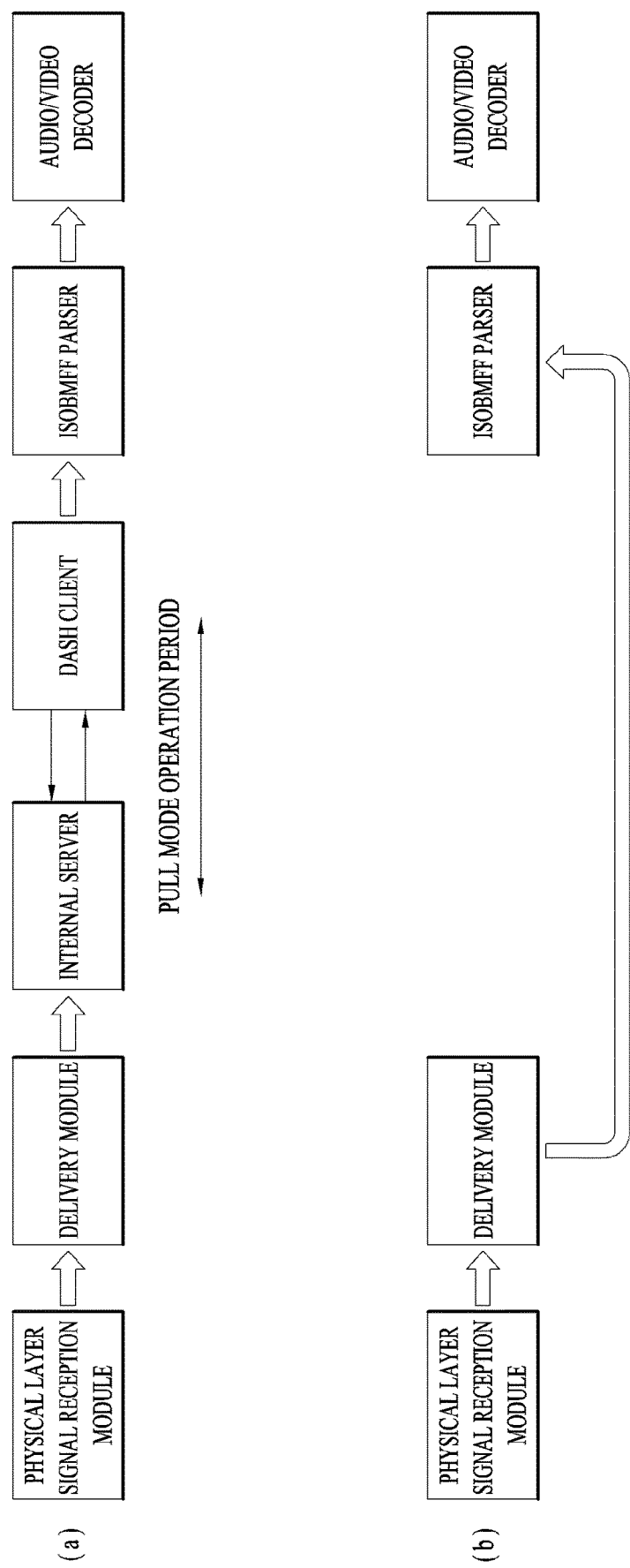
FIG. 74 is a diagram illustrating the structure of a receiver when DASH content is transmitted through a broadcast network.

FIG. 74 is a diagram illustrating the structure of a receiver when DASH content is transmitted through a broadcast network.

The receiver of FIG. 74 corresponds to another embodiment of the receiver described with reference to FIGS. 62 to 65. More specifically, (a) of FIG. 74 shows the structure of a receiver including a DASH client operating in a pull method (or pull mode) and (b) of FIG. 74 shows the structure of a receiver capable of receiving DASH content through a broadcast network while operating in a push mode.

The receiver according to the embodiment of the present invention may include a physical layer signal reception module, a delivery module, an internal server, a DASH client, an ISOBMFF parser and an audio/video decoder or an A/V decoder. The delivery module of the present invention may perform the same operation as the above-described transport protocol client. In addition, the delivery module, the internal server and the DASH client may be included in one processor. This may be referred to as the above-described delivery object processor and may be changed according to designer. Hereinafter, the modules/blocks will be described.

The physical layer signal reception module may receive a broadcast signal and process the signal according to the physical layer processing method described with reference to FIGS. 18 to 40. Thereafter, the delivery module may process the signal output from the physical layer, e.g., an IP/UDP/ROUTE signal (or transport protocol packet). The internal server may provide DASH content and an MPD included in the signal output from the delivery module. If the internal server is present, a conventional DASH client may be minimally modified and used.

The DASH client may first receive the MPD and request the DASH content (segment or chunk) from the internal server. More specifically, the DASH client may initialize an audio/video decoder of a specified codec according to the result of parsing the MPD. The DASH client may parse the received DASH content. The DASH segment may take the form of an ISOBMFF (ISO Base Media File Format) based file. Accordingly, the ISOBMFF parser may parse box based information included in the segment received by the DASH client and deliver audio data or video data (or video frames) to the audio/video decoder. Thereafter, the audio/video decoder may decode audio data or video data.

As described above, if DASH content is transmitted through the broadcast network, the receiver may basically operate in a push mode. However, since the DASH client operates in the pull mode, in the receiver of the present invention, assume that the internal server E74200 and the DASH client operate in the pull mode and the other modules operate in the push mode. In the present invention, a period in which data transmission between the internal server and the DASH client is performed may be referred to as a pull mode operation period.

In the structure of the receiver shown in (a) of FIG. 74, the DASH client may request a segment from the internal server according to a segment availability start time calculated using the MPD. The segment availability start time is used to describe a valid interval window (segment availability window) of a segment and may be calculated as follows using Period@start, SegmentBase@availabilityTimeOffset, etc. included in the MPD.

Segment Availability Start Time=MPD@availabilityStartTime+
Period@start+MST(k)
?SegmentBase@availabilityTimeOffset+MD(k)

MPD@availabilityStartTime indicates the start time of the MPD based on the wall clock of the MPD, and Period@start indicates the start time of the period. MST(k) indicates the start time of a k-th segment in the period, SegmentBase@availabilityTimeOffset indicates an offset for controlling the segment availability time, and MD(k) indicates the duration of the k-th segment in the period.

In addition, the DASH client E74300 may calculate the presentation time of the segment using the received MPD and transmit the segment and the segment presentation time to the ISOBMFF parser. The segment presentation time may be calculated as follows using the MPD@availabityStartTime, Period@start, earliest presentation time of k-th segment, etc. included in the MPD.

Segment presentation time=MPD@availabityStartTime+Period@start+
earliest presentation time of k-th segment−
(SegmentBase@presentationTimeOffset*SegmentBase@-
timescale)+MPD@suggestedPresentationDelay The earliest presentation time of the k-th segment means the smallest presentation time of the access unit of the k-th segment, and SegmentBase@timescale means a timescale used to parse different real time duration values in the segment information. MPD@suggestedPresentationDelay means a delay offset value fixed to the presentation time of each access unit.

As described above, the DASH client may calculate and determine information as to which segment is requested and when the segment is represented using the MPD. However, in a unidirectional network such as a broadcast network, it is difficult to immediately apply an event such as channel change. In addition, since it takes considerable time for the DASH client to receive and parse the MPD of the channel to be changed and to calculate the segment availability start time and the segment presentation time of the segment, the channel change time of the receiver may be delayed.

(b) of FIG. 74 shows the structure of the receiver for solving the above-described problems.

The receiver shown in (b) of FIG. 74 may include the same modules as the receiver of (a) of FIG. 74 except that the internal server and the DASH client are not included. More specifically, the delivery module included in the receiver shown in (b) of FIG. 74 may deliver DASH content to the ISOBMFF parser. Operation of the physical layer signal reception module is described above and thus operations of the delivery module, the ISOBMFF parser and the audio/video decoder will be focused upon. The delivery module according to the embodiment of the present invention may extract and deliver an ISOBMFF file (initialization segment, media segment, etc.) and the timestamp of the segment from the signal output from the physical layer signal reception module to the ISOBMFF parser. In this case, the delivery module may periodically receive server wall clock information and correct a system time clock (STC).

In the case of a conventional MPEG-2 TS based broadcast system, the receiver may receive a decoding timestamp (DTS)/presentation timestamp (PTS) of audio/video and a program clock reference (PCR) and correct the STC. In the case of a next-generation broadcast system, since all times are expressed in coordinated universal time (UTC), that is, absolute time, in the embodiment of the present invention, the timestamp is expressed by a network time protocol (NTP) value.

Hereinafter, a method of correcting an STC of a receiver according to an embodiment of the present invention will be described.

The receiver or the delivery module according to the embodiment of the present invention may periodically receive a wall clock value used for A/V encoding at the server side through NTP packets using a specific IP/port or receive an NTP timestamp through a link layer located between a physical layer and an IP layer.

The receiver may set the STC using the periodically received NTP wall clock, eliminate an error between a server clock and a client clock and perform synchronization between clocks. Therefore, all receivers can decode and play back the same image.

The delivery module according to the embodiment of the present invention may operate as follows depending on whether the @minBufferSize is present in the LSID.

If the @minBufferSize is present in the LSID, the delivery module according to the embodiment of the present invention may deliver data collected by the size indicated by the @minBufferSize to the ISOBMFF parser after channel change. If @minBufferSize is not present in the LSID, the delivery module according to the embodiment of the present invention may deliver the segment to the ISOBMFF parser after channel change.

Thereafter, the ISOBMFF parser may decode the received segment and the audio/video decoder may perform segment presentation according to the corrected STC. More specifically, the audio/video decoder may compare the STC value synchronized with the server with the PTS value of the A/V frame and perform segment presentation.

Hereinafter, a method of, at the delivery module, extracting an ISOBMFF file will be described.

As described above, in order for the delivery module to extract the ISOBMFF file from the signal output from the physical layer signal reception module, there is a need for information related to the ISOBMFF file for identifying the ISOBMFF file included in the received signal.

Hereinafter, the method of, at the delivery module, extracting the ISOBMFF file using information related to the ISOBMFF file included in the LSID or EFDT of the ROUTE protocol according to the embodiment of the present invention will be described.

The LSID according to the embodiment of the present invention may include a SourceFlow@realtime flag indicating whether real-time linear content is transmitted. Accordingly, the delivery module according to the embodiment of the present invention may check whether real-time linear content is transmitted through the SourceFlow@realtime flag.

In addition, the PayloadFormat element in the LSID according to the embodiment of the present invention may include a @codePoint. The delivery module according to the embodiment of the present invention checks whether the @codePoint of the PayloadFormat element is equal to the codepoint field (CP) included in the LCT packet. If so, the delivery module according to the embodiment of the present invention may check an object format, a fragmentation method, and a transmission order of data transmitted by the LCT packet using attribute information included in the SourceFlow element, e.g., @FormatID, @frag and @Order.

The @FormatID may indicate the payload format (or the object format) of the delivery object. The payload format of the delivery object may be any one of a file mode, an entity mode or a package. The @frag may include information indicating how the payload of the ROUTE packets carrying the object of the source flow is fragmented for delivery. The @Order may include information indicating whether the payload of the ROUTE packets carrying the objects of the source flow, such as DASH segments, is carried in order in which the DASH encoder is generated or how the payload is carried.

The delivery module according to the embodiment of the present invention may identify the initialization segment using the OI field, the Content-Location field, the Content-Type field, etc. included in the file element of the EFDT.

In addition, the delivery module according to the embodiment of the present invention may identify the media segment through the FileTemplate in the EFDT if the object format is a file mode. If the object format is an entity mode, the delivery module according to the embodiment of the present invention may identify the media segment through the entity header in the object.

Hereinafter, a method of extracting a timestamp value at a delivery module according to an embodiment of the present invention will be described.

The delivery module according to the embodiment of the present invention may check whether the SourceFlow@realtime flag of the LSID is present in order to extract the timestamp value of the segment. If the flag value is true, this means that the NTP timestamp is present in the LCT extension header for transmitting the segment.

The EXT_PRESENTATION_TIME header of the LCT packet for transmitting the segment may transmit the start time (NTP) of the segment. The EXT_PRESENTATION_TIME according to the embodiment of the present invention may be calculated as follows.

EXT_PRESENTATION_TIME=MPD@availabityStartTime+Period@start+earliest presentation time of $k$-th segment−(SegmentBase@presentationTimeOffset*SegmentBase@timescale)+MPD@suggestedPresentationDelay That is, in (b) of FIG. 74, since the server pre-calculates and transmits the value, which should be calculated by the DASH client, through the LCT packet header, the receiver does not need to calculate the presentation time of the segment.

As described above, the delivery module of the receiver shown in (a) of FIG. 74 may generate and deliver a segment or chunk to the internal server and the internal server may provide the segment only when the DASH client requests the segment. In addition, since the DASH client should first receive the MPD, the procedure of receiving and parsing the MPD should be performed before receiving the segment. Thereafter, the DASH client may calculate the availability time of the segment using the MPD information and request the segment from the internal server. The DASH client may calculate the presentation time and transmit the segment and the calculated presentation time information to the ISOBMFF parser.

In contrast, the delivery module of the receiver shown in (b) of FIG. 74 may receive and deliver packet data to the ISOBMFF parser in segment, chunk or packet units and does not need to transmit a request to the internal server. Therefore, a segment acquisition time may be shortened. In addition, since the delivery module of (b) of FIG. 74 does not calculate the segment availability time, a time required to transmit the DASH content to the ISOBMFF parser may be shortened. In addition, since the delivery module of (b) of FIG. 74 may extract and transmit the NTP transmitted through the packet header extension to the ISOBMFF parser, it is possible to shorten the time required to calculate the segment presentation time as compared to (a) of FIG. 74. In addition, since the receiver shown in (b) of FIG. 74 may perform A/V decoding and presentation without using the MPD when A/V codec information is received through separate signaling, it is possible to shorten the time required to receive and parse the MPD.

As a result, as compared to the receiver shown in (a) of FIG. 74, the receiver shown in (b) of FIG. 74 can shorten a channel change time.

Figure 75:
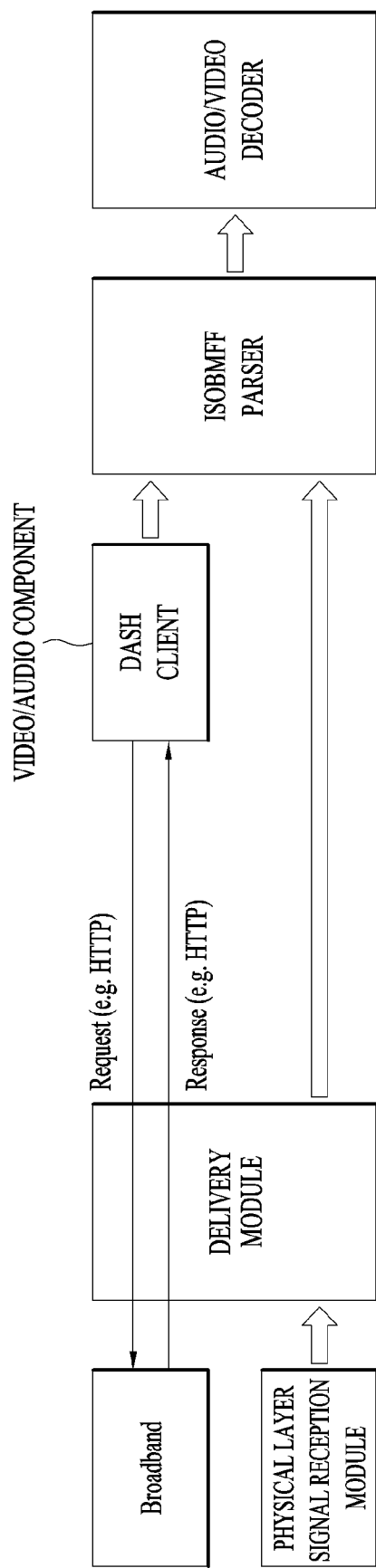
FIG. 75 is a diagram illustrating a receiver according to an embodiment of the present invention.

FIG. 75 is a diagram illustrating a receiver according to another embodiment of the present invention.

More specifically, FIG. 75 shows the structure of a receiver which operates in a push or pull mode according to path when a broadcast signal is received through a broadcast/broadband network. More specifically, the receiver may operate in the push mode when DASH content is received through the broadcast network and operate in the pull mode when DASH content is received through the broadband network.

The receiver according to the embodiment of the present invention may include a physical layer signal reception module, a delivery module, a DASH client, an ISOBMFF parser and an audio/video decoder or an A/V decoder.

Hereinafter, assume that one service includes one video component and two audio components 1 and 2, the video component and the audio component 1 are transmitted through a broadcast network, and the audio component 2 is transmitted through a broadband network. Operation of the receiver when content transmitted through the broadcast network, that is, the video component and the audio component 1, is first displayed will be described.

The physical layer signal reception module may receive a signal. Thereafter, the delivery module may receive and parse signaling information from the signal output from the physical layer signal reception module, receive server wall clock information, and set the STC value of the receiver.

Thereafter, the delivery module may first receive the initialization segment of audio and video or deliver a previously cached initialization segment to the ISOBMFF parser.

In addition, the delivery module may deliver an audio/video media segment (or chunk or packet) transmitted through the broadcast network to the ISOBMFF parser along with the PTS value.

Thereafter, the ISOBMFF parser parses the segment and delivers an A/V frame to the A/V decoder. The A/V decoder may render the A/V frame by referring to the STC and PTS values.

Hereinafter, when a user selects the audio component 2, operation of the receiver is performed as follows.

The delivery module may deliver the MPD to the DASH client. The MPD of the present invention may include only the audio component 2 or all components configuring the service, that is, the video component and the audio components 1 and 2, in order to disable the DASH client to request video delivered in the push mode through the broadcast network.

If the MPD includes all components, a flag indicating whether each representation included in the MPD is delivered through a broadcast network or a broadband network may be included. Accordingly, the DASH client may not request the representation transmitted through the broadcast network using the flag. In addition, an external module knowing on which delivery path each representation is delivered through signaling information may add an interface disabling the DASH client to request a specific component and externally control operation of the DASH client using the interface.

The DASH client may calculate a segment availability time using the MPD and request a segment corresponding to the audio component 2 from the server. After receiving the segment, the DASH client may calculate and deliver a presentation time using the MPD to the ISOBMFF parser along with the received segment. The ISOBMFF parser may parse the segment and deliver the parsed segment to the audio/video decoder. The audio/video decoder may perform rendering by referring to the STC and PTS values.

In this case, since the timeline of the video segment transmitted through the broadcast network and the timeline of the audio component 2 segment transmitted through the broadband network are equal and the same server wall clock is used, the receiver may perform A/V synchronization.

As described above, the ROUTE session may include one or more LCT (Layered Coding Transport) sessions. Detailed information on one or more transport sessions may be signaled through an LSID (LCT Session Instance Description). More specifically, the LSID may define what is transmitted in the LCT transport session of the ROUTE session. Each transport session may be identified by TSI (Transport Session Identifier) in the LCT header.

LSID may describe all transport sessions transmitted through the ROUTE session. LSID may be delivered through the same ROUTE sessions including the LCT session or may be delivered by means outside the ROUTE session, e.g., unicast or another ROUTE session.

Upon transmission through the same ROUTE sessions, the LSID may be delivered through a dedicated LCT packet with a TSI value of 0. In addition, the LSID may reference other data fragments.

The object which is referenced by the LSID is transmitted on an LCT session with TSI=0 and a TOI value different from the LSID. Alternatively, the object which is referenced by the LSID may be transmitted on a separate LCT session with TSI≠0. LSID may be updated using the version number as well as validity and expiration information.

FIG. 76 is a diagram illustrating semantics of an LSID element according to an embodiment of the present invention.

As described above, the LSID according to the embodiment of the present invention may include @version and transport session information. Attributes and elements were described above and thus a detailed description thereof will be omitted.

FIG. 77 is a diagram illustrating semantics of a source flow element according to an embodiment of the present invention.

As described above, a source protocol is used to transmit delivery objects on a unidirectional channel. The source protocol may configure at least one source flow within one session in order to deliver related objects in each object flow. Each object may be individually restored.

Hereinafter, attributes or elements included in a source flow element will be described.

An EFDT is an extended file delivery table instance and may describe details of file delivery data. The EFDT may be embedded or provided as a reference. If the EFDT is provided as the reference, the EFDT may be updated independently of the LSID. The EFDT may include the following sub attributes.

@idRef attribute is an identifier of the EFDT and may be expressed by a URI of a related transport session.

The value of @realtime attribute is determined depending on whether the attribute is present in the source flow element. If the attribute is not present in the source flow, this is set to false, and, otherwise, this is set to true. If set to true, LCT packets may include an extension header having a timestamp. The timestamp may indicate the presentation time of a delivery object included in the LCT packet.

@minBufferSize is an attribute indicating a maximum amount of data that needs to be stored in the receiver and may be present only when the value of the @realtime attribute is set to true.

An ApplicationIdentifier element may provide additional information which may be mapped to an application currently delivered through the transport session, e.g., adaptation set parameter of a DASH representation used to select LCT transport packets for rendering, a representation ID of DASH content, etc.

A PayloadFormat element may define a payload format of ROUTE packets for transmitting objects of the source flow. The PayloadFormat element may include sub attributes such as @codePoint, @deliveryObjectFormat, @fragmentation, @deliveryOrder and @sourceFecPayloadID.

@codePoint may define a CodePoint value currently used for a payload. The value is equal to the value of the CP field included in the LCT header. A detailed description thereof is equal to the above description.

@deliveryObjectFormat indicates the payload format of the delivery object. This attribute is equal to the above-described @FormatID attribute.

@fragmentation is an attribute indicating the type of fragmentation and may indicate the type or mode of fragmentation varying the value of the attribute. 0 is a default value. In addition, this attribute is equal to the above-described @frag attribute.

@deliveryOrder is an attribute describing the delivery order (or transmission order) of objects and may mean the delivery order varying according to the value of the attribute. This attribute is equal to the above-described @Order attribute.

@sourceFecPayloadID is an attribute defining the format of a source FEC payload ID and may indicate the format of the source FEC payload varying according to the value of the attribute.

An FECParameters element may define FEC parameters. This element may include an FEC encoding id, an instance id, etc. In addition, this element may be used to signal the applied source FEC payload ID.

A SourceFlowProperty element may provide property information of this source flow. The property information of the source flow may include broadcast location information for transmitting this source flow, e.g., data pipe information in the broadcast stream, etc.

FIG. 78 is a diagram illustrating semantics of a source flow element according to another embodiment of the present invention.

FIG. 78 shows another embodiment of the source flow element described with reference to FIG. 77 and is different from FIG. 77 in that an @location attribute is included after the ApplicationIdentifier element. Accordingly, a description of the same attributes or elements will be omitted.

@location is an attribute indicating broadcast location information for transmitting this source flow. As described with reference to FIG. 77, this information may be transmitted through the SourceFlowProperty element. This may be changed according to designer.

FIG. 79 is a diagram illustrating the structure of a signaling packet including EFDT semantics and an LSID according to an embodiment of the present invention.

The upper end of FIG. 79 is the semantics of the EFDT and corresponds to another embodiment of the EFDT described with reference to FIG. 77. According to the embodiment of the present invention, an EFDT @version attribute, an @maxTransportSize attribute and a FileTemplate element may be further included. The other attributes are equal to those described with reference to FIG. 77 and a detailed description thereof will be omitted.

@version is an attribute indicating the version of the EFDT and may be increased by 1 whenever the EFDT is updated. The received EFDT with a highest version number means a currently valid version.

@maxTransportSize is an attribute indicating a maximum transport size of any object described by this EFDT.

The FileTemplate element describes a file URL or a file template.

A signaling packet shown at the lower end of FIG. 79 may include a signaling message header and a payload.

The payload of the signaling packet may include an LSID itself or a part of the LSID. The LSID table including the LSID may include all or some of a signaling_id field, a protocol_version field, a signaling version field and the above-described LSID element.

The signaling ID field is an identifier indicating that this signaling table is a signaling table including an LSID element.

The protocol version field may indicate protocol version information of signaling including the LSID such as the syntax of signaling including the LSID.

The signaling version field may indicate version information of signaling data including the LSID.

Figure 80:
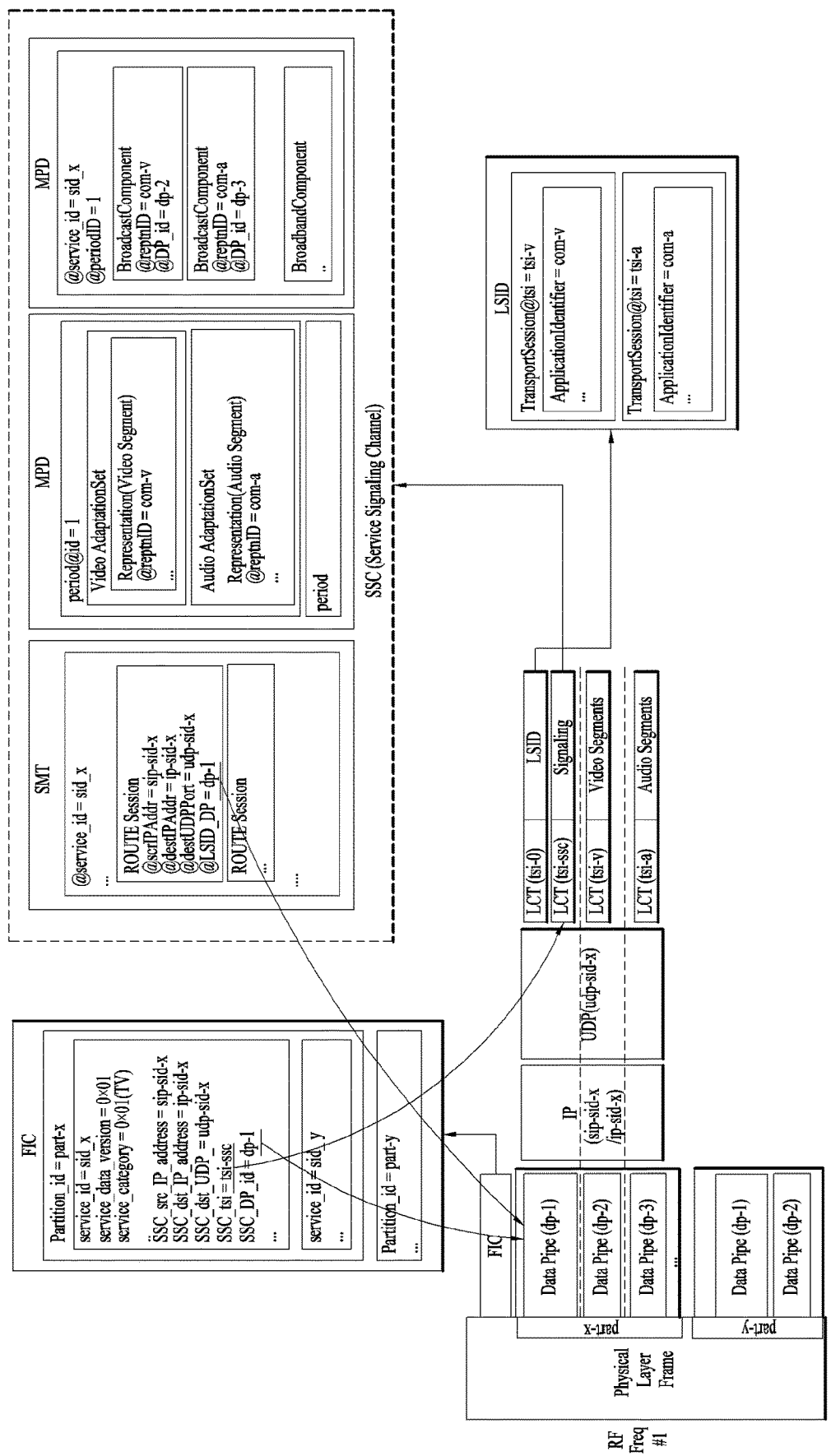
FIG. 80 is a diagram illustrating a process of acquiring signaling information through a broadcast network according to another embodiment of the present invention.

FIG. 80 is a diagram illustrating a process of acquiring signaling information through a broadcast network according to another embodiment of the present invention.

A receiver may access a location in which data of a service signaling channel related to a desired broadcast service is transmitted using information identifying services included in an FIC.

The receiver acquires, from the FIC, information about a source IP address, a destination IP address and/or a UDP port number of an IP datagram carrying the data of the service signaling channel.

The receiver acquires, from the FIC, information identifying a data pipe including the data of the service signaling channel. This figure shows an embodiment in which data of a service signaling channel is transmitted through data pipe 1. Here, SSC_DP-id in FIC may indicate data pipe 1.

The receiver can access the data pipe 1 through which the data of the service signaling channel is delivered using the information.

The receiver can access an LCT session using information which is included in the FIC and identifies the LCT session delivering the data of the service signaling channel. The LCT session delivering the data of the service signaling channel may be fixed to an LCT session having a specific TSI. In this case, the receiver can access the LCT session having the specific TSI to obtain the data of the service signaling channel. The receiver can acquire the data of the service signaling channel by accessing the corresponding location.

The receiver may access an LCT session delivering the aforementioned LSID. In this case, the TSI of the LCT session delivering the LSID may be fixed and the receiver can acquire the LSID by accessing the LCT session having the TSI. The receiver can acquire components included in the broadcast service using information of the LSID.

Figure 81:
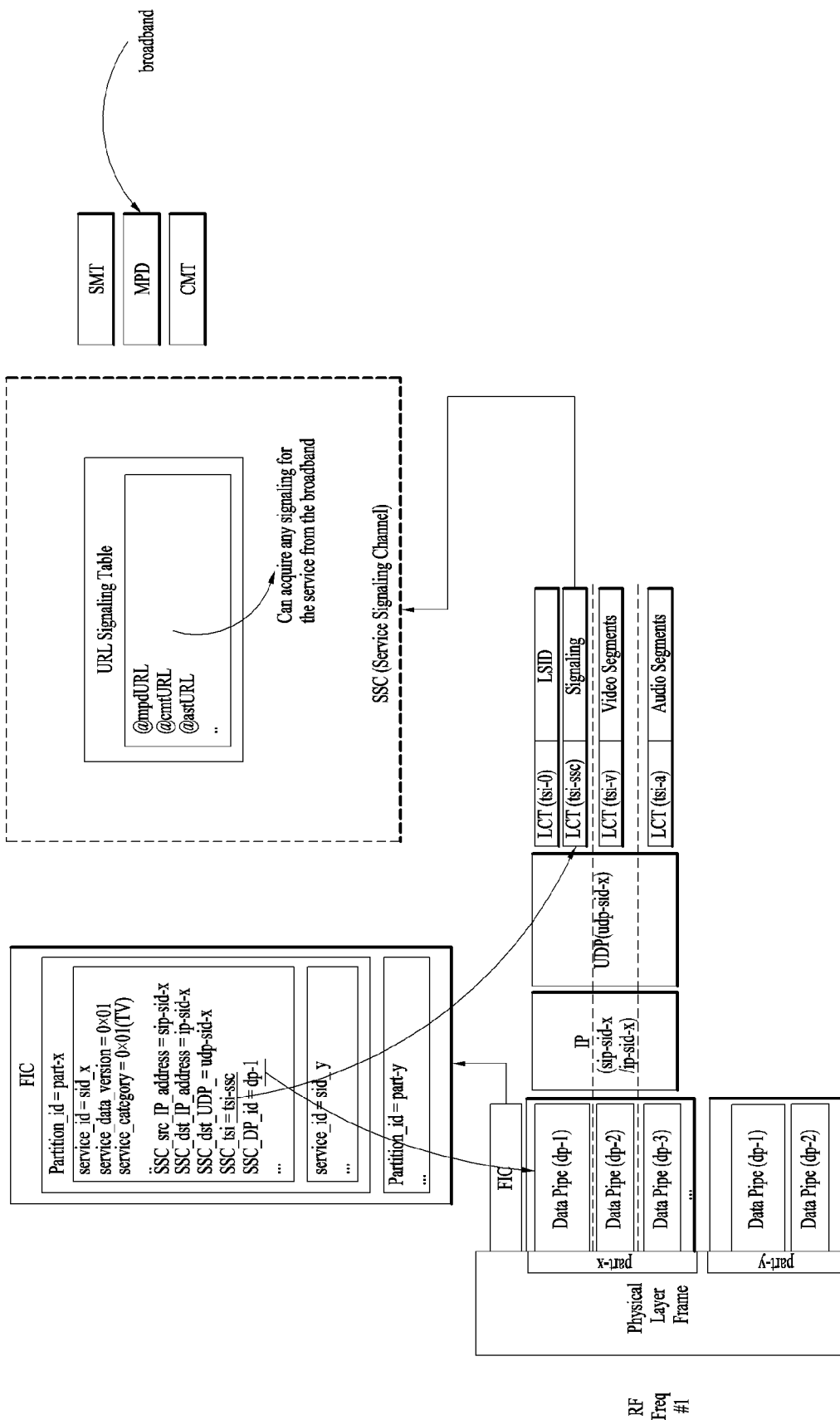
FIG. 81 is a diagram illustrating a process of acquiring signaling information through a broadcast network and a broadband network according to another embodiment of the present invention.

FIG. 81 is a diagram illustrating a process of acquiring signaling information through a broadcast network and a broadband network according to another embodiment of the present invention.

A receiver may access a location in which data of a service signaling channel related to a desired broadcast service is transmitted using information identifying services included in an FIC.

The receiver acquires, from the FIC, information about a source IP address, a destination IP address and/or a UDP port number of an IP datagram carrying the data of the service signaling channel.

The receiver acquires, from the FIC, information identifying a data pipe including the data of the service signaling channel. The receiver can access the data pipe through which the data of the service signaling channel is delivered using the information.

The receiver acquires the aforementioned URL signaling table or URL signaling description by accessing the data of the service signaling channel. The receiver can access a server or location providing service level signaling using information included in the URL signaling table to acquire the service level signaling through a broadband network.

FIG. 82 is a diagram illustrating semantics of an MPD element according to an embodiment of the present invention.

The MPD element means a root element for transmitting a media presentation description for a media presentation. Hereinafter, elements or attributes included in the MPD element will be described.

@id means an identifier for a media presentation and may be used as a unique identifier within a range within which the media presentation is published.

@profiles is an attribute describing a list of media presentation profiles.

@type is an attribute describing a type of a media presentation. The type of the media presentation may be divided into static and dynamic. While the static media presentation may be used for on-demand services, the dynamic media presentation may be used for live services. @availabilityStartTime may also be always present when the @type indicates dynamic. In this case, this attribute may specify an anchor for calculation of an earliest availability time of a certain segment within the media presentation.

In addition, when the @type indicates static, if the @availabilityStartTime is present in the MPD, this attribute may describe a time having availability with respect to all segments described in this MPD, that is, a segment availability start time. If the @availabilityStartTime is not present, all segments described in the MPD have availability at a time when the MPD has availability.

@availabilityEndTime is an attribute describing a latest segment availability end time of a certain segment within the media presentation. If this attribute is not present in the MPD, the value thereof is unknown.

@mediaPresentationDuration indicates the duration of the entire media presentation. If this attribute is not present in the MPD, the duration of the media presentation is unknown. In this case, the below-described @minimumUpdatePeriod attribute is present in the MPD. This attribute may be present in the MPD if the @minimumUpdatePeriod attribute is not present in the MPD and may be present only when the type of the media presentation is static.

@minimumUpdatePeriod may indicate a smallest period between potential changes occurring in the MPD. Accordingly, the DASH client may check and control frequency of MPD updates using this attribute. If this attribute is not present, this means that MPD change or update is not performed. In addition, this attribute is not present if the type of the media presentation is static.

Figure 83:
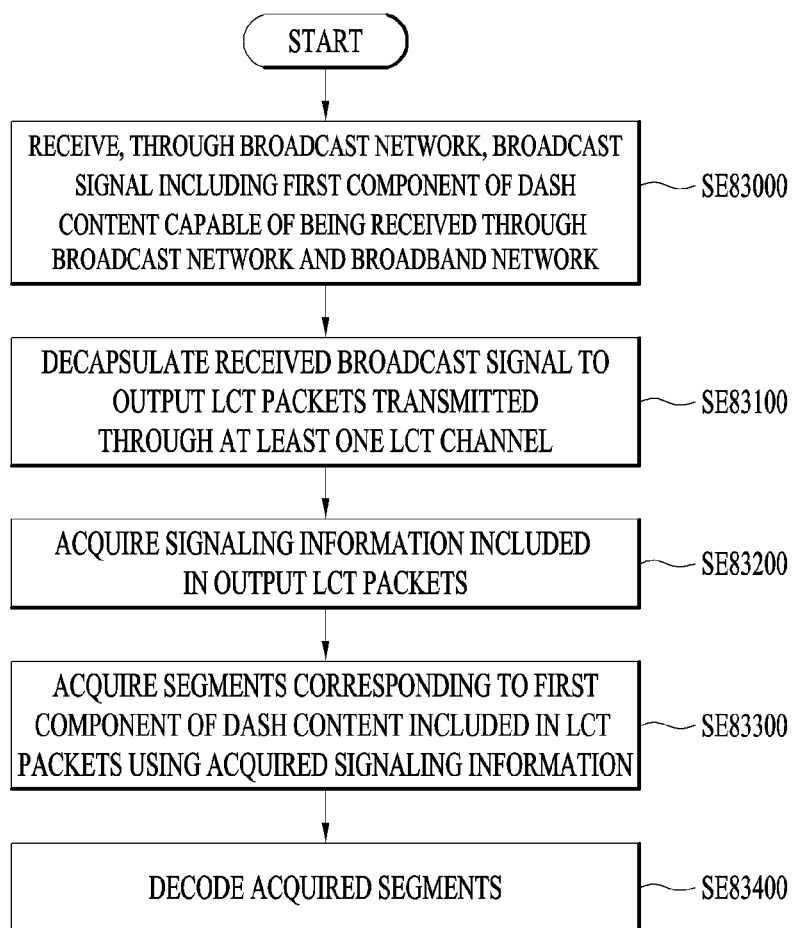
FIG. 83 is a flowchart illustrating a method of receiving a broadcast signal according to an embodiment of the present invention.

FIG. 83 is a flowchart illustrating a method of receiving a broadcast signal according to an embodiment of the present invention.

The receiver (or the broadcast signal reception device) according to the embodiment of the present invention may receive, through a broadcast network, a broadcast signal including a first component of DASH content capable of being received through the broadcast network and a broadband network (SE83000). A detailed description thereof is equal to the description of FIGS. 67 to 75 and thus will be omitted.

Hereinafter, the receiver according to the embodiment of the present invention may decapsulate the received broadcast signal and output LCT packets transmitted through at least one LCT channel (SE83100). A detailed description thereof is equal to the description of FIGS. 67 to 75 and thus will be omitted.

The receiver according to the embodiment of the present invention may acquire signaling information included in the output LCT packets (SE83200). More specifically, the receiver according to the embodiment of the present invention may acquire an LSID as signaling information transmitted through the LCT packets. A detailed description thereof is equal to the description of FIGS. 67 to 82 and thus will be omitted.

The receiver according to the embodiment of the present invention may acquire segments corresponding to the first component of the DASH content included in the LCT packets using the acquired signaling information (SE83300). More specifically, the receiver according to the embodiment of the present invention may acquire the segments by acquiring an MPD for transmitting information related to the segments using the information included in the LSID or acquire the segments using the information included in the LSID. A detailed description thereof is equal to the description of FIGS. 67 to 82 and thus will be omitted.

Hereinafter, the receiver according to the embodiment of the present invention may decode the acquired segments (SE83400).

A module or a unit may be a processor for execution of consecutive procedures stored in a memory (or a storage unit). The procedures described in the aforementioned embodiments may be executed by hardware/processors. Each module/block/unit described in the aforementioned embodiments may be operated as hardware/processor. In addition, methods proposed according to the present invention may be executed as a code. The code may be written in a storage medium readable by a processor. Accordingly, the code may be read by a processor provided by an apparatus.

Throughout this specification, the diagrams have been separately described for convenience of description. However, it is obvious that an embodiment obtained by combining some features of the diagrams is within the scope of the present invention. In addition, embodiments of the present invention can include a computer readable medium including program commands for executing operations implemented through various computers.

The method and device according to the present invention are not limited to the configurations and methods of the above-described embodiments. That is, the above-described embodiments may be partially or wholly combined to make various modifications.

The method proposed according to the present invention can also be embodied as computer readable codes on a processor readable recording medium included in a network device. The computer readable recording medium is any data storage device that can store data which can be thereafter read by a computer system. Examples of the computer readable recording medium include read-only memory (ROM), random-access memory (RAM), CD-ROMs, magnetic tapes, floppy discs, optical data storage devices, etc. The computer readable recording medium can also be distributed over network coupled computer systems so that the computer readable code is stored and executed in a distributed fashion.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Both apparatus and method inventions are mentioned in this specification and descriptions of both of the apparatus and method inventions may be complementarily applicable to each other.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

Both apparatus and method inventions are mentioned in this specification and descriptions of both of the apparatus and method inventions may be complementarily applicable to each other.

MODE FOR INVENTION

Various embodiments have been described in the best mode for carrying out the invention.

INDUSTRIAL APPLICABILITY

The present invention is available in a series of broadcast signal provision fields. It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method of processing a signal in a receiver, the method comprising:
    processing, by a processor, the signal including a service list table (SLT) and at least one service component which is carried by a Real-time Object delivery over Unidirectional Transport (ROUTE) session or a MPEG media transport protocol (MMTP) session,
    wherein the ROUTE session includes Layered Coding Transport (LCT) channels, further each of the LCT channels is identified based on Transport Session Identifier (TSI) information,
    wherein a LCT channel carries Service-based Transport Session Instance Description (S-TSID) information,
    wherein the SLT provides at least one bootstrap information that allows the receiver to discover at least one Service Layer Signaling (SLS) information for each service,
    wherein for ROUTE-delivered services, first bootstrap information includes a source IP address, a destination IP address and a destination port of at least one LCT channel carrying first SLS information,
    wherein for MMTP-delivered services, second bootstrap information includes a destination IP address and a destination port of the MMTP session carrying second SLS information,
    further the second bootstrap information does not include a source IP address.

2. The method of claim 1, wherein the receiver includes a television.

3. The method of claim 2, wherein the first SLS information includes the S-TSID information.

4. The method of claim 3, wherein the second SLS information includes a MMT signaling message.

5. The method of claim 4, further comprises:
    sending, by a DASH processor, a request for a DASH segment to a server based on an availability time of the DASH segment calculated based on a MPD (media presentation description).

6. The method of claim 1, further comprises:
    receiving, by a broadband network interface, an additional DASH representation delivered over broadband; and
    requesting and obtaining, by a broadband processor, missing data via broadband from a server based on a HTTP request/response transaction when the receiver is unable to acquire an entire object delivered by ROUTE.

7. The method of claim 1, wherein the S-TSID information is capable of including a start time of the LCT channel including a date and a time, and an end time of the LCT channel including a date and a time.

8. A receiver for processing a signal, the receiver comprising:
    a memory;
    a processor coupled to the memory and to process the signal including a service list table (SLT) and at least one service component which is carried by a Real-time Object delivery over Unidirectional Transport (ROUTE) session or a MPEG media transport protocol (MMTP) session,
    wherein the ROUTE session includes Layered Coding Transport (LCT) channels, further each of the LCT channels is identified based on Transport Session Identifier (TSI) information,
    wherein a LCT channel carries Service-based Transport Session Instance Description (S-TSID) information,
    wherein the SLT provides at least one bootstrap information that allows the receiver to discover at least one Service Layer Signaling (SLS) information for each service,
    wherein for ROUTE-delivered services, first bootstrap information includes a source IP address, a destination IP address and a destination port of at least one LCT channel carrying first SLS information,
    wherein for MMTP-delivered services, second bootstrap information includes a destination IP address and a destination port of the MMTP session carrying second SLS information,
    further the second bootstrap information does not include a source IP address.

9. The receiver of claim 8, wherein the receiver includes a television.

10. The receiver of claim 9, wherein the first SLS information includes the S-TSID information.

11. The receiver of claim 10, wherein the second SLS information includes a MMT signaling message.

12. The receiver of claim 11, further comprises a DASH processor to send a request for a DASH segment to the server based on an availability time of the DASH segment calculated based on a MPD (media presentation description).

13. The receiver of claim 8, further comprises:
    a broadband network interface to receive an additional DASH representation delivered over broadband; and
    a broadband processor to request and obtain missing data via broadband from a server based on a HTTP request/response transaction when the receiver is unable to acquire an entire object delivered by ROUTE.

14. The receiver of claim 8, wherein the S-TSID information is capable of including a start time of the LCT channel including a date and a time, and an end time of the LCT channel including a date and a time.

15. A method of transmitting a signal in a digital transmitter, the method comprising:
   transmitting the signal including a service list table (SLT) and at least one service component which is carried by a Real-time Object delivery over Unidirectional Transport (ROUTE) session or a MPEG media transport protocol (MMTP) session,
   wherein the ROUTE session includes Layered Coding Transport (LCT) channels, further each of the LCT channels is identified based on Transport Session Identifier (TSI) information,
   wherein a LCT channel carries Service-based Transport Session Instance Description (S-TSID) information,
   wherein the SLT provides at least one bootstrap information that allows a digital receiver to discover at least one Service Layer Signaling (SLS) information for each service,
   wherein for ROUTE-delivered services, first bootstrap information includes a source IP address, a destination IP address and a destination port of at least one LCT channel carrying first SLS information,
   wherein for MMTP-delivered services, second bootstrap information includes a destination IP address and a destination port of the MMTP session carrying second SLS information,
   further the second bootstrap information does not include a source IP address.

16. The method of claim 15, wherein the digital transmitter includes a broadcast station.

17. A digital transmitter for transmitting a signal, the digital transmitter comprising:
   a processor configured to transmit the signal including a service list table (SLT) and at least one service component which is carried by a Real-time Object delivery over Unidirectional Transport (ROUTE) session or a MPEG media transport protocol (MMTP) session,
   wherein the ROUTE session includes Layered Coding Transport (LCT) channels, further each of the LCT channels is identified based on Transport Session Identifier (TSI) information,
   wherein a LCT channel carries Service-based Transport Session Instance Description (S-TSID) information,
   wherein the SLT provides at least one bootstrap information that allows a digital receiver to discover at least one Service Layer Signaling (SLS) information for each service,
   wherein for ROUTE-delivered services, first bootstrap information includes a source IP address, a destination IP address and a destination port of at least one LCT channel carrying first SLS information,
   wherein for MMTP-delivered services, second bootstrap information includes a destination IP address and a destination port of the MMTP session carrying second SLS information,
   further the second bootstrap information does not include a source IP address.

18. The digital transmitter of claim 17, wherein the digital transmitter includes a broadcast station.

\* \* \* \* \*